United States Patent [19]

Hope et al.

[11] Patent Number: 4,526,462
[45] Date of Patent: Jul. 2, 1985

[54] COLOR PRINTING CONTROL SYSTEM AND METHOD

[75] Inventors: Henry F. Hope; Stephen F. Hope, both of Huntingdon Valley, Pa.; David Fidelman, Roslyn Heights, N.Y.

[73] Assignee: Hope Industries, Inc., Willow Grove, Pa.

[21] Appl. No.: 477,824

[22] Filed: Mar. 22, 1983

[51] Int. Cl.³ .................... G03B 27/73; G03B 27/80
[52] U.S. Cl. ...................................... 355/38; 355/68; 355/77
[58] Field of Search ................. 355/38, 77, 68; 356/404; 250/205, 214 B, 214 A

[56] References Cited

U.S. PATENT DOCUMENTS

| | | | |
|---|---|---|---|
| 4,061,925 | 12/1977 | van der Gaag et al. | 250/214 B X |
| 4,125,326 | 11/1978 | Baert | 355/74 |
| 4,140,391 | 2/1979 | Laciak et al. | 355/38 |
| 4,149,799 | 4/1979 | Poné, Jr. et al. | 355/38 |
| 4,168,120 | 9/1979 | Freier et al. | 355/38 |
| 4,168,121 | 9/1979 | Freier et al. | 355/38 |
| 4,172,659 | 10/1979 | Laska | 355/68 |
| 4,174,173 | 11/1979 | Poné, Jr. | 355/38 |
| 4,175,853 | 11/1979 | Harvey | 355/38 |
| 4,236,818 | 12/1980 | Fauchier | 355/77 |
| 4,270,861 | 6/1981 | Beckman | 355/38 |
| 4,286,868 | 9/1981 | Laska | 355/68 |
| 4,339,517 | 7/1982 | Akimoto | 355/77 |
| 4,371,259 | 2/1983 | Howitt | 355/38 |

OTHER PUBLICATIONS

Bremson Data Systems, Inc., prod. literature on Bremson's Single Printer Controller (Dyna-Mite).

*Primary Examiner*—L. T. Hix
*Assistant Examiner*—Della Rutledge
*Attorney, Agent, or Firm*—Ratner & Prestia

[57] ABSTRACT

A color printing control system for making prints from negatives having a color printer and a microprocessor. The output of photocells which read color negatives is applied to the microprocessor enabling it to calculate print time signals. These signals are applied, for example, to paddles and move them into the light path to terminate light exposure. A print test probe reads the density of the prints and is coupled to the microprocessor and forms a feedback loop which allows the microprocessor to adjust its internal values. In this manner, color balancing is performed and prints made from over and underexposed negatives have the same density as properly exposed negatives, without knowledge of paper characteristics and without operator setup calculations. This is achieved using the difference in density between a reference print and prints made by the system as a basis for calculating correction factors which are applied to such values as slope to cause subsequent print time signals to result in correct density. The system also corrects color predominance in negatives where the conventional integration to gray method would print incorrectly. In cases where color analysis indicates the possibility of exposure under tungsten or fluorescent light an operator prompt is provided allowing the operator to enable an appropriate correction.

12 Claims, 8 Drawing Figures

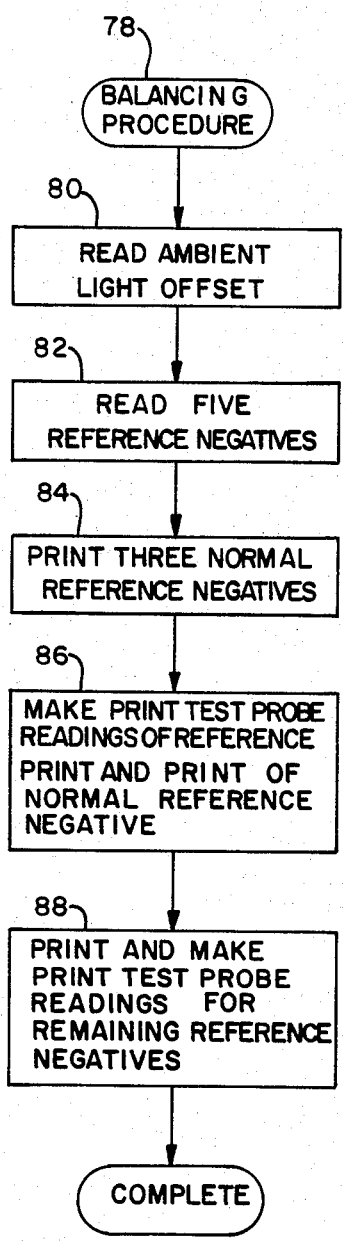
FIG.2A GENERAL BALANCING PROCEDURE

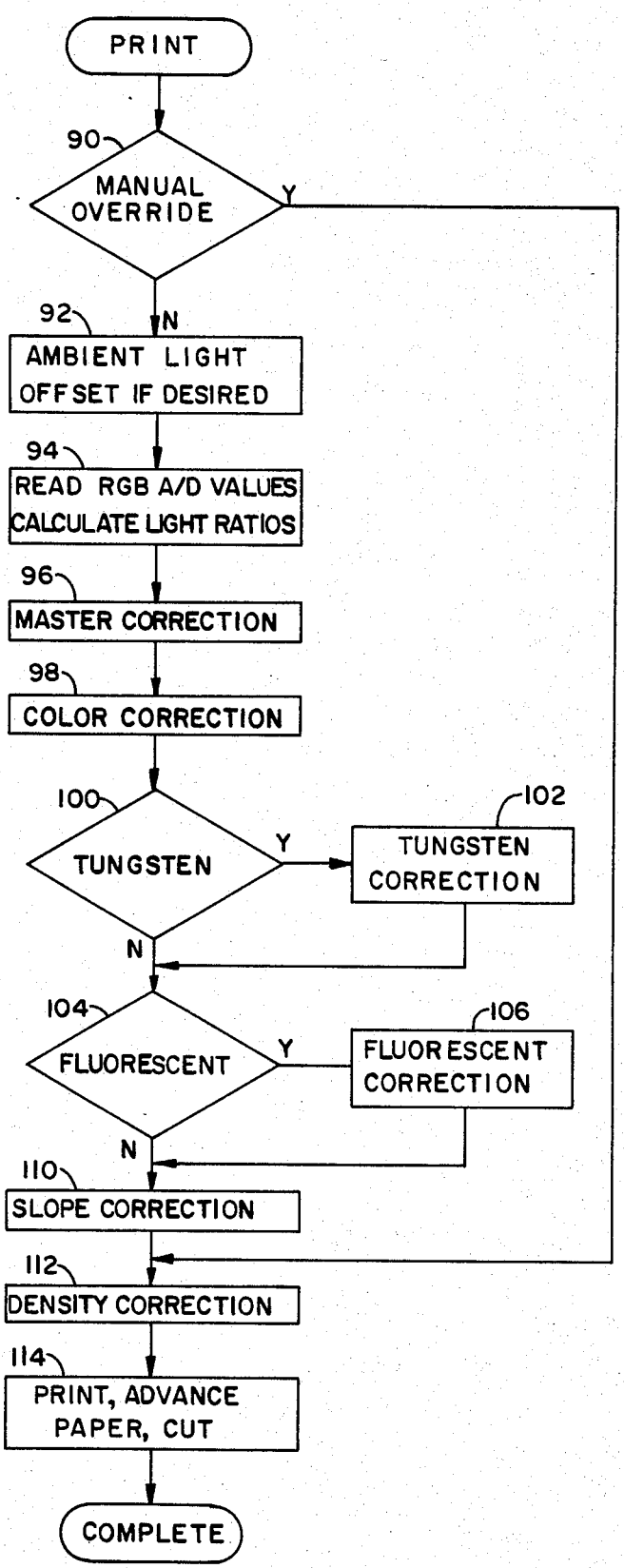
FIG. 2B   GENERAL PRINT CYCLE

COLOR PRINTING CONTROL SYSTEM AND METHOD

BACKGROUND OF THE INVENTION

A. Field of the Invention

This invention relates to the field of art of systems which control color printing.

B. Background Art

Color printing control systems are known in the art. However, prior systems have been limited in that they have usually required hand calculations by an operator of the readings of the density information on the prints, or they have required complicated printing procedures such as ring-arounds, seven-button density series, slope series, etc. The prior art has been unable to achieve a fully automated system with a closed feedback loop that operated with efficiency but without a great deal of complexity. Prior computer controlled systems have been extremely complicated and difficult to set up and balance. On the other hand, noncomputer controlled systems have left much to be desired in that they have not provided adequate flexibility and simplicity in setup which are necessary for today's multiplicity of film types, print size, etc. A further objection of prior color printing control systems has been that they have generally not provided adequate first print results or true color balance for negatives made under tungsten or fluorescent light conditions.

SUMMARY OF THE INVENTION

A color printing control system for making color prints from color negatives which comprises a color printer, microprocessor and photocells for reading the color negative. A plurality of paddles moves subtractive filters and shutters into the light path in response to print time signals from the computer. The printing times of these signals are computed from the photocell readings of the red, green and blue light transmitted through the negative. These calculations are based upon values stored in the computer memory which have been determined during an automated setup procedure. A print test probe coupled to the microprocessor reads the density values of a print made from a reference negative, and those of a correctly exposed print of the same negative. If there is any difference, the microprocessor calculates from these readings a set of correction factors which then permit it to make correct prints from this reference negative, and therefore from any other negative.

Further, the microprocessor determines the proper relationship between light transmission through the negative and proper print time signals for under and overexposed negatives to compensate for the non-linear relationship which exists (known as "slope"). This is done by making prints of an over and an underexposed negative, and comparing these prints with the correctly exposed prints. The microprocessor uses the differences to calculate a new slope characteristic which will produce proper prints without data on the characteristics of paper used. The procedure is performed using one set of moderately over and underexposed reference negatives, and again with a set of extremely over and underexposed negatives. Thus a four-segment slope characteristic is derived which provides proper correction for both moderately and extremely incorrect negative exposures. No operator setup calculations are required.

There is still further provided, a method of printing negatives that have a color predominance, where the conventional "integration-to-gray" method would print incorrectly. The color content of the negative is analyzed, and when a color predominance is detected the printing color balance is modified accordingly. In cases where the color analysis indicates the possibility of an exposure under tungsten light, for which normal outdoor film is not properly balanced, an operator prompt is shown so that the operator can decide whether the picture seems to be one taken under tungsten illumination. If so, a tungsten color correction is added to give accurate color balance in the print. A similar procedure is followed for fluorescent light illumination.

BRIEF DESCRIPTION OF THE DRAWINGS

FIG. 2A is a flowchart of the general balancing procedure used in the invention of FIG. 1A.

FIG. 2B is a flowchart of the general print cycle performed by the invention of FIG. 1A.

GENERAL DESCRIPTION OF SYSTEM 10

Figure 1A:
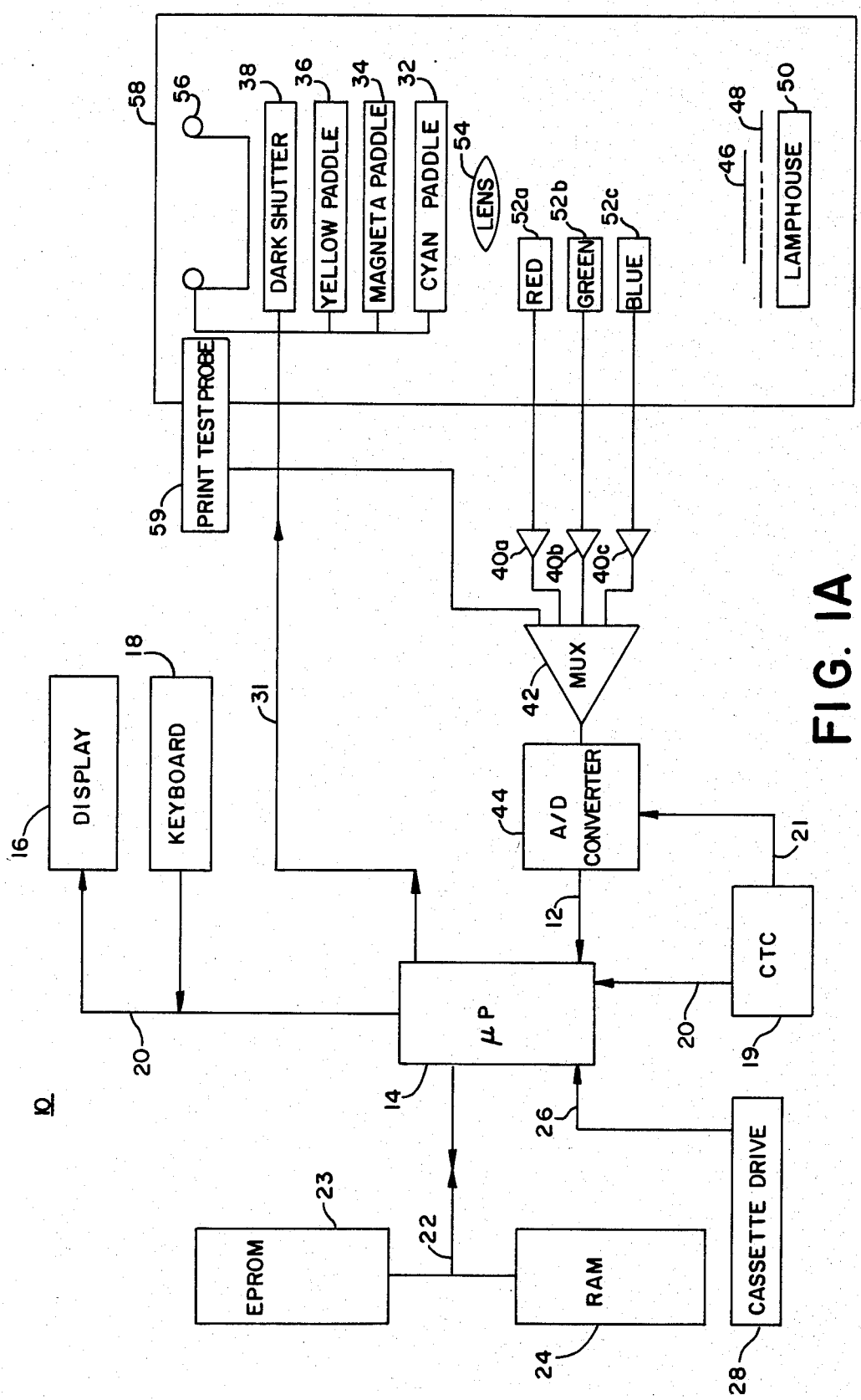
FIG. 1A is a block diagram of a color printing control system in accordance with the invention described.

A block diagram of a preferred embodiment of a color printer system 10 is shown in FIG. 1A. Color printer system 10 includes a conventional color printer 58, a microprocessor 14, eraseable programmable read only memory (EPROM) 23, a random access memory (RAM) 24 interconnected by a means of bus 22, and A/D converter 44, a multiplexer 42, operational amplifiers 40a-c, and a print test probe 59. Test probe 59 reads color prints and transmits density readings directly to the control circuitry through multiplexer 42. Time controller chip (CTC) 19 provides microprocessor 14 with real time interrupts and cassette drive 28 is used to store data base information. This data base information passes between cassette drive 28 and RAM 24 where it is stored when being used, by means of bus 26, microprocessor 14 an bus 22. Display 16 a keyboard 18 are connected to microprocessor 14 by means of bus 20. Using display 16 and keyboard 18 the operator may communicate with color printer system 10.

Within color printer 58, negative 46, in a negative mask 48, is placed above lamphouse 50. Lamphouse 50 contains an illumination source and the illuminated negative is focused through lens 54 onto the paper which is to be exposed. Paper transport 56 controls the movement of this paper. The light which is transmitted through negative 46 strikes photocells 52a-c which determine how much red, green and blue light respectively is transmitted through negative 46.

The outputs from photocells 52a-c are amplified by means of operational amplifiers 40a-c. The outputs of amplifiers 40a-c and densitometer 59 are multiplexed by multiplexer 42 and applied to A/D converter 44. A/D converter 44 supplies microprocessor 14 with digital information of the output of photocells 52a-c and probe 59 by means of bus 12.

Cyan paddle 32 includes a cyan filter which blocks cyan light while allowing other frequencies of light to pass. This cyan filter may be moved between lamp housing 50 and the paper which is being exposed thereby terminating cyan exposure. Similarly, magenta paddle 34 and yellow paddle 36 may be used to terminate magenta exposure and yellow exposure respectively. Dark shutter 38 is used to completely block any light from striking the paper. EPROM 23 and RAM 24 contain algorithms and data which allow microprocessor 14 to make calculations based upon the output of photocells 52a-c and to make determinations as to when to activate paddles 32, 34, 36 dark shutter 38 and paper transport 56. Microprocessor 14 exercises control over these devices by means of bus 31. Bus 31 includes conventional address decoders.

GENERAL DESCRIPTION OF COLOR BALANCING PROCEDURE

Figure 1B:
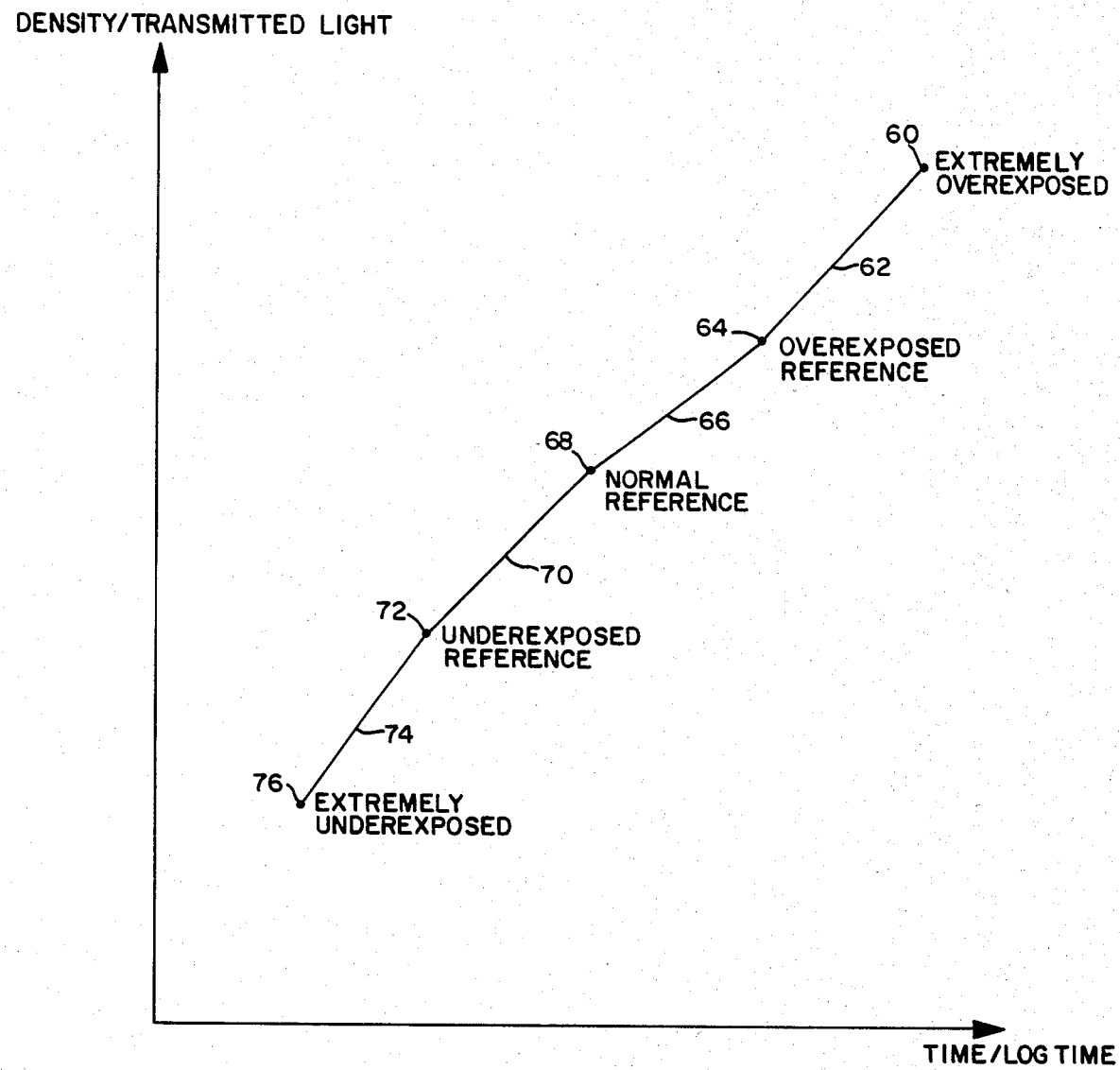
FIG. 1B is a chart of a four segment time versus density slope curve.

In the color balancing procedure shown in FIG. 2A, color printer system 10 adjusts the print times which will be used to produce color prints from a standard reference negative. The objective is to produce prints with the same red, green and blue densities as a standard reference print. Additionally, the procedure adjusts various constants which will be used as correction factors to compensate for the non-linear relationship between density and time when under and overexposed negatives are processed. The operator of color printer system 10 performs the balancing procedure when system 10 is installed and periodically when any of the printing or processing conditions have changed. A major purpose of this balancing procedure is to automatically develop proper slope corrections. A graphic representation of the slope characteristics are shown in FIG. 1B. Each of the three primary colors red, green and blue has its own independent density slope similar to the one shown in FIG. 1B. However, the theory involved in slope correction is identical for each of the three colors and the balancing procedure to be described will be the same for each.

Since a small amount of light from sources external to the printer will leak into color printer 58 and affect the photocell readings, an ambient light offset factor is developed in block 80 by turning the light source in lamphouse 50 of FIG. 1A off while readings are taken using photocells 52a-c. The outputs obtained from operational amplifiers 40a-c are stored in RAM 24 until the print is made. These ambient light values are then subtracted from the photocell readings when prints are made. This procedure thus eliminates the effect of external light which leaks into color printer 58.

In block 82 of FIG. 2A, five standard reference negatives are read using color printer 58 shown in FIG. 1A. The first is a normal reference exposure which is assumed to be a correct exposure. The remaining four negatives represent varying degrees of overexposure and underexposure. They are an overexposed reference negative, an underexposed reference negative, an extremely overexposed negative, and an extremely underexposed negative. Three readings are made for each of the five negatives, one for the amount of the red light detected by the photocell 52a, one for the amount of green light detected by photocell 52b and one for the amount of blue light detected by photocell 52c. Therefore, a total of fifteen A/D readings are taken as a result of the operations performed in block 82. These digital values are related to the quantity of red, green and blue light transmitted through the negatives because they represent the integrated output of the photocells. These fifteen readings are stored in the data base which has been loaded from cassette drive 28 and is stored in RAM 24. These readings are used to establish reference points 60, 64, 68, 72 and 76 of FIG. 1B.

The reading of the normal reference negative is used to establish center reference point 68, the reading of the overexposed reference negative is used to establish reference point 60, the reading of the underexposed reference negative is used to establish reference point 72, and the reading of the extremely underexposed negative is used to establish reference point 76. These reference points are used to determine the slopes of segments 62, 66, 70 and 74 of the four segment slope of FIG. 1B.

Block 84 shows a test used to assure consistent prints. In this test three prints are made of a normal reference negative. These prints are compared visually for consistency. One of them is used for a comparison with a reference print below.

In block 86 two readings using print test probe 59 are made. Print test probe 59 is a light source and light sensing device such as a densitometer. Its output is connected directly to processor 14 by way of multiplexer 42, converter 44 and bus 12. When a print is placed under probe 59 and the amount of red, green and blue light reflected off the print is measured, the operator depresses keys on keyboard 18 to automatically enter that data into RAM 24.

The first print read by probe 59 is a standard normal reference print. The computer attempts to make all production prints look like this reference print. It does this by controlling paddles 32, 34 and 36 to cause the density for each color in the production print to equal the corresponding density in this normal reference print. Having stored in its data base in RAM 24 the amount of red, green and blue reflected from the reference print and detected by the probe of light sensing head 59, the computer is now prepared to accept the readings of head 59 for the second print. This is one of the prints of the normal reference negative which was made in block 84. This print, because it is made from a reference negative assumed to be correct, should generate the same density readings as the reference print. The operator places this second print under test probe 59 and depresses the transmit button. This causes the output of test probe 59 to be directly read by printer system 10.

The corresponding red, green and blue density readings of the two prints are then compared by microprocessor 14. The density difference for each of the three colors is calculated. On the basis of this information, microprocessor 14 calculates new print times as necessary for each of three colors. The first step in this calculation of the new print time is the development of a multiplication factor which is then applied to the old print time for the appropriate color. This multiplication factor can be expressed as the natural log e raised to the power negative gamma times the delta density where gamma is the standard proportionality constant related to the density characteristics of the printing paper being exposed and the delta density is a proportionality constant related to the density difference between the two prints read by test probe 59. This density difference is related to the density of the reference print minus the difference of the print made from the normal reference negative. EPROM 23 and RAM 24 contain algorithms and data which allow microprocessor 14 to make a first order approximation of this multiplication factor. Due to the feedback made possible by print test probe 59 color printer system 10 does not require knowledge of gamma or other paper characteristics. Any approximations or incorrect assumptions are automatically corrected by iterating blocks 84 and 86.

Therefore, the amount of time before paddles 32, 34 and 36 are moved into the light path changes as necessary in block 86 in order to cause the density of the print made from the normal reference negative to equal the density of the reference print thus causing a proper negative to produce a proper print. This is an iterative learning process for printer system 10. If adjustments of print times were made in block 86 a new print is made from the normal reference negative. Block 86 is then repeated for this new print and the comparison is made between the density readings of the reference print and this new print.

While block 86 causes normal prints to be made from normal negatives, block 88 causes normal prints to be made from underexposed and overexposed negatives. In block 88 prints are made of the five reference negatives described in block 82. These prints are placed under print test probe 59. As each print is placed under probe 59, the operator pushes the transmit button causing the printer to automatically receive and store the density of red, green and blue light in each print. Microprocessor 14 will then recalculate reference points 60, 64, 72 and 76 by applying the multiplication factors developed from the density differences. This process is repeated until the underexposed and overexposed negatives yield normal prints.

Reference points 68 and 64 are then used to determine the slope of segment 66 of FIG. 1B. This is the slope correction which is used when the density of a production negative fails between the normal density and the overexposed density. Using this slope information, a correction characteristic is developed. During a production run, if a density is determined to fall in segment 66, the normal print time will be multiplied by this slope correction factor. Likewise, reference points 68 and 72 are used to determine the slope correction factor for an underexposed negative. If a production negative is determined to have a density in segment 70 a correction factor determined by this slope will be applied to the print times of that negative. Similarly, slope correction factors developed for segment 62 are developed using reference points 64 and 60 and for segment 74 using reference points 72 and 76. By adjusting the reference points, these internal factors or constants of the control algorithm have been automatically adjusted in such a way as to cause normal prints to result from underexposed and overexposed negatives without any intuitive judgement or adjustment by the operator. The objective is, of course, to cause the density of the prints made from all of these negatives to be equal to the density of the reference print.

GENERAL DESCRIPTION OF THE PRINT CYCLE

FIG. 2B shows a flow chart of the print cycle. This cycle is executed when a negative 46 is placed upon negative holder 48 in order to make a print. If there is a manual override, as determined in diamond 90, execution proceeds directly to the density correction of block 112. Otherwise the operator may read the ambient light offset to compensate for changes in ambient light in block 92. This procedure is the same as described in block 80 of FIG. 2A. During normal production prints there will be normal lighting around the machine. This normal lighting may change from day to day or at different times during the day. Thus, the operator may request new offsets to be calculated as often as desired. This request is entered using keyboard 18. The amount of offset calculated will be substracted from the subsequent photocell readings in order to compensate for the ambient light.

In block 94, the illumination source in lamphousing 50 is activated and the red, green and blue A/D values are read from photocells 52$a$–$c$ using color printer 58 of FIG. 1A. The linear print times for each color are determined based primarily on these values. The linear print times calculated are the normal reference print times developed in the balancing procedure adjusted by a series of correction factors as necessary. These corrections include light intensity ratios, a master correction, tungsten, fluorescent, and a slope correction.

The light ratios are determined separately for each of the primary colors red, green and blue. The ratio for the red light is the ratio of the A/D output of red photocell 52$a$ taken in block 94 to the A/D reading obtained from photocell 52$a$ when the normal reference negative was read in block 82 of the balancing procedure. This ratio will be multiplied by the normal red print time in order to get the linear component of the print time correction. Similarly, ratios will be developed for green and blue print times.

Block 96 shows the master correction factor. This correction factor takes into account everything in color printer system 10 from the light source through the densitometer reading of the print. It compensates for such things as the aging of the lamp, chemistry changes and dust. The operator may request that a master correction factor be calculated as necessary using keyboard 18. If some negatives are printed correctly and others are not, the operator will perform the balancing procedure in FIG. 2A. However, if there is a systematic problem which appears in all prints the operator will request a calculation of the master correction factor. The result is stored in memory and when block 96 is executed it is multiplied by the linear print times.

In the next step, block 98, color predominance is corrected using integration to gray. In this method the assumption is made that all normally exposed negatives will have the same amount of red, green and blue as the reference negative. Thus, if the difference between the A/D readings of block 94 and those stored for the normal reference negative is above a certain limit, a color predominance is detected. To make the correction for this color predominance the light ratios developed in block 94 are multiplied by the reference print times.

A predominance of yellow may be due to the use of a tungsten filament lightbulb. If such a yellow predominance is detected the printer will inquire of the operator, using display 16, whether a tungsten correction should be performed as represented in diamond 100. By visual inspection of negative 46, the operator can determine whether the predominance detected is due to tungsten or some other factor. If the predominance is due to tungsten, the operator will enter yes, using keyboard 18, and a special tungsten correction will be executed in block 102. This correction is a fixed amount that has been empirically determined to be appropriate for a tungsten filament lightbulb which is added to the adjusted normal reference print time.

Similarly, a predominance of blue/green may be due to fluorescent light. As in the case of the yellow predominance for the tungsten correction, color printer system 10 will inquire of the operator whether a fluorescent correction should be made in diamond 104 when such a predominance of blue is detected. If the operator response is yes the fluorescent correction of block 106 is executed. Again, a fixed empirically determined correction is added to the adjusted normal reference print time.

In block 110 the non-linear portion of the density correction is performed. When the light in lamphouse 50 is transmitted through negative 46 of FIG. 1A, printer system 10 can determine the amount of light transmitted by integrating the output of the photocells 52a-c. If too little light is transmitted by the negative, the paper must be exposed longer. To the first approximation there is a linear relationship between density and time. For example, if there is 50% too much light transmitted the paper should be exposed 50% shorter. This is the correction made in block 98 using the ratios of block 94.

However, this relationship is not exactly linear. Therefore a slope correction must be made. This correction is made in block 110. The slope correction used is an application of one of the constants adjusted in block 88 of FIG. 2A. The appropriate constant will be selected by determining which segment of FIG. 1B is applicable.

The operator of color printer system 10 may visually detect that a roll of film or a particular negative has an improper color. This may be due to such things as storing the film outside its temperature range for a long period of time. When this is detected, the operator may request appropriate color corrections using keyboard 18. In block 112 color printer system 10 will determine if any such requests have been made and if so make the requested corrections. If there is a manual override, as determined in diamond 90, execution will proceed directly to this block.

At this point, all of the appropriate corrections have been made to the print times. In block 114 microprocessor 14 opens dark shutter 38, activates the illumination source in lamphousing 50, activates paddles 32, 34 and 36 when appropriate, and closes dark shutter 38. Paper transport 56 is then activated by microprocessor 14. This causes the paper to be advanced and cut. The exposure times are displayed using display 16.

DETAILED DESCRIPTION OF SETUP PROCEDURE

Figure 3A:
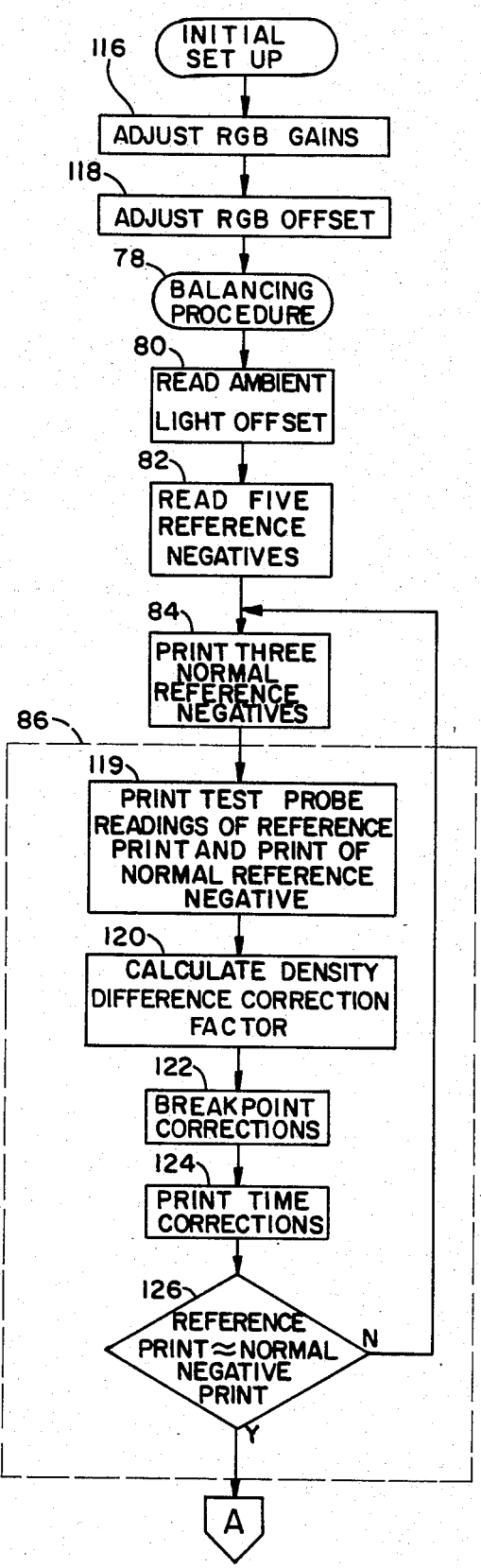
FIGS. 3A-B taken together form a flowchart of the detailed initial setup and balancing procedure used in the invention of FIG. 1A.
Figure 3B:
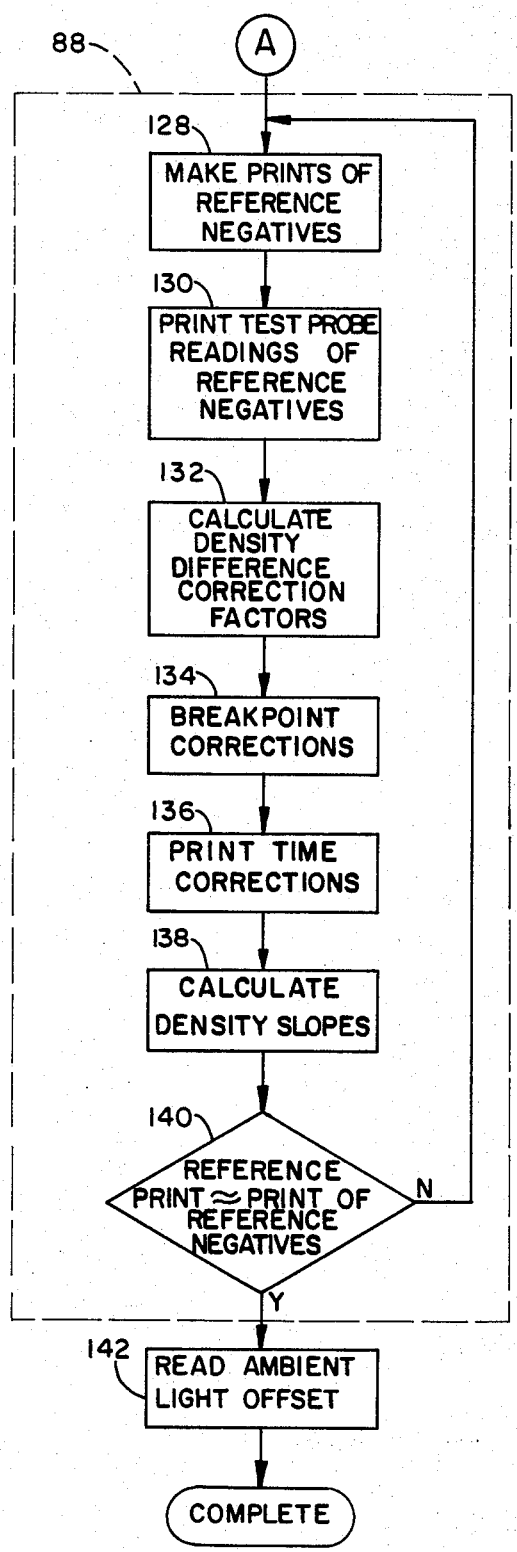

FIGS. 3A and 3B show a flow chart description of the initial setup procedure. This procedure is run when the machine is first installed and from time to time thereafter as desired. The balancing procedure described in FIG. 2A is a subset of this procedure and an expanded description of it is also shown in FIGS. 3A and 3B.

The first step in this initial setup procedure is an adjustment of the gains of operational amplifiers 40a-c of FIG. 1A. This step is shown in blocks 116 and 118. These operational amplifiers amplify the output of photocells 52a-c and apply this amplified output to A/D converter 44 by means of multiplexer 42. These gains are adjusted by means of three potentiometers. The primary objective of these adjustments is to prevent operation of A/D converter 44 from approaching its saturation range. Another objective is to achieve equal outputs from the three photocells as applied to A/D converter 44 by multiplexer 42. It is important to be approximately in the middle of the operating range of the A/D converter and to have equal red, green and blue outputs because this is the information upon which all control is based. To make the adjustment in block 116 the illumination source in lamphouse 50 is activated. Microprocessor 14 reads A/D converter 44 and displays these values to the operator on display 16. The operator will adjust the potentiometers until equal output at the optimum point of the operational range of A/D converter 44 is achieved.

Further adjustment of the photocell output is made in block 118. In this adjustment the illumination source in lamphouse 50 is deactivated and the offsets of the operational amplifiers are adjusted to assure a proper base lines. These base line adjustments are also made using three potentiometers. Once the system is thus assured of reliable readings of the negatives the balancing procedures can be begun. A detailed description of this procedure begins at block 78.

In block 80 the ambient light offset readings are taken. Since this balancing procedure is done in minimum light conditions, that is the lighting around the printer is turned off, this offset will be small. The amount of light leaking into the printer and striking the photocells will be stored in order to be subtracted from future photocell readings.

Block 82 shows a reading of the five reference negatives. These five reference negatives are the normal reference, the overexposed reference, the underexposed reference, the extremely overexposed, and the extremely underexposed. The overexposed and the underexposed negatives are incorrect by approximately two f-stops.

When the illumination source of lamphouse 50 of FIG. 1A is transmitted through negative 46, three readings are taken by photocells 52a-c, one for red, one for green and one for blue. These fifteen readings are used to determine reference points 60, 64, 68, 72 and 76 of the four segment slope of FIG. 1B. They are entered into the data base stored in RAM 24 for the appropriate setup.

Each different type of paper, size of paper and film speed requires its own group of data items called a setup. There are thus many different setups. Each setup contains approximately 52 data items. These 52 internal values include the initial values of reference print time and slope correction factors. When a print is to be made the operator requests, from cassette drive 28, the setup which is appropriate to the given requirements. The data items in this setup are then stored in RAM 24. These internal values are then used to obtain the proper prints for that printing session. During the balancing procedure these data items are modified. This procedure is performed as necessary for a given setup whenever it appears to the operator that prints made using that setup are not correct.

The format of a data base setup is shown in Table 1. The three readings taken for the normal reference in block 82 can be seen at data 44, data 45, and data 46. These data items are the A/D readings of reference negative obtained from red photocell 52a, green photocell 52b, and blue photocell 53c respectively. Similarly, the three readings for the overexposed reference negative can be seen at data 47, 48 and 49, and the three readings for the overexposed reference negative can be seen at data 50, 51 and 52.

Each of the readings represents a reference point on one of the three different four segment slopes, an example of which is represented in FIG. 1B. FIG. 1B shows a graph of the non-linear print time versus density slope. Each of the three primary colors will have its own independent graph.

Thus in block 82, microprocessor 14 uses algorithms contained in EPROM 23 to determine initial values for the reference points shown in FIG. 1B. After some adjustments, these reference points will determine the slopes which establish the adjusted print time signals necessary to correct underexposed and overexposed prints during production runs. It can be seen in FIG. 1B that the print time versus density is non-linear. It is therefore approximated using four segments. These segments are: segment 74 which is used to correct extremely underexposed negatives, segment 70 which is used to correct underexposed reference negatives, segment 66 which is used to correct overexposed reference negatives, and segment 62 which is used to correct extremely overexposed negatives. These segments are defined by the five reference points shown, each of which is obtained from one of the readings of each of the five reference negatives made in block 82. Reference point 68 in the center is the reference point associated with the standard normal reference negative. This is the negative which is defined to be correct. Reference point 72 is the reference point associated with the readings taken of the underexposed reference negative. Reference point 64 is the reference point associated with the overexposed reference negative. Reference point 76 is associated with the extremely underexposed negative, and reference point 60 is associated with the extremely overexposed negative. By breaking the graph of density versus time into four segments, it is possible to print negatives over a wide exposure range more accurately. Furthermore, it is possible to do this without requiring the expertise or judgement of the operator. Color printer system 10 can merely determine in which of the four regions the production negative falls and make the proper adjustments automatically.

In block 84 three prints of the normal reference negative are made. One of these prints will be used for comparison with the reference print below. These three prints are checked visually by the operator for consistency of density and color balance. Additionally, the operator will check the print times for each of the three colors, red, blue and green. The print times used will be displayed by the printer on display 16. Since this procedure is done under minimal light conditions, the three print times displayed should be within one A/D count of the print times stored in the data base. If either of these conditions are not met the operator must restart the balancing procedure.

The steps defined generally by dotted line 86, containing blocks 119, 120, 122, 124 and diamond 126 are an expanded view of block 86 of FIG. 2A. The first of these, block 119, shows the print density readings necessary for calculating the corrections which must be applied to the reference points and the print times in the data base in order to rebalance the set up. This is an iterative process. One of the reasons that an iterative process is used to cause these parameters to approach their correct values is the possibility that these corrections will overshoot. This is one of the reasons that a great deal of intuition and experienced judgement is required to manually correct color imbalance. To make the first set of print test probe readings the operator places the standard reference print under print test probe 59 and red, green and blue densities of the reference print are automatically communicated to microprocessor 14 by a means of multiplexer 42 and A/D converter 44. The same is done for one of the prints made from the normal reference negative in block 84.

The next step, shown in block 120, is the determination of a correction factor based upon the difference between the density readings of the reference print and one of the print made from the normal reference negative in block 84 for each of the three primary colors. In this step, microprocessor 14 will calculate the density difference between the two prints by subtracting the density of the print of the normal reference negative from the density of the reference print for each color. This multiplication factor can be expressed as the natural log base e raised to the power negative gamma times the delta density where gamma is the standard proportionality constant related to the density characteristics of the printing paper being exposed and the delta density is a proportionality constant related to the density difference between the two prints read by test probe 59. This density difference is related to the density of the reference print minus the density of the print made from the normal reference negative. EPROM 23 and RAM 24 contain algorithms and data which allow microprocessor 14 to make a first order approximation of this multiplication factor. Due to the feedback made possible by print test probe 59 color printer system 10 does not require knowledge of gamma or other paper characteristics. Any approximations or incorrect assumptions are automatically corrected by iterating blocks 84 and 86. If the densities are exactly equal, the multiplication factor will be unity.

These correction factors are applied to be reference point 68 of the print time versus density graph of each color in block 122. They are also applied to the print times of the normal reference negative for each color in the step shown in block 124. These values start at some approximation supplied to the user on a cassette. By performing the operations in block 124 these values are caused to become correct for the particular color printer, film, etc. The appropriate correction factors for the red, blue and green print times will be applied in this step.

The ultimate objective of the steps defined generally by dotted line 86 is to obtain a print from a normal reference negative which is identical to the reference print as determined by readings of print test probe 59. In diamond 126 the probe readings of block 119 are compared. If the difference is not within an acceptable range execution will return to block 84 in order to make a new print from a normal reference negative using the new reference point and print time. This process will be repeated as necessary causing successive adjustments until the prints are within tolerance.

Having learned how to make a correct print from a correct negative; the printer now learns how to make correct prints from underexposed and overexposed negatives. This process is depicted within dotted line 88 of FIG. 3B. Blocks 128, 130, 132, 134, 136, 138 and diamond 140 are an expanded representation of block 88 of FIG. 2A. The first step in this process is to make prints of the five negatives which were read in block 82. These are the normal reference, the overexposed reference, the underexposed reference, the extremely overexposed and the extremely underexposed. The printing of these negatives is shown in block 128.

In block 130 print test probe readings of each of these prints are made and stored in the data base in RAM 24. The objective is to adjust the reference points and print times of the four incorrectly exposed negatives in such a way as to produce prints of the four negatives which yield the same density readings as the print of the normal reference negative.

In block 132 the density difference correction factors are calculated in the same fashion as the density difference calculations in block 120. Three such correction factors are determined, one for each color. These three calculations are performed for each of the four negatives. In blocks 134 and 136 these correction factors are applied to reference points 60, 64, 68, 72 and 76 and to the print times for each of the four negatives. These new reference points are used to adjust other internal values.

Once the reference points have been adjusted the current or present values of density slope are replaced with adjusted values of density slope. The slope calculation involved is the standard m=delta y/delta x. For example, to determine the slope of segment 70 of FIG. 1B, the density coordinate of reference point 72 is subtracted from the density coordinate of reference point 68. The time coordinate of reference point 72 is then subtracted from the time coordinate of reference point 68. The former value is then divided by the later value. This process will be repeated for the red, the green and the blue reference points. The results are the adjusted print time versus density slopes. They will be stored at data 19, 20 and 21 of Table 1. The same procedure will be performed for segment 66, and the results will be stored at data 16, 17 and 18 of Table 1. This process is repeated for segments 62 and 74.

In diamond 140 a determination is made whether the densities of the prints made from the various underexposed and overexposed negatives which were made in block 128 are within the desired tolerance of the density of the print made from the normal reference negative. If they were not, a return to block 128 will be executed and the process will be repeated. This is continued until the densities are within tolerance.

The final step in the balancing procedure, block 142, is reading of the ambient light offset. This involves the same process as was described in block 80 above. At this point the lights are turned on and an ambient light offset is requested. This value is stored in memory and is used when the print cycle is executed. However, the operator may at the time of the execution of the print cycle elect to have another ambient light offset calculated in order to take into account the ambient light at the time of that print session, as often as necessary.

DETAILED DESCRIPTION OF THE PRINT CYCLE

Figure 3C:
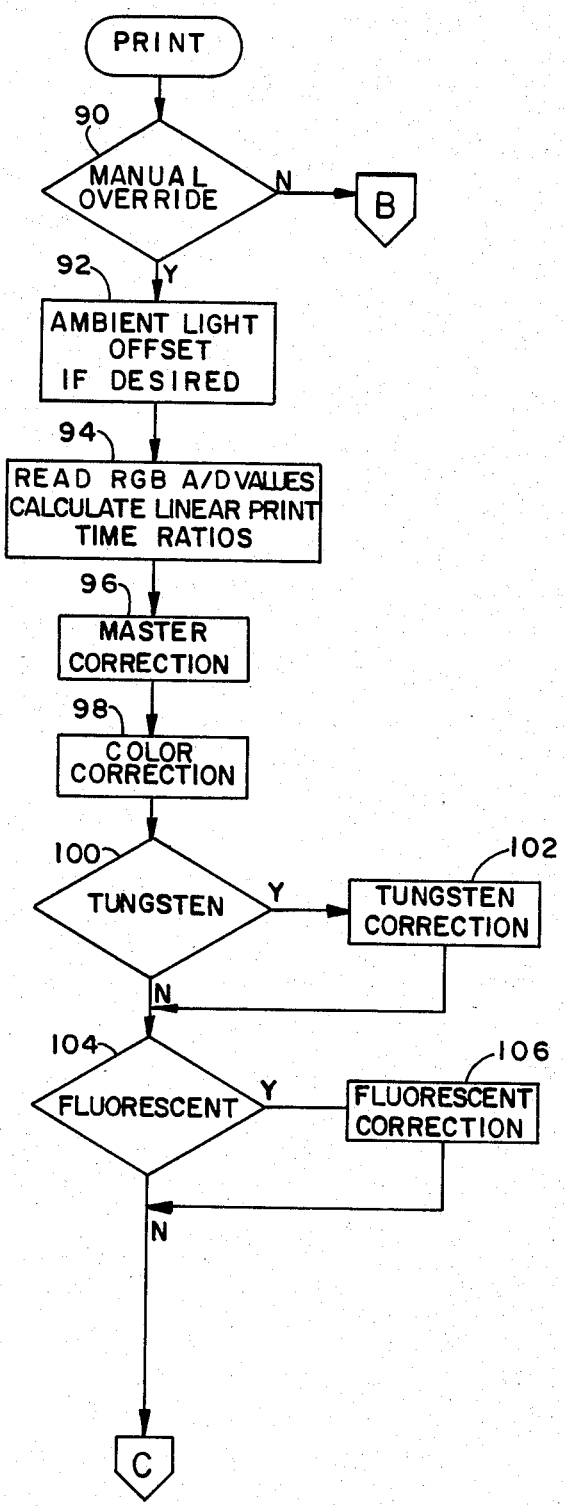
FIGS. 3C-D taken together form a flowchart of the detailed print cycle performed by the invention of FIG. 1A.
Figure 3D:
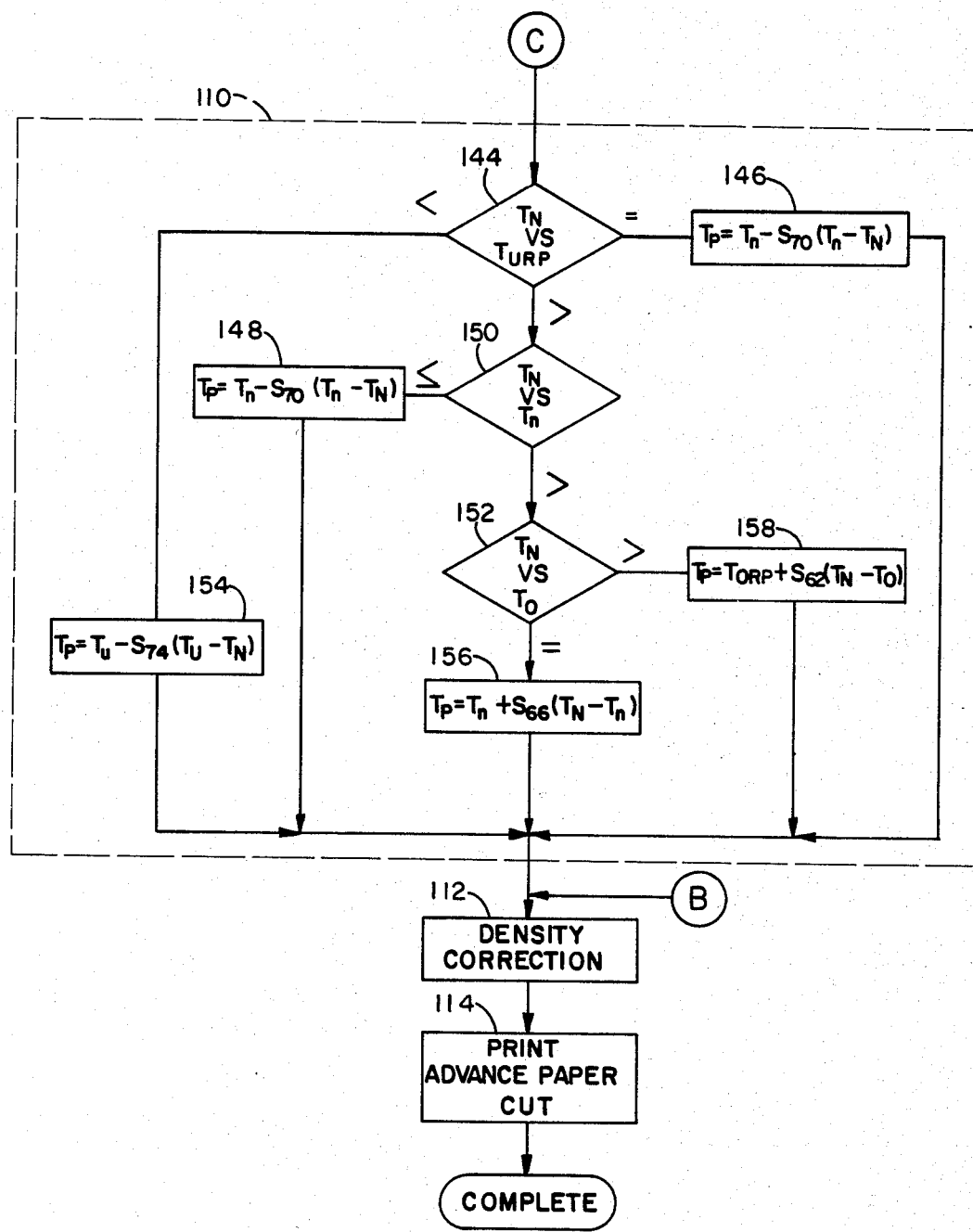

FIGS. 3C and 3D show a detailed description of the flow chart of the print cycle. There may be times when the operator will desire to make a print using judgement after visual examination of the negative. In such cases the operator may override all the correction factors to be described below. In diamond 90 a determination is made whether the operator has requested a manual override. If the answer is yes, execution proceeds to the density correction of block 112. Otherwise the operator may at this point elect to make an ambient light offset reading as seen in block 92. The operator will elect to make this ambient light offset reading whenever lighting conditions around the printer change. This reading is the same as was described in blocks 82 and 142. The amount of offset detected will be subtracted from the photocell readings in order to compensate for the ambient light.

In block 94 the illumination source in lamp-housing 50 is activated and light is transmitted through negative 46. The amount of red, green and blue light transmitted is detected by photocells 52a, b, c respectively. The output of photocells 52a–c is amplified by operational amplifiers 40a–c and multiplexed by multiplexer 42. The output of multiplexer 42 is read by A/D converter 44 and microprocessor 14 makes readings of the output of A/D converter 44 by means of bus 12. Thus, these readings made by microprocessor 14 are related to the amount of red, green and blue light transmitted through the negative 46. EPROM 23 and RAM 24 contain algorithms and data which enable microprocessor 14 to make calculations based upon these A/D readings. These calculations involve developing ratios of the various amounts of light to each other. These ratios will be used to calculate the linear component of the print time signals and to determine whether a color predominance exists.

The linear print times are corrections of the reference print times contained in the data base which is in RAM 24. The print time signal for each color is inversely proportional to the light of that color which is transmitted by negative 46. For example, an overexposed negative will transmit less light and therefore will require a longer print time in order to print correctly. Thus, a ratio of the amount of red light transmitted by the production negative to the red light transmitted by the reference negative is multiplied by the normal print time of red in order to make this correction. However, in block 94 only the ratios are calculated, the application of these ratios to the print times may be suppressed later. Similar ratios are developed for green and blue light.

Block 96 shows the master correction factor. This correction factors takes into account everything in color printer system 10 from the light source through the measurement of a test print. The operator may request that a master correction factor be recalculated as necessary using keyboard 18. If some negatives are printed correctly and others are not, the operator will perform the balancing procedure as shown in FIG. 2A and FIG. 3A. However, if there is a systematic problem which appears in all setups, the operator will request a calculation of the master correction factor. In block 96, this master correction factor is retrieved from RAM 24 and applied to the current production print times.

In order to determine the master correction factor the density of a print of the normal reference negative and the density of a standard reference print are compared as in block 86. However when this correction factor is calculated from the density difference it is not applied to any of the internal values. It is stored in RAM 24 and applied to negatives falling in all of the segments of FIG. 1B regardless of which setup is used.

In block 98, color predominance is detected. Using microprocessor 14 and algorithms and data contained in EPROM 23 and RAM 24 color printer system 10 will determine whether the amount of red green and blue light transmitted by the production negative is approximately equal to the amount of each color transmitted by the normal reference negative. This determination is made by examining the light ratios calculated in block 94. If these ratios are within certain predetermined limits the standard "integration-to-gray" method will be used. Execution will proceed from color predominance detection block 98 to the slope correction block 110. If these ratios are within other predetermined limits, ratio will be made using a color correction of the print times to permit the print to have a proper color balance.

A predominance of yellow light may be due to the use of a tungsten filament lightbulb. If such a yellow predominance is detected the printer will inquire of the operator using display 16 whether a tungsten correction should be performed as represented in diamond 102. By visual inspection of negative 46 the operator can determine whether the predominance detected is due to tungsten or to some other factor. If the predominance is due to tungsten the operator will enter yes using keyboard 18 and a special tungsten correction will be execution in block 102. This correction involves the addition of the empirically determined fixed amount.

Similarly, a predominance of blue/green may be due to fluorescent light. As in the case of the yellow predominance for the tungsten correction, color printer system 10 will inquire of the operator in diamond 104 whether florescent correction should be made when a predominance of blue/green above an empirically determined value is detected. If the operator's response is yes, block 106 is executed. Again, a fixed empirically determined correction is added.

To the first approximation the relationship between the density and the print time is linear and the color correction of block 98 is adequate to the extent of this linearity. However, the relationship between density and time is not exactly linear. Therefore a non-linear or slope correction must be made. This correction is made in the steps defined generally by dotted line 110 of FIG. 3D. These steps are an expanded description of block 110 of FIG. 2A, the slope correction step. The appropriate correction will be selected by determining which segment of FIG. 1B is applicable.

Inside dotted line 110, the linear time of the test negative is compared against three other values of time. In diamond 144 it is compared against the time of the underexposed reference negative. In diamond 150 it is compared against the time of the normal reference negative, and in diamond 152 it is compared against the time of the overexposed reference.

In diamond 144, the time of the test negative ($T_n$) is compared against the time of the underexposed reference point ($T_{urp}$). If the time of the test negative is less than the time of the underexposed reference point, execution will proceed to block 154. This will be the case whenever a test negative fails in segment 74 of FIG. 1B. The slope correction for test negatives falling in this segment as shown in block 154 is:

$$T_p = T_u - S_{74}(T_u - T_n)$$

where $T_p$ is the print time which is being calculated, $T_u$ is the print time for the underexposed reference negative, $S_{74}$ is the slope which was calculated for segment 74 in block 138 of FIG. 3B. $T_n$ is the linear print time calculated thus far for the test negative.

If $T_n$ is equal to $T_{urp}$, the slope calculated for segment 70 of FIG. 1B is used. This is shown in block 146. This correction is:

$$T_p = T_n - S_{70}(T_n - T_u)$$

where $T_n$ is the print time for a normal reference negative and $S_{70}$ is the slope calculated in block 138 for segment 70. If the time of the test negative is greater than the time of the underexposed reference negative, then the test negative will fall into one of the other three segments. Diamonds 150 and 153 will be used to determine which.

In diamond 150, the time of a test negative is compared to the time of the normal negative. If the time of a test negative is less than or equal to the time of the normal reference negative block 148 will be executed. This is the region between a normal reference negative and an underexposed reference negative, that is, segment 70 of FIG. 1B. The calculation for the print time of negatives falling in this range is:

$$T_p = T_n - S_{70}(T_n - T_n).$$

This calculation is the same as the one performed in block 146.

In diamond 152, the time of the test negative is compared against the time of the overexposed reference negative. Using this test, the algorithm will determine whether the test negative falls into segment 62 or 66. If the time of the test negative is less than or equal to the time of the overexposed negative, the test negative falls in segment 68 and execution proceeds to block 156. This calculation is:

$$T_p = T_n + S_{66}(T_n - T_n)$$

where $S_{66}$ is the slope calculated in block 138 for negatives falling in region 66.

If the time of the test negative is greater than the time of the overexposed negative, execution will proceed to block 158. The correction calculated in this block is:

$$T_p = T_{ORP} - S_{62}(T_n - T_o)$$

where $T_o$ is the print time for the overexposed reference negative and $S_{62}$ is the slope correction factor segment 62.

Once the slope correction has been made, execution proceeds to block 112, the density correction. This is the block to which execution would immediately proceed if a manual override has been requested in diamond 90. The operator of color printer system 10 may visually detect that a roll of film or a particular negative has an improper amount of color. This may be due to such things as storing the film outside its temperature range for a long period of time. When this is detected, the operator may request appropriate color corrections using keyboard 18. In block 112, color printer system 10 will determine if any such requests hav been made, and, if so, make the requested corrections.

At this point all of the appropriate corrections have been made to the print time. In block 114, microprocessor 14 opens dark shutter 38 in lamphouse 50, activates paddles 32, 34 and 36 as appropriate, closes dark shutter 38, and activates paper transport 56 which advances the paper and cuts it. The exposure times are displayed using display 16.

In color printer control system 10 the following components have been used for the operation and function as described and shown.

| Reference Number | Component |
| --- | --- |
| 14 | Z-80 |
| 19 | Z-80 CTC |
| 23 | 2732 |
| 24 | 6116 |
| 42 | 4051 |
| 44 | 7109 |
| 31 | 3X74LS374 |

While particular embodiments of the invention have been shown and described, this is not to be considered as necessarily limiting of the invention. It is understood that numerous changes may be made within the scope of the invention. For example, system 10 may control the making of prints from slides and black and white negatives. Lamphouse 50 may comprise any source of continuous or noncontinuous light. In addition, paddles 32, 34, 36 may be, for example, additive or subtractive.

The following is a listing for the firmware for EPROM 23. This listing carries out the operations set forth in FIGS. 2A–B and 3A–D and is expressed in Z80 assembly language.

APPENDIX

DATA BASE (DB) DATA NUMBERS ...

Asterisks indicate typical values to enter when creating new setup (1/7/83)
* indicates values that are modified automatically during setup procedure
** indicates values that are adjusted by the user only
Values below ---- line are reserved for computer use only - DO NOT MODIFY

| ENTRY KEY | DATA | | | TYPICAL VALUES |
|---|---|---|---|---|
| DATA 1 | FILM SIZE | | | 135 ** |
| DATA 2 | FILM ASA | | | 100 ** |
| DATA 3 | PAPER TYPE | | | 78 ** |
| DATA 4 | RED | REF PRINT TIME | | 60 * |
| DATA 5 | GREEN | REF PRINT TIME | | 60 * |
| DATA 6 | BLUE | REF PRINT TIME | | 60 * |
| DATA 7 | RED | POS BP PRINT TIME | | 210 |
| DATA 8 | GREEN | POS BP PRINT TIME | | 242 |
| DATA 9 | BLUE | POS BP PRINT TIME | | 287 |
| DATA 10 | RED | NEG BP PRINT TIME | | 21 |
| DATA 11 | GREEN | NEG BP PRINT TIME | | 28 |
| DATA 12 | BLUE | NEG BP PRINT TIME | | 29 |
| DATA 13 | RED | Slope O2 | | 3300 ** |
| DATA 14 | GREEN | Slope O2 | | 1000 ** |
| DATA 15 | BLUE | Slope O2 | | 1280 ** |
| DATA 16 | RED | Slope O1 | | 1400 * |
| DATA 17 | GREEN | Slope O1 | | 1300 * |
| DATA 18 | BLUE | Slope O1 | | 1450 * |
| DATA 19 | RED | Slope U1 | | 1150 * |
| DATA 20 | GREEN | Slope U1 | | 970 * |
| DATA 21 | BLUE | Slope U1 | | 970 * |
| DATA 22 | RED | Slope U2 | | 1300 ** |
| DATA 23 | GREEN | Slope U2 | | 1300 ** |
| DATA 24 | BLUE | Slope U2 | | 1250 ** |
| DATA 25 | RED | SUBJECT FAILURE RATIO | | 1800 ** |
| DATA 26 | GREEN | SUBJECT FAILURE RATIO | | 1700 ** |
| DATA 27 | BLUE | SUBJECT FAILURE RATIO | | 2200 ** |
| DATA 28 | RED | POPULATION CENTER AVG | | 1000 * |
| DATA 29 | GREEN | POPULATION CENTER AVG | | 1000 * |
| DATA 30 | BLUE | POPULATION CENTER AVG | | 1000 * |
| DATA 31 | POPULATION PRINT COUNT | | | 1 * |
| DATA 32 | TUNGSTEN RATIO (R-G) | | | 1200 ** |
| DATA 33 | TUNGSTEN RATIO (B-G) | | | 1100 ** |
| DATA 34 | BLUE CORRECTION TUNGSTEN | | | 900 ** |
| DATA 35 | FLUORESCENT RATIO | | | 800 ** |
| DATA 36 | MAGENTA CORRECTION FLOURESCENT | | | 1300 ** |
| DATA 37 | A/D INPUT RANGE FACTOR | | | 1 ** |
| DATA 38 | RED | O4 LINEAR BRK PT TIME | | 139 |
| DATA 39 | GREEN | O4 LINEAR BRK PT TIME | | 132 |
| DATA 40 | BLUE | O4 LINEAR BRK PT TIME | | 120 |
| DATA 41 | RED | U1 LINEAR BRK PT TIME | | 27 |
| DATA 42 | GREEN | U1 LINEAR BRK PT TIME | | 22 |
| DATA 43 | BLUE | U1 LINEAR BRK PT TIME | | 17 |
| DATA 44 | RED | REF A-D (N3) READING | | 1466 |
| DATA 45 | GREEN | REF A-D (N3) READING | | 1272 |
| DATA 46 | BLUE | REF A-D (N3) READING | | 1051 |
| DATA 47 | RED | O4 A-D READING | | 579 |
| DATA 48 | GREEN | O4 A-D READING | | 465 |
| DATA 49 | BLUE | O4 A-D READING | | 357 |
| DATA 50 | RED | U1 A-D READING | | 2905 |
| DATA 51 | GREEN | U1 A-D READING | | 2664 |
| DATA 52 | BLUE | U1 A-D READING | | 2439 |

TABLE I

INIT.L  03/16/83

*HOP-01*
*Color Printing Control*
*System and*
*Method*

INIT

| LOC | OBJ CODE | M | STMT | SOURCE STATEMENT | | |
|---|---|---|---|---|---|---|
| | | | 465 | | GLOBAL | CLINT |
| | | | 466 | ; | | |
| 0000 | | | 467 | | ORG | 0 |
| | | | 468 | ; | | |
| 0000 | F3 | | 469 | | DI | |
| 0001 | 1808 | | 470 | | JR | START |
| | | | 471 | ; | | |
| 0003 | CD0600 | | 472 | CLINT | CALL | CLINT2 |
| 0006 | CD0900 | | 473 | CLINT2 | CALL | CLINT1 |
| 0009 | ED4D | | 474 | CLINT1 | RETI | |
| | | | 475 | ; | | |
| | | | 476 | START | | |
| 000B | 31006A | | 477 | | LD | SP,STACK |
| 000E | 3E00 | | 478 | | LD | A,IVEC.SHR.8 |
| 0010 | ED47 | | 479 | | LD | I,A |
| 0012 | ED5E | | 480 | | IM | 2 |
| 0014 | 3E68 | | 481 | | LD | A,IVEC |
| 0016 | D330 | | 482 | | OUT | (CREG_1),A |
| 0018 | 3E03 | | 483 | | LD | A,RSTCTC |
| 001A | D330 | | 484 | | OUT | (CREG_1),A |
| 001C | 3EA7 | | 485 | | LD | A,LDCON |
| 001E | D330 | | 486 | | OUT | (CREG_1),A |
| 0020 | 3E18 | | 487 | | LD | A,TIME_1 |
| 0022 | D330 | | 488 | | OUT | (CREG_1),A |
| 0024 | 3E03 | | 489 | | LD | A,RSTCTC |
| 0026 | D331 | | 490 | | OUT | (CREG_2),A |
| 0028 | 3EA7 | | 491 | | LD | A,LDCON |
| 002A | D331 | | 492 | | OUT | (CREG_2),A |
| 002C | 3E00 | | 493 | | LD | A,TIME_2 |
| 002E | D331 | | 494 | | OUT | (CREG_2),A |
| 0030 | CD0300 | | 495 | | CALL | CLINT |
| | | | 496 | ; | | |
| | | | 497 | ; initialize display image area | | | |
| | | | 498 | ; | | |
| 0033 | 210868 | | 499 | | LD | HL,DIGPTR |
| 0036 | 3600 | | 500 | | LD | (HL),0 |
| 0038 | 210968 | | 501 | | LD | HL,SELPTR |
| 003B | 367F | | 502 | | LD | (HL),7FH |
| 003D | 115B00 | | 503 | | LD | DE,MSG |
| 0040 | CD0000 | X | 504 | | CALL | PUTASC |
| | | | 505 | ; | | |
| | | | 506 | ; initialize RAM areas | | | |
| | | | 507 | ; | | |
| 0043 | 3E00 | | 508 | IRAM | LD | A,0 |
| 0045 | 32E468 | | 509 | | LD | (RCSLOF),A |
| 0048 | 320A68 | | 510 | | LD | (KBDBUF),A |
| 004B | 320B68 | | 511 | | LD | (KBDFLG),A |
| 004E | 3E20 | | 512 | | LD | A,32 |
| 0050 | 320E68 | | 513 | | LD | (SCNCNT),A |
| 0053 | 3E07 | | 514 | | LD | A,7 |
| 0055 | 320D68 | | 515 | | LD | (CNT),A |
| | | | 516 | ; | | |
| 0058 | C30000 | X | 517 | | JP | PATCH |
| | | | 518 | ; | | |
| 005B | 52454C4B | | 519 | MSG | DEFM | 'RELKPXXX' |
| | | | 520 | ; | | |
| 0068 | | | 521 | | ORG | ($+7)&0FFF8H |
| | | | 522 | IVEC | | |
| 0068 | 0000 | X | 523 | | DEFW | DISP |
| 006A | 0000 | X | 524 | | DEFW | KEY |
| 006C | 0000 | X | 525 | | DEFW | PTINT |
| | | | 526 | ; | | |
| | | | 527 | | END | |

```
                                    RTIME
LOC    OBJ CODE  M STMT SOURCE STATEMENT

450        *LIST ON
                     451        ;
                     452        ; Realtime Interrupts, densitometer UART
                     453        ;
                     454        ;       104
                     455        ;
                     456        ;::::::::::::::::::::::::::::::::::
                     457        ;
                     458        ;                               E D I T
                     459        ;
                     460        ;        04-19-82              BB      Posit
                     461        ;        04-30-82              BB      Add pri
                     462        ;        07-24-82              BB      Add 7-
                     463        ;        09-05-82              BB      Add den
                     464        ;        10-16-82              BB      Remove
                     465        ;
                     466        ;:::::::::::::::::::::::::::::::::::
                     467        ;
                     468              GLOBAL      DISP,KEY,ADLIN,
                     469
                     470              EXTERNAL    WAIT,CLINT,DDIV
                     471              EXTERNAL    GETKEY,GET255
                     472        ;
0000   CD0401    R  473  DISP   CALL        DISINT
0003   CD0000    X  474         CALL        CLINT
0006   ED4D         475         RETI
                     476
0008   CD1800    R  477  KEY    CALL        KEYINT
000B   CD0000    X  478         CALL        CLINT
000E   ED4D         479         RETI
                     480
0010   CD6801    R  481  PTINT  CALL        PRTINT
0013   CD0000    X  482         CALL        CLINT
0016   ED4D         483         RETI
                     484
0018   F5           485  KEYINT PUSH        AF
0019   C5           486         PUSH        BC
001A   E5           487         PUSH        HL
001B   211468       488         LD          HL,TIMER
001E   35           489         DEC         (HL)
                     490  ;
001F   3AF768       491         LD          A,(BCOUNT)
0022   B7           492         OR          A
0023   2810         493         JR          Z,BCNT1
0025   3D           494         DEC         A
0026   32F768       495         LD          (BCOUNT),A
0029   200A         496         JR          NZ,BCNT1
002B   3A6568       497         LD          A,(IOIMG2)
002E   F640         498         OR          BEEPER
0030   326568       499         LD          (IOIMG2),A
0033   D310         500         OUT         (BANK2),A
                     501  ;
0035   3A0069       502  BCNT1  LD          A,(ADVCNT)
0038   B7           503         OR          A
0039   2810         504         JR          Z,BCNT2
003B   3D           505         DEC         A
003C   320069       506         LD          (ADVCNT),A
003F   200A         507         JR          NZ,BCNT2
0041   3A6468       508         LD          A,(IOIMG1)
0044   F620         509         OR          PAPADV
0046   326468       510         LD          (IOIMG1),A
0049   D300         511         OUT         (SSR1),A
                     512  ;
004B   3A9568       513  BCNT2  LD          A,(IOIMG4)
```

```
                             RTIME
LOC    OBJ CODE M STMT SOURCE STATEMENT

004E   CB4F       514             BIT     OPERATE,A
0050   203B       515             JR      NZ,SECEX
                  516    ;
0052   210E68     517             LD      HL,SCNCNT
0055   35         518             DEC     (HL)
0056   2035       519             JR      NZ,SECEX
0058   3620       520             LD      (HL),32
005A   3A0F68     521             LD      A,(SECCNT)
005D   3C         522             INC     A
005E   B7         523             OR      A
005F   27         524             DAA
0060   320F68     525             LD      (SECCNT),A
0063   D660       526             SUB     60H
0065   2026       527             JR      NZ,SECEX
0067   320F68     528             LD      (SECCNT),A
006A   3A1068     529             LD      A,(MINCNT)
006D   3C         530             INC     A
006E   B7         531             OR      A
006F   27         532             DAA
0070   321068     533             LD      (MINCNT),A
0073   D660       534             SUB     60H
0075   2016       535             JR      NZ,SECEX
0077   321068     536             LD      (MINCNT),A
007A   3A1168     537             LD      A,(HRCNT)
007D   3C         538             INC     A
007E   B7         539             OR      A
007F   27         540             DAA
0080   321168     541             LD      (HRCNT),A
0083   3AEE68     542             LD      A,(HHRCNT)
0086   CE00       543             ADC     A,0
0088   B7         544             OR      A
0089   27         545             DAA
008A   32EE68     546             LD      (HHRCNT),A
008D   3A6668     547     SECEX   LD      A,(IOIMG3)
0090   E6FD       548             AND     0FDH
0092   47         549             LD      B,A
0093   DB28       550             IN      A,(KBD)
0095   E680       551             AND     80H
0097   CB07       552             RLC     A
0099   CB07       553             RLC     A
009B   B0         554             OR      B
009C   326668     555             LD      (IOIMG3),A
009F   D308       556             OUT     (RNDOUT),A
                  557    ;
00A1   0E28       558     INKBD   LD      C,KBD
00A3   0605       559             LD      B,5
00A5   ED78       560     KLOOP   IN      A,(C)
00A7   F680       561             OR      080H
00A9   E6FF       562             AND     0FFH
00AB   3C         563             INC     A
00AC   200B       564             JR      NZ,KEYP_1
00AE   0C         565             INC     C
00AF   10F4       566             DJNZ    KLOOP
00B1   06FF       567             LD      B,0FFH
00B3   78         568             LD      A,B
00B4   32FE68     569             LD      (OLDKEY),A
00B7   182F       570             JR      EXIT
                  571     KEYP_1
00B9   3D         572             DEC     A
00BA   06FF       573             LD      B,0FFH
                  574     CIRCLE
00BC   04         575             INC     B
00BD   CB2F       576             SRA     A
00BF   38FB       577             JR      C,CIRCLE
```

```
LOC    OBJ CODE M STMT  SOURCE STATEMENT

00C1   79          578           LD      A,C
00C2   E607        579           AND     07H
00C4   CB27        580           SLA     A
00C6   CB27        581           SLA     A
00C8   CB27        582           SLA     A
00CA   80          583           ADD     A,B
00CB   47          584           LD      B,A
00CC   3A0C68      585           LD      A,(TEMPKEY)
00CF   FEFF        586           CP      0FFH
00D1   2815        587           JR      Z,EXIT
00D3   B8          588           CP      B
00D4   2006        589           JR      NZ,KEYP_2
00D6   3AFE68      590           LD      A,(OLDKEY)
00D9   B8          591           CP      B
00DA   280C        592           JR      Z,EXIT
00DC   78          593   KEYP_2  LD      A,B
00DD   32FE68      594           LD      (OLDKEY),A
00E0   320A68      595           LD      (KBDBUF),A
00E3   210B68      596           LD      HL,KBDFLG
00E6   3601        597           LD      (HL),1
                   598   ;
00E8   78          599   EXIT    LD      A,B
00E9   320C68      600           LD      (TEMPKEY),A
                   601   ;
00EC   DB00        602           IN      A,(BANK4)
00EE   329568      603           LD      (IOIMG4),A
00F1   3A6468      604           LD      A,(IOIMG1)
00F4   E6F7        605           AND     .NOT.CLR74
00F6   D300        606           OUT     (SSR1),A
00F8   F608        607           OR      CLR74
00FA   D300        608           OUT     (SSR1),A
00FC   326468      609           LD      (IOIMG1),A
00FF   E1          610           POP     HL
0100   C1          611           POP     BC
0101   F1          612           POP     AF
0102   ED4D        613           RETI
                   614   ;
                   615   ;*******************************
                   616   ;
                   617   ;           Display update interrupt
                   618   ;
                   619   ;     Alpha-numeric display driver
                   620   ;     takes character offset in one-of
                   621   ;     locations in RAM associated with
                   622   ;     corresponding digit on the front
                   623   ;     translates and outputs same at a
                   624   ;     refresh rate ... as driven by CT
                   625   ;
                   626   ;*******************************
                   627   ;
0104   F5          628   DISINT  PUSH    AF
0105   C5          629           PUSH    BC
0106   E5          630           PUSH    HL
0107   3EFF        631           LD      A,0FFH
0109   D318        632           OUT     (SEL),A
010B   210068      633           LD      HL,SEGIMG
010E   3A0868      634           LD      A,(DIGPTR)
0111   3C          635           INC     A
0112   E607        636           AND     7H
0114   320868      637           LD      (DIGPTR),A
0117   2005        638           JR      NZ,DI1
0119   3EFE        639           LD      A,0FEH
011B   320968      640           LD      (SELPTR),A
011E   3A0868      641   DI1     LD      A,(DIGPTR)
```

RTIME

| LOC | OBJ CODE | M | STMT | SOURCE | STATEMENT |
|---|---|---|---|---|---|
| 0121 | 85 | | 642 | ADD | A,L |
| 0122 | 6F | | 643 | LD | L,A |
| 0123 | 4E | | 644 | LD | C,(HL) |
| 0124 | 79 | | 645 | LD | A,C |
| 0125 | E680 | | 646 | AND | 80H |
| 0127 | F5 | | 647 | PUSH | AF |
| 0128 | CBB9 | | 648 | RES | 7,C |
| 012A | 214301 | R | 649 | LD | HL,TABLE |
| 012D | 0600 | | 650 | LD | B,0 |
| 012F | 09 | | 651 | ADD | HL,BC |
| 0130 | 7E | | 652 | LD | A,(HL) |
| 0131 | C1 | | 653 | POP | BC |
| 0132 | B0 | | 654 | OR | B |
| 0133 | D320 | | 655 | OUT | (SEG),A |
| | | | 656 | ; | |
| 0135 | 3A0968 | | 657 | LD | A,(SELPTR) |
| 0138 | 0F | | 658 | RRCA | |
| 0139 | D318 | | 659 | OUT | (SEL),A |
| 013B | 320968 | | 660 | LD | (SELPTR),A |
| | | | 661 | ; | |
| 013E | E1 | | 662 | POP | HL |
| 013F | C1 | | 663 | POP | BC |
| 0140 | F1 | | 664 | POP | AF |
| 0141 | ED4D | | 665 | RETI | |
| | | | 666 | TABLE | |
| 0143 | 3F | | 667 | DEFB | 3FH |
| 0144 | 06 | | 668 | DEFB | 06H |
| 0145 | 5B | | 669 | DEFB | 5BH |
| 0146 | 4F | | 670 | DEFB | 4FH |
| 0147 | 66 | | 671 | DEFB | 66H |
| 0148 | 6D | | 672 | DEFB | 6DH |
| 0149 | 7D | | 673 | DEFB | 7DH |
| 014A | 07 | | 674 | DEFB | 07H |
| 014B | 7F | | 675 | DEFB | 7FH |
| 014C | 67 | | 676 | DEFB | 67H |
| 014D | 77 | | 677 | DEFB | 77H |
| 014E | 7C | | 678 | DEFB | 7CH |
| 014F | 39 | | 679 | DEFB | 39H |
| 0150 | 5E | | 680 | DEFB | 5EH |
| 0151 | 79 | | 681 | DEFB | 79H |
| 0152 | 71 | | 682 | DEFB | 71H |
| 0153 | 6F | | 683 | DEFB | 6FH |
| 0154 | 76 | | 684 | DEFB | 76H |
| 0155 | 06 | | 685 | DEFB | 06H |
| 0156 | 1E | | 686 | DEFB | 1EH |
| 0157 | 40 | | 687 | DEFB | 40H |
| 0158 | 38 | | 688 | DEFB | 38H |
| 0159 | 48 | | 689 | DEFB | 48H |
| 015A | 54 | | 690 | DEFB | 54H |
| 015B | 5C | | 691 | DEFB | 5CH |
| 015C | 73 | | 692 | DEFB | 73H |
| 015D | 80 | | 693 | DEFB | 80H |
| 015E | 50 | | 694 | DEFB | 50H |
| 015F | 6D | | 695 | DEFB | 6DH |
| 0160 | D3 | | 696 | DEFB | 0D3H |
| 0161 | 3E | | 697 | DEFB | 3EH |
| 0162 | 1C | | 698 | DEFB | 1CH |
| 0163 | 04 | | 699 | DEFB | 04H |
| 0164 | 00 | | 700 | DEFB | 00H |
| 0165 | 66 | | 701 | DEFB | 66H |
| 0166 | 41 | | 702 | DEFB | 41H |
| 0167 | 78 | | 703 | DEFB | 78H |
| | | | 704 | ; | |
| | | | 705 | PRTINT | |

RTIME

```
LOC    OBJ CODE  M STMT  SOURCE STATEMENT

0168   F5          706           PUSH    AF
0169   E5          707           PUSH    HL
016A   2A6768      708           LD      HL,(REXP)
016D   7D          709           LD      A,L
016E   B4          710           OR      H
016F   2804        711           JR      Z,PRT1
0171   2B          712           DEC     HL
0172   226768      713           LD      (REXP),HL
0175   2A6968      714   PRT1    LD      HL,(GEXP)
0178   7D          715           LD      A,L
0179   B4          716           OR      H
017A   2804        717           JR      Z,PRT2
017C   2B          718           DEC     HL
017D   226968      719           LD      (GEXP),HL
0180   2A6B68      720   PRT2    LD      HL,(BEXP)
0183   7D          721           LD      A,L
0184   B4          722           OR      H
0185   2804        723           JR      Z,PRT3
0187   2B          724           DEC     HL
0188   226B68      725           LD      (BEXP),HL
018B   E1          726   PRT3    POP     HL
018C   F1          727           POP     AF
018D   C9          728           RET
                   729   ;
                   730   ;*******************************************
                   731   ;
                   732   ;                              A/D INPUT
                   733   ;
                   734   ;PURPOSE:         turn on lamp, wait till
                   735   ;
                   736   ;INPUT:           select # in A
                   737   ;                 wait time in C
                   738   ;
                   739   ;OUTPUT:          readings in BC
                   740   ;
                   741   ;*******************************************
                   742   ;
018E   47          743   AD_IN   LD      B,A
018F   3A6568      744           LD      A,(IOIMG2)
0192   B0          745           OR      B
0193   F620        746           OR      AD_RUN
0195   D310        747           OUT     (ADSEL),A
0197   3A6468      748           LD      A,(IOIMG1)
019A   E67F        749           AND    L801N
019C   326468      750           LD      (IOIMG1),A
019F   D300        751           OUT     (SSR1),A
01A1   79          752           LD      A,C
01A2   B7          753           OR      A
01A3   2803        754           JR      Z,IN1
01A5   CD0000    X 755           CALL    WAIT
                   756   ;
01A8   FB          757   IN1     EI
01A9   DB20        758           IN      A,(RNDIN)
01AB   CB47        759           BIT     0,A
01AD   20F9        760           JR      NZ,IN1
01AF   FB          761   IN4     EI
01B0   DB20        762           IN      A,(RNDIN)
01B2   CB47        763           BIT     0,A
01B4   28F9        764           JR      Z,IN4
                   765   ;
01B6   FB          766   IN12    EI
01B7   DB20        767           IN      A,(RNDIN)
01B9   CB47        768           BIT     0,A
01BB   20F9        769           JR      NZ,IN12
```

```
                              RTIME
LOC     OBJ CODE  M STMT  SOURCE STATEMENT

01BD    FB            770  IN42     EI
01BE    DB20          771           IN      A,(RNDIN)
01C0    CB47          772           BIT     0,A
01C2    28F9          773           JR      Z,IN42
                      774  ;
01C4    DB10          775           IN      A,(ADLOW)
01C6    4F            776           LD      C,A
01C7    DB08          777           IN      A,(ADHIGH)
01C9    E63F          778           AND     3FH
01CB    47            779           LD      B,A
01CC    3A6568        780           LD      A,(IOIMG2)
                      781  ;        AND     .NOT.AD_RUN
01CF    E6F8          782           AND     .NOT.REDCHL
01D1    326568        783           LD      (IOIMG2),A
01D4    D310          784           OUT     (ADSEL),A
01D6    C9            785           RET
                      786  ;
                      787  ;*********************************
                      788  ;            DENSITOMETER UART (bit-b
                      789  ;
                      790  ;PURPOSE:    set color + 3 digits of
                      791  ;            at 300 baud, any parity
                      792  ;
                      793  ;CALLS:      PUTASC
                      794  ;
                      795  ;RETURNS:    color offset in C as fol
                      796  ;                    0 = Clear (K)
                      797  ;                    1 = Cyan (C)
                      798  ;                    2 = Mase
                      799  ;                    3 = Yell
                      800  ;                    4 = ERRO
                      801  ;            density in SEGIM
                      802  ;            decimal point fi
                      803  ;
                      804  ;WARNING:    interrupts disab
                      805  ;            KBD is scanned w
                      806  ;
                      807  ;****************************
                      808  ;
01D7    DB20          809  D_UART   IN      A,(RNDIN)
01D9    CB5F          810           BIT     3,A
01DB    C27C02  R     811           JP      NZ,K_UART
                      812  ;
01DE    F3            813           DI
01DF    3EFF          814           LD      A,0FFH
01E1    D318          815           OUT     (SEL),A
01E3    CD2B02  R     816           CALL    GETBIT
01E6    216F02  R     817           LD      HL,TBL-1
01E9    0EFF          818           LD      C,0FFH
01EB    0605          819           LD      B,5
01ED    23            820  TBL1     INC     HL
01EE    0C            821           INC     C
01EF    05            822           DEC     B
01F0    2837          823           JR      Z,D_EXIT
01F2    BE            824           CP      (HL)
01F3    20F8          825           JR      NZ,TBL1
01F5    0600          826           LD      B,0
01F7    C5            827           PUSH    BC
01F8    CB21          828           SLA     C
01FA    217402  R     829           LD      HL,MSGTBL
01FD    09            830           ADD     HL,BC
01FE    5E            831           LD      E,(HL)
01FF    23            832           INC     HL
0200    56            833           LD      D,(HL)
```

RTIME

| LOC | OBJ CODE | M | STMT | SOURCE | STATEMENT | |
|---|---|---|---|---|---|---|
| 0201 | CD0000 | X | 834 | | CALL | PUTASC |
| | | | 835 | ; | | |
| 0204 | CD2B02 | R | 836 | | CALL | GETBIT |
| 0207 | D630 | | 837 | | SUB | 30H |
| 0209 | 320468 | | 838 | | LD | (SEGIMG+4),A |
| 020C | CD2B02 | R | 839 | | CALL | GETBIT |
| 020F | D630 | | 840 | | SUB | 30H |
| 0211 | F680 | | 841 | | OR | 80H |
| 0213 | 320568 | | 842 | | LD | (SEGIMG+5),A |
| 0216 | CD2B02 | R | 843 | | CALL | GETBIT |
| 0219 | D630 | | 844 | | SUB | 30H |
| 021B | 320668 | | 845 | | LD | (SEGIMG+6),A |
| 021E | 3E00 | | 846 | | LD | A,0 |
| 0220 | 320768 | | 847 | | LD | (SEGIMG+7),A |
| 0223 | 3E21 | | 848 | | LD | A,SPCHR |
| 0225 | 320368 | | 849 | | LD | (SEGIMG+3),A |
| 0228 | C1 | | 850 | | POP | BC |
| 0229 | FB | | 851 | D_EXIT | EI | |
| 022A | C9 | | 852 | | RET | |
| 022B | 0601 | | 854 | GETBIT | LD | B,1 |
| 022D | 1009 | | 855 | DEN3 | DJNZ | DEN5 |
| 022F | DB2B | | 856 | | IN | A,(KBD+3) |
| 0231 | CB4F | | 857 | | BIT | 1,A |
| 0233 | 2003 | | 858 | | JR | NZ,DEN5 |
| 0235 | 0E04 | | 859 | | LD | C,4 |
| 0237 | C9 | | 860 | | RET | |
| 0238 | DB20 | | 861 | DEN5 | IN | A,(RNDIN) |
| 023A | CB5F | | 862 | | BIT | 3,A |
| 023C | 28EF | | 863 | | JR | Z,DEN3 |
| 023E | CD6B02 | R | 864 | | CALL | HAFBIT |
| 0241 | DB20 | | 865 | DEN4 | IN | A,(RNDIN) |
| 0243 | CB5F | | 866 | | BIT | 3,A |
| 0245 | 28E6 | | 867 | | JR | Z,DEN3 |
| | | | 868 | ; | | |
| 0247 | 1608 | | 869 | | LD | D,8 |
| 0249 | 1E00 | | 870 | | LD | E,0 |
| 024B | CD6102 | R | 871 | DEN2 | CALL | BITTIM |
| 024E | DB28 | | 872 | | IN | A,(KBD) |
| 0250 | DB20 | | 873 | | IN | A,(RNDIN) |
| 0252 | 37 | | 874 | | SCF | |
| 0253 | CB5F | | 875 | | BIT | 3,A |
| 0255 | 2801 | | 876 | | JR | Z,DEN1 |
| 0257 | 3F | | 877 | | CCF | |
| 0258 | 7B | | 878 | DEN1 | LD | A,E |
| 0259 | 1F | | 879 | | RRA | |
| 025A | 5F | | 880 | | LD | E,A |
| 025B | 15 | | 881 | | DEC | D |
| 025C | 20ED | | 882 | | JR | NZ,DEN2 |
| 025E | E67F | | 883 | | AND | 7FH |
| 0260 | C9 | | 884 | | RET | |
| | | | 885 | ; | | |
| 0261 | 0628 | | 886 | BITTIM | LD | B,28H |
| 0263 | 0E03 | | 887 | | LD | C,3 |
| 0265 | 10FE | | 888 | LOOP | DJNZ | LOOP |
| 0267 | 0D | | 889 | | DEC | C |
| 0268 | 20FB | | 890 | | JR | NZ,LOOP |
| 026A | C9 | | 891 | | RET | |
| | | | 892 | ; | | |
| 026B | 06F0 | | 893 | HAFBIT | LD | B,0F0H |
| 026D | 10FE | | 894 | HLOOP | DJNZ | HLOOP |
| 026F | C9 | | 895 | | RET | |
| | | | 896 | ; | | |
| 0270 | 4B434D59 | | 897 | TBL | DEFM | 'KCMY' |
| 0274 | 0000 | X | 898 | MSGTBL | DEFW | MSGK |

RTIME
LOC    OBJ CODE  M STMT  SOURCE STATEMENT

```
0276   0000      X  899           DEFW    MSGC
0278   0000      X  900           DEFW    MSGM
027A   0000      X  901           DEFW    MSGY
                    902   ;
                    903   ;RETURNS:       color offset in
                    904   ;                      0 = Clea
                    905   ;                      1 = Cyan
                    906   ;                      2 = Mase
                    907   ;                      3 = Yell
                    908   ;                      4 = ERRO
027C   CD0000    X  909   K_UART  CALL    GETKEY
027F   0E01         910           LD      C,1
0281   110000    X  911           LD      DE,MSGC
0284   FE10         912           CP      KEYR
0286   2812         913           JR      Z,KUART1
0288   110000    X  914           LD      DE,MSGM
028B   0C           915           INC     C
028C   FE11         916           CP      KEYG
028E   280A         917           JR      Z,KUART1
0290   110000    X  918           LD      DE,MSGY
0293   0C           919           INC     C
0294   FE12         920           CP      KEYB
0296   2802         921           JR      Z,KUART1
0298   0C           922           INC     C
0299   C9           923           RET
029A   C5           924   KUART1  PUSH    BC
029B   CD0000    X  925           CALL    PUTASC
029E   CD0000    X  926           CALL    GET255
02A1   C1           927           POP     BC
02A2   3A0568       928           LD      A,(SEGIMG+5)
02A5   F680         929           OR      80H
02A7   320568       930           LD      (SEGIMG+5),A
02AA   3E00         931           LD      A,0
02AC   320468       932           LD      (SEGIMG+4),A
02AF   C9           933           RET
                    934   ;
                    935   END
```

EXEC
LOC    OBJ CODE  M STMT  SOURCE STATEMENT

```
                    450   *LIST ON
                    451   ;
                    452   ;
                    453   ;       117
                    454   ;
                    455   ;
                    456   ; executive module - general keys
                    457   ;
                    458   ;;;;;;;;;;;;;;;;;;;;;;;;;;;;;;;;;;
                    459   ;
                    460   ;                      E D I T
                    461   ;
                    462   ;       04-19-82       BB      E
                    463   ;       05-03-82       BB      a
                    464   ;       05-08-82       AMF     ;
                    465   ;       08-14-82       AMF     F
                    466   ;
                    467   ;;;;;;;;;;;;;;;;;;;;;;;;;;;;;;;;;;
                    468   ;
                    469           GLOBAL          EXEC,PAT(
                    470
                    471           EXTERNAL        PUTASC,GE
                    472           EXTERNAL        ERROR,SEI
```

```
                              EXEC.
                    473         EXTERNAL    MSG0,MSG:
                    474         EXTERNAL    BEEP_3,BI
                    475         EXTERNAL    BOMBED,M!
                    476   ;
0000  3A0369        477  PATCH  LD          A,(BOMOUT)
0003  FE45          478         CP          69
0005  2012          479         JR          NZ,PATCH1
0007  3E00          480         LD          A,0
0009  320369        481         LD          (BOMOUT),A
000C  3A386A        482         LD          A,(RSTCNT)
000F  3C            483         INC         A
0010  32386A        484         LD          (RSTCNT),A
0013  CD0000   X    485         CALL        BOMBED
0016  C37700   R    486         JP          EXEC
                    487   ;
0019  CD0000   X    488  PATCH1 CALL        INITSF
001C  3E00          489         LD          A,0
001E  32C368        490         LD          (LOGO),A
0021  32C268        491         LD          (PRNSW),A
0024  32F568        492         LD          (TUNFLG),A
0027  32F668        493         LD          (FLOFLG),A
002A  32FF68        494         LD          (Y_NFLG),A
002D  3EBF          495         LD          A,DEFLT1
002F  D300          496         OUT         (SSR1),A
0031  326468        497         LD          (IOIMG1),A
0034  3E60          498         LD          A,DEFLT2
0036  D310          499         OUT         (BANK2),A
0038  326568        500         LD          (IOIMG2),A
003B  3E1F          501         LD          A,DEFLT3
003D  D308          502         OUT         (RNDOUT),A
003F  326668        503         LD          (IOIMG3),A
0042  3E00          504         LD          A,0
0044  329568        505         LD          (IOIMG4),A
                    506   ;
0047  210568        507         LD          HL,SEGIMG+5
```

```
                              INIT
LOC   OBJ CODE M STMT SOURCE STATEMENT

59  ;   08-11-82           AMF      Changed
                    60  ;   02-10-83           BB       Change R
                    61  ;
                    62  ;::::::::::::::::::::::::::::::::::::::
                    63  ;
                    64  ;**************************************
                    65  ;                            I/O BIT DEFINITI
                    66  ;
                    67  SSR1           EQU     000H
                    68  ;
                    69  CPADL          EQU     001H
                    70  MPADL          EQU     002H
                    71  YPADL          EQU     004H
                    72  CLR74          EQU     008H
                    73  DKSHUT         EQU     010H
                    74  PAPADV         EQU     020H
                    75  K801           EQU     040H
                    76  L801           EQU     080H
                    77  L801N          EQU     07FH
                    78  DEFLT1         EQU     0BFH
                    79  ;
                    80  BANK2          EQU     010H
                    81  ;
```

```
                    INIT
LOC   OBJ CODE M STMT  SOURCE STATEMENT

82   REDCHL       EQU     007H
           83   GRNCHL       EQU     006H
           84   BLUCHL       EQU     005H
           85   TAPOUT       EQU     008H
           86   TAPON        EQU     010H
           87   AD_RUN       EQU     020H
           88   BEEPER       EQU     040H
           89   DEFLT2       EQU     060H
           90   ;
           91   RNDOUT       EQU     008H
           92   ;
           93   SSR12        EQU     001H
           94   SSRXX        EQU     002H
           95   SSR7         EQU     004H
           96   SSR8         EQU     008H
           97   SRTSSR       EQU     010H
           98   DEFLT3       EQU     01FH
           99   ;
          100   BANK4        EQU     000H
          101   ;
          102   FOOTSW       EQU     0
          103   OPERATE      EQU     1
          104   IN74A        EQU     2
          105   IN74B        EQU     3
          106   WAITSW       EQU     4
          107   ;
          108   ;*******************************)
          109   ;
          110   CREG_1       EQU     030H
          111   CREG_2       EQU     031H
          112   CREG_3       EQU     032H
          113   CREG_4       EQU     033H
          114   LDCON        EQU     0A7H
          115   RSTCTC       EQU     003H
          116   TIME_1       EQU     018H
          117   TIME_2       EQU     000H
          118   SEG          EQU     020H
          119   SEL          EQU     018H
          120   KBD          EQU     028H
          121   RNDIN        EQU     020H
          122   ADSEL        EQU     010H
          123   ADLOW        EQU     010H
          124   ADHIGH       EQU     008H
          125   SPCHR        EQU     'X'-'7'
          126   ;PA_PUL      EQU     16
          127   ;NUMSAM      EQU     6
          128   ;
          129   ;===========================================
          130   ;
          131   ;            DBM     EQUATES
          132   ;
          133   ;===========================================
          134   ;
          135   DBFS         EQU     1
          136   DBFT         EQU     2
          137   DBPT         EQU     3
          138   DBRRPT       EQU     4
          139   DBGRPT       EQU     5
          140   DBBRPT       EQU     6
          141   DBRPPT       EQU     7
          142   DBGPPT       EQU     8
          143   DBBPPT       EQU     9
          144   DBRNPT       EQU     10
          145   DBGNPT       EQU     11
```

```
                        INIT
LOC   OBJ CODE M STMT SOURCE STATEMENT
              146  DBBNPT        EQU     12
              147  DBRSOO        EQU     13
              148  DBGSOO        EQU     14
              149  DBBSOO        EQU     15
              150  DBRSO         EQU     16
              151  DBGSO         EQU     17
              152  DBBSO         EQU     18
              153  DBRSU         EQU     19
              154  DBGSU         EQU     20
              155  DBBSU         EQU     21
              156  DBRSUU        EQU     22
              157  DBGSUU        EQU     23
              158  DBBSUU        EQU     24
              159  DBRSFR        EQU     25
              160  DBGSFR        EQU     26
              161  DBBSFR        EQU     27
              162  DBRAVG        EQU     28
              163  DBGAVG        EQU     29
              164  DBBAVG        EQU     30
              165  DBPCNT        EQU     31
              166  DBTRAT        EQU     32
              167  DBTRBG        EQU     33
              168  DBBLUC        EQU     34
              169  DBFRAT        EQU     35
              170  DBMAGC        EQU     36
              171  DBADGF        EQU     37
              172  DBRPBP        EQU     38
              173  DBGPBP        EQU     39
              174  DBBPBP        EQU     40
              175  DBRNBP        EQU     41
              176  DBGNBP        EQU     42
              177  DBBNBP        EQU     43
              178  DBRRAD        EQU     44
              179  DBGRAD        EQU     45
              180  DBBRAD        EQU     46
              181  DBRO4N        EQU     47
              182  DBGO4N        EQU     48
              183  DBBO4N        EQU     49
              184  DBRU1N        EQU     50
              185  DBGU1N        EQU     52
              186  DBBU1N        EQU     53
              187  ;
              188  RAM           EQU     6800H
              189  ERAM          EQU     5000H
              190  ;
              191  SEGIMG        EQU     RAM
              192  DIGPTR        EQU     SEGIMG+8
              193  SELPTR        EQU     DIGPTR+1
              194  KBDBUF        EQU     SELPTR+1
              195  KBDFLG        EQU     KBDBUF+1
              196  TEMPKEY       EQU     KBDFLG+1
              197  CNT           EQU     TEMPKEY+1
              198  SCNCNT        EQU     CNT+1
              199  SECCNT        EQU     SCNCNT+1
              200  MINCNT        EQU     SECCNT+1
              201  HRCNT         EQU     MINCNT+1
              202  TEMP          EQU     HRCNT+1
              203  TEMP1         EQU     TEMP+1
              204  TIMER         EQU     TEMP1+1
              205  SIGN          EQU     TIMER+1
              206  EXECMEM       EQU     SIGN+1
              207  ENDEM         EQU     EXECMEM+10
              208  RREF          EQU     ENDEM
              209  GREF          EQU     RREF+2
              210  BREF          EQU     GREF+2
              211  RNEG          EQU     BREF+2
```

INIT
LOC  OBJ CODE  M STMT  SOURCE STATEMENT

|  |  | STMT | Label | | Expression |
|---|---|---|---|---|---|
|  |  | 212 | GNEG | EQU | RNEG+2 |
|  |  | 213 | BNEG | EQU | GNEG+2 |
|  |  | 214 | RRTIME | EQU | BNEG+2 |
|  |  | 215 | GRTIME | EQU | RRTIME+2 |
|  |  | 216 | BRTIME | EQU | GRTIME+2 |
|  |  | 217 | RPTIME | EQU | BRTIME+2 |
|  |  | 218 | GPTIME | EQU | RPTIME+2 |
|  |  | 219 | BPTIME | EQU | GPTIME+2 |
|  |  | 220 | RDISP | EQU | BPTIME+2 |
|  |  | 221 | GDISP | EQU | RDISP+2 |
|  |  | 222 | BDISP | EQU | GDISP+2 |
|  |  | 223 | REF | EQU | BDISP+2 |
|  |  | 224 | NEG | EQU | REF+2 |
|  |  | 225 | RTIME | EQU | NEG+2 |
|  |  | 226 | CTIME | EQU | RTIME+2 |
|  |  | 227 | REM | EQU | CTIME+2 |
|  |  | 228 | ANS | EQU | REM+2 |
|  |  | 229 | HEX | EQU | ANS+2 |
|  |  | 230 | DEC | EQU | HEX+2 |
|  |  | 231 | DECDSP | EQU | DEC+2 |
|  |  | 232 | ANSSAV | EQU | DECDSP+9 |
|  |  | 233 | ANSLP | EQU | ANSSAV+10 |
|  |  | 234 | ECONSV | EQU | ANSLP+1 |
|  |  | 235 | IOIMG1 | EQU | ECONSV+2 |
|  |  | 236 | IOIMG2 | EQU | IOIMG1+1 |
|  |  | 237 | IOIMG3 | EQU | IOIMG2+1 |
|  |  | 238 | REXP | EQU | IOIMG3+1 |
|  |  | 239 | GEXP | EQU | REXP+2 |
|  |  | 240 | BEXP | EQU | GEXP+2 |
|  |  | 241 | BYTEO | EQU | BEXP+2 |
|  |  | 242 | SETNUM | EQU | BYTEO+1 |
|  |  | 243 | SETSAV | EQU | SETNUM+1 |
|  |  | 244 | FUNC | EQU | SETSAV+1 |
|  |  | 245 | POSSLP | EQU | FUNC+1 |
|  |  | 246 | NEGSLP | EQU | POSSLP+1 |
|  |  | 247 | SUPTR | EQU | NEGSLP+1 |
|  |  | 248 | SETVAL | EQU | SUPTR+2 |
|  |  | 249 | MODE | EQU | SETVAL+2 |
|  |  | 250 | FUNPTR | EQU | MODE+1 |
|  |  | 251 | SUFLAG | EQU | FUNPTR+1 |
|  |  | 252 | SEGOUT | EQU | SUFLAG+1 |
|  |  | 253 | RCH | EQU | SEGOUT+4 |
|  |  | 254 | GCH | EQU | RCH+1 |
|  |  | 255 | BCH | EQU | GCH+1 |
|  |  | 256 | COUNT | EQU | BCH+1 |
|  |  | 257 | BUTOFF | EQU | COUNT+1 |
|  |  | 258 | BEPFLG | EQU | BUTOFF+2 |
|  |  | 259 | CONFLG | EQU | BEPFLG+1 |
|  |  | 260 | PAPFLG | EQU | CONFLG+1 |
|  |  | 261 | EXRANG | EQU | PAPFLG+1 |
|  |  | 262 | COLCOR | EQU | EXRANG+1 |
|  |  | 263 | COLRSGN | EQU | COLCOR+1 |
|  |  | 264 | COLRVAL | EQU | COLRSGN+1 |
|  |  | 265 | HEXSGN | EQU | COLRVAL+1 |
|  |  | 266 | TIMFLG | EQU | HEXSGN+1 |
|  |  | 267 | TTIME | EQU | TIMFLG+1 |
|  |  | 268 | TTIME1 | EQU | TTIME+2 |
|  |  | 269 | DIFF | EQU | TTIME1+2 |
|  |  | 270 | TBLSAV | EQU | DIFF+2 |
|  |  | 271 | IOIMG4 | EQU | TBLSAV+2 |
|  |  | 272 | MSGCNT | EQU | IOIMG4+1 |
|  |  | 273 | REDDEN | EQU | MSGCNT+2 |
|  |  | 274 | GRNDEN | EQU | REDDEN+14 |
|  |  | 275 | BLUDEN | EQU | GRNDEN+14 |
|  |  | 276 | PRNSW | EQU | BLUDEN+14 |
|  |  | 277 | LOGO | EQU | PRNSW+1 |

LOC  OBJ CODE  M STMT  SOURCE STATEMENT

```
LOC   OBJ CODE M STMT  SOURCE STATEMENT
                 278   BPU        EQU    LOGO+1
                 279   BPO        EQU    BPU+2
                 280   N3         EQU    BPO+2
                 281   NT         EQU    N3+2
                 282   SLPO1      EQU    NT+2
                 283   SLPO2      EQU    SLPO1+2
                 284   SLPU1      EQU    SLPO2+2
                 285   SLPU2      EQU    SLPU1+2
                 286   O4         EQU    SLPU2+2
                 287   U1         EQU    O4+2
                 288   DELTAT     EQU    U1+2
                 289   N3DEN      EQU    DELTAT+2
                 290   NTDEN      EQU    N3DEN+2
                 291   N3TIME     EQU    NTDEN+2
                 292   DBPTR      EQU    N3TIME+2
                 293   BP         EQU    DBPTR+2
                 294   RCSLOP     EQU    BP+2
                 295   CBHFLG     EQU    RCSLOP+2
                 296   SFSFLG     EQU    CBHFLG+1
                 297   FSFSF      EQU    SFSFLG+1
                 298   FLGSFS     EQU    FSFSF+1
                 299   MAX        EQU    FLGSFS+1
                 300   MIN        EQU    MAX+1
                 301   CRATIO     EQU    MIN+1
                 302   HHRCNT     EQU    CRATIO+2
                 303   BLKCNT     EQU    HHRCNT+1
                 304   SCRTH1     EQU    BLKCNT+1
                 305   TEMPSU     EQU    SCRTH1+2
                 306   SLPFLG     EQU    TEMPSU+1
                 307   BYTE1      EQU    SLPFLG+1
                 308   TUNFLG     EQU    BYTE1+1
                 309   FLOFLG     EQU    TUNFLG+1
                 310   BCOUNT     EQU    FLOFLG+1
                 311   DOBLNK     EQU    BCOUNT+1
                 312   DENBUT     EQU    DOBLNK+1
                 313   ADMODE     EQU    DENBUT+1
                 314   MINUS      EQU    ADMODE+1
                 315   ORDSRT     EQU    MINUS+1
                 316   OLDKEY     EQU    ORDSRT+2
                 317   Y_NFLG     EQU    OLDKEY+1
                 318   ADVCNT     EQU    Y_NFLG+1
                 319   MULPRN     EQU    ADVCNT+1
                 320   BOMOUT     EQU    MULPRN+2
                 321   RAMSUM     EQU    BOMOUT+1
                 322   ADD        EQU    RAMSUM+2
                 323   ;
                 324   ;
                 325   ;
                 326   ;==========================================
                 327   ;
                 328   ;             SETUP / SET1   DATA BASE
                 329   ;
                 330   ;==========================================
                 331   ;
                 332   SET12B     EQU    49
                 333   MSGSIZ     EQU    8
                 334   ED2B       EQU    3
                 335   MAX2B      EQU    SET12B+ED2B
                 336   MAXFLD     EQU    MAX2B
                 337   ;SETSIZ    EQU    112
                 338   SETSIZ     EQU    2*MAX2B+2
                 339   STACK      EQU    RAM+200H
                 340   SETUPO     EQU    STACK
                 341   SUADDR     EQU    SETUPO+100H
                 342   MAXCLC     EQU    RAM+OFFFH-SUADDR
                 343   MXSETP1    EQU    MAXCLC/SETSIZ
```

INIT
```
LOC   OBJ CODE  M STMT  SOURCE STATEMENT
               344  MAXSET         EQU    MXSETP1-1
               345  CMXSET         EQU    2048/SETSIZ
               346  EMXSET         EQU    CMXSET+MAXSET
               347  DENMAX         EQU    29
               348  ;MAXFNC        EQU    5
               349  ;
               350  ;
               351  ;
               352  ;
               353  REDREF         EQU    SETUP0+2
               354  GRNREF         EQU    REDREF+2
               355  BLUREF         EQU    GRNREF+2
               356  REDNEG         EQU    BLUREF+2
               357  GRNNEG         EQU    REDNEG+2
               358  BLUNEG         EQU    GRNNEG+2
               359  RO4PRN         EQU    BLUNEG+2
               360  GO4PRN         EQU    RO4PRN+2
               361  BO4PRN         EQU    GO4PRN+2
               362  RU1PRN         EQU    BO4PRN+2
               363  GU1PRN         EQU    RU1PRN+2
               364  BU1PRN         EQU    GU1PRN+2
               365  REDMAS         EQU    BU1PRN+2
               366  GRNMAS         EQU    REDMAS+2
               367  BLUMAS         EQU    GRNMAS+2
               368  RCORR          EQU    BLUMAS+2
               369  GCORR          EQU    RCORR+2
               370  BCORR          EQU    GCORR+2
               371  ROFFS          EQU    BCORR+2
               372  GOFFS          EQU    ROFFS+2
               373  BOFFS          EQU    GOFFS+2
               374  PRNCNT         EQU    BOFFS+2
               375  FACTOR         EQU    PRNCNT+4
               376  CUTPUL         EQU    FACTOR+2
               377  ADVPUL         EQU    CUTPUL+2
               378  ADWAIT         EQU    ADVPUL+2
               379  RSTCNT         EQU    ADWAIT+2
               380  SRTCNT         EQU    RSTCNT+2
               381  ;
               382  RDDEN          EQU    SRTCNT+2
               383  GDDEN          EQU    RDDEN+14
               384  BDDEN          EQU    GDDEN+14
               385  RDICHRO        EQU    BDDEN+14
               386  GDICHRO        EQU    RDICHRO+2
               387  BDICHRO        EQU    GDICHRO+2
               388  RDENVAL        EQU    BDICHRO+2
               389  GDENVAL        EQU    RDENVAL+2
               390  BDENVAL        EQU    GDENVAL+2
               391  ENDVALU        EQU    BDENVAL+2
               392  ;
               393  ;
               394  ;
               395  ENDRAM         EQU    SETSIZ*MAXSET
               396  ;
               397  ;****************************************
               398  ;
               399  ;                             KEY MAP EQUATES
               400  ;
               401  ;****************************************
               402  ;
               403  KEY1           EQU    00H
               404  KEYPRI         EQU    00H
               405  KEY2           EQU    01H
               406  KEYSFS         EQU    01H
               407  KEY3           EQU    02H
               408  KEYCBH         EQU    02H
               409  KEY4           EQU    03H
```

```
                          INIT.L
LOC    OBJ CODE  M STMT  SOURCE STATEMENT
                    410  KEYPAP              EQU     03H
                    411  KEY5                EQU     04H
                    412  KEYFCP              EQU     04H
                    413  KEY6                EQU     05H
                    414  KEYSU               EQU     05H
                    415  KEY7                EQU     08H
                    416  KEYSLP              EQU     08H
                    417  KEY8                EQU     09H
                    418  KEYABS              EQU     09H
                    419  KEY9                EQU     0AH
                    420  KEYEXR              EQU     0AH
                    421  KEYSPE              EQU     0BH
                    422  KEY0                EQU     0CH
                    423  KEYORD              EQU     0DH
                    424  KEYR                EQU     10H
                    425  KEYG                EQU     11H
                    426  KEYB                EQU     12H
                    427  KEYC                EQU     13H
                    428  KEYM                EQU     14H
                    429  KEYY                EQU     15H
                    430  KEYENT              EQU     18H
                    431  KEYCAN              EQU     19H
                    432  KEYTIM              EQU     1AH
                    433  KEYADV              EQU     1BH
                    434  KEYSTP              EQU     1CH
                    435  KEYON               EQU     1DH
                    436  KEYPLU              EQU     1DH
                    437  KEYYES              EQU     1DH
                    438  KEYOFF              EQU     1EH
                    439  KEYMIN              EQU     1EH
                    440  KEYNO               EQU     1EH
                    441  KEY2M               EQU     20H
                    442  KEY1M               EQU     21H
                    443  KEYNM               EQU     22H
                    444  KEYN                EQU     23H
                    445  KEYNP               EQU     24H
                    446  KEY1P               EQU     25H
                    447  KEY2P               EQU     26H
                    448  ;
                    449  ;
                    450  ;    INITialization module
                    451  ;
                    452  ;            107
                    453  ;
                    454  ;
                    455  ;::::::::::::::::::::::::::::::::::::::
                    456  ;
                    457  ;                        E D I T   H I S
                    458  ;
                    459  ;        04-19-82       BB      Begin re
                    460  ;        04-30-82       BB      Add prir
                    461  ;
                    462  ;::::::::::::::::::::::::::::::::::::::
                    463  ;
                    464           EXTERNAL      DISP,KEY,PUTASC, EXEC
004A   3603         508          LD      (HL),HIREL
004C   23           509          INC     HL
004D   3689         510          LD      (HL),LOREL
004F   0E20         511          LD      C,32
0051   CD0000   X   512          CALL    WAIT
                    513  ;
```

| LOC | OBJ CODE | M | STMT | SOURCE | EXEC STATEMENT | |
|---|---|---|---|---|---|---|
| 0054 | CD0000 | X | 514 | | CALL | CHKSUM |
| 0057 | 2A0469 | | 515 | | LD | HL,(RAMSUM) |
| 005A | B7 | | 516 | | OR | A |
| 005B | ED42 | | 517 | | SBC | HL,BC |
| 005D | 280F | | 518 | | JR | Z,PASS |
| 005F | ED430469 | | 519 | | LD | (RAMSUM),BC |
| 0063 | 110000 | X | 520 | | LD | DE,MSG1F |
| 0066 | CD0000 | X | 521 | | CALL | PUTASC |
| 0069 | CD0000 | X | 522 | | CALL | BEEP_3 |
| 006C | 1809 | | 523 | | JR | EXEC |
| 006E | 110000 | X | 524 | PASS | LD | DE,MSG1 |
| 0071 | CD0000 | X | 525 | | CALL | PUTASC |
| 0074 | CD0000 | X | 526 | | CALL | BEEP_3 |
| | | | 527 | ; | | |
| 0077 | 110000 | X | 528 | EXEC | LD | DE,MSG3A |
| 007A | 3AC368 | | 529 | | LD | A,(LOGO) |
| 007D | B7 | | 530 | | OR | A |
| 007E | C28400 | R | 531 | | JP | NZ,EXEC0 |
| 0081 | 110000 | X | 532 | | LD | DE,MSG3 |
| | | | 533 | EXEC0: | | |
| 0084 | CD0000 | X | 534 | | CALL | PUTASC |
| 0087 | 3E01 | | 535 | | LD | A,1 |
| 0089 | 32C368 | | 536 | | LD | (LOGO),A |
| 008C | 0E10 | | 537 | | LD | C,10H |
| | | | 538 | EXEC1 | | |
| 008E | FB | | 539 | | EI | |
| 008F | 1020 | | 540 | | DJNZ | EXEC3 |
| 0091 | 0D | | 541 | | DEC | C |
| 0092 | 201D | | 542 | | JR | NZ,EXEC3 |
| 0094 | CD0000 | X | 543 | | CALL | LEFT |
| 0097 | 0E10 | | 544 | | LD | C,10H |
| 0099 | 3A9568 | | 545 | | LD | A,(IOIMG4) |
| 009C | CB47 | | 546 | | BIT | FOOTSW,A |
| 009E | C2B100 | R | 547 | | JP | NZ,EXEC3 |
| 00A1 | 0E04 | | 548 | | LD | C,4 |
| 00A3 | CD0000 | X | 549 | | CALL | WAIT |
| 00A6 | CB47 | | 550 | | BIT | FOOTSW,A |
| 00A8 | C2B100 | R | 551 | | JP | NZ,EXEC3 |
| 00AB | CD0000 | X | 552 | | CALL | PRINT |
| 00AE | C37700 | R | 553 | | JP | EXEC |
| | | | 554 | EXEC3 | | |
| 00B1 | 3A0B68 | | 555 | | LD | A,(KBDFLG) |
| 00B4 | B7 | | 556 | | OR | A |
| 00B5 | 28D7 | | 557 | | JR | Z,EXEC1 |
| | | | 558 | ; | | |
| 00B7 | AF | | 559 | | XOR | A |
| 00B8 | 320B68 | | 560 | | LD | (KBDFLG),A |
| 00BB | 3A0A68 | | 561 | | LD | A,(KBDBUF) |
| 00BE | FE27 | | 562 | | CP | 027H |
| 00C0 | D27700 | R | 563 | | JP | NC,EXEC |
| 00C3 | FE0B | | 564 | EXEC2 | CP | KEYSPE |
| 00C5 | CA9A01 | R | 565 | | JP | Z,SPECIAL |
| 00C8 | FE10 | | 566 | | CP | KEYR |
| 00CA | DAD800 | R | 567 | | JP | C,EXEC2B |
| 00CD | FE16 | | 568 | | CP | KEYY+1 |
| 00CF | D2D800 | R | 569 | | JP | NC,EXEC2B |
| 00D2 | CD0000 | X | 570 | | CALL | COLOR |
| 00D5 | C37700 | R | 571 | | JP | EXEC |
| | | | 572 | EXEC2B: | | |
| 00D8 | FE0D | | 573 | | CP | KEYORD |
| 00DA | CAA901 | R | 574 | | JP | Z,SORT |
| 00DD | FE1A | | 575 | | CP | KEYTIM |
| 00DF | CAEB01 | R | 576 | | JP | Z,TIME |
| 00E2 | FE1B | | 577 | | CP | KEYADV |
| 00E4 | CA2101 | R | 578 | | JP | Z,ADVPAP |

```
                        EXEC
 LOC    OBJ CODE  M STMT SOURCE STATEMENT
00E7    FE1C        579           CP    KEYSTP
00E9    CA0C01   R  580           JP    Z,SUCHG
00EC    CB6F        581           BIT   5,A
00EE    CAF700   R  582           JP    Z,EXEC2A
00F1    CD0000   X  583           CALL  BUTT7
00F4    C37700   R  584           JP    EXEC
                    585  EXEC2A:
00F7    FE1D        586           CP    KEYPLU
00F9    CC0000   X  587           CALL  Z,EXPRN
00FC    FE1E        588           CP    KEYMIN
00FE    CC0000   X  589           CALL  Z,EXPRN
0101    FE19        590           CP    KEYCAN
0103    CA7700   R  591           JP    Z,EXEC
0106    CD0000   X  592           CALL  ERROR
0109    C37700   R  593           JP    EXEC
                    594  ;
010C    CD0000   X  595  SUCHG    CALL  SHO_SU
010F    CD0000   X  596           CALL  GET255
0112    3A0D68      597           LD    A,(CNT)
0115    FE03        598           CP    3
0117    CA7700   R  599           JP    Z,EXEC
011A    79          600           LD    A,C
011B    326E68      601           LD    (SETNUM),A
011E    C37700   R  602           JP    EXEC
                    603  ;
0121    3A9568      604  ADVPAP   LD    A,(IOIMG4)
0124    CB4F        605           BIT   OPERATE,A
0126    C27700   R  606           JP    NZ,EXEC
                    607  ;
0129    3A9568      608           LD    A,(IOIMG4)
012C    CB67        609           BIT   WAITSW,A
012E    CA7101   R  610           JP    Z,PAPCLR
0131    110000   X  611           LD    DE,CUTMSG
0134    CD0000   X  612           CALL  PUTASC
0137    CD0000   X  613           CALL  BEEP_2
013A    FB          614  WAITPC   EI
013B    3A9568      615           LD    A,(IOIMG4)
013E    CB67        616           BIT   WAITSW,A
0140    C24C01   R  617           JP    NZ,WTPC1
0143    ED4B326A    618           LD    BC,(CUTPUL)
0147    CD0000   X  619           CALL  WAIT
014A    1825        620           JR    PAPCLR
014C    3A0B68      621  WTPC1    LD    A,(KBDFLG)
014F    B7          622           OR    A
0150    28E8        623           JR    Z,WAITPC
0152    3E00        624           LD    A,0
0154    320B68      625           LD    (KBDFLG),A
0157    3A0A68      626           LD    A,(KBDBUF)
015A    FE18        627           CP    KEYENT
015C    2813        628           JR    Z,PAPCLR
015E    FE19        629           CP    KEYCAN
0160    20D8        630           JR    NZ,WAITPC
0162    3EBF        631           LD    A,DEFLT1
0164    326468      632           LD    (IOIMG1),A
0167    D300        633           OUT   (SSR1),A
0169    0E18        634           LD    C,24
016B    CD0000   X  635           CALL  WAITKY
016E    C37700   R  636           JP    EXEC
                    637  ;
0171    110000   X  638  PAPCLR   LD    DE,MSG5
0174    CD0000   X  639           CALL  PUTASC
0177    ED4B326A    640           LD    BC,(CUTPUL)
017B    CB39        641           SRL   C
017D    CD0000   X  642           CALL  WAIT
0180    3A6468      643           LD    A,(IOIMG1)
0183    E6DF        644           AND   .NOT.PAPADV
```

| LOC | OBJ CODE | M | STMT | SOURCE | EXEC STATEMENT | |
|---|---|---|---|---|---|---|
| 0185 | 326468 | | 645 | | LD | (IOIMG1),A |
| 0188 | D300 | | 646 | | OUT | (SSR1),A |
| 018A | ED4B346A | | 647 | | LD | BC,(ADVPUL) |
| 018E | 79 | | 648 | | LD | A,C |
| 018F | 320069 | | 649 | | LD | (ADVCNT),A |
| | | | 650 | ; | CALL | WAIT |
| | | | 651 | ; | LD | A,(IOIMG1) |
| | | | 652 | ; | OR | PAPADV |
| | | | 653 | ;PAPEX | LD | (IOIMG1),A |
| | | | 654 | ; | OUT | (SSR1),A |
| 0192 | 0E18 | | 655 | | LD | C,24 |
| 0194 | CD0000 | X | 656 | | CALL | WAITKY |
| 0197 | C37700 | R | 657 | | JP | EXEC |
| | | | 658 | ; | | |
| | | | 659 | SPECIAL | | |
| 019A | 110000 | X | 660 | | LD | DE,MSG2 |
| 019D | CD0000 | X | 661 | | CALL | PUTASC |
| 01A0 | CD0000 | X | 662 | | CALL | GETKEY |
| 01A3 | CC0000 | X | 663 | | CALL | Z,SELRUT |
| 01A6 | C37700 | R | 664 | | JP | EXEC |
| | | | 665 | ; | | |
| 01A9 | 110000 | X | 666 | SORT | LD | DE,MSG0 |
| 01AC | CD0000 | X | 667 | | CALL | PUTASC |
| 01AF | ED4BFC68 | | 668 | | LD | BC,(ORDSRT) |
| 01B3 | CD0000 | X | 669 | | CALL | DSPBCD |
| | | | 670 | ; | | |
| 01B6 | 3A6668 | | 671 | | LD | A,(IOIMG3) |
| 01B9 | E6EF | | 672 | | AND | .NOT.SRTSSR |
| 01BB | 326668 | | 673 | | LD | (IOIMG3),A |
| 01BE | D308 | | 674 | | OUT | (RNDOUT),A |
| 01C0 | ED4B3A6A | | 675 | | LD | BC,(SRTCNT) |
| 01C4 | CD0000 | X | 676 | | CALL | WAIT |
| 01C7 | 3A6668 | | 677 | | LD | A,(IOIMG3) |
| 01CA | F610 | | 678 | | OR | SRTSSR |
| 01CC | 326668 | | 679 | | LD | (IOIMG3),A |
| 01CF | D308 | | 680 | | OUT | (RNDOUT),A |
| | | | 681 | ; | | |
| 01D1 | CD0000 | X | 682 | | CALL | GETKEY |
| 01D4 | FE0C | | 683 | | CP | KEY0 |
| 01D6 | C27700 | R | 684 | | JP | NZ,EXEC |
| 01D9 | 010000 | | 685 | | LD | BC,0 |
| 01DC | ED43FC68 | | 686 | | LD | (ORDSRT),BC |
| 01E0 | CD0000 | X | 687 | | CALL | DSPBCD |
| 01E3 | 0E20 | | 688 | | LD | C,32 |
| 01E5 | CD0000 | X | 689 | | CALL | WAITKY |
| 01E8 | C37700 | R | 690 | | JP | EXEC |
| | | | 691 | ; | | |
| 01EB | 110000 | X | 692 | TIME | LD | DE,MSG0 |
| 01EE | CD0000 | X | 693 | | CALL | PUTASC |
| 01F1 | FB | | 694 | TIME1 | EI | |
| 01F2 | 210068 | | 695 | | LD | HL,SEGIMG |
| 01F5 | 3A9568 | | 696 | | LD | A,(IOIMG4) |
| 01F8 | CB4F | | 697 | | BIT | OPERATE,A |
| 01FA | 200C | | 698 | | JR | NZ,TIME3 |
| 01FC | 3A0F68 | | 699 | | LD | A,(SECCNT) |
| 01FF | CB0F | | 700 | | RRC | A |
| 0201 | 3E21 | | 701 | | LD | A,21H |
| 0203 | 3002 | | 702 | | JR | NC,TIME2 |
| 0205 | F680 | | 703 | | OR | 80H |
| 0207 | 77 | | 704 | TIME2 | LD | (HL),A |
| 0208 | 23 | | 705 | TIME3 | INC | HL |
| 0209 | 3AE68 | | 706 | | LD | A,(HHRCNT) |
| 020C | CD8502 | R | 707 | | CALL | PUT |
| 020F | 3A1168 | | 708 | | LD | A,(HRCNT) |
| 0212 | CD8502 | R | 709 | | CALL | PUT |
| 0215 | 3E14 | | 710 | | LD | A,14H |

```
                                EXEC
LOC     OBJ CODE  M STMT  SOURCE STATEMENT
0217    77            711           LD     (HL),A
0218    23            712           INC    HL
0219    3A1068        713           LD     A,(MINCNT)
021C    CD8502    R   714           CALL   PUT
021F    3A0B68        715           LD     A,(KBDFLG)
0222    B7            716           OR     A
0223    28CC          717           JR     Z,TIME1
                      718   ;
0225    3E00          719           LD     A,0
0227    320B68        720           LD     (KBDFLG),A
022A    3A0A68        721           LD     A,(KBDBUF)
022D    FE0C          722           CP     KEY0
022F    CA7402    R   723           JP     Z,TIM1
0232    FE1A          724           CP     KEYTIM
0234    C27700    R   725           JP     NZ,EXEC
                      726   ;
0237    AF            727           XOR    A
0238    320B68        728           LD     (KBDFLG),A
023B    CD0000    X   729   POPCNT  CALL   GET_SU
023E    110000    X   730           LD     DE,MSG0
0241    CD0000    X   731           CALL   PUTASC
0244    0652          732           LD     B,'R'
0246    0E1F          733           LD     C,DBPCNT
0248    CD0000    X   734           CALL   SET1
024B    D5            735           PUSH   DE
024C    C1            736           POP    BC
024D    CD0000    X   737           CALL   DSPBCD
0250    CD0000    X   738           CALL   RES_SU
0253    CD0000    X   739           CALL   GETKEY
0256    FE1A          740           CP     KEYTIM
0258    28E1          741           JR     Z,POPCNT
025A    C37700    R   742           JP     EXEC
                      743   ;
025D    CD6402    R   744   MASCNT  CALL   DSPCNT
0260    CD0000    X   745           CALL   GETKEY
0263    C9            746           RET
                      747   ;       CP     KEY0
                      748   ;       JP     NZ,EXEC
                      749   ;       LD     BC,0
                      750   ;       LD     (PRNCNT),BC
                      751   ;       LD     (PRNCNT+2),BC
                      752   ;       CALL   DSPCNT
                      753   ;       LD     C,32
                      754   ;       CALL   WAITKY
                      755   ;       JP     EXEC
                      756   ;
0264    210068        757   DSPCNT  LD     HL,SEGIMG
0267    112F6A        758           LD     DE,PRNCNT+3
026A    0604          759           LD     B,4
026C    1A            760   CNT1    LD     A,(DE)
026D    CD8502    R   761           CALL   PUT
0270    1B            762           DEC    DE
0271    10F9          763           DJNZ   CNT1
0273    C9            764           RET
                      765   ;
0274    3E00          766   TIM1    LD     A,0
0276    32EE68        767           LD     (HHRCNT),A
0279    321168        768           LD     (HRCNT),A
027C    321068        769           LD     (MINCNT),A
027F    320F68        770           LD     (SECCNT),A
0282    C3F101    R   771           JP     TIME1
                      772   ;
0285    4F            773   PUT     LD     C,A
0286    CB3F          774           SRL    A
0288    CB3F          775           SRL    A
028A    CB3F          776           SRL    A
```

```
                                   EXEC
   LOC   OBJ CODE  M STMT  SOURCE STATEMENT

028C  CB3F        777           SRL     A
   028E  77          778           LD      (HL),A
   028F  23          779           INC     HL
   0290  79          780           LD      A,C
   0291  E60F        781           AND     0FH
   0293  77          782           LD      (HL),A
   0294  23          783           INC     HL
   0295  C9          784           RET
                     785   ;
                     786   ;
                     787   END

PROC

450   *LIST ON
                     451   ;
                     452   ;    PROCedure module - common sub
                     453   ;
                     454   ;         107
                     455   ;
                     456   ;
                     457   ;:::::::::::::::::::::::::::::::::
                     458   ;
                     459   ;                         E D I T
                     460   ;
                     461   ;         04-19-82              BB
                     462   ;         05-05-82              AMF
                     463   ;         05-13-82              AMF
                     464   ;         08-26-82              AMF
                     465   ;         12-20-82              BB
                     466   ;         12-21-82              BB
                     467   ;:::::::::::::::::::::::::::::::::
                     468
                     469           GLOBAL        PUTASC,G
                     470           GLOBAL        BCD,CONV
                     471           GLOBAL        INITSF,G
                     472           GLOBAL        BEEP_2,B
                     473
                     474           EXTERNAL      MSG6,MSG
                     475
                     476   ;********************************
                     477   ;
                     478   ;                         PUT ASCI
                     479   ;
                     480   ;INPUT         DE points to mes
                     481   ;
                     482   ;OUTPUT        none
                     483   ;
                     484   ;DESTROYS      HL, B, A, DE poi
                     485   ;
                     486   ;********************************
                     487   ;
                     488   PUTASC
   0000  210068      489           LD      HL,SEGIMG
   0003  0608        490           LD      B,8
                     491   D_LOOP
   0005  1A          492           LD      A,(DE)
   0006  D637        493           SUB     37H
   0008  77          494           LD      (HL),A
   0009  23          495           INC     HL
   000A  13          496           INC     DE
   000B  10F8        497           DJNZ    D_LOOP
   000D  C9          498           RET
                     499   ;
```

```
LOC     OBJ CODE  M STMT  SOURCE STATEMENT
                   500    ;********************************
                   501    ;
                   502    ;                    GET NUMB
                   503    ;
                   504    ;INPUT               none
                   505    ;
                   506    ;OUTPUT              BCD number in SE
                   507    ;
                   508    ;NOTE                ENTER key return
                   509    ;                    CANCEL key cance
                   510    ;
                   511    ;********************************
                   512    ;
                   513    RENGNM:
000E    110000   X 514           LD      DE,MSG6
0011    CD0000   R 515           CALL    PUTASC
                   516    GETNUM:
0014    3E08       517           LD      A,8
0016    320D68     518           LD      (CNT),A
0019    CDE100   R 519           CALL    GETDIG
                   520    GETMNM:
001C    3022       521           JR      NC,CHKKEY
001E    57         522           LD      D,A
001F    D5         523           PUSH    DE
0020    110000   X 524           LD      DE,MSG6
0023    CD0000   R 525           CALL    PUTASC
0026    D1         526           POP     DE
                   527    GN_1
0027    3A0D68     528           LD      A,(CNT)
002A    3D         529           DEC     A
002B    FA5200   R 530           JP      M,NUMEX
002E    320D68     531           LD      (CNT),A
                   532    ;
0031    CD1A01   R 533           CALL    LEFT
0034    7A         534           LD      A,D
0035    210768     535           LD      HL,SEGIMG+7
0038    77         536           LD      (HL),A
0039    CDE100   R 537    GN_2   CALL    GETDIG
003C    57         538           LD      D,A
003D    DA2700   R 539           JP      C,GN_1
                   540    CHKKEY
0040    FE1E       541           CP      KEYMIN
0042    2004       542           JR      NZ,CHK1
0044    1614       543           LD      D,'K'-37H
0046    18DF       544           JR      GN_1
0048    FE19       545    CHK1   CP      KEYCAN
004A    CA0E00   R 546           JP      Z,RENGNM
004D    FE18       547           CP      KEYENT
004F    C23900   R 548           JP      NZ,GN_2
0052    C9         549    NUMEX  RET
                   550    ;
                   551    ;********************************
                   552    ;
                   553    ;       GET NUMBER FROM KEYBOARD
                   554    ;
                   555    ;INPUT               message in first
                   556    ;
                   557    ;OUTPUT              0 -> 999 binary
                   558    ;
                   559    ;NOTE                ENTER key return
                   560    ;                    CANCEL key cance
                   561    ;
                   562    ;********************************
                   563    ;
0053    3E21       564    REN255 LD      A,21H
0055    320568     565           LD      (SEGIMG+5),A
```

| LOC | OBJ CODE | M | STMT | PROC SOURCE | STATEMENT | |
|-----|----------|---|------|-------------|-----------|--|
| 0058 | 320668 | | 566 | | LD | (SEGIMG+6),A |
| 005B | 320768 | | 567 | | LD | (SEGIMG+7),A |
| 005E | 3E03 | | 568 | GET255 | LD | A,3 |
| 0060 | 320D68 | | 569 | | LD | (CNT),A |
| 0063 | CDE100 | R | 570 | | CALL | GETDIG |
| 0066 | 3025 | | 571 | | JR | NC,CHK255 |
| 0068 | 57 | | 572 | | LD | D,A |
| 0069 | 3E21 | | 573 | | LD | A,21H |
| 006B | 320568 | | 574 | | LD | (SEGIMG+5),A |
| 006E | 320668 | | 575 | | LD | (SEGIMG+6),A |
| 0071 | 320768 | | 576 | | LD | (SEGIMG+7),A |
| 0074 | 3A0D68 | | 577 | G255_1 | LD | A,(CNT) |
| 0077 | 3D | | 578 | | DEC | A |
| 0078 | FA5300 | R | 579 | | JP | M,REN255 |
| 007B | 320D68 | | 580 | | LD | (CNT),A |
| 007E | CD2D01 | R | 581 | | CALL | LEFT3 |
| 0081 | 7A | | 582 | | LD | A,D |
| 0082 | 210768 | | 583 | | LD | HL,SEGIMG+7 |
| 0085 | 77 | | 584 | | LD | (HL),A |
| 0086 | CDE100 | R | 585 | G255_2 | CALL | GETDIG |
| 0089 | 57 | | 586 | | LD | D,A |
| 008A | DA7400 | R | 587 | | JP | C,G255_1 |
| 008D | FE19 | | 588 | CHK255 | CP | KEYCAN |
| 008F | C29D00 | R | 589 | | JP | NZ,C255_2 |
| 0092 | 3A0D68 | | 590 | | LD | A,(CNT) |
| 0095 | FE03 | | 591 | | CP | 3 |
| 0097 | 0E00 | | 592 | | LD | C,0 |
| 0099 | C8 | | 593 | | RET | Z |
| 009A | C35300 | R | 594 | | JP | REN255 |
| 009D | FE18 | | 595 | C255_2 | CP | KEYENT |
| 009F | 280A | | 596 | | JR | Z,CHKENT |
| 00A1 | 3A0D68 | | 597 | | LD | A,(CNT) |
| 00A4 | FE03 | | 598 | | CP | 3 |
| 00A6 | CA5E00 | R | 599 | | JP | Z,GET255 |
| 00A9 | 18DB | | 600 | | JR | G255_2 |
| | | | 601 | ; | | |
| 00AB | 010000 | | 602 | CHKENT | LD | BC,0 |
| 00AE | 3A0768 | | 603 | | LD | A,(SEGIMG+7) |
| 00B1 | FE21 | | 604 | | CP | 21H |
| 00B3 | C8 | | 605 | | RET | Z |
| 00B4 | FE1D | | 606 | | CP | 1DH |
| 00B6 | C8 | | 607 | | RET | Z |
| 00B7 | 4F | | 608 | | LD | C,A |
| 00B8 | 3A0668 | | 609 | | LD | A,(SEGIMG+6) |
| 00BB | FE21 | | 610 | | CP | 21H |
| 00BD | C8 | | 611 | | RET | Z |
| 00BE | FE00 | | 612 | | CP | 0 |
| 00C0 | 2808 | | 613 | | JR | Z,LOOP11 |
| 00C2 | 47 | | 614 | | LD | B,A |
| 00C3 | 79 | | 615 | | LD | A,C |
| 00C4 | 0E0A | | 616 | | LD | C,10 |
| 00C6 | 81 | | 617 | LOOP10 | ADD | A,C |
| 00C7 | 10FD | | 618 | | DJNZ | LOOP10 |
| 00C9 | 4F | | 619 | | LD | C,A |
| 00CA | 3A0568 | | 620 | LOOP11 | LD | A,(SEGIMG+5) |
| 00CD | FE21 | | 621 | | CP | 21H |
| 00CF | C8 | | 622 | | RET | Z |
| 00D0 | FE00 | | 623 | | CP | 0 |
| 00D2 | 280C | | 624 | | JR | Z,LOOP21 |
| 00D4 | 47 | | 625 | | LD | B,A |
| 00D5 | 69 | | 626 | | LD | L,C |
| 00D6 | 2600 | | 627 | | LD | H,0 |
| 00D8 | 116400 | | 628 | | LD | DE,100 |
| 00DB | 19 | | 629 | LOOP20 | ADD | HL,DE |
| 00DC | 10FD | | 630 | | DJNZ | LOOP20 |
| 00DE | E5 | | 631 | | PUSH | HL |

```
                            PROC
LOC    OBJ CODE  M STMT  SOURCE  STATEMENT
00DF   C1           632           POP     BC
00E0   C9           633  LOOP21   RET
                    634  ;
                    635  ;        LD      B,100
                    636  ;        CP      1
                    637  ;        JR      Z,LAB1
                    638  ;        LD      B,200
                    639  ;        CP      2
                    640  ;        JP      NZ,REN255
                    641  ;        LD      A,C
                    642  ;        CP      56
                    643  ;        JP      NC,REN255
                    644  ;LAB1    LD      A,B
                    645  ;        ADD     A,C
                    646  ;        LD      C,A
                    647  ;        RET
                    648  ;
                    649  ;*****************************)
                    650  ;
                    651  ;                                    (
                    652  ;
                    653  ;INPUT            none
                    654  ;
                    655  ;OUTPUT           disit in Acc, Ca
                    656  ;
                    657  ;******************************
                    658  ;
                    659  GETDIG
00E1   CD0B01   R   660           CALL    GETKEY
                    661  GETDI1:
00E4   FE1D         662           CP      KEYPLU
00E6   CA0301   R   663           JP      Z,GK2
00E9   FE1E         664           CP      KEYMIN
00EB   CA0701   R   665           JP      Z,GK3
00EE   FE0D         666           CP      0DH
00F0   D0           667           RET     NC
                    668  CONVKEY:
00F1   3C           669           INC     A
00F2   FE07         670           CP      7
00F4   FA0101   R   671           JP      M,GK1
00F7   D602         672           SUB     2
00F9   FE0A         673           CP      0AH
00FB   FA0101   R   674           JP      M,GK1
00FE   C8           675           RET     Z
00FF   3E00         676           LD      A,0
0101   37           677  GK1      SCF
0102   C9           678           RET
                    679  GK2:
0103   3E21         680           LD      A,SPCHR
0105   37           681           SCF
0106   C9           682           RET
                    683  GK3:
0107   3E14         684           LD      A,'K'-'7'
0109   37           685           SCF
010A   C9           686           RET
                    687  ;
                    688  ;
                    689  ;******************************)
                    690  ;
                    691  ;                                    (
                    692  ;
                    693  ;INPUT            none
                    694  ;
                    695  ;OUTPUT           keyed character i
```

```
                        696  ;
                        697  ;DESTROYS         Acc
                        698  ;
                        699  ;*******************************
                        700  ;
                        701  GETKEY
010B   FB               702          EI
010C   3A0B68           703          LD      A,(KBDFLG)
010F   B7               704          OR      A
0110   28F9             705          JR      Z,GETKEY
0112   AF               706          XOR     A
0113   320B68           707          LD      (KBDFLG),A
0116   3A0A68           708          LD      A,(KBDBUF)
0119   C9               709          RET
                        710  ;
                        711  ;*******************************
                        712  ;
                        713  ;                ROTATE DISPLAY D:
                        714  ;
                        715  ;INPUT           none
                        716  ;
                        717  ;OUTPUT          none
                        718  ;
                        719  ;EFFECT          all eight displa
                        720  ;
                        721  ;DESTROYS        A, B, C, HL
                        722  ;
                        723  ;*******************************
                        724  ;
                        725  LEFT
011A   210068           726          LD      HL,SEGIMG
011D   7E               727          LD      A,(HL)
011E   4F               728          LD      C,A
011F   23               729          INC     HL
0120   0607             730          LD      B,7
                        731  LEFT1
0122   7E               732          LD      A,(HL)
0123   2B               733          DEC     HL
0124   77               734          LD      (HL),A
0125   23               735          INC     HL
0126   23               736          INC     HL
0127   10F9             737          DJNZ    LEFT1
0129   2B               738          DEC     HL
012A   79               739          LD      A,C
012B   77               740          LD      (HL),A
012C   C9               741          RET
                        742  ;
012D   210668           743  LEFT3   LD      HL,SEGIMG+6
0130   0E00             744          LD      C,0
0132   0602             745          LD      B,2
0134   C32201    R      746          JP      LEFT1
                        747  ;
                        748  ;*******************************
                        749  ;
                        750  ;
                        751  ;
                        752  ;INPUT           wait time in C
                        753  ;
                        754  ;OUTPUT          none
                        755  ;
                        756  ;EFFECT          Processor loops
                        757  ;                resolution is 1/
                        758  ;
                        759  ;DESTROYS        Acc, any key ent
                        760  ;
                        761  ;*******************************
```

```
                762  ;
                763  WAIT
0137  79        764           LD      A,C
0138  321468    765           LD      (TIMER),A
013B  FB        766  WAIT1    EI
013C  3A1468    767           LD      A,(TIMER)
013F  B7        768           OR      A
0140  20F9      769           JR      NZ,WAIT1
                770  ;        LD      (KBDFLG),A
0142  C9        771           RET
                772  ;
                773  ;******************************
                774  ;
                775  ;
                776  ;
                777  ;INPUT          wait time in C
                778  ;
                779  ;OUTPUT         none
                780  ;
                781  ;EFFECT         processor loops
                782  ;               resolution is 1/
                783  ;               terminates on an
                784  ;
                785  ;DESTROYS       Acc
                786  ;
                787  ;******************************
                788  ;
0143  79        789  WAITKY   LD      A,C
0144  321468    790           LD      (TIMER),A
0147  FB        791  WAITK1   EI
0148  3A0B68    792           LD      A,(KBDFLG)
014B  B7        793           OR      A
014C  C0        794           RET     NZ
014D  3A1468    795           LD      A,(TIMER)
0150  B7        796           OR      A
0151  20F4      797           JR      NZ,WAITK1
0153  C9        798           RET
                799  ;
                800  ;******************************
                801  ;                       ACTIVATE
                802  ;
                803  ;INPUT          beep time in C
                804  ;
                805  ;OUTPUT         none
                806  ;
                807  ;EFFECT         beeper sounds 1/
                808  ;               count & shutoff
                809  ;
                810  ;DESTROYS       Acc
                811  ;
                812  ;******************************
                813  ;
0154  79        814  BEEP     LD      A,C
0155  32F768    815           LD      (BCOUNT),A
0158  3A6568    816           LD      A,(IOIMG2)
015B  E6BF      817           AND     .NOT.BEEPER
015D  326568    818           LD      (IOIMG2),A
0160  D310      819           OUT     (BANK2),A
0162  C9        820           RET
                821  ;
0163  0E07      822  BEEP_4   LD      C,7
0165  CD5401  R 823           CALL    BEEP
0168  0E0E      824           LD      C,14
016A  CD4301  R 825           CALL    WAITKY
016D  0E07      826  BEEP_3   LD      C,7
016F  CD5401  R 827           CALL    BEEP
0172  0E0E      828           LD      C,14
```

```
0174  CD4301   R   829            CALL   WAITKY
0177  0E07         830   BEEP_2   LD     C,7
0179  CD5401   R   831            CALL   BEEP
017C  0E0E         832            LD     C,14
017E  CD4301   R   833            CALL   WAITKY
0181  0E07         834   BEEP_1   LD     C,7
0183  CD5401   R   835            CALL   BEEP
0186  0E0E         836            LD     C,14
0188  CD4301   R   837            CALL   WAITKY
018B  C9           838            RET
                   839   ;
                   840   ;*****************************
                   841   ;
                   842   ;                      PUT 'ERR
                   843   ;                      wait 2 s
                   844   ;
                   845   ;*****************************
                   846   ;
                   847   ERROR
018C  110000   X   848            LD     DE,MSG7
018F  CD0000   R   849            CALL   PUTASC
0192  0E14         850            LD     C,20
0194  CD5401   R   851            CALL   BEEP
0197  0E14         852            LD     C,20
0199  CD4301   R   853            CALL   WAITKY
019C  C9           854            RET
                   855   ;
                   856   ;*****************************
                   857   ;
                   858   ;                      CONVERT
                   859   ;
                   860   ;INPUT:       12 bit readins f
                   861   ;
                   862   ;OUTPUT:      LS BCD in B, MS
                   863   ;
                   864   ;*****************************
                   865   ;
                   866   CONV
019D  CB39         867            SRL    C
019F  CB39         868            SRL    C
01A1  CB39         869            SRL    C
01A3  CB39         870            SRL    C
01A5  CB20         871            SLA    B
01A7  CB20         872            SLA    B
01A9  CB20         873            SLA    B
01AB  CB20         874            SLA    B
01AD  78           875            LD     A,B
01AE  B1           876            OR     C
01AF  CB3F         877            SRL    A
01B1  47           878            LD     B,A
01B2  CB3F         879            SRL    A
01B4  CB3F         880            SRL    A
01B6  4F           881            LD     C,A
01B7  78           882            LD     A,B
01B8  91           883            SUB    C
01B9  47           884            LD     B,A
01BA  97           885            SUB    A
01BB  04           886            INC    B
01BC  C601         887   CONV1    ADD    A,1
01BE  27           888            DAA
01BF  10FB         889            DJNZ   CONV1
                   890   ;
01C1  4F           891            LD     C,A
01C2  E60F         892            AND    0FH
01C4  47           893            LD     B,A
01C5  79           894            LD     A,C
```

```
01C6   E6F0          895           AND     0F0H
01C8   CB3F          896           SRL     A
01CA   CB3F          897           SRL     A
01CC   CB3F          898           SRL     A
01CE   CB3F          899           SRL     A
01D0   C9            900           RET
                     901   ;
                     902   ;******************************
                     903   ;
                     904   ;                  16 BIT BINARY TO
                     905   ;
                     906   ;INPUT             0 -> 65565 in BC
                     907   ;
                     908   ;OUTPUT            0 -> 99 99 in BC
                     909   ;                  0 -> 9 low digit
                     910   ;
                     911   ;DESTROYS          A,B,C,D,E,H,L
                     912   ;
                     913   ;******************************
                     914   BCD:
01D1   C5            915           PUSH    BC
01D2   E1            916           POP     HL
01D3   0600          917           LD      B,0
01D5   111027        918           LD      DE,10000
01D8   B7            919   BCD1    OR      A
01D9   ED52          920           SBC     HL,DE
01DB   3803          921           JR      C,BCD2
01DD   04            922           INC     B
01DE   18F8          923           JR      BCD1
01E0   19            924   BCD2    ADD     HL,DE
01E1   0E00          925           LD      C,0
01E3   11E803        926           LD      DE,1000
01E6   B7            927   BCD3    OR      A
01E7   ED52          928           SBC     HL,DE
01E9   3803          929           JR      C,BCD4
01EB   0C            930           INC     C
01EC   18F8          931           JR      BCD3
01EE   19            932   BCD4    ADD     HL,DE
01EF   C5            933           PUSH    BC
01F0   0600          934           LD      B,0
01F2   116400        935           LD      DE,100
01F5   B7            936   BCD5    OR      A
01F6   ED52          937           SBC     HL,DE
01F8   3803          938           JR      C,BCD6
01FA   04            939           INC     B
01FB   18F8          940           JR      BCD5
01FD   19            941   BCD6    ADD     HL,DE
01FE   0E00          942           LD      C,0
0200   110A00        943           LD      DE,10
0203   B7            944   BCD7    OR      A
0204   ED52          945           SBC     HL,DE
0206   3803          946           JR      C,BCD8
0208   0C            947           INC     C
0209   18F8          948           JR      BCD7
020B   19            949   BCD8    ADD     HL,DE
020C   C5            950           PUSH    BC
020D   D1            951           POP     DE
020E   C1            952           POP     BC
020F   C9            953           RET
                     954   ;
                     955   ;******************************
                     956   ;                  DISPLAY
                     957   ;
                     958   ;PURPOSE           display value in
                     959   ;                  leading zeros su
                     960   ;
                     961   ;******************************
```

```
                   962  ;
0210  DD210568     963  DSP255   LD    IX,SEGIMG+5
0214  CDD101   R   964           CALL  BCD
0217  2600         965           LD    H,0
0219  180D         966           JR    DIS3
021B  DD210468     967  DSPBCD   LD    IX,SEGIMG+4
021F  CDD101   R   968  DBCD     CALL  BCD
0222  2600         969           LD    H,0
0224  79           970           LD    A,C
0225  CD3502   R   971           CALL  MAKDIS
0228  7A           972  DIS3     LD    A,D
0229  CD3502   R   973           CALL  MAKDIS
022C  7B           974           LD    A,E
022D  CD3502   R   975           CALL  MAKDIS
0230  7D           976           LD    A,L
0231  CD4702   R   977           CALL  MAK1
0234  C9           978           RET
                   979  ;
0235  B7           980  MAKDIS   OR    A
0236  200F         981           JR    NZ,MAK1
0238  3E21         982           LD    A,21H
023A  DD7700       983           LD    (IX),A
023D  3E00         984           LD    A,0
023F  B4           985           OR    H
0240  3E00         986           LD    A,0
0242  2003         987           JR    NZ,MAK1
0244  DD23         988           INC   IX
0246  C9           989           RET
0247  DD7700       990  MAK1     LD    (IX),A
024A  DD23         991           INC   IX
024C  24           992           INC   H
024D  C9           993           RET
                   994  ;
                   995  ;****************************
                   996  ;                     INITIAL
                   997  ;
                   998  ;****************************
                   999  ;
024E  3E00        1000  INITSF   LD    A,0
0250  32E668      1001           LD    (CBHFLG),A
0253  328768      1002           LD    (EXRANG),A
0256  328868      1003           LD    (COLCOR),A
0259  328468      1004           LD    (BEFFLG),A
025C  328968      1005           LD    (COLRSGN),A
025F  328C68      1006           LD    (TIMFLG),A
0262  32E768      1007           LD    (SFSFLG),A
0265  32E868      1008           LD    (FSFSF),A
0268  32F368      1009           LD    (SLPFLG),A
026B  3E01        1010           LD    A,1
026D  328668      1011           LD    (PAPFLG),A
0270  32E968      1012           LD    (FLGSFS),A
0273  21E803      1013           LD    HL,1000
0276  22206A      1014           LD    (RCORR),HL
0279  22226A      1015           LD    (GCORR),HL
027C  22246A      1016           LD    (BCORR),HL
027F  210000      1017           LD    HL,0
0282  220169      1018           LD    (MULPRN),HL
0285  C9          1019           RET
                  1020  ;
0286  3A6E68      1021  GET_SU   LD    A,(SETNUM)
0289  32F268      1022           LD    (TEMPSU),A
028C  110000   X  1023           LD    DE,SETM2
028F  CD0000   R  1024           CALL  PUTASC
0292  CD5E00   R  1025           CALL  GET255
0295  3A0D68      1026           LD    A,(CNT)
0298  FE03        1027           CP    3
```

```
029A   C8              1028            RET     Z
029B   79              1029            LD      A,C
029C   326E68          1030            LD      (SETNUM),A
029F   C9              1031            RET
                       1032    ;
02A0   3AF268          1033    RES_SU  LD      A,(TEMPSU)
02A3   326E68          1034            LD      (SETNUM),A
02A6   C9              1035            RET
                       1036    ;
02A7   110000    X     1037    SHO_SU  LD      DE,SETM1
02AA   CD0000    R     1038            CALL    PUTASC
02AD   3A6E68          1039            LD      A,(SETNUM)
02B0   0600            1040            LD      B,0
02B2   4F              1041            LD      C,A
02B3   CD1002    R     1042            CALL    DSP255
02B6   C9              1043            RET
                       1044    ;
                       1045    ;*******************************
                       1046    ;                           RAM C
                       1047    ;
                       1048    ;INPUT           none
                       1049    ;
                       1050    ;OUTPUT          checksum from SE
                       1051    ;
                       1052    ;*******************************
                       1053    ;
02B7   210000          1054    CHKSUM  LD      HL,0
02BA   11006B          1055            LD      DE,SUADDR
02BD   010000          1056            LD      BC,0
02C0   FB              1057    RAM1    EI
02C1   1A              1058            LD      A,(DE)
02C2   4F              1059            LD      C,A
02C3   09              1060            ADD     HL,BC
02C4   13              1061            INC     DE
02C5   7A              1062            LD      A,D
02C6   FE80            1063            CP      80H
02C8   C2C002    R     1064            JP      NZ,RAM1
02CB   44              1065            LD      B,H
02CC   4D              1066            LD      C,L
02CD   C9              1067            RET
                       1068    ;
                       1069    END

AD
LOC    OBJ CODE  M STMT SOURCE STATEMENT

450    *LIST ON
                        451    ;
                        452    ;   A/D & lamphouse driver routin
                        453    ;
                        454    ;         102
                        455    ;
                        456    ;
                        457    ;:::::::::::::::::::::::::::::::
                        458    ;
                        459    ;                           E D I T
                        460    ;
                        461    ;       04-19-82            BB
                        462    ;       05-12-82            BB
                        463    ;
                        464    ;:::::::::::::::::::::::::::::::
                        465    ;
                        466            GLOBAL          ADIN
                        467
                        468            EXTERNAL        LEFT,PUT
                        469            EXTERNAL        MSG8,MSG
```

| LOC | OBJ CODE | M | STMT | SOURCE STATEMENT | | |
|---|---|---|---|---|---|---|
| | | | 470 | ; | | |
| 0000 | 110000 | X | 471 | ADIN | LD | DE,MSGB |
| 0003 | CD0000 | X | 472 | | CALL | PUTASC |
| 0006 | FB | | 473 | ADINA | EI | |
| 0007 | CD0000 | X | 474 | | CALL | GETKEY |
| 000A | FE19 | | 475 | ADINB | CP | KEYCAN |
| 000C | CAC600 | R | 476 | | JP | Z,EXIT |
| 000F | 211268 | | 477 | | LD | HL,TEMP |
| 0012 | 3600 | | 478 | | LD | (HL),0 |
| 0014 | FE10 | | 479 | | CP | KEYR |
| 0016 | 2007 | | 480 | | JR | NZ,ADIN1 |
| 0018 | 3E07 | | 481 | | LD | A,REDCHL |
| 001A | 110000 | X | 482 | | LD | DE,MSGR |
| 001D | 1814 | | 483 | | JR | SELCHL |
| 001F | FE11 | | 484 | ADIN1 | CP | KEYG |
| 0021 | 2007 | | 485 | | JR | NZ,ADIN2 |
| 0023 | 3E06 | | 486 | | LD | A,GRNCHL |
| 0025 | 110000 | X | 487 | | LD | DE,MSGG |
| 0028 | 1809 | | 488 | | JR | SELCHL |
| 002A | FE12 | | 489 | ADIN2 | CP | KEYB |
| 002C | 20D2 | | 490 | | JR | NZ,ADIN |
| 002E | 3E05 | | 491 | | LD | A,BLUCHL |
| 0030 | 110000 | X | 492 | | LD | DE,MSGB |
| 0033 | 321368 | | 493 | SELCHL | LD | (TEMP1),A |
| 0036 | CD0000 | X | 494 | | CALL | PUTASC |
| 0039 | ED4B366A | | 495 | | LD | BC,(ADWAIT) |
| 003D | 1807 | | 496 | | JR | LOOP1 |
| 003F | FB | | 497 | LOOP | EI | |
| 0040 | 3A0B68 | | 498 | | LD | A,(KBDFLG) |
| 0043 | B7 | | 499 | | OR | A |
| 0044 | 20BA | | 500 | | JR | NZ,ADIN |
| 0046 | 3A1368 | | 501 | LOOP1 | LD | A,(TEMP1) |
| 0049 | CD0000 | X | 502 | | CALL | AD_IN |
| | | | 503 | ; | | |
| 004C | 3A6468 | | 504 | | LD | A,(IOIMG1) |
| 004F | F680 | | 505 | | OR | L80 |
| 0051 | 326468 | | 506 | | LD | (IOIMG1),A |
| 0054 | D300 | | 507 | | OUT | (SSR1),A |
| | | | 508 | ; | | |
| 0056 | 3E00 | | 509 | | LD | A,0 |
| 0058 | 32FB68 | | 510 | | LD | (MINUS),A |
| 005B | 3AFA68 | | 511 | | LD | A,(ADMODE) |
| 005E | FE03 | | 512 | | CP | 3 |
| 0060 | 2005 | | 513 | | JR | NZ,D01 |
| 0062 | CDE400 | R | 514 | | CALL | SHOHEX |
| 0065 | 182F | | 515 | | JR | L01 |
| 0067 | 78 | | 516 | D01 | LD | A,B |
| 0068 | CB67 | | 517 | | BIT | 4,A |
| 006A | C2CD00 | R | 518 | | JP | NZ,OVRFLO |
| 006D | CB6F | | 519 | | BIT | 5,A |
| 006F | 2006 | | 520 | | JR | NZ,D01A |
| 0071 | 3E01 | | 521 | | LD | A,1 |
| 0073 | 32FB68 | | 522 | | LD | (MINUS),A |
| 0076 | 78 | | 523 | | LD | A,B |
| 0077 | E60F | | 524 | D01A | AND | 0FH |
| 0079 | 47 | | 525 | | LD | B,A |
| 007A | 3AFA68 | | 526 | | LD | A,(ADMODE) |
| 007D | FE02 | | 527 | | CP | 2 |
| 007F | 2005 | | 528 | | JR | NZ,D02 |
| 0081 | CD0000 | X | 529 | | CALL | DSPBCD |
| 0084 | 1810 | | 530 | | JR | L01 |
| 0086 | C5 | | 531 | D02 | PUSH | BC |
| 0087 | D1 | | 532 | | POP | DE |
| 0088 | 210000 | | 533 | | LD | HL,0 |
| 008B | 010A00 | | 534 | | LD | BC,10 |

```
008E   CD0000   X   535           CALL    DDIV
0091   D5           536           PUSH    DE
0092   C1           537           POP     BC
0093   CD0000   X   538           CALL    DSPBCD
                    539       ;
0096   3AFB68       540   L01     LD      A,(MINUS)
0099   B7           541           OR      A
009A   2805         542           JR      Z,L01A
009C   3E14         543           LD      A,14H
009E   320568       544           LD      (SEGIMG+5),A
00A1   3A1268       545   L01A    LD      A,(TEMP)
00A4   B7           546           OR      A
00A5   0E10         547           LD      C,16
00A7   2096         548           JR      NZ,LOOP
00A9   FB           549           EI
00AA   CD0000   X   550           CALL    GETKEY
00AD   FE1D         551           CP      KEYON
00AF   C20A00   R   552           JP      NZ,ADINB
00B2   3E01         553           LD      A,1
00B4   321268       554           LD      (TEMP),A
00B7   3A6468       555           LD      A,(IOIMG1)
00BA   E67F         556           AND    L801N
00BC   326468       557           LD      (IOIMG1),A
00BF   D300         558           OUT     (SSR1),A
00C1   0E08         559           LD      C,8
00C3   C33F00   R   560           JP      LOOP
                    561       ;
00C6   3E00         562   EXIT    LD      A,0
00C8   320B68       563           LD      (KBDFLG),A
00CB   B7           564           OR      A
00CC   C9           565           RET
                    566       ;
00CD   3E00         567   OVRFLO  LD      A,0
00CF   320468       568           LD      (SEGIMG+4),A
00D2   3E1E         569           LD      A,1EH
00D4   320568       570           LD      (SEGIMG+5),A
00D7   3E0E         571           LD      A,0EH
00D9   320668       572           LD      (SEGIMG+6),A
00DC   3E1B         573           LD      A,1BH
00DE   320768       574           LD      (SEGIMG+7),A
00E1   C39600   R   575           JP      L01
                    576       ;
00E4   79           577   SHOHEX  LD      A,C
00E5   E60F         578           AND     OFH
00E7   320768       579           LD      (SEGIMG+7),A
00EA   79           580           LD      A,C
00EB   E6F0         581           AND     OFOH
00ED   CB3F         582           SRL     A
00EF   CB3F         583           SRL     A
00F1   CB3F         584           SRL     A
00F3   CB3F         585           SRL     A
00F5   320668       586           LD      (SEGIMG+6),A
                    587       ;
00F8   78           588           LD      A,B
00F9   E60F         589           AND     OFH
00FB   320568       590           LD      (SEGIMG+5),A
00FE   78           591           LD      A,B
00FF   E6F0         592           AND     OFOH
0101   CB3F         593           SRL     A
0103   CB3F         594           SRL     A
0105   CB3F         595           SRL     A
0107   CB3F         596           SRL     A
0109   320468       597           LD      (SEGIMG+4),A
010C   C9           598           RET
                    599       ;
                    600           END
```

```
                              SET
LOC    OBJ CODE  M STMT SOURCE STATEMENT

450       *LIST ON
                    451       ;
                    452       ;   Setup mode routines
                    453       ;
                    454       ;        112
                    455       ;
                    456       ;::::::::::::::::::::::::::::
                    457       ;
                    458       ;                               E D I T
                    459       ;
                    460       ;        04-19-82               BB
                    461       ;        04-24-82               AMF
                    462       ;        04-25-82               BB
                    463       ;        04-30-82               BB
                    464       ;        05-05-82               AMF
                    465       ;        05-07-82               BB
                    466       ;        05-12-82               BB
                    467       ;        06-04-82               AMF
                    468       ;        07-10-82               AMF
                    469       ;        12-21-82               BB
                    470       ;
                    471       ;::::::::::::::::::::::::::::
                    472       ;
                    473              GLOBAL      SETUP,D
                    474       ;
                    475              EXTERNAL    PUTASC,I
                    476              EXTERNAL    BCD,DMP
                    477              EXTERNAL    LINEAR,
                    478              EXTERNAL    MSG21,M
                    479              EXTERNAL    MSG29,M
                    480              EXTERNAL    RECLTM,
                    481              EXTERNAL    MSG17,M
                    482       ;
0000   110000   X  483  SETUP   LD      DE,MSG21
0003   CD0000   X  484          CALL    PUTASC
0006   CD0000   X  485  SETUP1  CALL    GET255
0009   3A0D68      486          LD      A,(CNT)
000C   FE03        487          CP      3
000E   C8          488          RET     Z
000F   79          489          LD      A,C
0010   B7          490          OR      A
0011   C8          491          RET     Z
0012   3D          492          DEC     A
0013   FE14        493          CP      (EXIT-SETADD)/2
0015   D22800   R  494          JP      NC,SETERR
0018   212D00   R  495          LD      HL,SETADD
001B   CD0000   X  496          CALL    SELECT
001E   CA0000   R  497          JP      Z,SETUP
0021   F0          498          RET     P
0022   CD0000   X  499          CALL    GETKEY
0025   C30000   R  500          JP      SETUP
                    501       ;
0028   CD0000   X  502  SETERR  CALL    ERROR
002B   18D3        503          JR      SETUP
                    504       ;
                    505       ;
002D   C100     R  506  SETADD  DEFW    ADIN1
002F   D600     R  507          DEFW    ADIN2
0031   D801     R  508          DEFW    RDREF
0033   EA00     R  509          DEFW    SHO_M1
0035   0000     X  510          DEFW    CALDTM
0037   3E01     R  511          DEFW    SHO_M2
0039   0000     X  512          DEFW    CO4U1S
003B   AA00     R  513          DEFW    FINI
```

| | | | | | | | |
|---|---|---|---|---|---|---|---|
| 003D | FC02 | R | 514 | | DEFW | DICHRO | |
| 003F | 9003 | R | 515 | | DEFW | RDNEG1 | |
| 0041 | B604 | R | 516 | | DEFW | SHONEG | |
| 0043 | 7A00 | R | 517 | | DEFW | RESET0 | |
| 0045 | 5900 | R | 518 | | DEFW | ROMCHK | |
| 0047 | 7300 | R | 519 | | DEFW | RAMCHK | |
| 0049 | 0000 | X | 520 | | DEFW | IOTEST | |
| 004B | E000 | R | 521 | | DEFW | ADIN3 | |
| 004D | 0000 | X | 522 | | DEFW | BEP | |
| 004F | 0000 | X | 523 | | DEFW | ERROR | |
| 0051 | 0000 | X | 524 | | DEFW | ERROR | |
| 0053 | 9501 | R | 525 | | DEFW | ECS | |
| | | | 526 | ; | DEFW | DSPNEG | |
| | | | 527 | ; | DEFW | DSRTIM | |
| | | | 528 | ; | DEFW | DSPREF | |
| | | | 529 | ; | DEFW | MANDEN | |
| | | | 530 | ; | DEFW | STRREF | |
| | | | 531 | ; | DEFW | RECSLP | |
| | | | 532 | ; | DEFW | CALSLP | |
| | | | 533 | ; | DEFW | RECLTM | |
| | | | 534 | ; | | | |
| 0055 | 3E01 | | 535 | EXIT | LD | A,1 | |
| 0057 | B7 | | 536 | | OR | A | |
| 0058 | C9 | | 537 | | RET | | |
| | | | 538 | ; | | | |
| 0059 | 210000 | | 539 | ROMCHK | LD | HL,0 | |
| 005C | 110000 | | 540 | | LD | DE,0 | |
| 005F | 010000 | | 541 | | LD | BC,0 | |
| 0062 | FB | | 542 | ROM1 | EI | | |
| 0063 | 1A | | 543 | | LD | A,(DE) | |
| 0064 | 4F | | 544 | | LD | C,A | |
| 0065 | 09 | | 545 | | ADD | HL,BC | |
| 0066 | 13 | | 546 | | INC | DE | |
| 0067 | 7A | | 547 | | LD | A,D | |
| 0068 | FE40 | | 548 | | CP | 40H | |
| 006A | C26200 | R | 549 | | JP | NZ,ROM1 | |
| 006D | 44 | | 550 | | LD | B,H | |
| 006E | 4D | | 551 | | LD | C,L | |
| 006F | CD0000 | X | 552 | | CALL | DSPHEX | |
| 0072 | C9 | | 553 | | RET | | |
| | | | 554 | ; | | | |
| 0073 | CD0000 | X | 555 | RAMCHK | CALL | CHKSUM | |
| 0076 | CD0000 | X | 556 | | CALL | DSPHEX | |
| 0079 | C9 | | 557 | | RET | | |
| | | | 558 | ; | | | |
| 007A | 21D007 | | 559 | RESET0 | LD | HL,2000 | |
| 007D | 22306A | | 560 | | LD | (FACTOR),HL | |
| 0080 | 211000 | | 561 | | LD | HL,16 | |
| 0083 | 22326A | | 562 | | LD | (CUTPUL),HL | |
| 0086 | 210800 | | 563 | | LD | HL,8 | |
| 0089 | 22346A | | 564 | | LD | (ADVPUL),HL | |
| 008C | 210800 | | 565 | | LD | HL,8 | |
| 008F | 22366A | | 566 | | LD | (ADWAIT),HL | |
| 0092 | 21E803 | | 567 | | LD | HL,1000 | |
| 0095 | 221A6A | | 568 | | LD | (REDMAS),HL | |
| 0098 | 221C6A | | 569 | | LD | (GRNMAS),HL | |
| 009B | 221E6A | | 570 | | LD | (BLUMAS),HL | |
| | | | 571 | ; | | | |
| 009E | 110000 | X | 572 | | LD | DE,MSG19 | |
| 00A1 | CD0000 | X | 573 | | CALL | PUTASC | |
| 00A4 | 0E30 | | 574 | | LD | C,48 | |
| 00A6 | CD0000 | X | 575 | | CALL | WAITKY | |
| 00A9 | C9 | | 576 | | RET | | |
| | | | 577 | ; | | | |
| 00AA | CD4402 | R | 578 | FINI | CALL | RDAMB | |
| 00AD | 117D01 | R | 579 | | LD | DE,SMSG6 | |

```
00B0    CD0000   X   580           CALL    PUTASC
00B3    0E30         581           LD      C,48
00B5    CD0000   X   582           CALL    WAITKY
00B8    118501   R   583           LD      DE,SMSG7
00BB    CD0000   X   584           CALL    PUTASC
00BE    C33601   R   585           JP      M1LOOP
                     586     ;
00C1    116D01   R   587   ADIN1   LD      DE,SMSG4
00C4    3E01         588           LD      A,1
00C6    32FA68       589           LD      (ADMODE),A
00C9    0E30         590   ADINEX  LD      C,48
00CB    CD0000   X   591           CALL    PUTASC
00CE    0E30         592           LD      C,48
00D0    CD0000   X   593           CALL    WAITKY
00D3    C30000   X   594           JP      ADIN
                     595     ;
00D6    117501   R   596   ADIN2   LD      DE,SMSG5
00D9    3E02         597           LD      A,2
00DB    32FA68       598           LD      (ADMODE),A
00DE    18E9         599           JR      ADINEX
                     600     ;
00E0    118D01   R   601   ADIN3   LD      DE,SMSG8
00E3    3E03         602           LD      A,3
00E5    32FA68       603           LD      (ADMODE),A
00E8    18DF         604           JR      ADINEX
                     605     ;
00EA    CD4402   R   606   SHO_M1  CALL    RDAMB
00ED    115501   R   607           LD      DE,SMSG1
00F0    CD0000   X   608           CALL    PUTASC
00F3    0E30         609           LD      C,48
00F5    CD0000   X   610           CALL    WAITKY
00F8    115D01   R   611           LD      DE,SMSG2
00FB    CD0000   X   612           CALL    PUTASC
00FE    0E30         613           LD      C,48
0100    CD0000   X   614           CALL    WAITKY
                     615     ;
0103    110000   X   616           LD      DE,MSG11
0106    CD0000   X   617           CALL    PUTASC
0109    FD210068     618           LD      IY,SEGIMG
010D    0652         619           LD      B,'R'
010F    0E04         620           LD      C,DBRRPT
0111    CD0000   X   621           CALL    SET1
0114    D5           622           PUSH    DE
0115    C1           623           POP     BC
0116    CDB505   R   624           CALL    DISTIM
0119    0652         625           LD      B,'R'
011B    0E05         626           LD      C,DBGRPT
011D    CD0000   X   627           CALL    SET1
0120    D5           628           PUSH    DE
0121    C1           629           POP     BC
0122    CDB505   R   630           CALL    DISTIM
0125    0652         631           LD      B,'R'
0127    0E06         632           LD      C,DBBRPT
0129    CD0000   X   633           CALL    SET1
012C    D5           634           PUSH    DE
012D    C1           635           POP     BC
012E    CDB505   R   636           CALL    DISTIM
0131    3E00         637           LD      A,0
0133    320B68       638           LD      (KBDFLG),A
0136    FB           639   M1LOOP  EI
0137    3A0B68       640           LD      A,(KBDFLG)
013A    B7           641           OR      A
013B    28F9         642           JR      Z,M1LOOP
013D    C9           643           RET
                     644     ;
013E    CD4402   R   645   SHO_M2  CALL    RDAMB
```

```
0141   115501     R   646           LD      DE,SMSG1
0144   CD0000     X   647           CALL    PUTASC
0147   0E30           648           LD      C,48
0149   CD0000     X   649           CALL    WAITKY
014C   116501     R   650           LD      DE,SMSG3
014F   CD0000     X   651           CALL    PUTASC
0152   C33601     R   652           JP      M1LOOP
                     653      ;
0155   58505257       654   SMSG1   DEFM    'XPRWNEXX'
015D   583A584F       655   SMSG2   DEFM    'X:XOFXN:'
0165   4E3A584F       656   SMSG3   DEFM    'N:XO;XU8'
016D   53455B58       657   SMSG4   DEFM    'SE[XGAIN'
0175   53455B58       658   SMSG5   DEFM    'SE[XOFS['
017D   5853455B       659   SMSG6   DEFM    'XSE[UPXX'
0185   46494E49       660   SMSG7   DEFM    'FINISHED'
018D   41425358       661   SMSG8   DEFM    'ABSXAKDX'
                     662      ;
0195   11D001     R   663   ECS     LD      DE,ECSMSG
0198   CD0000     X   664           CALL    PUTASC
019B   1601           665           LD      D,1
019D   7A             666   ECS1    LD      A,D
019E   320668         667           LD      (SEGIMG+6),A
01A1   3A6468         668           LD      A,(IOIMG1)
01A4   E6DF           669           AND     .NOT.PAPADV
01A6   326468         670           LD      (IOIMG1),A
01A9   D300           671           OUT     (SSR1),A
01AB   ED4B346A       672           LD      BC,(ADVPUL)
01AF   CD0000     X   673           CALL    WAIT
01B2   3A6468         674           LD      A,(IOIMG1)
01B5   F620           675           OR      PAPADV
01B7   326468         676           LD      (IOIMG1),A
01BA   D300           677           OUT     (SSR1),A
01BC   0E30           678           LD      C,48
01BE   CD0000     X   679           CALL    WAIT
01C1   3A0B68         680           LD      A,(KBDFLG)
01C4   B7             681           OR      A
01C5   C0             682           RET     NZ
01C6   14             683           INC     D
01C7   7A             684           LD      A,D
01C8   FE09           685           CP      9
01CA   20D1           686           JR      NZ,ECS1
01CC   3E01           687           LD      A,1
01CE   B7             688           OR      A
01CF   C9             689           RET
01D0   45435358       690   ECSMSG  DEFM    'ECSXXXXX'
                     691      ;
01D8   CD0000     X   692   RDREF   CALL    GET_SU
01DB   110000     X   693   DICENT  LD      DE,MSG22
01DE   CD0000     X   694           CALL    PUTASC
01E1   CD0000     X   695   RDREF1  CALL    GETKEY
01E4   FE19           696           CP      KEYCAN
01E6   CA3F02     R   697           JP      Z,REFEX
01E9   FE18           698           CP      KEYENT
01EB   C2E101     R   699           JP      NZ,RDREF1
                     700      ;
01EE   CD8902     R   701   RDREFN  CALL    GETREF
01F1   0677           702           LD      B,'w'
01F3   0E2C           703           LD      C,DBRRAD
01F5   2A2068         704           LD      HL,(RREF)
01F8   CD0000     X   705           CALL    SET1
01FB   0E2D           706           LD      C,DBGRAD
01FD   2A2268         707           LD      HL,(GREF)
0200   CD0000     X   708           CALL    SET1
0203   0E2E           709           LD      C,DBBRAD
0205   2A2468         710           LD      HL,(BREF)
0208   0657           711           LD      B,'W'
```

```
020A   CD0000   X   712            CALL   SET1
                    713        ;
020D   110000   X   714   RDREF0   LD     DE,MSG26
0210   CD0000   X   715            CALL   PUTASC
0213   CD0000   X   716   RDREF2   CALL   GETKEY
0216   FE19         717            CP     KEYCAN
0218   CA3F02   R   718            JP     Z,REFEX
021B   FE18         719            CP     KEYENT
021D   C21302   R   720            JP     NZ,RDREF2
0220   CD8902   R   721            CALL   GETREF
0223   CD0000   X   722            CALL   CALO4T
                    723        ;
0226   110000   X   724   RDREFU   LD     DE,MSG27
0229   CD0000   X   725            CALL   PUTASC
022C   CD0000   X   726   RDREF3   CALL   GETKEY
022F   FE19         727            CP     KEYCAN
0231   CA3F02   R   728            JP     Z,REFEX
0234   FE18         729            CP     KEYENT
0236   C22C02   R   730            JP     NZ,RDREF3
0239   CD8902   R   731            CALL   GETREF
023C   CD0000   X   732            CALL   CALU1T
                    733        ;
023F   CD0000   X   734   REFEX    CALL   RES_SU
0242   AF           735            XOR    A
0243   C9           736            RET
                    737        ;
0244   3A9568       738   RDAMB    LD     A,(IOIMG4)
0247   CB4F         739            BIT    OPERATE,A
0249   2012         740            JR     NZ,RDAMB1
024B   110000   X   741            LD     DE,MSG16
024E   CD0000   X   742            CALL   PUTASC
0251   CD0000   X   743            CALL   BEEP_2
0254   0E30         744            LD     C,48
0256   CD0000   X   745            CALL   WAIT
0259   3E01         746            LD     A,1
025B   B7           747            OR     A
025C   C9           748            RET
025D   110000   X   749   RDAMB1   LD     DE,MSG30
0260   CD0000   X   750            CALL   PUTASC
0263   0E20         751            LD     C,32
0265   CD0000   X   752            CALL   WAIT
0268   110000   X   753            LD     DE,MSG29
026B   CD0000   X   754            CALL   PUTASC
026E   0E10         755            LD     C,16
0270   CD0000   X   756            CALL   WAIT
0273   CD8902   R   757            CALL   GETREF
0276   2A2068       758            LD     HL,(RREF)
0279   22266A       759            LD     (ROFFS),HL
027C   2A2268       760            LD     HL,(GREF)
027F   22286A       761            LD     (GOFFS),HL
0282   2A2468       762            LD     HL,(BREF)
0285   222A6A       763            LD     (BOFFS),HL
0288   C9           764            RET
                    765        ;
0289   ED4B366A     766   GETREF   LD     BC,(ADWAIT)
028D   3E07         767            LD     A,REDCHL
028F   CDDE05   R   768            CALL   AD_IN1
0292   ED432068     769            LD     (RREF),BC
0296   0E00         770            LD     C,0
0298   3E06         771            LD     A,GRNCHL
029A   CDDE05   R   772            CALL   AD_IN1
029D   ED432269     773            LD     (GREF),BC
02A1   0E00         774            LD     C,0
02A3   3E05         775            LD     A,BLUCHL
02A5   CDDE05   R   776            CALL   AD_IN1
02A8   ED432468     777            LD     (BREF),BC
```

```
                        778   ;
02AC    3E60            779         LD      A,DEFLT2
02AE    D310            780         OUT     (ADSEL),A
02B0    3A6468          781         LD      A,(IOIMG1)
02B3    F680            782         OR      L,801
02B5    326468          783         LD      (IOIMG1),A
02B8    D300            784         OUT     (SSR1),A
02BA    C9              785         RET
                        786   ;
02BB    110000    X     787   ENTTIM    LD    DE,RM
02BE    CDE603    R     788         CALL    GETCV
02C1    DABB02    R     789         JP      C,ENTTIM
02C4    222068          790   EN1       LD    (RRTIME),HL
02C7    110000    X     791         LD      DE,GM
02CA    CDE602    R     792         CALL    GETCV
02CD    DAC402    R     793         JP      C,EN1
02D0    222E68          794   EN2       LD    (GRTIME),HL
02D3    110000    X     795         LD      DE,BM
02D6    CDE602    R     796         CALL    GETCV
02D9    DAD002    R     797         JP      C,EN2
02DC    223068          798         LD      (BRTIME),HL
02DF    3E01            799         LD      A,1
02E1    328C68          800         LD      (TIMFLG),A
02E4    AF              801         XOR     A
02E5    C9              802         RET
                        803   ;
                        804   ;
02E6    CD0000    X     805   GETCV     CALL    PUTASC
02E9    CD0000    X     806   GETHN     CALL    GETNUM
02EC    3A0D68          807         LD      A,(CNT)
02EF    FE08            808         CP      8
02F1    CAF802    R     809         JP      Z,GETHN1
02F4    CD0000    X     810         CALL    DECTHX
02F7    C9              811         RET
                        812   ;
02F8    210000          813   GETHN1    LD    HL,0
02FB    C9              814         RET
                        815   ;
02FC    110000    X     816   DICHRO    LD    DE,MSG23
02FF    CD0000    X     817         CALL    PUTASC
0302    0E10            818         LD      C,16
0304    CD0000    X     819         CALL    WAITKY
0307    CDD604    R     820   DICHR1    CALL    RDNEG
030A    CD0000    X     821         CALL    LINEAR
030D    CDB003    R     822         CALL    FUDGE
0310    110000    X     823         LD      DE,MSG11
0313    CD0000    X     824         CALL    PUTASC
0316    FD210068        825         LD      IY,SEGIMG
031A    ED4B6768        826         LD      BC,(REXP)
031E    CDB505    R     827         CALL    DISTIM
0321    ED4B6968        828         LD      BC,(GEXP)
0325    CDB505    R     829         CALL    DISTIM
0328    ED4B6B68        830         LD      BC,(BEXP)
032C    CDB505    R     831         CALL    DISTIM
032F    0E08            832         LD      C,8
0331    CD0000    X     833         CALL    WAITKY
0334    3A0B68          834         LD      A,(KBDFLG)
0337    B7              835         OR      A
0338    28CD            836         JR      Z,DICHR1
                        837   ;
033A    3A6468          838         LD      A,(IOIMG1)
033D    F680            839         OR      L,801
033F    326468          840         LD      (IOIMG1),A
0342    D300            841         OUT     (SSR1),A
0344    AF              842         XOR     A
0345    320B68          843         LD      (KBDFLG),A
```

```
0348  110000    X   844           LD     DE,MSG17
034B  CD0000    X   845           CALL   PUTASC
034E  CD0000    X   846           CALL   GETKEY
0351  110000    X   847           LD     DE,MSG18
0354  FE1D          848           CP     KEYYES
0356  2809          849           JR     Z,STODIC
0358  CD0000    X   850           CALL   PUTASC
035B  0E30          851           LD     C,48
035D  CD0000    X   852           CALL   WAITKY
0360  C9            853           RET
                    854   ;
0361  CD0000    X   855   STODIC  CALL   GET_SU
0364  2A6768        856           LD     HL,(REXP)
0367  0677          857           LD     B,'w'
0369  0E04          858           LD     C,DBRRPT
036B  CD0000    X   859           CALL   SET1
036E  2A6968        860           LD     HL,(GEXP)
0371  0677          861           LD     B,'w'
0373  0E05          862           LD     C,DBGRPT
0375  CD0000    X   863           CALL   SET1
0378  2A6B68        864           LD     HL,(BEXP)
037B  0657          865           LD     B,'W'
037D  0E06          866           LD     C,DBBRPT
037F  CD0000    X   867           CALL   SET1
0382  110000    X   868           LD     DE,MSG19
0385  CD0000    X   869           CALL   PUTASC
0388  0E20          870           LD     C,32
038A  CD0000    X   871           CALL   WAITKY
038D  C3DB01    R   872           JP     DICENT
                    873   ;
0390  CDD604    R   874   RDNEG1  CALL   RDNEG
0393  CD0000    X   875           CALL   LINEAR
0396  0E08          876           LD     C,8
0398  CD0000    X   877           CALL   WAITKY
039B  3A0B68        878           LD     A,(KBDFLG)
039E  B7            879           OR     A
039F  28EF          880           JR     Z,RDNEG1
                    881   ;
03A1  3A6468        882           LD     A,(IOIMG1)
03A4  F680          883           OR     L801
03A6  326468        884           LD     (IOIMG1),A
03A9  D300          885           OUT    (SSR1),A
03AB  AF            886           XOR    A
03AC  320B68        887           LD     (KBDFLG),A
03AF  C9            888           RET
                    889   ;
                    890   FUDGE
                    891   ;RED
03B0  2A6768        892           LD     HL,(REXP)
03B3  22CA68        893           LD     (NT),HL
03B6  0652          894           LD     B,'R'
03B8  0E04          895           LD     C,DBRRPT
03BA  CD0000    X   896           CALL   SET1
03BD  ED53C868      897           LD     (N3),DE
03C1  0652          898           LD     B,'R'
03C3  0E07          899           LD     C,DBRPPT
03C5  CD0000    X   900           CALL   SET1
03C8  ED53C668      901           LD     (BPO),DE
03CC  0652          902           LD     B,'R'
03CE  0E0A          903           LD     C,DBRNPT
03D0  CD0000    X   904           CALL   SET1
03D3  ED53C468      905           LD     (BPU),DE
03D7  ED5B306A      906           LD     DE,(FACTOR)
03DB  ED53CC68      907           LD     (SLPO1),DE
03DF  ED53CE68      908           LD     (SLPO2),DE
03E3  ED53D068      909           LD     (SLPU1),DE
```

```
03E7    ED53D268    910         LD      (SLPU2),DE
03EB    0652        911         LD      B,'R'
03ED    0E26        912         LD      C,DBRPBP
03EF    CD0000  X   913         CALL    SET1
03F2    ED53D468    914         LD      (O4),DE
03F6    0652        915         LD      B,'R'
03F8    0E29        916         LD      C,DBRNBP
03FA    CD0000  X   917         CALL    SET1
03FD    ED53D668    918         LD      (U1),DE
0401    CD0000  X   919         CALL    DOSLP
0404    226768      920         LD      (REXP),HL
                    921     ;
                    922     ;GREEN
0407    2A6968      923         LD      HL,(GEXP)
040A    22CA68      924         LD      (NT),HL
040D    0652        925         LD      B,'R'
040F    0E05        926         LD      C,DBGRPT
0411    CD0000  X   927         CALL    SET1
0414    ED53C868    928         LD      (N3),DE
0418    0652        929         LD      B,'R'
041A    0E08        930         LD      C,DBGPPT
041C    CD0000  X   931         CALL    SET1
041F    ED53C668    932         LD      (BPO),DE
0423    0652        933         LD      B,'R'
0425    0E0B        934         LD      C,DBGNPT
0427    CD0000  X   935         CALL    SET1
042A    ED53C468    936         LD      (BPU),DE
042E    ED5B306A    937         LD      DE,(FACTOR)
0432    ED53CC68    938         LD      (SLPO1),DE
0436    ED53CE68    939         LD      (SLPO2),DE
043A    ED53D068    940         LD      (SLPU1),DE
043E    ED53D268    941         LD      (SLPU2),DE
0442    0652        942         LD      B,'R'
0444    0E27        943         LD      C,DBGPBP
0446    CD0000  X   944         CALL    SET1
0449    ED53D468    945         LD      (O4),DE
044D    0652        946         LD      B,'R'
044F    0E2A        947         LD      C,DBGNBP
0451    CD0000  X   948         CALL    SET1
0454    ED53D668    949         LD      (U1),DE
0458    CD0000  X   950         CALL    DOSLP
045B    226968      951         LD      (GEXP),HL
                    952     ;
                    953     ;BLUE
045E    2A6B68      954         LD      HL,(BEXP)
0461    22CA68      955         LD      (NT),HL
0464    0652        956         LD      B,'R'
0466    0E06        957         LD      C,DBBRPT
0468    CD0000  X   958         CALL    SET1
046B    ED53C868    959         LD      (N3),DE
046F    0652        960         LD      B,'R'
0471    0E09        961         LD      C,DBBPPT
0473    CD0000  X   962         CALL    SET1
0476    ED53C668    963         LD      (BPO),DE
047A    0652        964         LD      B,'R'
047C    0E0C        965         LD      C,DBBNPT
047E    CD0000  X   966         CALL    SET1
0481    ED53C468    967         LD      (BPU),DE
0485    ED5B306A    968         LD      DE,(FACTOR)
0489    ED53CC68    969         LD      (SLPO1),DE
048D    ED53CE68    970         LD      (SLPO2),DE
0491    ED53D068    971         LD      (SLPU1),DE
0495    ED53D268    972         LD      (SLPU2),DE
0499    0652        973         LD      B,'R'
049B    0E28        974         LD      C,DBBPBP
049D    CD0000  X   975         CALL    SET1
04A0    ED53D468    976         LD      (O4),DE
```

```
04A4  0652              977         LD      B,'R'
04A6  0E2B              978         LD      C,DBBNBP
04A8  CD0000    X       979         CALL    SET1
04AB  ED53D668          980         LD      (U1),DE
04AF  CD0000    X       981         CALL    DOSLP
04B2  226B68            982         LD      (BEXP),HL
04B5  C9                983         RET
                        984  ;
04B6  CDD604    R       985  SHONEG CALL    RDNEG
04B9  CD1905    R       986         CALL    DSPNEG
04BC  0E08              987         LD      C,8
04BE  CD0000    X       988         CALL    WAITKY
04C1  3A0B68            989         LD      A,(KBDFLG)
04C4  B7                990         OR      A
04C5  28EF              991         JR      Z,SHONEG
                        992  ;
04C7  3A6468            993         LD      A,(IOIMG1)
04CA  F680              994         OR      L801
04CC  326468            995         LD      (IOIMG1),A
04CF  D300              996         OUT     (SSR1),A
04D1  AF                997         XOR     A
04D2  320B68            998         LD      (KBDFLG),A
04D5  C9                999         RET
                       1000  ;
04D6  ED4B366A         1001  RDNEG  LD      BC,(ADWAIT)
04DA  3E07             1002         LD      A,REDCHL
04DC  CDDE05    R      1003         CALL    AD_IN1
04DF  ED432668         1004         LD      (RNEG),BC
04E3  0E04             1005         LD      C,4
04E5  3E06             1006         LD      A,GRNCHL
04E7  CDDE05    R      1007         CALL    AD_IN1
04EA  ED432868         1008         LD      (GNEG),BC
04EE  0E04             1009         LD      C,4
04F0  3E05             1010         LD      A,BLUCHL
04F2  CDDE05    R      1011         CALL    AD_IN1
04F5  ED432A68         1012         LD      (BNEG),BC
04F9  3E60             1013         LD      A,DEFLT2
04FB  D310             1014         OUT     (ADSEL),A
04FD  C9               1015         RET
                       1016  ;
04FE  ED4B2068         1017  DSPREF LD      BC,(RREF)
0502  ED433868         1018         LD      (RDISP),BC
0506  ED4B2268         1019         LD      BC,(GREF)
050A  ED433A68         1020         LD      (GDISP),BC
050E  ED4B2468         1021         LD      BC,(BREF)
0512  ED433C68         1022         LD      (BDISP),BC
0516  C38105    R      1023         JP      DISVAL
                       1024  ;
0519  ED4B2668         1025  DSPNEG LD      BC,(RNEG)
051D  ED433868         1026         LD      (RDISP),BC
0521  ED4B2868         1027         LD      BC,(GNEG)
0525  ED433A68         1028         LD      (GDISP),BC
0529  ED4B2A68         1029         LD      BC,(BNEG)
052D  ED433C68         1030         LD      (BDISP),BC
0531  C38105    R      1031         JP      DISVAL
                       1032  ;
0534  110000    X      1033  DSRTIM LD      DE,MSG24
0537  CD0000    X      1034         CALL    PUTASC
053A  FD210068         1035         LD      IY,SEGIMG
053E  ED4B2C68         1036         LD      BC,(RRTIME)
0542  CD5705    R      1037         CALL    DSTIM
0545  ED4B2E68         1038         LD      BC,(GRTIME)
0549  CD5705    R      1039         CALL    DSTIM
054C  ED4B3068         1040         LD      BC,(BRTIME)
0550  CD5705    R      1041         CALL    DSTIM
0553  3E80             1042         LD      A,080H
```

```
0555   B7            1043           OR      A
0556   C9            1044           RET
                     1045   ;
                     1046   ;
0557   116400        1047   DSTIM   LD      DE,100
055A   CD0000   X    1048           CALL    DMPY
055D   D5            1049           PUSH    DE
055E   C1            1050           POP     BC
055F   CD0000   X    1051           CALL    BCD
0562   CD6605   R    1052           CALL    DENIMG
0565   C9            1053           RET
                     1054   ;
                     1055   ;DSPDEN  LD      DE,MSG24
                     1056   ;       CALL    PUTASC
                     1057   ;       LD      IY,SEGIMG
                     1058   ;       LD      BC,(RNEG)
                     1059   ;       CALL    LOG
                     1060   ;       CALL    BCD
                     1061   ;       CALL    DENIMG
                     1062   ;       LD      BC,(GNEG)
                     1063   ;       CALL    LOG
                     1064   ;       CALL    BCD
                     1065   ;       CALL    DENIMG
                     1066   ;       LD      BC,(BNEG)
                     1067   ;       CALL    LOG
                     1068   ;       CALL    BCD
                     1069   ;       CALL    DENIMG
                     1070   ;       LD      A,080H
                     1071   ;       OR      A
                     1072   ;       RET
                     1073   ;
                     1074   ;
0566   CBF9          1075   DENIMG  SET     7,C
0568   97            1076           SUB     A
0569   B0            1077           OR      B
056A   2808          1078           JR      Z,DI1
056C   FD7000        1079           LD      (IY+0),B
056F   FD7101        1080           LD      (IY+1),C
0572   1806          1081           JR      IMGEX
0574   FD7100        1082   DI1     LD      (IY+0),C
0577   FD7201        1083           LD      (IY+1),D
057A   FD23          1084   IMGEX   INC     IY
057C   FD23          1085           INC     IY
057E   FD23          1086           INC     IY
0580   C9            1087           RET
                     1088   ;
0581   110000   X    1089   DISVAL  LD      DE,MSG24
0584   CD0000   X    1090           CALL    PUTASC
0587   ED4B3868      1091           LD      BC,(RDISP)
058B   CD0000   X    1092           CALL    CONV
058E   320068        1093           LD      (SEGIMG),A
0591   78            1094           LD      A,B
0592   320168        1095           LD      (SEGIMG+1),A
0595   ED4B3A68      1096           LD      BC,(GDISP)
0599   CD0000   X    1097           CALL    CONV
059C   320368        1098           LD      (SEGIMG+3),A
059F   78            1099           LD      A,B
05A0   320468        1100           LD      (SEGIMG+4),A
05A3   ED4B3C68      1101           LD      BC,(BDISP)
05A7   CD0000   X    1102           CALL    CONV
05AA   320668        1103           LD      (SEGIMG+6),A
05AD   78            1104           LD      A,B
05AE   320768        1105           LD      (SEGIMG+7),A
05B1   3E80          1106           LD      A,080H
05B3   B7            1107           OR      A
05B4   C9            1108           RET
```

```
05B5  CD0000  X 1110  DISTIM  CALL  BCD
05B8  CBFB      1111          SET   7,E
05BA  97        1112          SUB   A
05BB  B1        1113          OR    C
05BC  2808      1114          JR    Z,DT1
05BE  FD7100    1115          LD    (IY+0),C
05C1  FD7201    1116          LD    (IY+1),D
05C4  1811      1117          JR    DT3
05C6  B2        1118  DT1     OR    D
05C7  2808      1119          JR    Z,DT2
05C9  FD7200    1120          LD    (IY+0),D
05CC  FD7301    1121          LD    (IY+1),E
05CF  1806      1122          JR    DT3
05D1  FD7300    1123  DT2     LD    (IY+0),E
05D4  FD7501    1124          LD    (IY+1),L
05D7  FD23      1125  DT3     INC   IY
05D9  FD23      1126          INC   IY
05DB  FD23      1127          INC   IY
05DD  C9        1128          RET
                1129  ;
05DE  CD0000  X 1130  AD_IN1  CALL  AD_IN
05E1  78        1131          LD    A,B
05E2  E60F      1132          AND   0FH
05E4  47        1133          LD    B,A
05E5  C9        1134          RET
                1135  ;
                1136  ;
                1137  *END
```

MATH
LOC   OBJ CODE M STMT SOURCE STATEMENT

```
           450  *LIST ON
           451  ;
           452  ;   Math packages
           453  ;
           454  ;::::::::::::::::::::::::::::::::
           455  ;
           456  ;                              E D I T
           457  ;
           458  ;       04-19-82          BB
           459  ;       05-09-82          BB
           460  ;       08-02-82          BB
           461  ;       09-07-82          AMF
           462  ;
           463  ;::::::::::::::::::::::::::::::::
           464  ;
           465          GLOBAL            INTERP,I
           466  ;
           467  ;
           468  ;================================
           469  ;
           470  ;                            INTERPO
           471  ;
           472  ;
           473  ;       INPUT:  DE = DIFFERENTI
           474  ;               A  = FRACTIONAL
           475  ;
           476  ;
           477  ;       OUTPUT: DE = INTERPOLAT
           478  ;               CARRY NOT SET =
           479  ;               CARRY SET = OVE
           480  ;
           481  ;
           482  ;       EXTERNAL ROUTINES CALLE
```

```
                    483  ;
                    484  ;                     DMPY - 16 X 16
                    485  ;                     DDIV - 32 / 16
                    486  ;
                    487  ;===================================
                    488  ;
                    489  INTERP:
0000   0600         490         LD      B,0H
0002   4F           491         LD      C,A
0003   CD0D00    R  492         CALL    DMPY
                                LD
0009   CD2600    R  494         CALL    DDIV
000C   C9           495         RET
                    496  ;

499  ;         *  MULTIPLY  *
                    500  ;
                    501  ;         **************
                    502  ;
                    503  ;16 BIT X 16 BIT -> 32 BIT UNS
                    504  ;BC,DE -> DE,HL (HL HOLDS HIGH
                    505  ;1132 T STATES WORST CASE,
                    506  ;
000D   3E10         507  DMPY    LD      A,16
000F   210000       508          LD      HL,0
0012   CB1A         509          RR      D
0014   CB1B         510          RR      E
                    511  ;
                    512  ;ONE STEP:
0016   FB           513  DMPYA   EI
0017   3001         514          JR      NC,DMPYB
0019   09           515          ADD     HL,BC
001A   CB1C         516  DMPYB   RR      H
001C   CB1D         517          RR      L
001E   CB1A         518          RR      D
0020   CB1B         519          RR      E
0022   3D           520          DEC     A
0023   20F1         521          JR      NZ,DMPYA
0025   C9           522          RET
                    523  ;
                    524  ;         ************
                    525  ;         *          *
                    526  ;         *  DIVIDE  *
                    527  ;         *          *
                    528  ;         ************
                    529
                    530  ;32 BIT / 16 BIT -> 16 BIT UNSIG
                    531  ;DE,HL / BC -> DE, REMAINDER ->
                    532  ;THE CARRY FLAG IS SET ON OVERFL
                    533  ;OCCURRS, THE QUOTIENT AND REMAI
                    534  ;
0026   3E11         535  DDIV    LD      A,17
0028   B7           536          OR      A
0029   180C         537          JR      DDIVC
                    538
                    539  ;ONE STEP
002B   FB           540  DDIVA   EI
002C   CB15         541          RL      L
002E   CB14         542          RL      H
0030   3005         543          JR      NC,DDIVC
0032   B7           544          OR      A
0033   ED42         545          SBC     HL,BC
0035   1806         546          JR      DDIVD
0037   ED42         547  DDIVC   SBC     HL,BC
0039   3001         548          JR      NC,DDIVB
```

```
003B  09           549          ADD    HL,BC
003C  3F           550   DDIVB  CCF
003D  CB13         551   DDIVD  RL     E
003F  CB12         552          RL     D
0041  3D           553          DEC    A
0042  20E7         554          JR     NZ,DDIVA
0044  C9           555          RET
                   556   ;
                   557          END
                                MESS
LOC   OBJ CODE  M STMT  SOURCE STATEMENT

1    *EJECT
                   2    ;
                   3    ;
                   4    ;            205
                   5    ;
                   6    ;
                   7    ;
                   8           GLOBAL       SLOPEM,S
                   9           GLOBAL       EM,RREFM
                  10           GLOBAL       PAPONM,P
                  11           GLOBAL       DOVERM,(
                  12           GLOBAL       COLORM,P
                  13           GLOBAL       MSG0,MSG
                  14           GLOBAL       MSG7,MSG
                  15           GLOBAL       MSG15,MS
                  16           GLOBAL       MSGR,MSG
                  17           GLOBAL       MSG21,MS
                  18           GLOBAL       MSG29,MS
                  19           GLOBAL       BUTMSG,M
                  20           GLOBAL       BMSG3,BM
                  21    ;
                  22    ;
                  23    ;=================================
                  24    ;
                  25    ;              C O M M O N    M
                  26    ;
                  27    ;=================================
                  28    ;
                  29    ;
0000  434C4541    30   CLRMSG  DEFM   'CLEARXSF'
0008  58494C4C    31   ILLSUM  DEFM   'XILLXSUX'
0010  434F564E    32   PRIM    DEFM   'COVNEXTT'
0018  434F564E    33   PRIM1   DEFM   'COVNEXXX'
0020  50415058    34   CUTMSG  DEFM   'PAPXCVEK'
0028  5837584B    35   ERRO2M  DEFM   'X7XKX<XT'
0030  53454558    36   LOOKM   DEFM   'SEEXDXBX'
0038  4544575B    37   EDITMS  DEFM   'EDWEXDXB'
0040  53454C58    38   EXRNM   DEFM   'SELXRNGE'
0048  4F4E5458    39   DOVERM  DEFM   'ONTXOFFT'
0050  53454C58    40   PRINTM  DEFM   'SELXPRWN'
0058  43424858    41   CBHONM  DEFM   'CBHXONXX'
0060  43424858    42   CBHOFM  DEFM   'CBHXOFFX'
0068  41445658    43   PAPONM  DEFM   'ADVXONXX'
0070  41445658    44   PAPOFM  DEFM   'ADVXOFFX'
0078  42455058    45   BEPOFM  DEFM   'BEPXXOFF'
0080  42455058    46   BEPONM  DEFM   'BEPXXXON'
0088  58534653    47   SFSONM  DEFM   'XSFSXONX'
0090  58534653    48   SFSOFM  DEFM   'XSFSXOFF'
0098  534C5045    49   SLPONM  DEFM   'SLPEXONX'
00A0  534C5045    50   SLPOFM  DEFM   'SLPEXOFF'
00A8  4F524452    51   ORDSRM  DEFM   'ORDRXSOR'
00B0  43414C43    52   CALDENM DEFM   'CALCXDEN'
00B8  5858584F    53   ONM     DEFM   'XXXONXXX'
00C0  58584F46    54   OFFM    DEFM   'XXOFFXXX'
```

| | | | | | |
|---|---|---|---|---|---|
| 00C8 | 44454C45 | 55 | DELSUM | DEFM | 'DELECEXX' |
| 00D0 | 5355584E | 56 | SETM | DEFM | 'SUXNOXTT' |
| 00D8 | 53455B55 | 57 | SETM1 | DEFM | 'SECUPXXX' |
| 00E0 | 53455B55 | 58 | SETM2 | DEFM | 'SECUPXTT' |
| 00E8 | 44415B41 | 59 | EDITM | DEFM | 'DACAXXTT' |
| 00F0 | 46554E43 | 60 | FUNCTM | DEFM | 'FUNCXXTT' |
| | | 61 | ; | | |
| | | 62 | ; | | |
| 00F8 | 46494C58 | 63 | EM | DEFM | 'FILXCYPE' |
| 0100 | 46494C58 | 64 | | DEFM | 'FILXASAX' |
| 0108 | 50415058 | 65 | | DEFM | 'PAPXCYPE' |
| 0110 | 52585245 | 66 | | DEFM | 'RXREFXPR' |
| 0118 | 47585245 | 67 | | DEFM | 'GXREFXPR' |
| 0120 | 42585245 | 68 | | DEFM | 'BXREFXPR' |
| 0128 | 5258504F | 69 | | DEFM | 'RXPOSXBP' |
| 0130 | 4758504F | 70 | | DEFM | 'GXPOSXBP' |
| 0138 | 4258504F | 71 | | DEFM | 'BXPOSXBP' |
| 0140 | 52584E45 | 72 | | DEFM | 'RXNEGXBP' |
| 0148 | 47584E45 | 73 | | DEFM | 'GXNEGXBP' |
| 0150 | 42584E45 | 74 | | DEFM | 'BXNEGXBP' |
| 0158 | 5258534C | 75 | SLOPEM | DEFM | 'RXSLPX09' |
| 0160 | 4758534C | 76 | | DEFM | 'GXSLPX09' |
| 0168 | 4258534C | 77 | | DEFM | 'BXSLPX09' |
| 0170 | 5258534C | 78 | | DEFM | 'RXSLPX08' |
| 0178 | 4758534C | 79 | | DEFM | 'GXSLPX08' |
| 0180 | 4258534C | 80 | | DEFM | 'BXSLPX08' |
| 0188 | 5258534C | 81 | | DEFM | 'RXSLPXU8' |
| 0190 | 4758534C | 82 | | DEFM | 'GXSLPXU8' |
| 0198 | 4258534C | 83 | | DEFM | 'BXSLPXU8' |
| 01A0 | 5258534C | 84 | | DEFM | 'RXSLPXU9' |
| 01A8 | 4758534C | 85 | | DEFM | 'GXSLPXU9' |
| 01B0 | 4258534C | 86 | | DEFM | 'BXSLPXU9' |
| 01B8 | 52585346 | 87 | | DEFM | 'RXSFSXRM' |
| 01C0 | 47585346 | 88 | | DEFM | 'GXSFSXRM' |
| 01C8 | 42585346 | 89 | | DEFM | 'BXSFSXRM' |
| 01D0 | 52454458 | 90 | | DEFM | 'REDXPOPM' |
| 01D8 | 47524E58 | 91 | | DEFM | 'GRNXPOPM' |
| 01E0 | 424C5558 | 92 | | DEFM | 'BLUXPOPM' |
| 01E8 | 504F5058 | 93 | | DEFM | 'POPXPRWN' |
| 01F0 | 5B554E47 | 94 | | DEFM | 'CUNGXRKG' |
| 01F8 | 5B554E47 | 95 | | DEFM | 'CUNGXBKG' |
| 0200 | 424C5558 | 96 | | DEFM | 'BLUXCORR' |
| 0208 | 464C5258 | 97 | | DEFM | 'FLRXXRAC' |
| 0210 | 464C5258 | 98 | | DEFM | 'FLRXCORR' |
| 0218 | 4741494E | 99 | | DEFM | 'GAINXFAC' |
| 0220 | 52584F3B | 100 | | DEFM | 'RXO;XLBP' |
| 0228 | 47584F3B | 101 | | DEFM | 'GXO;XLBP' |
| 0230 | 42584F3B | 102 | | DEFM | 'BXO;XLBP' |
| 0238 | 52585538 | 103 | | DEFM | 'RXU8XLBP' |
| 0240 | 47585538 | 104 | | DEFM | 'GXU8XLBP' |
| 0248 | 42585538 | 105 | | DEFM | 'BXU8XLBP' |
| 0250 | 52585245 | 106 | | DEFM | 'RXREFXN;' |
| 0258 | 47585245 | 107 | | DEFM | 'GXREFXN;' |
| 0260 | 42585245 | 108 | | DEFM | 'BXREFXN;' |
| 0268 | 52584F3B | 109 | | DEFM | 'RXO;XAKD' |
| 0270 | 47584F3B | 110 | | DEFM | 'GXO;XAKD' |
| 0278 | 42584F3B | 111 | | DEFM | 'BXO;XAKD' |
| 0280 | 52585538 | 112 | | DEFM | 'RXU8XAKD' |
| 0298 | 47585539 | 113 | | DEFM | 'GXU8XAKD' |
| 0290 | 42585538 | 114 | | DEFM | 'BXU8XAKD' |
| 0298 | 52454458 | 115 | RREFM | DEFM | 'REDXREFM' |
| 02A0 | 47524E58 | 116 | | DEFM | 'GRNXREFM' |
| 02A8 | 424C5558 | 117 | | DEFM | 'BLUXREFM' |
| 02B0 | 58585245 | 118 | | DEFM | 'XXREDXN;' |
| 02B8 | 47524545 | 119 | | DEFM | 'GREENXN;' |
| 02C0 | 58424C55 | 120 | | DEFM | 'XBLUEXN;' |

| | | | | | |
|---|---|---|---|---|---|
| 02C8 | 58585245 | 121 | | DEFM | 'XXREDXO;' |
| 02D0 | 47524545 | 122 | | DEFM | 'GREENXO;' |
| 02D8 | 58424C55 | 123 | | DEFM | 'XBLUEXO;' |
| 02E0 | 58585245 | 124 | | DEFM | 'XXREDXU8' |
| 02E8 | 47524545 | 125 | | DEFM | 'GREENXU8' |
| 02F0 | 58424C55 | 126 | | DEFM | 'XBLUEXU8' |
| 02F8 | 52454458 | 127 | | DEFM | 'REDXXXSU' |
| 0300 | 47524545 | 128 | | DEFM | 'GREENXSU' |
| 0308 | 424C5545 | 129 | | DEFM | 'BLUEXXSU' |
| 0310 | 52584358 | 130 | | DEFM | 'RXCXCORR' |
| 0318 | 47584358 | 131 | | DEFM | 'GXCXCORR' |
| 0320 | 42584358 | 132 | | DEFM | 'BXCXCORR' |
| 0328 | 52454458 | 133 | | DEFM | 'REDXOFFS' |
| 0330 | 47524E58 | 134 | | DEFM | 'GRNXOFFS' |
| 0338 | 424C5558 | 135 | | DEFM | 'BLUXOFFS' |
| 0340 | 5058434E | 136 | | DEFM | 'PXCNCXLO' |
| 0348 | 5058434E | 137 | | DEFM | 'PXCNCXHI' |
| 0350 | 44584641 | 138 | | DEFM | 'DXFACCOR' |
| 0358 | 43555B58 | 139 | | DEFM | 'CUCXPULS' |
| 0360 | 41445658 | 140 | | DEFM | 'ADVXPULS' |
| 0368 | 41445844 | 141 | | DEFM | 'ADXDELAY' |
| 0370 | 52535B58 | 142 | | DEFM | 'RSCXCNCX' |
| 0378 | 534F525B | 143 | | DEFM | 'SORCXPLS' |
| 0380 | 58525843 | 144 | CORMSG | DEFM | 'XRXCORXX' |
| 0388 | 58475843 | 145 | | DEFM | 'XGXCORXX' |
| 0390 | 58425843 | 146 | | DEFM | 'XBXCORXX' |
| 0398 | 4B525843 | 147 | | DEFM | 'KRXCORXX' |
| 03A0 | 4B475843 | 148 | | DEFM | 'KGXCORXX' |
| 03A8 | 4B425843 | 149 | | DEFM | 'KBXCORXX' |
| | | 150 | ; | | |
| | | 151 | ; | | |
| 03B0 | 52584E45 | 152 | RDENM | DEFM | 'RXNEGX9M' |
| | | 153 | ; | DEFM | 'GXNEGX9M' |
| | | 154 | ; | DEFM | 'BXNEGX9M' |
| | | 155 | ; | DEFM | 'RXNEGX8M' |
| | | 156 | ; | DEFM | 'GXNEGX8M' |
| | | 157 | ; | DEFM | 'BXNEGX8M' |
| | | 158 | ; | DEFM | 'RXNEGXNM' |
| | | 159 | ; | DEFM | 'GXNEGXNM' |
| | | 160 | ; | DEFM | 'BXNEGXNM' |
| | | 161 | ; | DEFM | 'RXNORXXM' |
| | | 162 | ; | DEFM | 'GXNORXXM' |
| | | 163 | ; | DEFM | 'BXNORXXM' |
| | | 164 | ; | DEFM | 'RXNXPLXM' |
| | | 165 | ; | DEFM | 'GXNXPLXM' |
| | | 166 | ; | DEFM | 'BXNXPLXM' |
| | | 167 | ; | DEFM | 'RXPLX8XM' |
| | | 168 | ; | DEFM | 'GXPLX8XM' |
| | | 169 | ; | DEFM | 'BXPLX8XM' |
| | | 170 | ; | DEFM | 'RXPLX9XM' |
| | | 171 | ; | DEFM | 'GXPLX9XM' |
| | | 172 | ; | DEFM | 'BXPLX9XM' |
| | | 173 | ; | DEFM | 'RXDICHRO' |
| | | 174 | ; | DEFM | 'GXDICHRO' |
| | | 175 | ; | DEFM | 'BXDICHRO' |
| | | 176 | ; | DEFM | 'RXDENSEX' |
| | | 177 | ; | DEFM | 'GXDENSEX' |
| | | 178 | ; | DEFM | 'BXDENSEX' |
| | | 179 | | ;DEFM | 'NEGXSIMX' |
| | | 180 | | ;DEFM | 'PRXSIMXX' |
| | | 181 | | ;DEFM | 'PAPXADVM' |
| | | 182 | | ;DEFM | 'DESXENLM' |
| | | 183 | | ;DEFM | 'ENLMXXXX' |
| | | 184 | | ;DEFM | 'DIOPMXXX' |
| | | 185 | | ;DEFM | 'INORMXXX' |
| | | 186 | | ;DEFM | 'LENSXHMX' |

|      |          | 187 |        | ;DEFM | 'LENSMXXX' |
|------|----------|-----|--------|-------|------------|
|      |          | 188 |        | ;DEFM | 'DIAPMXXX' |
|      |          | 189 |        | ;DEFM | 'CARRXLMX' |
|      |          | 190 |        | ;DEFM | 'SPILLMXX' |
|      |          | 191 |        | ;DEFM | 'PAPERXSM' |
|      |          | 192 |        | ;DEFM | 'REMXXXXX' |
|      |          | 193 | ;      |       |            |
| 03B8 | 44585345 | 194 | SBUTSM | DEFM  | 'DXSERIES' |
|      |          | 195 | MSG0:  |       |            |
| 03C0 | 58585858 | 196 | MSG6:  | DEFM  | 'XXXXXXXX' |
| 03C8 | 51515041 | 197 | MSG1   | DEFM  | 'QQPASSQQ' |
| 03D0 | 4B4B5041 | 198 | MSG1F  | DEFM  | 'KKPASSKK' |
| 03D8 | 58535045 | 199 | MSG2   | DEFM  | 'XSPECIAL' |
| 03E0 | 51515148 | 200 | MSG3   | DEFM  | 'QQQH7FEQ' |
| 03E8 | 58585858 | 201 | MSG3A  | DEFM  | 'XXXXXXXX' |
| 03F0 | 54544B54 | 202 | MSG4   | DEFM  | 'TTKTTKTT' |
| 03F8 | 50415058 | 203 | MSG5   | DEFM  | 'PAPXADVC' |
| 0400 | 58584552 | 204 | MSG7   | DEFM  | 'XXERRORX' |
| 0408 | 58524B47 | 205 | MSG8   | DEFM  | 'XRKGKBXT' |
| 0410 | 47524F55 | 206 | MSG9   | DEFM  | 'GROUPXTX' |
| 0418 | 43414C43 | 207 | MSG10  | DEFM  | 'CALCXSLP' |
| 0420 | 58584B58 | 208 | MSG11  | DEFM  | 'XXKXXKXX' |
| 0428 | 58585A58 | 209 | MSG12  | DEFM  | 'XXZXXZXX' |
| 0430 | 464F5243 | 210 | MSG13  | DEFM  | 'FORCEXCP' |
| 0438 | 42554C53 | 211 | MSG14  | DEFM  | 'BULSXEYE' |
| 0440 | 58524543 | 212 | MSG15  | DEFM  | 'XRECALCX' |
| 0448 | 4C485849 | 213 | MSG16  | DEFM  | 'LHXISXON' |
| 0450 | 5853534F | 214 | MSG17  | DEFM  | 'XSCOREXT' |
| 0458 | 5841424F | 215 | MSG18  | DEFM  | 'XABORCXX' |
| 0460 | 5858444F | 216 | MSG19  | DEFM  | 'XXDONEXX' |
| 0468 | 5858584F | 217 | TOOM   | DEFM  | 'XXCOXTXX' |
| 0470 | 5858434F | 218 | COPYM  | DEFM  | 'XXCOPYXX' |
|      |          | 219 | ;      |       |            |
|      |          | 220 | ;      |       |            |
| 0478 | 535B4550 | 221 | MSG21  | DEFM  | 'SCEPXXTT' |
| 0480 | 584E3A58 | 222 | MSG22  | DEFM  | 'XN;XNEGX' |
| 0488 | 44574348 | 223 | MSG23  | DEFM  | 'DWCHROWC' |
| 0490 | 58584B58 | 224 | MSG24  | DEFM  | 'XXKXXKXX' |
| 0498 | 4641435B | 225 | MSG25  | DEFM  | 'FACCORXT' |
| 04A0 | 584F3B58 | 226 | MSG26  | DEFM  | 'XO;XNEGX' |
| 04A8 | 58553858 | 227 | MSG27  | DEFM  | 'XU8XNEGX' |
| 04B0 | 52454144 | 228 | MSG28  | DEFM  | 'READXREF' |
| 04B8 | 584F4646 | 229 | MSG29  | DEFM  | 'XOFFSECX' |
| 04C0 | 58585245 | 230 | MSG30  | DEFM  | 'XXREADXX' |
| 04C8 | 5245444D | 231 | RM     | DEFM  | 'REDMXXXX' |
| 04D0 | 47524545 | 232 | GM     | DEFM  | 'GREENMXX' |
| 04D8 | 424C5545 | 233 | BM     | DEFM  | 'BLUEMXXX' |
|      |          | 234 | MSGR:  |       |            |
| 04E0 | 524D5858 | 235 | MSGC:  | DEFM  | 'RMXXXXXX' |
|      |          | 236 | MSGG:  |       |            |
| 04E8 | 474D5858 | 237 | MSGM:  | DEFM  | 'GMXXXXXX' |
|      |          | 238 | MSGB:  |       |            |
| 04F0 | 424D5858 | 239 | MSGY:  | DEFM  | 'BMXXXXXX' |
| 04F8 | 434C524D | 240 | MSGK:  | DEFM  | 'CLRMXXXX' |
| 0500 | 53454C58 | 241 | SELPRM | DEFM  | 'SELXPRWN' |
| 0508 | 44454E53 | 242 | SEEDEN | DEFM  | 'DENSXERR' |
| 0510 | 584B3958 | 243 | BUTMSG | DEFM  | 'XK9XPRWN' |
| 0518 | 584B3858 | 244 |        | DEFM  | 'XK8XPRWN' |
| 0520 | 584E4B58 | 245 |        | DEFM  | 'XNKXPRWN' |
| 0528 | 4E4F5258 | 246 | MSGNOR | DEFM  | 'NORXPRWN' |
| 0530 | 4E504C58 | 247 |        | DEFM  | 'NPLXPRWN' |
| 0538 | 504C3858 | 248 |        | DEFM  | 'PL8XPRWN' |
| 0540 | 504C3958 | 249 |        | DEFM  | 'PL9XPRWN' |
|      |          | 250 |        |       |            |
|      |          | 251 | BMSG3: |       |            |
| 0548 | 4B383958 | 252 |        | DEFM  | 'K89XPRNX' |

```
0550   4B383A58      253           DEFM      'K8;XPRNX'
0558   4B383B58      254           DEFM      'K8;XPRNX'
0560   4B383C58      255           DEFM      'K8<XPRNX'
0568   4B383D58      256           DEFM      'K8=XPRNX'
0570   4B383E58      257           DEFM      'K8>XPRNX'
0578   4B383F58      258           DEFM      'K8?XPRNX'
0580   4B384058      259           DEFM      'K8@XPRNX'
                     260   BMSG4:
0588   4B583C58      261           DEFM      'KX<XPRWN'
0590   4B583D58      262           DEFM      'KX=XPRWN'
0598   4B583E58      263           DEFM      'KX>XPRWN'
05A0   4B583F58      264           DEFM      'KX?XPRWN'
05A8   4B584058      265           DEFM      'KXERROR C7
```

PASS 1 COMPLETE
0 ASSEMBLY ERRORS
PASS 2 COMPLETE
ASSEMBLY COMPLETE

Assembling Printer Module -> PRINT.S
ASM 4.1
PASS 1 COMPLETE
0 ASSEMBLY ERRORS
PASS 2 COMPLETE
ASSEMBLY COMPLETE Assembling Conversion Module -> CONVER.S
ASM 4.1
PASS 1 COMPLETE
0 ASSEMBLY ERRORS
PASS 2 COMPLETE
ASSEMBLY COMPLETE

```
                                     DISPLAY0
LOC   OBJ CODE  M STMT SOURCE STATEMENT

450   *LIST ON
                  451   ;
                  452   ;
                  453   ;      224
                  454   ;
                  455   ;
                  456   ;
                  457              EXTERNAL
                  458              EXTERNAL
                  459              EXTERNAL
                  460              EXTERNAL
                  461              EXTERNAL
                  462              EXTERNAL
                  463   ;
                  464              GLOBAL
                  465              GLOBAL
                  466   ;
                  467   ;
                  468   ;
                  469   ;================================
                  470   ;                    SETUP
                  471   ;================================
                  472   ;      SET1 function number a
                  473   ;
                  474   ;         1 ->   FILM SIZE
                  475   ;         2 ->   FILM TYPE
                  476   ;         3 ->   PAPER TYPE
                  477   ;         4 ->   RED      REF PR
                  478   ;         5 ->   GREEN    REF PR
                  479   ;         6 ->   BLUE     REF PR
                  480   ;         7 ->   RED      POS BP
```

```
                    DISPLAY0
LOC  OBJ CODE M STMT SOURCE STATEMENT
              481 ;        8 ->    GREEN    POS BP
              482 ;        9 ->    BLUE     POS BP
              483 ;       10 ->    RED      NEG BP
              484 ;       11 ->    GREEN    NEG BP
              485 ;       12 ->    BLUE     NEG BP
              486 ;       13 ->    RED      Slope
              487 ;       14 ->    GREEN    Slope
              488 ;       15 ->    BLUE     Slope
              489 ;       16 ->    RED      Slope
              490 ;       17 ->    GREEN    Slope
              491 ;       18 ->    BLUE     Slope
              492 ;       19 ->    RED      Slope
              493 ;       20 ->    GREEN    Slope
              494 ;       21 ->    BLUE     Slope
              495 ;       22 ->    RED      Slope
              496 ;       23 ->    GREEN    Slope
              497 ;       24 ->    BLUE     Slope
              498 ;       25 ->    RED      SUBJEC
              499 ;       26 ->    GREEN    SUBJEC
              500 ;       27 ->    BLUE     SUBJEC
              501 ;       28 ->    RED      POPULA
              502 ;       29 ->    GREEN    POPULA
              503 ;       30 ->    BLUE     POPULA
              504 ;       31 ->    POPULATION PRI
              505 ;       32 ->    TUNGSTEN RATIO
              506 ;       33 ->    TUNGSTEN RATIO
              507 ;       34 ->    BLUE CORRECTIO
              508 ;       35 ->    FLUORESCENT RA
              509 ;       36 ->    MAGENTA CORREC
              510 ;       37 ->    RED      O4 LIN
              511 ;       38 ->    GREEN    O4 LIN
              512 ;       39 ->    BLUE     O4 LIN
              513 ;       40 ->    RED      U1 LIN
              514 ;       41 ->    GREEN    U1 LIN
              515 ;       42 ->    BLUE     U1 LIN
              516 ;       43 ->    RED      REF A-
              517 ;       44 ->    GREEN    REF A-
              518 ;       45 ->    BLUE     REF A-
              519 ;       46 ->    RED      O4 A-I
              520 ;       47 ->    GREEN    O4 A-I
              521 ;       48 ->    BLUE     O4 A-I
              522 ;       49 ->    RED      U1 A-I
              523 ;       50 ->    GREEN    U1 A-I
              524 ;       51 ->    BLUE     U1 A-I
              525 ;       52 ->    RANGE GAIN FAC
              526 *EJECT
              527 ;=============================
              528 ;
              529 ;       DENSITOMETER INPUTS (KE
              530 ;
              531 ;=============================
              532 ;
              533 ;        1 ->    RED REFERENCE P
              534 ;        2 ->    GREEN REFERENCE
              535 ;        3 ->    BLUE REFERENCE
              536 ;        4 ->    N3 RED PRINT
              537 ;        5 ->    N3 GREEN
              538 ;        6 ->    N3 BLUE
              539 ;        7 ->    O4 RED PRINT
              540 ;        8 ->    O4 GREEN
              541 ;        9 ->    O4 BLUE
              542 ;       10 ->    U1 RED PRINT
              543 ;       11 ->    U1 GREEN
              544 ;       12 ->    U1 BLUE
              545 ;       13 ->    RED      MASTER
```

```
                    546 ;      14 ->    GREEN    MASTER
                    547 ;      15 ->    BLUE     MASTER
                    548 ;      16 ->    RED      COLOR C
                    549 ;      17 ->    GREEN    COLOR C
                    550 ;      18 ->    BLUE     COLOR C
                    551 ;      19 ->    PRINT COUNT
                    552 ;      20 ->    RED      OFFSET
                    553 ;      21 ->    GREEN    OFFSET
                    554 ;      22 ->    BLUE     OFFSET
                    555 ;*LIST OFF
                    556 ;==============================
                    557 ;
                    558 ;
                    559 ;      SETDBM   - CALLED PROGRA
                    560 ;      SET1     - REQUIRES THE
                    561 ;               -      INPUT
                    562 ;                      -----
                    563 ;                      B = W
                    564 ;                      C = FUN
                    565 ;                      HL = V/
                    566 ;                      SETUP
                    567 ;
                    568 ;                      B = R
                    569 ;                      C = FU
                    570 ;                      SETUP
                    571 ;
                    572 ;
                    573 ;==============================
                    574 ;
                    575 ;
                    576 ENDED    EQU      99
                    577 ;
                    578 SETDBM:
0000  3A6E68        579          LD       A,(SETNUM)
0003  326F68        580          LD       (SETSAV),A
                    581 GETFNC:
0006  110000   X    582          LD       DE,FUNCTM
0009  CD0000   X    583          CALL     PUTASC
000C  CD0000   X    584          CALL     GET255
000F  79            585          LD       A,C
0010  FE06          586          CP       6
0012  D20000   X    587          JP       NC,ERROR
0015  211B00   R    588          LD       HL,FNCADR
0018  C30000   X    589          JP       SELECT
                    590 ;
                    591 ;
                    592 FNCADR:
001B  CB00     R    593          DEFW     DBMRET
001D  AB00     R    594          DEFW     SETDB1
001F  8B01     R    595          DEFW     SEEDBM
0021  0000     X    596          DEFW     KILLSU
0023  5200     R    597          DEFW     COPYSU
0025  2700     R    598          DEFW     INITSU
                    599 ;        DEFW     STRCAS
                    600 ;        DEFW     LODCAS
                    601 ;
0027  CD0000   X    602 INITSU   CALL     GET_SU
002A  21E803        603          LD       HL,1000
002D  0677          604          LD       B,'w'
002F  0E1C          605          LD       C,DBRAVG
0031  CDD800   R    606          CALL     SET1
0034  21E803        607          LD       HL,1000
0037  0E1D          608          LD       C,DBGAVG
0039  CDD800   R    609          CALL     SET1
003C  21E803        610          LD       HL,1000
003F  0E1E          611          LD       C,DBBAVG
```

```
0041   CDD800   R   612           CALL   SET1
0044   210100       613           LD     HL,1
0047   0657         614           LD     B,'W'
0049   0E1F         615           LD     C,DBPCNT
004B   CDD800   R   616           CALL   SET1
004E   CD0000   X   617           CALL   RES_SU
0051   C9           618           RET
                    619   ;
                    620   COPYSU:
0052   110000   X   621           LD     DE,COPYM
0055   CD0000   X   622           CALL   SNDWAT
0058   CD0000   X   623           CALL   GETSET
005B   1600         624           LD     D,0
005D   5F           625           LD     E,A
005E   3A0D68       626           LD     A,(CNT)
0061   FE03         627           CP     3
0063   CABE00   R   628           JP     Z,SET0
0066   7B           629           LD     A,E
0067   FE1F         630           CP     MAXSET+1
0069   D2A500   R   631           JP     NC,COPYS1
006C   CD0000   X   632           CALL   CALSU
006F   22F068       633           LD     (SCRTH1),HL
0072   CD9F00   R   634           CALL   CHK4OK
0075   C2A500   R   635           JP     NZ,COPYS1
0078   110000   X   636           LD     DE,TOOM
007B   CD0000   X   637           CALL   SNDWAT
007E   CD0000   X   638           CALL   GETSET
0081   FE1F         639           CP     MAXSET+1
0083   D2A500   R   640           JP     NC,COPYS1
0086   5F           641           LD     E,A
0087   1600         642           LD     D,0
0089   CD0000   X   643           CALL   CALSU
008C   CD9F00   R   644           CALL   CHK4OK
008F   CAA500   R   645           JP     Z,COPYS1
0092   2B           646           DEC    HL
0093   EB           647           EX     DE,HL
0094   2AF068       648           LD     HL,(SCRTH1)
0097   016A00       649           LD     BC,SETSIZ
009A   EDB0         650           LDIR
009C   C3BE00   R   651           JP     SET0
                    652   ;
                    653   CHK4OK:
009F   7E           654           LD     A,(HL)
00A0   23           655           INC    HL
00A1   AE           656           XOR    (HL)
00A2   FE04         657           CP     04
00A4   C9           658           RET
                    659   ;
                    660   COPYS1:
00A5   CD0000   X   661           CALL   ILLSUE
00A8   C3BE00   R   662           JP     SET0
                    663   ;
                    664   ;
                    665   SETDB1:
00AB   110000   X   666           LD     DE,EDITMS
00AE   CD0000   X   667           CALL   SNDWAT
00B1   CD0000   X   668           CALL   GETSET
00B4   5F           669           LD     E,A
00B5   3A0D68       670           LD     A,(CNT)
00B8   FE03         671           CP     3
00BA   7B           672           LD     A,E
00BB   C2CC00   R   673           JP     NZ,SET00
                    674   SET0:
00BE   3A6F68       675           LD     A,(SETSAV)
00C1   326E68       676           LD     (SETNUM),A
00C4   CD0000   X   677           CALL   CHKSUM
```

```
  00C7    ED430469    678             LD      (RAMSUM),BC
                      679  DBMRET:
  00CB    C9          680             RET
                      681  ;
                      682  SET00:
  00CC    FE1F        683             CP      MAXSET+1
  00CE    D20000   X  684             JP      NC,SUERR
  00D1    326E68      685             LD      (SETNUM),A
  00D4    0645        686             LD      B,'E'
  00D6    0E01        687             LD      C,01
                      688  SET1:
  00D8    3A6E68      689             LD      A,(SETNUM)
  00DB    1600        690             LD      D,0
  00DD    5F          691             LD      E,A
  00DE    227568      692             LD      (SETVAL),HL
  00E1    217768      693             LD      HL,MODE
  00E4    70          694             LD      (HL),B
  00E5    217868      695             LD      HL,FUNPTR
  00E8    71          696             LD      (HL),C
  00E9    79          697             LD      A,C
  00EA    FE35        698             CP      MAXFLD+1
  00EC    D28502   R  699             JP      NC,WRTERR
  00EF    CD0000   X  700             CALL    GTSUAD
  00F2    227368      701             LD      (SUPTR),HL
  00F5    CD9F00   R  702             CALL    CHK4OK
  00F8    CA1301   R  703             JP      Z,SUVALD
  00FB    3A7768      704             LD      A,(MODE)
  00FE    FE52        705             CP      'R'
  0100    CA8502   R  706             JP      Z,RDERR
  0103    FE45        707             CP      'E'
  0105    C20D01   R  708             JP      NZ,SET2
  0108    3E41        709             LD      A,'A'
  010A    327768      710             LD      (MODE),A
                      711  SET2:
  010D    2B          712             DEC     HL
  010E    364F        713             LD      (HL),'O'
  0110    23          714             INC     HL
  0111    364B        715             LD      (HL),'K'
                      716  SUVALD:
  0113    23          717             INC     HL
  0114    3A7768      718             LD      A,(MODE)
  0117    FE45        719             CP      'E'
  0119    C22701   R  720             JP      NZ,RPTFUN
                      721  ADDFUN:
  011C    110000   X  722             LD      DE,EDITM
  011F    CD9202   R  723             CALL    GETBOB
  0122    EB          724             EX      DE,HL
  0123    7B          725             LD      A,E
  0124    327868      726             LD      (FUNPTR),A
                      727  RPTFUN:
  0127    3A7868      728             LD      A,(FUNPTR)
  012A    FE63        729             CP      ENDED
  012C    CABE00   R  730             JP      Z,SET0
  012F    B7          731             OR      A
  0130    CA1C01   R  732             JP      Z,ADDFUN
  0133    CD5202   R  733             CALL    TESTFUN
  0136    D21002   R  734             JP      NC,BADFUN
  0139    87          735             ADD     A,A
                      736            ;CP      MAX2B*2+1
                      737            ;JP      C,SUVO
                      738            ;SUB     MAX2B*2
                      739            ;RRCA
                      740            ;ADD     A,MAX2B*2+1
                      741  SUVO:
  013A    110000      742             LD      DE,0
  013D    5F          743             LD      E,A
```

```
013E   2A7368          744          LD      HL,(SUPTR)
0141   19              745          ADD     HL,DE
                       746   ;
                       747   SUVA:
0142   3A7768          748          LD      A,(MODE)
0145   FE45            749          CP      'E'
0147   C25201    R     750          JP      NZ,SUV3
                       751   ;
                       752   ;
014A   E5              753          PUSH    HL
014B   4E              754          LD      C,(HL)
014C   23              755          INC     HL
014D   46              756          LD      B,(HL)
014E   CD0000    X     757          CALL    DSPHEX
0151   E1              758          POP     HL
                       759   SUV3:
0152   3A7868          760          LD      A,(FUNPTR)
0155   110000          761          LD      DE,0
0158   5F              762          LD      E,A
0159   010800          763          LD      BC,MSGSIZ
015C   E5              764          PUSH    HL
015D   CD0000    X     765          CALL    DMPY
0160   21F8FF    X     766          LD      HL,EM-MSGSIZ
0163   3A6E68          767          LD      A,(SETNUM)
0166   FE00            768          CP      0
0168   C26E01    R     769          JP      NZ,SUV4A
016B   21F8FF    X     770          LD      HL,RREFM-MSGSIZ
                       771   SUV4A:
016E   19              772          ADD     HL,DE
                       773   SUV4:
016F   EB              774          EX      DE,HL
0170   E1              775          POP     HL
0171   3A7768          776          LD      A,(MODE)
0174   FE77            777          CP      'w'
0176   CA6302    R     778          JP      Z,SUV1
0179   FE57            779          CP      'W'
017B   CA6302    R     780          JP      Z,SUV1
                       781   ;
017E   FE52            782          CP      'R'
0180   C21B02    R     783          JP      NZ,SUV2
0183   CD0000    X     784          CALL    READVL
0186   0652            785          LD      B,'R'
0188   C37C02    R     786          JP      OKRET
                       787   SEEDBM:
018B   110000    X     788          LD      DE,LOOKM
018E   CD0000    X     789          CALL    SNDWAT
0191   110000    X     790          LD      DE,SETM
0194   CD9202    R     791          CALL    GETBOB
0197   3A6E68          792          LD      A,(SETNUM)
019A   326F68          793          LD      (SETSAV),A
019D   7D              794          LD      A,L
019E   FE63            795          CP      ENDED
01A0   C8              796          RET     Z
01A1   326E68          797          LD      (SETNUM),A
01A4   110000    X     798          LD      DE,EDITM
01A7   CD0000    X     799          CALL    GETS1
01AA   1600            800          LD      D,0
01AC   5F              801          LD      E,A
01AD   32F068          802          LD      (SCRTH1),A
01B0   010200          803          LD      BC,2
01B3   CD0000    X     804          CALL    DMPY
01B6   D5              805          PUSH    DE
01B7   3A6E68          806          LD      A,(SETNUM)
01BA   110000          807          LD      DE,0
01BD   5F              808          LD      E,A
01BE   CD0000    X     809          CALL    GTSUAD
```

| | | | | | |
|---|---|---|---|---|---|
| 01C1 | D1 | | 810 | POP | DE |
| | | | 811 | SDBM0: | |
| 01C2 | D5 | | 812 | PUSH | DE |
| 01C3 | E5 | | 813 | PUSH | HL |
| 01C4 | 19 | | 814 | ADD | HL,DE |
| 01C5 | 4E | | 815 | LD | C,(HL) |
| 01C6 | 23 | | 816 | INC | HL |
| 01C7 | 46 | | 817 | LD | B,(HL) |
| 01C8 | CD0000 | X | 818 | CALL | DISPHX |
| 01CB | 3AF068 | | 819 | LD | A,(SCRTH1) |
| 01CE | 010000 | | 820 | LD | BC,0 |
| 01D1 | 4F | | 821 | LD | C,A |
| 01D2 | CDFD01 | R | 822 | CALL | DSPLH2 |
| 01D5 | 3AF068 | | 823 | LD | A,(SCRTH1) |
| 01D8 | 3C | | 824 | INC | A |
| 01D9 | 32F068 | | 825 | LD | (SCRTH1),A |
| 01DC | CD0000 | X | 826 | CALL | GETKEY |
| 01DF | E1 | | 827 | POP | HL |
| 01E0 | D1 | | 828 | POP | DE |
| 01E1 | FE19 | | 829 | CP | KEYCAN |
| 01E3 | CAFA01 | R | 830 | JP | Z,SDBM3 |
| 01E6 | 13 | | 831 | INC | DE |
| 01E7 | 13 | | 832 | INC | DE |
| 01E8 | 3A6E68 | | 833 | LD | A,(SETNUM) |
| 01EB | B7 | | 834 | OR | A |
| 01EC | 7B | | 835 | LD | A,E |
| 01ED | C2F501 | R | 836 | JP | NZ,SDBM1 |
| 01F0 | FE3B | | 837 | CP | 2*DENMAX+1 |
| 01F2 | C3F701 | R | 838 | JP | SDBM2 |
| | | | 839 | SDBM1: | |
| 01F5 | FE69 | | 840 | CP | 2*MAXFLD+1 |
| | | | 841 | SDBM2: | |
| 01F7 | DAC201 | R | 842 | JP | C,SDBM0 |
| | | | 843 | SDBM3: | |
| | | | 844 | ; POP | HL |
| 01FA | C3BE00 | R | 845 | JP | SET0 |
| | | | 846 | ; | |
| | | | 847 | ; | |
| | | | 848 | DSPLH2: | |
| 01FD | CD0000 | X | 849 | CALL | BCD |
| 0200 | 4D | | 850 | LD | C,L |
| 0201 | 43 | | 851 | LD | B,E |
| 0202 | 210068 | | 852 | LD | HL,SEGIMG |
| 0205 | 70 | | 853 | LD | (HL),B |
| 0206 | 23 | | 854 | INC | HL |
| 0207 | 71 | | 855 | LD | (HL),C |
| 0208 | C9 | | 856 | RET | |
| | | | 857 | ; | |
| | | | 858 | ; | |
| | | | 859 | MAKDEC: | |
| 0209 | 2B | | 860 | DEC | HL |
| 020A | 7E | | 861 | LD | A,(HL) |
| 020B | F680 | | 862 | OR | 080H |
| 020D | 77 | | 863 | LD | (HL),A |
| 020E | 23 | | 864 | INC | HL |
| 020F | C9 | | 865 | RET | |
| | | | 866 | ; | |
| | | | 867 | BADFUN: | |
| 0210 | 3A7768 | | 868 | LD | A,(MODE) |
| 0213 | FE45 | | 869 | CP | 'E' |
| 0215 | CA1C01 | R | 870 | JP | Z,ADDFUN |
| 0218 | C38502 | R | 871 | JP | RDERR |
| | | | 872 | ; | |
| | | | 873 | SUV2: | |
| 021B | E5 | | 874 | PUSH | HL |
| 021C | CD0000 | X | 875 | CALL | PUTASC |

```
021F  CD0000   X  876         CALL    GETHN
0222  D1          877         POP     DE
0223  EB          878         EX      DE,HL
0224  3A0D68      879         LD      A,(CNT)
0227  FE08        880         CP      8
0229  CA4702   R  881         JP      Z,BADFNO
022C  CD0000   X  882         CALL    STORVL
                  883  BADFN1:
022F  3A7768      884         LD      A,(MODE)
0232  FE45        885         CP      'E'
0234  CA1C01   R  886         JP      Z,ADDFUN
0237  3A7868      887         LD      A,(FUNPTR)
023A  3C          888         INC     A
023B  327868      889         LD      (FUNPTR),A
023E  CD5202   R  890         CALL    TESTFUN
0241  D27F02   R  891         JP      NC,OKOUT
0244  C32701   R  892         JP      RPTFUN
                  893  ;
                  894  BADFNO:
0247  3A0A68      895         LD      A,(KBDBUF)
024A  FE19        896         CP      KEYCAN
024C  CABE00   R  897         JP      Z,SETO
024F  C32F02   R  898         JP      BADFN1
                  899  ;
                  900  TESTFUN:
0252  F5          901         PUSH    AF
0253  3A6E68      902         LD      A,(SETNUM)
0256  FE00        903         CP      0
0258  CA5F02   R  904         JP      Z,TSTFN1
025B  F1          905         POP     AF
025C  FE35        906         CP      MAXFLD+1
025E  C9          907         RET
                  908  TSTFN1:
025F  F1          909         POP     AF
0260  FE1E        910         CP      DENMAX+1
0262  C9          911         RET
                  912  ;
                  913  ;
                  914  SUV1:
0263  EB          915         EX      DE,HL
0264  2A7568      916         LD      HL,(SETVAL)
0267  EB          917         EX      DE,HL
0268  CD0000   X  918         CALL    STORVL
026B  3A7768      919         LD      A,(MODE)
026E  FE77        920         CP      'W'
0270  CA7A02   R  921         JP      Z,OKWRET
0273  CD0000   X  922         CALL    CHKSUM
0276  ED430469    923         LD      (RAMSUM),BC
                  924  OKWRET:
027A  0657        925         LD      B,'W'
                  926  OKRET:
027C  37          927         SCF
027D  3F          928         CCF
027E  C9          929         RET
                  930  ;
                  931  OKOUT:
027F  CDBE00   R  932         CALL    SETO
0282  C37C02   R  933         JP      OKRET
                  934  ;
                  935  RDERR:
                  936  WRTERR:
0285  3A7768      937         LD      A,(MODE)
0288  47          938         LD      B,A
0289  3A7868      939         LD      A,(FUNPTR)
028C  4F          940         LD      C,A
028D  2A7568      941         LD      HL,(SETVAL)
```

```
0290  37              942        SCF
0291  C9              943        RET
                      944  ;
0292  CD0000  X       945  GETBOB  CALL  PUTASC
0295  CD0000  X       946          CALL  GET255
0298  3A0D68          947          LD    A,(CNT)
029B  FE03            948          CP    3
029D  3E00            949          LD    A,0
029F  328B68          950          LD    (HEXSGN),A
02A2  2600            951          LD    H,0
02A4  2002            952          JR    NZ,GETB1
02A6  0E63            953          LD    C,99
02A8  69              954  GETB1   LD    L,C
02A9  C9              955          RET
                      956  ;
                      957  *END
```

CROSS REFERENCE                    DISPLAY0
SYMBOL   VAL  M DEFN REFS

| Symbol | Val | M | Defn | Refs | | | |
|---|---|---|---|---|---|---|---|
| ADD | 6906 | | 323 | | | | |
| ADDFUN | 011C | R | 721 | 732 | 870 | 886 | |
| ADHIGH | 0008 | | 125 | | | | |
| ADLOW | 0010 | | 124 | | | | |
| ADMODE | 68FA | | 314 | 315 | | | |
| ADSEL | 0010 | | 123 | | | | |
| ADVCNT | 6900 | | 319 | 320 | | | |
| ADVPUL | 6A34 | | 378 | 379 | | | |
| ADWAIT | 6A36 | | 379 | 380 | | | |
| AD_RUN | 0020 | | 88 | | | | |
| ANS | 6848 | | 229 | 230 | | | |
| ANSLP | 6861 | | 234 | 235 | | | |
| ANSSAV | 6857 | | 233 | 234 | | | |
| BADFN0 | 0247 | R | 894 | 881 | | | |
| BADFN1 | 022F | R | 883 | 898 | | | |
| BADFUN | 0210 | R | 867 | 734 | | | |
| BANK2 | 0010 | | 81 | | | | |
| BANK4 | 0000 | | 101 | | | | |
| BCD | 004C | X | 462 | 849 | | | |
| BCH | 6880 | | 256 | 257 | | | |
| BCORR | 6A24 | | 371 | 372 | | | |
| BCOUNT | 68F7 | | 311 | 312 | | | |
| BDDEN | 6A58 | | 385 | 386 | | | |
| BDENVA | 6A70 | | 391 | 392 | | | |
| BDICHR | 6A6A | | 388 | 389 | | | |
| BDISP | 683C | | 223 | 224 | | | |
| BEEPER | 0040 | | 89 | | | | |
| BEPFLG | 6884 | | 259 | 260 | | | |
| BEXP | 686B | | 241 | 242 | | | |
| BLKCNT | 68EF | | 304 | 305 | | | |
| BLUCHL | 0005 | | 85 | | | | |
| BLUDEN | 68B4 | | 276 | 277 | | | |
| BLUMAS | 6A1E | | 368 | 369 | | | |
| BLUNEG | 6A0C | | 359 | 360 | | | |
| BLUREF | 6A06 | | 356 | 357 | | | |
| BNEG | 682A | | 214 | 215 | | | |
| BO4PRN | 6A12 | | 362 | 363 | | | |
| BOFFS | 6A2A | | 374 | 375 | | | |
| BOMOUT | 6903 | | 321 | 322 | | | |
| BP | 68E2 | | 294 | 295 | | | |
| BP0 | 68C6 | | 280 | 281 | | | |
| BPTIME | 6836 | | 220 | 221 | | | |
| BPU | 68C4 | | 279 | 280 | | | |
| BREF | 6824 | | 211 | 212 | | | |
| BRTIME | 6830 | | 217 | 218 | | | |
| BU1PRN | 6A18 | | 365 | 366 | | | |

CROSS REFERENCE                     DISPLAY0
SYMBOL   VAL  M DEFN REFS

| Symbol | Val | M | Defn | Refs | | | |
|---|---|---|---|---|---|---|---|
| BUTOFF | 6882 | | 258 | 259 | | | |
| BYTE0 | 686D | | 242 | 243 | | | |
| BYTE1 | 68F4 | | 308 | 309 | | | |
| CALSU | 005D | X | 462 | 632 | 643 | | |
| CBHFLG | 68E6 | | 296 | 297 | | | |
| CHK4OK | 009F | G | 653 | 465 | 634 | 644 | 702 |
| CHKSUM | 013C | X | 457 | 677 | 922 | | |
| CLR74 | 0008 | | 73 | | | | |
| CMXSET | 0013 | | 346 | 347 | | | |
| CNT | 680D | | 198 | 199 | 626 | 670 | 879 | 947 |
| COLCOR | 6888 | | 263 | 264 | | | |
| COLRSG | 6889 | | 264 | 265 | | | |
| COLRVA | 688A | | 265 | 266 | | | |
| CONFLG | 6885 | | 260 | 261 | | | |
| COPYM | 006E | X | 461 | 621 | | | |
| COPYS1 | 00A5 | R | 660 | 631 | 635 | 640 | 645 |
| COPYSU | 0052 | R | 620 | 597 | | | |
| COUNT | 6881 | | 257 | 258 | | | |
| CPADL | 0001 | | 70 | | | | |
| CRATIO | 68EC | | 302 | 303 | | | |
| CREG_1 | 0030 | | 111 | | | | |
| CREG_2 | 0031 | | 112 | | | | |
| CREG_3 | 0032 | | 113 | | | | |
| CREG_4 | 0033 | | 114 | | | | |
| CTIME | 6844 | | 227 | 228 | | | |
| CUTPUL | 6A32 | | 377 | 378 | | | |
| DBADGF | 0025 | | 172 | | | | |
| DBBAVG | 001E | | 165 | 611 | | | |
| DBBLUC | 0022 | | 169 | | | | |
| DBBNBP | 002B | | 178 | | | | |
| DBBNPT | 000C | | 147 | | | | |
| DBBO4N | 0031 | | 184 | | | | |
| DBBPBP | 0028 | | 175 | | | | |
| DBBPPT | 0009 | | 144 | | | | |
| DBBRAD | 002E | | 181 | | | | |
| DBBRPT | 0006 | | 141 | | | | |
| DBBSFR | 001B | | 162 | | | | |
| DBBSO | 0012 | | 153 | | | | |
| DBBSOO | 000F | | 150 | | | | |
| DBBSU | 0015 | | 156 | | | | |
| DBBSUU | 0018 | | 159 | | | | |
| DBBU1N | 0035 | | 187 | | | | |
| DBFRAT | 0023 | | 170 | | | | |
| DBFS | 0001 | | 136 | | | | |
| DBFT | 0002 | | 137 | | | | |
| DBGAVG | 001D | | 164 | 608 | | | |
| DBGNBP | 002A | | 177 | | | | |
| DBGNPT | 000B | | 146 | | | | |
| DBGO4N | 0030 | | 183 | | | | |
| DBGPBP | 0027 | | 174 | | | | |
| DBGPPT | 0008 | | 143 | | | | |
| DBGRAD | 002D | | 180 | | | | |
| DBGRPT | 0005 | | 140 | | | | |
| DBGSFR | 001A | | 161 | | | | |
| DBGSO | 0011 | | 152 | | | | |
| DBGSOO | 000E | | 149 | | | | |
| DBGSU | 0014 | | 155 | | | | |
| DBGSUU | 0017 | | 158 | | | | |
| DBGU1N | 0034 | | 186 | | | | |
| DBMAGC | 0024 | | 171 | | | | |
| DBMRET | 00CB | R | 679 | 593 | | | |
| DBPCNT | 001F | | 166 | 615 | | | |
| DBPT | 0003 | | 138 | | | | |
| DBPTR | 68E0 | | 293 | 294 | | | |

```
DBRAVG  001C      163  605
DBRNBP  0029      176
DBRNPT  000A      145
DBRO4N  002F      182
DBRPBP  0026      173
DBRPPT  0007      142
DBRRAD  002C      179
DBRRPT  0004      139
DBRSFR  0019      160
DBRSO   0010      151
DBRSOO  000D      148
DBRSU   0013      154
DBRSUU  0016      157
DBRU1N  0032      185
DBTRAT  0020      167
DBTRBG  0021      168
DEC     684C      231  232
DECDSP  684E      232  233
DEFLT1  00BF       79
DEFLT2  0060       90
DEFLT3  001F       99
DELTAT  68D8      289  290
DENBUT  68F9      313  314
DENMAX  001D      348  837  910
DIFF    6891      270  271
DIGPTR  6808      193  194
DISPHX  00E2  X   459  818
DKSHUT  0010       74
DMPY    012A  X   458  765  804
DOBLNK  68F8      312  313
DSPHEX  0132  X   458  757
DSPLH2  01FD  G   848  465  822
ECONSV  6862      235  236
ED2B    0003      335  336
EDITM   0150  X   457  722  798
EDITMS  0077  X   461  666
EM      0124  X   458  766
EMXSET  0031      347
ENDED   0063      576  729  795
ENDEM   6820      208  209
ENDRAM  0C6C      396
ENDVAL  6A72      392
ERAM    5000      190
ERROR   008B  X   461  587
EXECME  6816      207  208
EXRANG  6887      262  263
FACTOR  6A30      376  377
FLGSFS  68E9      299  300
FLOFLG  68F6      310  311
FNCADR  001B  R   592  588
FOOTSW  0000      103
FSFSF   68E8      298  299
FUNC    6870      245  246
FUNCTM  0094  X   461  582
FUNPTR  6878      251  252  695  726  728  760  887  889  9
GCH     687F      255  256
GCORR   6A22      370  371
GDDEN   6A4A      384  385
GDENVA  6A6E      390  391
GDICHR  6A68      387  388
GDISP   683A      222  223
GET255  0146  X   457  584  946
GETB1   02A8  R   954  952
GETBOB  0292  R   945  723  791
GETFNC  0006  R   581
GETHN   00C5  X   459  876
```

```
GETKEY  00D8 X   459  826
GETS1   00EC X   459  799
GETSET  00B1 X   460  623  638  668
GET_SU  00FF X   458  602
GEXP    6869     240  241
GNEG    6828     213  214
GO4PRN  6A10     361  362
GOFFS   6A28     373  374
GPTIME  6834     219  220
GREF    6822     210  211
GRNCHL  0006      84
GRNDEN  68A6     275  276
GRNMAS  6A1C     367  368
GRNNEG  6A0A     358  359
GRNREF  6A04     355  356
GRTIME  682E     216  217
GTSUAD  0159 X   457  700  809
GU1PRN  6A16     364  365
HEX     684A     230  231
HEXSGN  688B     266  267  950
HHRCNT  68EE     303  304
HIREL   0003      40
HRCNT   6811     202  203
ILLSUE  0042 X   462  661
IN74A   0002     105
IN74B   0003     106
INITSU  0027 R   602  598
IOIMG1  6864     236  237
IOIMG2  6865     237  238
IOIMG3  6866     238  239
IOIMG4  6895     272  273
K801    0040      76
KBD     0028     121
KBDBUF  680A     195  196  895
KBDFLG  680B     196  197
KEY0    000C     423
KEY1    0000     404
KEY1M   0021     443
KEY1P   0025     447
KEY2    0001     406
KEY2M   0020     442
KEY2P   0026     448
KEY3    0002     408
KEY4    0003     410
KEY5    0004     412
KEY6    0005     414
KEY7    0008     416
KEY8    0009     418
KEY9    000A     420
KEYABS  0009     419
KEYADV  001B     434
KEYB    0012     427
KEYC    0013     428
KEYCAN  0019     432  829  896
KEYCBH  0002     409
KEYENT  0018     431
KEYEXR  000A     421
KEYFCP  0004     413
KEYG    0011     426
KEYM    0014     429
KEYMIN  001E     440
KEYN    0023     445
KEYNM   0022     444
KEYNO   001E     441
KEYNP   0024     446
KEYOFF  001E     439
KEYON   001D     436
```

```
KEYORD  000D     424
KEYPAP  0003     411
KEYPLU  001D     437
KEYPRI  0000     405
KEYR    0010     425
KEYSFS  0001     407
KEYSLP  0008     417
KEYSPE  000B     422
KEYSTP  001C     435
KEYSU   0005     415
KEYTIM  001A     433
KEYY    0015     430
KEYYES  001D     438
KILLSU  016C  X  457   460   596
L801    0080      77
L801N   007F      78
LDCON   00A7     115
LOGO    68C3     278   279
LOOKM   00A8  X  460   788
LOREL   0089      41
MAKDEC  0209  R  859
MAKDIS  0053  X  462
MAX     68EA     300   301
MAX2B   0034     336   337   339
MAXCLC  0CFF     343   344
MAXFLD  0034     337   698   840   906
MAXSET  001E     345   347   396   630   639   683
MIN     68EB     301   302
MINCNT  6810     201   202
MINUS   68FB     315   316
MODE    6877     250   251   693   704   710   718   748   776   8
                 937
MPADL   0002      71
MSGCNT  6896     273   274
MSGSIZ  0008     334   763   766   770
MULPRN  6901     320   321
MXSETP  001F     344   345
N3      68C8     281   282
N3DEN   68DA     290   291
N3TIME  68DE     292   293
NEG     6840     225   226
NEGSLP  6872     247   248
NT      68CA     282   283
NTDEN   68DC     291   292
O4      68D4     287   288
OKOUT   027F  R  931   891
OKRET   027C  R  926   786   933
OKWRET  027A  R  924   921
OLDKEY  68FE     317   318
OPERAT  0001     104
ORDSRT  68FC     316   317
PAPADV  0020      75
PAPFLG  6886     261   262
POSSLP  6871     246   247
PRNCNT  6A2C     375   376
PRNSW   68C2     277   278
PUTASC  00CE  X  459   583   875   945
RAM     6800     189   192   340   343
RAMSUM  6904     322   323   678   923
RCH     687E     254   255
RCORR   6A20     369   370
RCSLOP  68E4     295   296
RDDEN   6A3C     383   384
RDENVA  6A6C     389   390
RDERR   0285  R  935   706   871
RDICHR  6A66     386   387
RDISP   6838     221   222
```

| | | | | | | | | | |
|---|---|---|---|---|---|---|---|---|---|
| READVL | 0111 | X | 458 | 784 | | | | | |
| REDCHL | 0007 | | 83 | | | | | | |
| REDDEN | 6898 | | 274 | 275 | | | | | |
| REDMAS | 6A1A | | 366 | 367 | | | | | |
| REDNEG | 6A08 | | 357 | 358 | | | | | |
| REDREF | 6A02 | | 354 | 355 | | | | | |
| REF | 683E | | 224 | 225 | | | | | |
| REM | 6846 | | 228 | 229 | | | | | |
| RES_SU | 00F5 | X | 458 | 617 | | | | | |
| REXP | 6867 | | 239 | 240 | | | | | |
| RNDIN | 0020 | | 122 | | | | | | |
| RNDOUT | 0008 | | 92 | | | | | | |
| RNEG | 6826 | | 212 | 213 | | | | | |
| RO4PRN | 6A0E | | 360 | 361 | | | | | |
| ROFFS | 6A26 | | 372 | 373 | | | | | |
| RPTFUN | 0127 | R | 727 | 720 | 892 | | | | |
| RPTIME | 6832 | | 218 | 219 | | | | | |
| RREF | 6820 | | 209 | 210 | | | | | |
| RREFM | 011B | X | 458 | 770 | | | | | |
| RRTIME | 682C | | 215 | 216 | | | | | |
| RSTCNT | 6A38 | | 380 | 381 | | | | | |
| RSTCTC | 0003 | | 116 | | | | | | |
| RTIME | 6842 | | 226 | 227 | | | | | |
| RU1PRN | 6A14 | | 363 | 364 | | | | | |
| SCNCNT | 680E | | 199 | 200 | | | | | |
| SCRTH1 | 68F0 | | 305 | 306 | 633 | 648 | 802 | 819 | 823 | 825 |
| SDBM0 | 01C2 | R | 811 | 842 | | | | | |
| SDBM1 | 01F5 | R | 839 | 836 | | | | | |
| SDBM2 | 01F7 | R | 841 | 838 | | | | | |
| SDBM3 | 01FA | R | 843 | 830 | | | | | |
| SECCNT | 680F | | 200 | 201 | | | | | |
| SEEDBM | 018B | G | 787 | 464 | 595 | | | | |
| SEG | 0020 | | 119 | | | | | | |
| SEGIMG | 6800 | | 192 | 193 | 852 | | | | |
| SEGOUT | 687A | | 253 | 254 | | | | | |
| SEL | 0018 | | 120 | | | | | | |
| SELECT | 0081 | X | 461 | 589 | | | | | |
| SELPTR | 6809 | | 194 | 195 | | | | | |
| SET0 | 00BE | G | 674 | 464 | 628 | 651 | 662 | 730 | 845 | 897 | 9? |
| SET00 | 00CC | R | 682 | 673 | | | | | |
| SET1 | 00D8 | G | 688 | 464 | 606 | 609 | 612 | 616 | | |
| SET12B | 0031 | | 333 | 336 | | | | | |
| SET2 | 010D | R | 711 | 708 | | | | | |
| SETDB1 | 00AB | G | 665 | 464 | 594 | | | | |
| SETDBM | 0000 | G | 578 | 464 | | | | | |
| SETM | 0109 | X | 458 | 790 | | | | | |
| SETNUM | 686E | | 243 | 244 | 579 | 676 | 685 | 689 | 767 | 792 | 7? |
| | | | | 902 | | | | | |
| SETSAV | 686F | | 244 | 245 | 580 | 675 | 793 | | | |
| SETSIZ | 006A | | 339 | 344 | 346 | 396 | 649 | | | |
| SETUP0 | 6A00 | | 341 | 342 | 354 | | | | |
| SETVAL | 6875 | | 249 | 250 | 692 | 916 | 941 | | | |
| SFSFLG | 68E7 | | 297 | 298 | | | | | |
| SIGN | 6815 | | 206 | 207 | | | | | |
| SLPFLG | 68F3 | | 307 | 308 | | | | | |
| SLPO1 | 68CC | | 283 | 284 | | | | | |
| SLPO2 | 68CE | | 284 | 285 | | | | | |
| SLPU1 | 68D0 | | 285 | 286 | | | | | |
| SLPU2 | 68D2 | | 286 | 287 | | | | | |
| SNDWAT | 009E | X | 460 | 622 | 637 | 667 | 789 | | | |
| SPCHR | 0021 | | 126 | | | | | | |
| SRTCNT | 6A3A | | 381 | 383 | | | | | |
| SRTSSR | 0010 | | 98 | | | | | | |
| SSR1 | 0000 | | 68 | | | | | | |
| SSR12 | 0001 | | 94 | | | | | | |
| SSR7 | 0004 | | 96 | | | | | | |
| SSR8 | 0008 | | 97 | | | | | | |

```
SSRXX   0002       95
STACK   6A00       340  341
STORVL  00BB  X    460  882  918
SUADDR  6B00       342  343
SUERR   0163  X    457  684
SUFLAG  6879       252  253
SUPTR   6873       248  249  701  744
SUV0    013A  R    741
SUV1    0263  R    914  778  780
SUV2    021B  R    873  783
SUV3    0152  R    759  750
SUV4    016F  R    773
SUV4A   016E  R    771  769
SUVA    0142  R    747
SUVALD  0113  R    716  703
TAPON   0010       87
TAPOUT  0008       86
TBLSAV  6893       271  272
TEMP    6812       203  204
TEMP1   6813       204  205
TEMPKE  680C       197  198
TEMPSU  68F2       306  307
TESTFU  0252  R    900  733  890
TIMER   6814       205  206
TIME_1  0018       117
TIME_2  0000       118
TIMFLG  688C       267  268
TOOM    0066  X    462  636
TSTFN1  025F  R    908  904
TTIME   688D       268  269
TTIME1  688F       269  270
TUNFLG  68F5       309  310
U1      68D6       288  289
WAITSW  0004       107
WRTERR  0285  R    936  699
YPADL   0004       72
Y_NFLG  68FF       318  319
```

```
                              DISPLAY
LOC    OBJ CODE  M STMT SOURCE STATEMENT

451    *LIST ON
              452    ;
              453    ;         270
              454    ;*LIST OFF
              455    ;
              456    ;;;;;;;;;;;;;;;;;;;;;;;;;;;;;;;;;;
              457    ;
              458    ;                        E D I T
              459    ;
              460    ;         04-19-82       BB
              461    ;         05-02-82       AMF
              462    ;         05-05-82       AMF
              463    ;         05-10-82       BB
              464    ;         05-11-82       AMF
              465    ;         05-13-82       AMF
              466    ;         05-14-82       BB
              467    ;         05-25-82       AMF
              468    ;         07-20-82       AMF
              469    ;         08-10-82       AMF
              470    ;         09-01-82       AMF
              471    ;         10-23-82       BB
              472    ;         11-27-82       BB
              473    ;         12-20-82       BB
              474    ;
              475    ;;;;;;;;;;;;;;;;;;;;;;;;;;;;;;;;;;
              476    ;
```

```
                         477                EXTERNAL
                         478                EXTERNAL
                         479                EXTERNAL
                         480                EXTERNAL
                         481                EXTERNAL
                         482                EXTERNAL
                         483                EXTERNAL
                         484                EXTERNAL
                         485                EXTERNAL
                         486                EXTERNAL
                         487  ;
                         488                GLOBAL
                         489                GLOBAL
                         490                GLOBAL
                         491                GLOBAL
                         492  ;
                         493  ;
                         494  ;
                         495  ;
                         496  ;
                         497  SELRUT:
0000  FE1B               498           CP   KEYTIM+1
0002  D20000    X        499           JP   NC,ERROR
0005  211700    R        500           LD   HL,ROUTAD
                         501  ;
                         502  ;
                         503  SELECT:
0008  CD0C00    R        504           CALL SELCT1
000B  E9                 505           JP   (HL)
                         506  ;
                         507  SELCT1:
000C  87                 508           ADD  A,A
000D  110000             509           LD   DE,0
0010  5F                 510           LD   E,A
0011  19                 511           ADD  HL,DE
0012  5E                 512           LD   E,(HL)
0013  23                 513           INC  HL
0014  56                 514           LD   D,(HL)
0015  EB                 515           EX   DE,HL
0016  C9                 516           RET
                         517  ROUTAD:
0017  1901      R        518           DEFW      PRI
0019  6201      R        519           DEFW      SFS
001B  4001      R        520           DEFW      CBH
001D  2C01      R        521           DEFW      PAP
001F  8A01      R        522           DEFW      SFS_1
0021  0000      X        523           DEFW      SETUP
0023  0000      X        524           DEFW      ERROR
0025  0000      X        525           DEFW      ERROR
0027  0000      X        526           DEFW      RDAMB
0029  0000      X        527           DEFW      ENTTIM
002B  0000      X        528           DEFW      CMCORR
002D  0000      X        529           DEFW      ERROR
002F  0000      X        530           DEFW      SETDBM
0031  0602      R        531           DEFW      SAFE
0033  0000      X        532           DEFW      ERROR
0035  0000      X        533           DEFW      ERROR
0037  0000      X        534           DEFW      ERROR
0039  0000      X        535           DEFW      ERROR
003B  0000      X        536           DEFW      ERROR
003D  0000      X        537           DEFW      ERROR
003F  0000      X        538           DEFW      ERROR
0041  0000      X        539           DEFW      ERROR
0043  0000      X        540           DEFW      ERROR
0045  0000      X        541           DEFW      ERROR
0047  7601      R        542           DEFW      SLP
```

```
0049   4D00            R   543            DEFW        CLRSF
004B   0000            X   544            DEFW        MASCNT
                           545    ;
004D   110000          X   546   CLRSF    LD          DE,CLRMSG
0050   CDDB01          R   547            CALL        SNDWAT
0053   CD0000          X   548            CALL        INITSF
0056   C9                  549            RET
                           550    ;
                           551    ;
0057   CD0000          X   552   DISPHX   CALL        BCD
005A   E5                  553            PUSH        HL
005B   217A68              554            LD          HL,SEGOUT
005E   CDA400          R   555            CALL        SUPRESS
0061   CDA400          R   556            CALL        SUPRESS
0064   CDA400          R   557            CALL        SUPRESS
0067   78                  558            LD          A,B
0068   B7                  559            OR          A
0069   CC9800          R   560            CALL        Z,SUPRIT
006C   CDA600          R   561            CALL        MAKDIS
006F   79                  562            LD          A,C
0070   80                  563            ADD         A,B
0071   79                  564            LD          A,C
0072   CC9800          R   565            CALL        Z,SUPRIT
0075   CDA600          R   566            CALL        MAKDIS
0078   7A                  567            LD          A,D
0079   81                  568            ADD         A,C
007A   80                  569            ADD         A,B
007B   7A                  570            LD          A,D
007C   CC9800          R   571            CALL        Z,SUPRIT
007F   CDA600          R   572            CALL        MAKDIS
0082   7B                  573            LD          A,E
0083   82                  574            ADD         A,D
0084   81                  575            ADD         A,C
0085   80                  576            ADD         A,B
0086   7B                  577            LD          A,E
0087   CC9800          R   578            CALL        Z,SUPRIT
008A   CDA600          R   579            CALL        MAKDIS
008D   D1                  580            POP         DE
008E   7B                  581            LD          A,E
008F   CDA600          R   582            CALL        MAKDIS
0092   117A68              583            LD          DE,SEGOUT
0095   C30000          X   584            JP          PUTASC
                           585    ;
                           586    ;
                           587   SUPRIT:
0098   3E21                588            LD          A,'X'-'7'
009A   C9                  589            RET
                           590    ;
                           591   DSPHEX:
009B   CD5700          R   592            CALL        DISPHX
009E   0E20                593            LD          C,1*32
00A0   CD0000          X   594            CALL        WAITKY
00A3   C9                  595            RET
                           596    ;
                           597    ;
                           598   SUPRESS:
00A4   3E21                599            LD          A,'X'-'7'
                           600   MAKDIS:
00A6   C637                601            ADD         A,'7'
                           602   MKDIS1:
00A8   77                  603            LD          (HL),A
00A9   23                  604            INC         HL
00AA   C9                  605            RET
                           606    ;
                           607    ;
                           608   SUERR:
```

```
00AB  CDB100  R  609           CALL   ILLSUE
00AE  C30000  X  610           JP     SETDBM
               611   ;
               612   ILLSUE:
00B1  110000  X  613           LD     DE,ILLSUM
00B4  C3DB01  R  614           JP     SNDWAT
               615   ;
               616   KILLSU:
00B7  110000  X  617           LD     DE,DELSUM
00BA  CDDB01  R  618           CALL   SNDWAT
00BD  CDD600  R  619           CALL   KILSET
00C0  FE1F       620           CP     MAXSET+1
00C2  D2AB00  R  621           JP     NC,SUERR
00C5  110000     622           LD     DE,C
00C8  5F         623           LD     E,A
00C9  CDF900  R  624           CALL   GTSUAD
00CC  3E35       625           LD     A,SETSIZ/2
               626   KILLALL:
00CE  36DE       627           LD     (HL),0DEH
00D0  23         628           INC    HL
00D1  36AD       629           LD     (HL),0ADH
               630   ;         INC    HL
               631   ;         DEC    A
               632   ;         JP     NZ,KILLALL
00D3  C30000  X  633           JP     SET0
               634   ;
               635   ;
               636   KILSET:
00D6  110000  X  637           LD     DE,SETM
00D9  C3EF00  R  638           JP     GETS1
               639   ;
               640   ;
               641   GETSET:
00DC  110000  X  642           LD     DE,SETM
00DF  CDEF00  R  643           CALL   GETS1
00E2  FE1F       644           CP     MAXSET+1
00E4  D2E800  R  645           JP     NC,SETERR
00E7  C9         646           RET
               647   SETERR:
00E8  E1         648           POP    HL
00E9  CDB100  R  649           CALL   ILLSUE
00EC  C30000  X  650           JP     SET0
               651   ;
               652   ;
               653   GETS1:
               654   GETCV1:
00EF  CD0000  X  655           CALL   PUTASC
00F2  CD0000  X  656           CALL   GET255
00F5  79         657           LD     A,C
00F6  FE35       658           CP     MAX2B+1
00F8  C9         659           RET
               660   ;
               661   ;
               662   ;
               663   ;
               664   GTSUAD:
00F9  3A6E68     665           LD     A,(SETNUM)
00FC  B7         666           OR     A
00FD  CA0B01  R  667           JP     Z,DENSADD
               668   CALSU:
0100  016A00     669           LD     BC,SETSIZ
0103  CD0000  X  670           CALL   DMPY
0106  21006B     671           LD     HL,SUADDR
0109  19         672           ADD    HL,DE
010A  C9         673           RET
               674   DENSADD:
```

```
010B  21006A        675           LD    HL,SETUP0
010E  C9            676           RET
              677   ;
              678   ;
              679   READVL:
010F  1600          680           LD    D,0
0111  5E            681           LD    E,(HL)
              682           ;LD   A,(FUNPTR)
              683           ;CP   MAX2B+1
              684           ;RET  NC
0112  23            685           INC   HL
0113  56            686           LD    D,(HL)
0114  C9            687           RET
              688   ;
              689   STORVL:
0115  73            690           LD    (HL),E
              691           ;LD   A,(FUNPTR)
              692           ;CP   MAX2B+1
              693           ;RET  NC
0116  23            694           INC   HL
0117  72            695           LD    (HL),D
0118  C9            696           RET
              697   *EJECT
              698   ;
              699   ;           MULTIPLE PRINT F
              700   ;
              701   ;DISPLAY    COUNT ??
              702   ;
              703   ;KEYS:      A. PRI KEY
              704   ;           B. THREE (3) NUM
              705   ;
              706   ;
              707   ;INPUT:     ANY THREE DIGIT
              708   ;
              709   ;
              710   ;
              711   ;OUTPUT:    A. COUNT ?? MSG
              712   ;           B. SELECTED EXPO
              713   ;               PRINT.
              714   ;           C. VALUE STORED
              715   ;
              716   ;
0119  110000  X  717   PRI       LD    DE,PRIM
011C  CD0000  X  718             CALL  PUTASC
011F  CD0000  X  719             CALL  GET255
0122  79           720            LD    A,C
0123  B0           721            OR    B
0124  2801         722            JR    Z,PRI1
0126  0B           723            DEC   BC
0127  ED430169     724   PRI1    LD    (MULPRN),BC
012B  C9           725            RET
              726   ;
              727   ;
              728   ;
              729   ;                     PAPER AD
              730   ;
              731   ;
              732   ;DISPLAY:   PAP
              733   ;
              734   ;KEY:       1 KEY
              735   ;                A. ON
              736   ;                B. OFF
              737   ;
              738   PAP:
012C  110000  X  739           LD    DE,PAPONM
012F  3A8668     740           LD    A,(PAPFLG)
```

```
0132   B7              741           OR    A
0133   C23901    R     742           JP    NZ,PAP1
0136   110000    X     743           LD    DE,PAPOFM
                       744   PAP1:
0139   CDB901    R     745           CALL  GETON
013C   328668          746           LD    (PAPFLG),A
013F   C9              747           RET
                       748   ;
                       749   ;
                       750   ;
                       751   CBH:
0140   110000    X     752           LD    DE,CBHONM
0143   3AE668          753           LD    A,(CBHFLG)
0146   B7              754           OR    A
0147   C24D01    R     755           JP    NZ,CBH1
014A   110000    X     756           LD    DE,CBHOFM
                       757   CBH1:
014D   CDB901    R     758           CALL  GETON
0150   32E668          759           LD    (CBHFLG),A
0153   B7              760           OR    A
0154   C0              761           RET   NZ
0155   21E803          762           LD    HL,1000
0158   22206A          763           LD    (RCORR),HL
015B   22226A          764           LD    (GCORR),HL
015E   22246A          765           LD    (BCORR),HL
0161   C9              766           RET
                       767   ;
                       768   ;
                       769   SFS:
0162   110000    X     770           LD    DE,SFSONM
0165   3AE968          771           LD    A,(FLGSFS)
0168   B7              772           OR    A
0169   C26F01    R     773           JP    NZ,SFS1
016C   110000    X     774           LD    DE,SFSOFM
                       775   SFS1:
016F   CDB901    R     776           CALL  GETON
0172   32E968          777           LD    (FLGSFS),A
0175   C9              778           RET
                       779   ;
0176   110000    X     780   SLP     LD    DE,SLPONM
0179   3AF368          781           LD    A,(SLPFLG)
017C   B7              782           OR    A
017D   C28301    R     783           JP    NZ,SLP1
0180   110000    X     784           LD    DE,SLPOFM
0183   CDB901    R     785   SLP1    CALL  GETON
0186   32F368          786           LD    (SLPFLG),A
0189   C9              787           RET
                       788   ;
018A   3E01            789   SFS_1   LD    A,1
018C   32E868          790           LD    (FSFSF),A
018F   110000    X     791           LD    DE,MSG13
0192   CDDB01    R     792           CALL  SNDWAT
0195   C9              793           RET
                       794   ;
                       795   ;
                       796   ;                       BULLS-EY
                       797   ;
                       798   ;DISPLAY:                BEP
                       799   ;
                       800   ;
                       801   ;             A. DISABLE SFS (
                       802   ;
                       803   BEP:
0196   110000    X     804           LD    DE,BEPONM
0199   3A8468          805           LD    A,(BEPFLG)
019C   B7              806           OR    A
```

```
019D  C2A301   R  807            JP    NZ,BEP1
01A0  110000   X  808            LD    DE,BEPOFM
                  809  BEP1:
01A3  CDB901   R  810            CALL  GETON
01A6  328468      811            LD    (BEPFLG),A
01A9  C9          812            RET
                  813  SENDNC:
01AA  C30000   X  814            JP    PUTASC
                  815  ;
                  816  ;
                  817  SPRINT:
01AD  110000   X  818            LD    DE,PRINTM
                  819  SENDNG:
01B0  CDAA01   R  820            CALL  SENDNC
01B3  C30000   X  821            JP    GETKEY
                  822  ;
                  823  ;
                  824  GETXON:
01B6  110000   X  825            LD    DE,DOVERM
                  826  GETON:
01B9  CDB001   R  827            CALL  SENDNG
01BC  FE1D        828            CP    KEYON
01BE  CAC901   R  829            JP    Z,DOAON
01C1  FE1E        830            CP    KEYOFF
01C3  CAD201   R  831            JP    Z,DOAOFF
01C6  C3B601   R  832            JP    GETXON
                  833  DOAON:
01C9  110000   X  834            LD    DE,ONM
01CC  CDDB01   R  835            CALL  SNDWAT
01CF  3E01        836            LD    A,01
01D1  C9          837            RET
                  838  ;
                  839  DOAOFF:
01D2  110000   X  840            LD    DE,OFFM
01D5  CDDB01   R  841            CALL  SNDWAT
01D8  3E00        842            LD    A,0
01DA  C9          843            RET
                  844  ;
                  845  ;
                  846  ;
                  847  SNDWAT:
01DB  CD0000   X  848            CALL  PUTASC
                  849  WAIT1:
01DE  0E20        850            LD    C,32
01E0  C30000   X  851            JP    WAITKY
                  852  ;
                  853  SETEX:
01E3  110000   X  854            LD    DE,EXRNM
01E6  CDAA01   R  855            CALL  SENDNC
01E9  CD0000   X  856            CALL  GETKEY
01EC  FE0C        857            CP    KEY0
01EE  CAFF01   R  858            JP    Z,EXT0
01F1  FE05        859            CP    KEY6
01F3  DA0102   R  860            JP    C,EXT1
01F6  110000   X  861            LD    DE,ERRO2M
01F9  CDAA01   R  862            CALL  SENDNC
01FC  C3E301   R  863            JP    SETEX
                  864  ;
                  865  EXT0:
01FF  3EFF        866            LD    A,0FFH
                  867  EXT1:
0201  3C          868            INC   A
0202  328768      869            LD    (EXRANG),A
0205  C9          870            RET
                  871  ;
                  872  ;
```

```
                               873  ;EXTRNG:
                               874  ;        CALL    SETEX
                               875  ;        CALL    SPRINT
                               876  ;        CALL    BUTT7
                               877  ;        LD      A,0
                               878  ;        LD      (EXRANG),A
                               879  ;        RET
                               880  ;
                               881  ;
                               882  SAFE:
0206   CD0000    X              883           CALL    GETKEY
0209   FE0A                     884           CP      KEY9
020B   C20000    X              885           JP      NZ,ERROR
020E   CD0000    X              886           CALL    GETKEY
0211   FE08                     887           CP      KEY7
0213   C20000    X              888           JP      NZ,ERROR
0216   CD0000    X              889           CALL    GETKEY
0219   FE03                     890           CP      KEY4
021B   C20000    X              891           JP      NZ,ERROR
021E   CD0000    X              892           CALL    GETKEY
0221   FE04                     893           CP      KEY5
0223   C20000    X              894           JP      NZ,ERROR
0226   113202    R              895           LD      DE,HOPEM
0229   CD0000    X              896           CALL    PUTASC
022C   0EFF                     897           LD      C,255
022E   CD0000    X              898           CALL    WAIT
0231   C9                       899           RET
                               900  ;
0232   58485848                 901  HOPEM    DEFM    'XHXHOPEX'
                               902  *END
```

CROSS REFERENCE                     DISPLAY
SYMBOL   VAL  M  DEFN  REFS

```
ADD      6906     323
ADHIGH   0008     125
ADLOW    0010     124
ADMODE   68FA     314   315
ADSEL    0010     123
ADVCNT   6900     319   320
ADVPUL   6A34     378   379
ADWAIT   6A36     379   380
AD_RUN   0020     88
ANS      6848     229   230
ANSLP    6861     234   235
ANSSAV   6857     233   234
BANK2    0010     81
BANK4    0000     101
BCD      029C X   478   552
BCH      6880     256   257
BCORR    6A24     371   372   765
BCOUNT   68F7     311   312
BDDEN    6A58     385   386
BDENVA   6A70     391   392
BDICHR   6A6A     388   389
BDISP    683C     223   224
BEEPER   0040     89
BEP      0196 G   803   491
BEP1     01A3 R   809   807
BEPFLG   6884     259   260   805   811
BEPOFM   017E X   483   808
BEPONM   01D9 X   481   804
BEXP     686B     241   242
BLKCNT   68EF     304   305
BLUCHL   0005     85
```

CROSS REFERENCE    DISPLAY
SYMBOL   VAL  M DEFN REFS

| SYMBOL | VAL | M | DEFN | REFS | | |
|---|---|---|---|---|---|---|
| BLUDEN | 68B4 | | 276 | 277 | | |
| BLUMAS | 6A1E | | 368 | 369 | | |
| BLUNEG | 6A0C | | 359 | 360 | | |
| BLUREF | 6A06 | | 356 | 357 | | |
| BNEG | 682A | | 214 | 215 | | |
| BO4PRN | 6A12 | | 362 | 363 | | |
| BOFFS | 6A2A | | 374 | 375 | | |
| BOMOUT | 6903 | | 321 | 322 | | |
| BP | 68E2 | | 294 | 295 | | |
| BP0 | 68C6 | | 280 | 281 | | |
| BPTIME | 6836 | | 220 | 221 | | |
| BPU | 68C4 | | 279 | 280 | | |
| BREF | 6824 | | 211 | 212 | | |
| BRTIME | 6830 | | 217 | 218 | | |
| BU1PRN | 6A18 | | 365 | 366 | | |
| BUTOFF | 6882 | | 258 | 259 | | |
| BUTT7 | 0262 | X | 479 | | | |
| BUTT7N | 023A | X | 480 | | | |
| BYTE0 | 686D | | 242 | 243 | | |
| BYTE1 | 68F4 | | 308 | 309 | | |
| CALSU | 0100 | G | 668 | 490 | | |
| CBH | 0140 | R | 751 | 520 | | |
| CBH1 | 014D | R | 757 | 755 | | |
| CBHFLG | 68E6 | | 296 | 297 | 753 | 759 |
| CBHOFM | 010C | X | 485 | 756 | | |
| CBHONM | 0116 | X | 485 | 752 | | |
| CLR74 | 0008 | | 73 | | | |
| CLRMSG | 0213 | X | 480 | 546 | | |
| CLRSF | 004D | R | 546 | 543 | | |
| CMCORR | 0209 | X | 480 | 528 | | |
| CMXSET | 0013 | | 346 | 347 | | |
| CNT | 680D | | 198 | 199 | | |
| COLCOR | 6888 | | 263 | 264 | | |
| COLRSG | 6889 | | 264 | 265 | | |
| COLRVA | 688A | | 265 | 266 | | |
| CONFLG | 6885 | | 260 | 261 | | |
| COUNT | 6881 | | 257 | 258 | | |
| CPADL | 0001 | | 70 | | | |
| CRATIO | 68EC | | 302 | 303 | | |
| CRE8RF | 0274 | X | 479 | | | |
| CREG_1 | 0030 | | 111 | | | |
| CREG_2 | 0031 | | 112 | | | |
| CREG_3 | 0032 | | 113 | | | |
| CREG_4 | 0033 | | 114 | | | |
| CTIME | 6844 | | 227 | 228 | | |
| CUTPUL | 6A32 | | 377 | 378 | | |
| DBADGF | 0025 | | 172 | | | |
| DBBAVG | 001E | | 165 | | | |
| DBBLUC | 0022 | | 169 | | | |
| DBBNBP | 002B | | 178 | | | |
| DBBNPT | 000C | | 147 | | | |
| DBBO4N | 0031 | | 184 | | | |
| DBBPBP | 0028 | | 175 | | | |
| DBBPPT | 0009 | | 144 | | | |
| DBBRAD | 002E | | 181 | | | |
| DBBRPT | 0006 | | 141 | | | |
| DBBSFR | 001B | | 162 | | | |
| DBBSO | 0012 | | 153 | | | |
| DBBSOO | 000F | | 150 | | | |
| DBBSU | 0015 | | 156 | | | |
| DBBSUU | 0018 | | 159 | | | |
| DBBU1N | 0035 | | 187 | | | |
| DBFRAT | 0023 | | 170 | | | |

| | | | | |
|---|---|---|---|---|
| DBFS | 0001 | 136 | | |
| DBFT | 0002 | 137 | | |
| DBGAVG | 001D | 164 | | |
| DBGNBP | 002A | 177 | | |
| DBGNPT | 000B | 146 | | |
| DBGO4N | 0030 | 183 | | |
| DBGPBP | 0027 | 174 | | |
| DBGPPT | 0008 | 143 | | |
| DBGRAD | 002D | 180 | | |
| DBGRPT | 0005 | 140 | | |
| DBGSFR | 001A | 161 | | |
| DBGSO | 0011 | 152 | | |
| DBGSOO | 000E | 149 | | |
| DBGSU | 0014 | 155 | | |
| DBGSUU | 0017 | 158 | | |
| DBGU1N | 0034 | 186 | | |
| DBMAGC | 0024 | 171 | | |
| DBPCNT | 001F | 166 | | |
| DBPT | 0003 | 138 | | |
| DBPTR | 68E0 | 293 | 294 | |
| DBRAVG | 001C | 163 | | |
| DBRNBP | 0029 | 176 | | |
| DBRNPT | 000A | 145 | | |
| DBRO4N | 002F | 182 | | |
| DBRPBP | 0026 | 173 | | |
| DBRPPT | 0007 | 142 | | |
| DBRRAD | 002C | 179 | | |
| DBRRPT | 0004 | 139 | | |
| DBRSFR | 0019 | 160 | | |
| DBRSO | 0010 | 151 | | |
| DBRSOO | 000D | 148 | | |
| DBRSU | 0013 | 154 | | |
| DBRSUU | 0016 | 157 | | |
| DBRU1N | 0032 | 185 | | |
| DBTRAT | 0020 | 167 | | |
| DBTRBG | 0021 | 168 | | |
| DEC | 684C | 231 | 232 | |
| DECDSP | 684E | 232 | 233 | |
| DECTHX | 00F9 X | 485 | | |
| DEFLT1 | 00BF | 79 | | |
| DEFLT2 | 0060 | 90 | | |
| DEFLT3 | 001F | 99 | | |
| DELSUM | 01BF X | 482 | 617 | |
| DELTAT | 68D8 | 289 | 290 | |
| DENBUT | 68F9 | 313 | 314 | |
| DENMAX | 001D | 348 | | |
| DENSAD | 010B R | 674 | 667 | |
| DIFF | 6891 | 270 | 271 | |
| DIGPTR | 6808 | 193 | 194 | |
| DISPHX | 0057 G | 552 | 488 | 592 |
| DKSHUT | 0010 | 74 | | |
| DMPY | 02AC X | 478 | 670 | |
| DOAOFF | 01D2 R | 839 | 831 | |
| DOAON | 01C9 R | 833 | 829 | |
| DOBLNK | 68F8 | 312 | 313 | |
| DOVERM | 0156 X | 484 | 825 | |
| DSPBCD | 019C X | 482 | | |
| DSPHEX | 009B G | 591 | 488 | |
| ECONSV | 6862 | 235 | 236 | |
| ED2B | 0003 | 335 | 336 | |
| EDITM | 01E3 X | 481 | | |
| EM | 01D3 X | 482 | | |
| EMXSET | 0031 | 347 | | |
| ENDEM | 6820 | 208 | 209 | |
| ENDRAM | 0C6C | 396 | | |
| ENDVAL | 6A72 | 392 | | |

| | | | | | | | | | |
|---|---|---|---|---|---|---|---|---|---|
| ENTTIM | 02C7 | X | 477 | 527 | | | | | |
| ERAM | 5000 | | 190 | | | | | | |
| ERRO2M | 0134 | X | 484 | 861 | | | | | |
| ERROR | 02F7 | X | 477 | 499 | 524 | 525 | 529 | 532 | 533 | 534 |
| | | | | 538 | 539 | 540 | 541 | 885 | 888 | 891 |
| EXECME | 6816 | | 207 | 208 | | | | | | |
| EXRANG | 6887 | | 262 | 263 | 869 | | | | | |
| EXRNM | 013E | X | 484 | 854 | | | | | | |
| EXT0 | 01FF | R | 865 | 858 | | | | | | |
| EXT1 | 0201 | R | 867 | 860 | | | | | | |
| FACTOR | 6A30 | | 376 | 377 | | | | | | |
| FLGSFS | 68E9 | | 299 | 300 | 771 | 777 | | | | |
| FLOFLG | 68F6 | | 310 | 311 | | | | | | |
| FOOTSW | 0000 | | 103 | | | | | | | |
| FSFSF | 68E8 | | 298 | 299 | 790 | | | | | |
| FUNC | 6870 | | 245 | 246 | | | | | | |
| FUNCTM | 00DE | X | 485 | | | | | | | |
| FUNPTR | 6878 | | 251 | 252 | | | | | | |
| GCH | 687F | | 255 | 256 | | | | | | |
| GCORR | 6A22 | | 370 | 371 | 764 | | | | | |
| GDDEN | 6A4A | | 384 | 385 | | | | | | |
| GDENVA | 6A6E | | 390 | 391 | | | | | | |
| GDICHR | 6A68 | | 387 | 388 | | | | | | |
| GDISP | 683A | | 222 | 223 | | | | | | |
| GET255 | 021D | X | 480 | 656 | 719 | | | | | |
| GETCV | 02B4 | X | 478 | | | | | | | |
| GETCV1 | 00EF | R | 654 | | | | | | | |
| GETDI1 | 012A | X | 484 | | | | | | | |
| GETHN | 02A3 | X | 478 | | | | | | | |
| GETKEY | 02D9 | X | 477 | 821 | 856 | 883 | 886 | 889 | 892 | |
| GETMNM | 0160 | X | 483 | | | | | | | |
| GETNUM | 02ED | X | 477 | | | | | | | |
| GETON | 01B9 | R | 826 | 745 | 758 | 776 | 785 | 810 | | |
| GETS1 | 00EF | G | 653 | 489 | 638 | 643 | | | | |
| GETSET | 00DC | G | 641 | 488 | | | | | | |
| GETXON | 01B6 | R | 824 | 832 | | | | | | |
| GEXP | 6869 | | 240 | 241 | | | | | | |
| GNEG | 6828 | | 213 | 214 | | | | | | |
| GO4PRN | 6A10 | | 361 | 362 | | | | | | |
| GOFFS | 6A28 | | 373 | 374 | | | | | | |
| GPTIME | 6834 | | 219 | 220 | | | | | | |
| GREF | 6822 | | 210 | 211 | | | | | | |
| GRNCHL | 0006 | | 84 | | | | | | | |
| GRNDEN | 68A6 | | 275 | 276 | | | | | | |
| GRNMAS | 6A1C | | 367 | 368 | | | | | | |
| GRNNEG | 6A0A | | 358 | 359 | | | | | | |
| GRNREF | 6A04 | | 355 | 356 | | | | | | |
| GRTIME | 682E | | 216 | 217 | | | | | | |
| GTSUAD | 00F9 | G | 664 | 489 | 624 | | | | | |
| GU1PRN | 6A16 | | 364 | 365 | | | | | | |
| HEX | 684A | | 230 | 231 | | | | | | |
| HEXSGN | 688B | | 266 | 267 | | | | | | |
| HHRCNT | 68EE | | 303 | 304 | | | | | | |
| HIREL | 0003 | | 40 | | | | | | | |
| HOPEM | 0232 | R | 901 | 895 | | | | | | |
| HRCNT | 6811 | | 202 | 203 | | | | | | |
| ILLSUE | 00B1 | G | 612 | 488 | 609 | 649 | | | | |
| ILLSUM | 01C9 | X | 482 | 613 | | | | | | |
| IN74A | 0002 | | 105 | | | | | | | |
| IN74B | 0003 | | 106 | | | | | | | |
| INITSF | 0244 | X | 479 | 548 | | | | | | |
| IOIMG1 | 6864 | | 236 | 237 | | | | | | |
| IOIMG2 | 6865 | | 237 | 238 | | | | | | |
| IOIMG3 | 6866 | | 238 | 239 | | | | | | |
| IOIMG4 | 6895 | | 272 | 273 | | | | | | |
| K801 | 0040 | | 76 | | | | | | | |

```
KBD     0028      121
KBDBUF  680A      195   196
KBDFLG  680B      196   197
KEY0    000C      423   857
KEY1    0000      404
KEY1M   0021      443
KEY1P   0025      447
KEY2    0001      406
KEY2M   0020      442
KEY2P   0026      448
KEY3    0002      408
KEY4    0003      410   890
KEY5    0004      412   893
KEY6    0005      414   859
KEY7    0008      416   887
KEY8    0009      418
KEY9    000A      420   884
KEYABS  0009      419
KEYADV  001B      434
KEYB    0012      427
KEYC    0013      428
KEYCAN  0019      432
KEYCBH  0002      409
KEYENT  0018      431
KEYEXR  000A      421
KEYFCP  0004      413
KEYG    0011      426
KEYM    0014      429
KEYMIN  001E      440
KEYN    0023      445
KEYNM   0022      444
KEYNO   001E      441
KEYNP   0024      446
KEYOFF  001E      439   830
KEYON   001D      436   828
KEYORD  000D      424
KEYPAP  0003      411
KEYPLU  001D      437
KEYPRI  0000      405
KEYR    0010      425
KEYSFS  0001      407
KEYSLP  0008      417
KEYSPE  000B      422
KEYSTP  001C      435
KEYSU   0005      415
KEYTIM  001A      433   498
KEYY    0015      430
KEYYES  001D      438
KILLAL  00CE  R   626
KILLSU  00B7  G   616   489
KILSET  00D6  R   636   619
L801    0080       77
L801N   007F       78
LDCON   00A7      115
LOGO    68C3      278   279
LOREL   0089       41
MAKDIS  00A6  G   600   491   561   566   572   579   582
MASCNT  00CC  X   486   544
MAX     68EA      300   301
MAX2B   0034      336   337   339   658
MAXCLC  00FF      343   344
MAXFLD  0034      337
MAXSET  001E      345   347   396   620   644
MIN     68EB      301   302
MINCNT  6810      201   202
MINUS   68FB      315   316
```

| | | | | | | | |
|---|---|---|---|---|---|---|---|
| MKDIS1 | 00A8 | R | 602 | | | | |
| MODE | 6877 | | 250 | 251 | | | |
| MPADL | 0002 | | 71 | | | | |
| MSG0 | 00D6 | X | 486 | | | | |
| MSG13 | 0103 | X | 485 | 791 | | | |
| MSGCNT | 6896 | | 273 | 274 | | | |
| MSGSIZ | 0008 | | 334 | | | | |
| MULPRN | 6901 | | 320 | 321 | 724 | | |
| MXSETP | 001F | | 344 | 345 | | | |
| N3 | 68C8 | | 281 | 282 | | | |
| N3DEN | 68DA | | 290 | 291 | | | |
| N3TIME | 68DE | | 292 | 293 | | | |
| NEG | 6840 | | 225 | 226 | | | |
| NEGSLP | 6872 | | 247 | 248 | | | |
| NT | 68CA | | 282 | 283 | | | |
| NTDEN | 68DC | | 291 | 292 | | | |
| O4 | 68D4 | | 287 | 288 | | | |
| OFFM | 0147 | X | 484 | 840 | | | |
| OLDKEY | 68FE | | 317 | 318 | | | |
| ONM | 014F | X | 484 | 834 | | | |
| OPERAT | 0001 | | 104 | | | | |
| ORDSRT | 68FC | | 316 | 317 | | | |
| PAP | 012C | R | 738 | 521 | | | |
| PAP1 | 0139 | R | 744 | 742 | | | |
| PAPADV | 0020 | | 75 | | | | |
| PAPFLG | 6886 | | 261 | 262 | 740 | 746 | |
| PAPOFM | 0188 | X | 483 | 743 | | | |
| PAPONM | 0192 | X | 483 | 739 | | | |
| POSSLP | 6871 | | 246 | 247 | | | |
| PRI | 0119 | R | 717 | 518 | | | |
| PRI1 | 0127 | R | 724 | 722 | | | |
| PRIM | 01A6 | X | 482 | 717 | | | |
| PRINTM | 0174 | X | 483 | 818 | | | |
| PRNCNT | 6A2C | | 375 | 376 | | | |
| PRNSW | 68C2 | | 277 | 278 | | | |
| PUTASC | 02E3 | X | 477 | 584 | 655 | 718 | 814 | 848 | 896 |
| RAM | 6800 | | 189 | 192 | 340 | 343 | |
| RAMSUM | 6904 | | 322 | 323 | | | |
| RCH | 687E | | 254 | 255 | | | |
| RCORR | 6A20 | | 369 | 370 | 763 | | |
| RCSLOP | 68E4 | | 295 | 296 | | | |
| RDAMB | 00F0 | X | 485 | 526 | | | |
| RDDEN | 6A3C | | 383 | 384 | | | |
| RDENVA | 6A6C | | 389 | 390 | | | |
| RDICHR | 6A66 | | 386 | 387 | | | |
| RDISP | 6838 | | 221 | 222 | | | |
| READVL | 010F | G | 679 | 489 | | | |
| REDCHL | 0007 | | 83 | | | | |
| REDDEN | 6898 | | 274 | 275 | | | |
| REDMAS | 6A1A | | 366 | 367 | | | |
| REDNEG | 6A08 | | 357 | 358 | | | |
| REDREF | 6A02 | | 354 | 355 | | | |
| REF | 683E | | 224 | 225 | | | |
| REM | 6846 | | 228 | 229 | | | |
| REXP | 6867 | | 239 | 240 | | | |
| RNDIN | 0020 | | 122 | | | | |
| RNDOUT | 0008 | | 92 | | | | |
| RNEG | 6826 | | 212 | 213 | | | |
| RO4PRN | 6A0E | | 360 | 361 | | | |
| ROFFS | 6A26 | | 372 | 373 | | | |
| ROUTAD | 0017 | G | 517 | 488 | 500 | | |
| RPTIME | 6832 | | 218 | 219 | | | |
| RREF | 6820 | | 209 | 210 | | | |
| RREFM | 01F6 | X | 481 | 482 | | | |
| RRTIME | 682C | | 215 | 216 | | | |
| RSTCNT | 6A38 | | 380 | 381 | | | |

| | | | | | | | | |
|---|---|---|---|---|---|---|---|---|
| RSTCTC | 0003 | | 116 | | | | | |
| RTIME | 6842 | | 226 | 227 | | | | |
| RU1PRN | 6A14 | | 363 | 364 | | | | |
| SAFE | 0206 | R | 882 | 531 | | | | |
| SBUTSM | 01EC | X | 481 | | | | | |
| SCNCNT | 680E | | 199 | 200 | | | | |
| SCRTH1 | 68F0 | | 305 | 306 | | | | |
| SECCNT | 680F | | 200 | 201 | | | | |
| SEEDBM | 024E | X | 479 | | | | | |
| SEG | 0020 | | 119 | | | | | |
| SEGIMG | 6800 | | 192 | 193 | | | | |
| SEGOUT | 687A | | 253 | 254 | 554 | 583 | | |
| SEL | 0018 | | 120 | | | | | |
| SELCT1 | 000C | G | 507 | 490 | 504 | | | |
| SELECT | 0008 | G | 503 | 491 | | | | |
| SELPTR | 6809 | | 194 | 195 | | | | |
| SELRUT | 0000 | G | 497 | 488 | | | | |
| SENDNC | 01AA | G | 813 | 490 | 820 | 855 | 862 | |
| SENDNG | 01B0 | G | 819 | 490 | 827 | | | |
| SET0 | 00E8 | X | 485 | 633 | 650 | | | |
| SET12B | 0031 | | 333 | 336 | | | | |
| SETDB1 | 0120 | X | 484 | | | | | |
| SETDBM | 016A | X | 483 | 530 | 610 | | | |
| SETERR | 00E8 | R | 647 | 645 | | | | |
| SETEX | 01E3 | R | 853 | 863 | | | | |
| SETM | 01B7 | X | 482 | 637 | 642 | | | |
| SETM1 | 01AE | X | 482 | | | | | |
| SETNUM | 686E | | 243 | 244 | 665 | | | |
| SETSAV | 686F | | 244 | 245 | | | | |
| SETSIZ | 006A | | 339 | 344 | 346 | 396 | 625 | 669 |
| SETUP | 0227 | X | 480 | 523 | | | | |
| SETUP0 | 6A00 | | 341 | 342 | 354 | 675 | | |
| SETVAL | 6875 | | 249 | 250 | | | | |
| SEVENB | 0292 | X | 478 | | | | | |
| SFS | 0162 | R | 769 | 519 | | | | |
| SFS1 | 016F | R | 775 | 773 | | | | |
| SFSFLG | 68E7 | | 297 | 298 | | | | |
| SFSOFM | 0230 | X | 480 | 774 | | | | |
| SFSONM | 0258 | X | 479 | 770 | | | | |
| SFS_1 | 018A | R | 789 | 522 | | | | |
| SIGN | 6815 | | 206 | 207 | | | | |
| SLOPEM | 01FF | X | 481 | 481 | | | | |
| SLP | 0176 | R | 780 | 542 | | | | |
| SLP1 | 0183 | R | 785 | 783 | | | | |
| SLPFLG | 68F3 | | 307 | 308 | 781 | 786 | | |
| SLP01 | 68CC | | 283 | 284 | | | | |
| SLP02 | 68CE | | 284 | 285 | | | | |
| SLPOFM | 027E | X | 478 | 784 | | | | |
| SLPONM | 0288 | X | 478 | 780 | | | | |
| SLPU1 | 68D0 | | 285 | 286 | | | | |
| SLPU2 | 68D2 | | 286 | 287 | | | | |
| SNDWAT | 01DB | G | 847 | 491 | 547 | 614 | 618 | 792 | 835 | 841 |
| SPCHR | 0021 | | 126 | | | | | |
| SPRINT | 01AD | G | 817 | 490 | | | | |
| SRTCNT | 6A3A | | 381 | 383 | | | | |
| SRTSSR | 0010 | | 98 | | | | | |
| SSR1 | 0000 | | 68 | | | | | |
| SSR12 | 0001 | | 94 | | | | | |
| SSR7 | 0004 | | 96 | | | | | |
| SSR8 | 0008 | | 97 | | | | | |
| SSRXX | 0002 | | 95 | | | | | |
| STACK | 6A00 | | 340 | 341 | | | | |
| STORVL | 0115 | G | 689 | 491 | | | | |
| SUADDR | 6B00 | | 342 | 343 | 671 | | | |
| SUERR | 00AB | G | 608 | 489 | 621 | | | |
| SUFLAG | 6879 | | 252 | 253 | | | | |

```
SUPRES  00A4 R    598   555   556   557
SUPRIT  0098 R    587   560   565   571   578
SUPTR   6873      248   249
TABLE   026B X    479
TAPON   0010       87
TAPOUT  0008       86
TBLSAV  6893      271   272
TEMP    6812      203   204
TEMP1   6813      204   205
TEMPKE  680C      197   198
TEMPSU  68F2      306   307
TIMER   6814      205   206
TIME_1  0018      117
TIME_2  0000      118
TIMFLG  688C      267   268
TTIME   688D      268   269
TTIME1  688F      269   270
TUNFLG  68F5      309   310
U1      68D6      288   289
WAIT    02D1 X    477   898
WAIT1   01DE R    849
WAITKY  02BD X    477   594   851
WAITSW  0004      107
YPADL   0004       72
Y_NFLG  68FF      318   319
```

```
                                    PRINT
 LOC    OBJ CODE  M STMT  SOURCE STATEMENT

450  *LIST ON
                   451  ;
                   452  ;   PRINT routines - main sequence of
                   453  ;
                   454  ;       116
                   455  ;
                   456  ;
                   457  ;::::::::::::::::::::::::::::::::::::
                   458  ;
                   459  ;                    E D I T   H
                   460  ;
                   461  ;       04-19-82         BB      Resi
                   462  ;       07-31-82         BB      add
                   463  ;       08-17-82         AMF     add
                   464  ;       09-24-82         BB      chan
                   465  ;
                   466  ;::::::::::::::::::::::::::::::::::::
                   467  ;
                   468          GLOBAL          PRINT,BUTT7,
                   469  ;
                   470          EXTERNAL        WAIT,PUTASC,
                   471          EXTERNAL        DDIV,SET1,SL
                   472          EXTERNAL        BUTMSG,MSGNO
                   473          EXTERNAL        BMSG3,BMSG4,
                   474          EXTERNAL        CALSU
                   475  ;
 0000  3A6E68      476  PRINT1  LD      A,(SETNUM)
 0003  5F          477          LD      E,A
 0004  1600        478          LD      D,0
 0006  CD0000  X   479          CALL    CALSU
 0009  7E          480          LD      A,(HL)
 000A  23          481          INC     HL
 000B  AE          482          XOR     (HL)
 000C  FE04        483          CP      04
 000E  2814        484          JR      Z,PRINT2
 0010  111C00  R   485          LD      DE,SETNG
 0013  CD0000  X   486          CALL    PUTASC
 0016  0E30        487          LD      C,48
```

```
0018   CD0000    X   488           CALL    WAITKY
001B   C9            489           RET
                     490    ;
001C   53455B55      491   SETNG   DEFM    'SECUPXNG'
                     492    ;
0024   3A9568        493   PRINT2  LD      A,(IOIMG4)
0027   CB4F          494           BIT     OPERATE,A
0029   C0            495           RET     NZ
                     496    ;
002A   3A6468        497           LD      A,(IOIMG1)
002D   E67F          498           AND     L801N
002F   326468        499           LD      (IOIMG1),A
0032   D300          500           OUT     (SSR1),A
0034   0E02          501           LD      C,2
0036   CD0000    X   502           CALL    WAIT
                     503    ;
0039   3A6468        504           LD      A,(IOIMG1)
003C   F640          505           OR      K801
003E   326468        506           LD      (IOIMG1),A
0041   D300          507           OUT     (SSR1),A
0043   0E02          508           LD      C,2
0045   CD0000    X   509           CALL    WAIT
                     510    ;
0048   3A8C68        511           LD      A,(TIMFLG)
004B   B7            512           OR      A
004C   282A          513           JR      Z,DOCORR
004E   2A2C68        514           LD      HL,(RRTIME)
0051   226768        515           LD      (REXP),HL
0054   2A2E68        516           LD      HL,(GRTIME)
0057   226968        517           LD      (GEXP),HL
005A   2A3068        518           LD      HL,(BRTIME)
005D   226B68        519           LD      (BEXP),HL
0060   97            520           SUB     A
0061   328C68        521           LD      (TIMFLG),A
0064   210000        522           LD      HL,0
0067   222C68        523           LD      (RRTIME),HL
006A   222E68        524           LD      (GRTIME),HL
006D   223068        525           LD      (BRTIME),HL
0070   0E08          526           LD      C,8
0072   CD0000    X   527           CALL    WAIT
0075   C3B900    R   528           JP      NOCORR
                     529    ;
0078   CD0000    X   530   DOCORR  CALL    RDNEG
                     531    ;
007B   CD0000    X   532           CALL    LINEAR
                     533    ;
007E   CD8303    R   534           CALL    MASCOR
                     535    ;
0081   CD0000    X   536           CALL    DO_SFS
                     537    ;
0084   CDE703    R   538           CALL    CORCOL
                     539    ;
0087   3AF568        540           LD      A,(TUNFLG)
008A   B7            541           OR      A
008B   C40000    X   542           CALL    NZ,TUNCOR
                     543    ;
008E   3AF668        544           LD      A,(FLOFLG)
0091   B7            545           OR      A
0092   C40000    X   546           CALL    NZ,FLOCOR
                     547    ;
0095   3AF368        548           LD      A,(SLPFLG)
0098   B7            549           OR      A
0099   C2AC00    R   550           JP      NZ,DAVES
                     551    ;
009C   3A8468        552           LD      A,(BEPFLG)
009F   B7            553           OR      A
```

```
00A0  C2A600    R  554           JP    NZ,SLPEX
00A3  CD0000    X  555           CALL  SLOPE
00A6  CD5503    R  556   SLPEX   CALL  SEVDEN
00A9  C3B900    R  557           JP    NOCORR
                   558   ;
00AC  CD5503    R  559   DAVES   CALL  SEVDEN
00AF  3A8468       560           LD    A,(BEPFLG)
00B2  B7           561           OR    A
00B3  C2B900    R  562           JP    NZ,NOCORR
00B6  CD0000    X  563           CALL  SLOPE
                   564   ;
00B9  2A6768       565   NOCORR  LD    HL,(REXP)
00BC  223268       566           LD    (RPTIME),HL
00BF  2A6968       567           LD    HL,(GEXP)
00C2  223468       568           LD    (GPTIME),HL
00C5  2A6B68       569           LD    HL,(BEXP)
00C8  223668       570           LD    (BPTIME),HL
                   571   ;
00CB  3A9568       572           LD    A,(IOIMG4)
00CE  CB67         573           BIT   WAITSW,A
00D0  CA0701    R  574           JP    Z,PAPCLR
00D3  110000    X  575           LD    DE,CUTMSG
00D6  CD0000    X  576           CALL  PUTASC
00D9  CD0000    X  577           CALL  BEEP_2
00DC  FB           578   WAITPC  EI
00DD  3A9568       579           LD    A,(IOIMG4)
00E0  CB67         580           BIT   WAITSW,A
00E2  C2EE00    R  581           JP    NZ,WTPC1
00E5  ED4B326A     582           LD    BC,(CUTPUL)
00E9  CD0000    X  583           CALL  WAIT
00EC  1819         584           JR    PAPCLR
00EE  3A0B68       585   WTPC1   LD    A,(KBDFLG)
00F1  B7           586           OR    A
00F2  28E8         587           JR    Z,WAITPC
00F4  3A0A68       588           LD    A,(KBDBUF)
00F7  FE18         589           CP    KEYENT
00F9  280C         590           JR    Z,PAPCLR
00FB  FE19         591           CP    KEYCAN
00FD  20DD         592           JR    NZ,WAITPC
00FF  3EBF         593           LD    A,DEFLT1
0101  326468       594           LD    (IOIMG1),A
0104  D300         595           OUT   (SSR1),A
0106  C9           596           RET
                   597   ;
0107  3A6468       598   PAPCLR  LD    A,(IOIMG1)
010A  E6EF         599           AND   .NOT.DKSHUT
010C  326468       600           LD    (IOIMG1),A
010F  D300         601           OUT   (SSR1),A
                   602   ;
0111  CD7702    R  603   EXPO    CALL  EXPOSE
                   604   ;
0114  ED4B0169     605           LD    BC,(MULPRN)
0118  79           606           LD    A,C
0119  B0           607           OR    B
011A  2003         608           JR    NZ,EXDONE
011C  320B68       609           LD    (KBDFLG),A
                   610   ;
011F  3A2C6A       611   EXDONE  LD    A,(PRNCNT)
0122  C601         612           ADD   A,1
0124  27           613           DAA
0125  322C6A       614           LD    (PRNCNT),A
0128  3A2D6A       615           LD    A,(PRNCNT+1)
012B  CE00         616           ADC   A,0
012D  27           617           DAA
012E  322D6A       618           LD    (PRNCNT+1),A
0131  3A2E6A       619           LD    A,(PRNCNT+2)
```

| | | | | | |
|---|---|---|---|---|---|
| 0134 | CE00 | | 620 | ADC | A,0 |
| 0136 | 27 | | 621 | DAA | |
| 0137 | 322E6A | | 622 | LD | (PRNCNT+2),A |
| 013A | 3A2F6A | | 623 | LD | A,(PRNCNT+3) |
| 013D | CE00 | | 624 | ADC | A,0 |
| 013F | 27 | | 625 | DAA | |
| 0140 | 322F6A | | 626 | LD | (PRNCNT+3),A |
| | | | 627 | ; | |
| 0143 | 2AFC68 | | 628 | LD | HL,(ORDSRT) |
| 0146 | 23 | | 629 | INC | HL |
| 0147 | 22FC68 | | 630 | LD | (ORDSRT),HL |
| | | | 631 | ; | |
| 014A | 0652 | | 632 | LD | B,'R' |
| 014C | 0E1F | | 633 | LD | C,DBPCNT |
| 014E | CD0000 | X | 634 | CALL | SET1 |
| 0151 | 13 | | 635 | INC | DE |
| 0152 | EB | | 636 | EX | DE,HL |
| 0153 | 0657 | | 637 | LD | B,'W' |
| 0155 | 0E1F | | 638 | LD | C,DBPCNT |
| 0157 | CD0000 | X | 639 | CALL | SET1 |
| | | | 640 | ; | |
| 015A | 3AE668 | | 641 | LD | A,(CBHFLG) |
| 015D | B7 | | 642 | OR | A |
| 015E | C26D01 | R | 643 | JP | NZ,EXP01 |
| 0161 | 21E803 | | 644 | LD | HL,1000 |
| 0164 | 22206A | | 645 | LD | (RCORR),HL |
| 0167 | 22226A | | 646 | LD | (GCORR),HL |
| 016A | 22246A | | 647 | LD | (BCORR),HL |
| 016D | 0E04 | | 648 | EXP01 LD | C,4 |
| 016F | CD0000 | X | 649 | CALL | WAIT |
| | | | 650 | ; | |
| 0172 | CD0000 | X | 651 | CALL | SHO_SU |
| 0175 | 3A8668 | | 652 | LD | A,(PAPFLG) |
| 0178 | B7 | | 653 | OR | A |
| 0179 | 280F | | 654 | JR | Z,EXP02 |
| 017B | 3E45 | | 655 | LD | A,69 |
| 017D | 320369 | | 656 | LD | (BOMOUT),A |
| 0180 | 3A6468 | | 657 | LD | A,(IOIMG1) |
| 0183 | E6DF | | 658 | AND | .NOT.PAPADV |
| 0185 | 326468 | | 659 | LD | (IOIMG1),A |
| 0188 | D300 | | 660 | OUT | (SSR1),A |
| 018A | ED4B346A | | 661 | EXP02 LD | BC,(ADVPUL) |
| 018E | 79 | | 662 | LD | A,C |
| 018F | 320069 | | 663 | LD | (ADVCNT),A |
| 0192 | 3E10 | | 664 | LD | A,16 |
| 0194 | 81 | | 665 | ADD | A,C |
| 0195 | 4F | | 666 | LD | C,A |
| 0196 | CD0000 | X | 667 | CALL | WAITKY |
| 0199 | 3E00 | | 668 | LD | A,0 |
| 019B | 320369 | | 669 | LD | (BOMOUT),A |
| | | | 670 | ; | |
| 019E | 110000 | X | 671 | BOMBED LD | DE,MSG11 |
| 01A1 | 3AE768 | | 672 | LD | A,(SFSFLG) |
| 01A4 | B7 | | 673 | OR | A |
| 01A5 | 2803 | | 674 | JR | Z,SFS1 |
| 01A7 | 110000 | X | 675 | LD | DE,MSG12 |
| 01AA | CD0000 | X | 676 | SFS1 CALL | PUTASC |
| 01AD | FD210068 | | 677 | LD | IY,SEGIMG |
| 01B1 | ED4B3268 | | 678 | LD | BC,(RPTIME) |
| 01B5 | CD0000 | X | 679 | CALL | DISTIM |
| 01B8 | ED4B3468 | | 680 | LD | BC,(GPTIME) |
| 01BC | CD0000 | X | 681 | CALL | DISTIM |
| 01BF | ED4B3668 | | 682 | LD | BC,(BPTIME) |
| 01C3 | CD0000 | X | 683 | CALL | DISTIM |
| | | | 684 | ; | |
| 01C6 | 3AE668 | | 685 | LD | A,(CBHFLG) |

```
01C9   B7              686          OR      A
01CA   2018            687          JR      NZ,BLINK
01CC   3A8468          688          LD      A,(BEPFLG)
01CF   B7              689          OR      A
01D0   2012            690          JR      NZ,BLINK
01D2   3AF368          691          LD      A,(SLPFLG)
01D5   B7              692          OR      A
01D6   200C            693          JR      NZ,BLINK
01D8   3AE968          694          LD      A,(FLGSFS)
01DB   B7              695          OR      A
01DC   2806            696          JR      Z,BLINK
01DE   3A8668          697          LD      A,(PAPFLG)
01E1   B7              698          OR      A
01E2   2008            699          JR      NZ,LOOP
01E4   3E01            700   BLINK  LD      A,1
01E6   32F868          701          LD      (DOBLNK),A
01E9   CD0000     X    702          CALL    BEEP_1
                       703   ;
01EC   FB              704   LOOP   EI
01ED   3AF868          705          LD      A,(DOBLNK)
01F0   B7              706          OR      A
01F1   2821            707          JR      Z,LOOP1
01F3   0E14            708          LD      C,14H
01F5   3AE768          709          LD      A,(SFSFLG)
01F8   B7              710          OR      A
01F9   2802            711          JR      Z,BLINK1
01FB   0E23            712          LD      C,23H
01FD   3AEF68          713   BLINK1 LD      A,(BLKCNT)
0200   0600            714          LD      B,0
0202   10FE            715          DJNZ    $
0204   3D              716          DEC     A
0205   32EF68          717          LD      (BLKCNT),A
0208   FA0D02     R    718          JP      M,BLINK2
020B   0E21            719          LD      C,21H
020D   79              720   BLINK2 LD      A,C
020E   320268          721          LD      (SEGIMG+2),A
0211   320568          722          LD      (SEGIMG+5),A
                       723   ;
                       724   LOOP1
                       725   ;      LD      A,(PRNSW)
                       726   ;      OR      A
                       727   ;      RET     NZ
0214   ED4B0169        728          LD      BC,(MULPRN)
0218   79              729          LD      A,C
0219   B0              730          OR      B
021A   2829            731          JR      Z,LOOP3
021C   0E20            732          LD      C,32
021E   CD0000     X    733          CALL    WAIT
0221   110000     X    734          LD      DE,PRIM1
0224   CD0000     X    735          CALL    PUTASC
0227   ED4B0169        736          LD      BC,(MULPRN)
                       737   ;      LD      C,A
022B   CD0000     X    738          CALL    DSP255
022E   CD0000     X    739          CALL    BEEP_2
0231   0E10            740          LD      C,16
0233   CD0000     X    741          CALL    WAIT
0236   ED4B0169        742          LD      BC,(MULPRN)
023A   0B              743          DEC     BC
023B   ED430169        744          LD      (MULPRN),BC
023F   3AF968          745          LD      A,(DENBUT)
0242   C33504.    R    746          JP      BUTT7
                       747   ;
0245   3A9568          748   LOOP3  LD      A,(IOIMG4)
0248   CB47            749          BIT     FOOTSW,A
024A   C26502     R    750          JP      NZ,LOOP2
024D   0E04            751          LD      C,4
```

```
024F  CD0000    X  752         CALL    WAIT
0252  CB47         753         BIT     FOOTSW,A
0254  C26502    R  754         JP      NZ,LOOP2
0257  3E00         755         LD      A,0
0259  32E768       756         LD      (SFSFLG),A
025C  32E868       757         LD      (FSFSF),A
025F  32F868       758         LD      (DOBLNK),A
0262  C33304    R  759         JP      PRINT
                   760 ;
0265  3A0B68       761 LOOP2   LD      A,(KBDFLG)
0268  B7           762         OR      A
0269  2881         763         JR      Z,LOOP
026B  3E00         764         LD      A,0
026D  32E768       765         LD      (SFSFLG),A
0270  32E868       766         LD      (FSFSF),A
0273  32F868       767         LD      (DOBLNK),A
0276  C9           768         RET
                   769 ;
                   770 ;*****************************
                   771 ;
                   772 ;                   EXPOSURE
                   773 ;
                   774 ;PURPOSE:    count down R,G,B
                   775 ;            color expires; si
                   776 ;
                   777 ;IOPUT:      R,G-B exposure t
                   778 ;
                   779 ;*****************************
                   780 ;
0277  3E03         781 EXPOSE  LD      A,RSTCTC
0279  D332         782         OUT     (CREG_3),A
027B  3EA7         783         LD      A,LDCON
027D  D332         784         OUT     (CREG_3),A
027F  3E52         785         LD      A,82
0281  D332         786         OUT     (CREG_3),A
0283  110000    X  787 EXP1    LD      DE,MSG11
0286  3AE768       788         LD      A,(SFSFLG)
0289  B7           789         OR      A
028A  2803         790         JR      Z,EXP7
028C  110000    X  791         LD      DE,MSG12
028F  CD0000    X  792 EXP7    CALL    PUTASC
0292  FB           793 EXP2    EI
0293  FD210068     794         LD      IY,SEGIMG
0297  ED4B6768     795         LD      BC,(REXP)
029B  CD0000    X  796         CALL    DISTIM
029E  ED4B6968     797         LD      BC,(GEXP)
02A2  CD0000    X  798         CALL    DISTIM
02A5  ED4B6B68     799         LD      BC,(BEXP)
02A9  CD0000    X  800         CALL    DISTIM
02AC  3A0B68       801         LD      A,(KBDFLG)
02AF  B7           802         OR      A
02B0  285D         803         JR      Z,EXP6
02B2  3A0A68       804         LD      A,(KBDBUF)
02B5  FE19         805         CP      KEYCAN
02B7  2056         806         JR      NZ,EXP6
02B9  ED4B0169     807         LD      BC,(MULPRN)
02BD  79           808         LD      A,C
02BE  B0           809         OR      B
02BF  2810         810         JR      Z,EXP03
02C1  97           811         SUB     A
                   812 ;       LD      (MULPRN),A
02C2  32FF68       813         LD      (Y_NFLG),A
02C5  320B68       814         LD      (KBDFLG),A
02C8  010000       815         LD      BC,0
02CB  ED430169     816         LD      (MULPRN),BC
02CF  183E         817         JR      EXP6
```

```
02D1  2A3268         818  EXP03   LD    HL,(RPTIME)
02D4  ED5B6768       819          LD    DE,(REXP)
02D8  B7             820          OR    A
02D9  ED52           821          SBC   HL,DE
02DB  223268         822          LD    (RPTIME),HL
02DE  2A3468         823          LD    HL,(GPTIME)
02E1  ED5B6968       824          LD    DE,(GEXP)
02E5  B7             825          OR    A
02E6  ED52           826          SBC   HL,DE
02E8  223468         827          LD    (GPTIME),HL
02EB  2A3668         828          LD    HL,(BPTIME)
02EE  ED5B6B68       829          LD    DE,(BEXP)
02F2  B7             830          OR    A
02F3  ED52           831          SBC   HL,DE
02F5  223668         832          LD    (BPTIME),HL
02F8  110000         833          LD    DE,0
02FB  ED536768       834          LD    (REXP),DE
02FF  ED536968       835          LD    (GEXP),DE
0303  ED536B68       836          LD    (BEXP),DE
0307  3E00           837          LD    A,0
0309  320B68         838          LD    (KBDFLG),A
030C  32FF68         839          LD    (Y_NFLG),A
                     840  ;
030F  ED4B6768       841  EXP6    LD    BC,(REXP)
0313  79             842          LD    A,C
0314  B0             843          OR    B
0315  2008           844          JR    NZ,EXP3
0317  3A6468         845          LD    A,(IOIMG1)
031A  E6FE           846          AND   .NOT.CPADL
031C  326468         847          LD    (IOIMG1),A
031F  ED4B6968       848  EXP3    LD    BC,(GEXP)
0323  79             849          LD    A,C
0324  B0             850          OR    B
0325  2008           851          JR    NZ,EXP4
0327  3A6468         852          LD    A,(IOIMG1)
032A  E6FD           853          AND   .NOT.MPADL
032C  326468         854          LD    (IOIMG1),A
032F  ED4B6B68       855  EXP4    LD    BC,(BEXP)
0333  79             856          LD    A,C
0334  B0             857          OR    B
0335  2008           858          JR    NZ,EXP5
0337  3A6468         859          LD    A,(IOIMG1)
033A  E6FB           860          AND   .NOT.YPADL
033C  326468         861          LD    (IOIMG1),A
                     862  ;
033F  3A6468         863  EXP5    LD    A,(IOIMG1)
0342  D300           864          OUT   (SSR1),A
0344  E607           865          AND   CPADL+MPADL+YPADL
0346  C29202   R     866          JP    NZ,EXP2
0349  3EBF           867          LD    A,DEFLT1
034B  326468         868          LD    (IOIMG1),A
034E  D300           869          OUT   (SSR1),A
0350  3E03           870          LD    A,RSTCTC
0352  D332           871          OUT   (CREG_3),A
0354  C9             872          RET
                     873  ;
                     874  ;******************* 7-button
                     875  ;
0355  ED4B8268       876  SEVDEN  LD    BC,(BUTOFF)
0359  ED5B6B68       877          LD    DE,(BEXP)
035D  CD1504   R     878          CALL  NORMAL
0360  ED536B68       879          LD    (BEXP),DE
0364  ED4B8268       880          LD    BC,(BUTOFF)
0368  ED5B6968       881          LD    DE,(GEXP)
036C  CD1504   R     882          CALL  NORMAL
036F  ED536968       883          LD    (GEXP),DE
```

```
0373   ED4B8268        884            LD      BC,(BUTOFF)
0377   ED5B6768        885            LD      DE,(REXP)
037B   CD1504    R     886            CALL    NORMAL
037E   ED536768        887            LD      (REXP),DE
0382   C9              888            RET
                       889    ;
                       890    ;****************   MASTER SETUP
                       891    ;
0383   ED4B1A6A        892    MASCOR  LD      BC,(REDMAS)
0387   CDBA03    R     893            CALL    CHECK
038A   ED5B6768        894            LD      DE,(REXP)
038E   CD1504    R     895            CALL    NORMAL
0391   ED536768        896            LD      (REXP),DE
                       897
0395   ED4B1C6A        898            LD      BC,(GRNMAS)
0399   CDBA03    R     899            CALL    CHECK
039C   ED5B6968        900            LD      DE,(GEXP)
03A0   CD1504    R     901            CALL    NORMAL
03A3   ED536968        902            LD      (GEXP),DE
                       903
03A7   ED4B1E6A        904            LD      BC,(BLUMAS)
03AB   CDBA03    R     905            CALL    CHECK
03AE   ED5B6B68        906            LD      DE,(BEXP)
03B2   CD1504    R     907            CALL    NORMAL
03B5   ED536B68        908            LD      (BEXP),DE
03B9   C9              909            RET
                       910    ;
03BA   21D007          911    CHECK   LD      HL,2000
03BD   B7              912            OR      A
03BE   ED42            913            SBC     HL,BC
03C0   D0              914            RET     NC
03C1   21E803          915            LD      HL,1000
03C4   221A6A          916            LD      (REDMAS),HL
03C7   221C6A          917            LD      (GRNMAS),HL
03CA   221E6A          918            LD      (BLUMAS),HL
03CD   11DF03    R     919            LD      DE,CRFAIL
03D0   CD0000    X     920            CALL    PUTASC
03D3   CD0000    X     921            CALL    BEEP_2
03D6   0E20            922            LD      C,32
03D8   CD0000    X     923            CALL    WAIT
03DB   E1              924            POP     HL
03DC   C38303    R     925            JP      MASCOR
                       926    ;
03DF   434F5252        927    CRFAIL  DEFM    'CORRXERR'
                       928    ;
                       929    ;****************   COLOR CORRE
                       930    ;
03E7   ED4B206A        931    CORCOL  LD      BC,(RCORR)
03EB   ED5B6768        932            LD      DE,(REXP)
03EF   CD1504    R     933            CALL    NORMAL
03F2   ED536768        934            LD      (REXP),DE
                       935
03F6   ED4B226A        936            LD      BC,(GCORR)
03FA   ED5B6968        937            LD      DE,(GEXP)
03FE   CD1504    R     938            CALL    NORMAL
0401   ED536968        939            LD      (GEXP),DE
                       940
0405   ED4B246A        941            LD      BC,(BCORR)
0409   ED5B6B68        942            LD      DE,(BEXP)
040D   CD1504    R     943            CALL    NORMAL
0410   ED536B68        944            LD      (BEXP),DE
0414   C9              945            RET
                       946    ;
0415   CD0000    X     947    NORMAL  CALL    DMPY
0418   01E803          948            LD      BC,1000
041B   CD0000    X     949            CALL    DDIV
```

| | | | | | |
|---|---|---|---|---|---|
| 041E | C9 | | 950 | | RET |
| | | | 951 | ; | |
| | | | 952 | BUTT7N: | |
| 041F | F5 | | 953 | | PUSH AF |
| 0420 | 3EFF | | 954 | | LD A,0FFH |
| 0422 | 32C268 | | 955 | | LD (PRNSW),A |
| 0425 | F1 | | 956 | | POP AF |
| 0426 | CD3504 | R | 957 | | CALL BUTT7 |
| 0429 | 0E20 | | 958 | | LD C,32 |
| 042B | CD0000 | X | 959 | | CALL WAIT |
| 042E | AF | | 960 | | XOR A |
| 042F | 32C268 | | 961 | | LD (PRNSW),A |
| 0432 | C9 | | 962 | | RET |
| | | | 963 | ; | |
| | | | 964 | ; | |
| 0433 | 3E23 | | 965 | PRINT | LD A,KEYN |
| 0435 | 32F968 | | 966 | BUTT7 | LD (DENBUT),A |
| 0438 | E607 | | 967 | | AND 7 |
| 043A | CB27 | | 968 | | SLA A |
| 043C | 4F | | 969 | | LD C,A |
| 043D | 0600 | | 970 | | LD B,0 |
| 043F | F5 | | 971 | | PUSH AF |
| | | | 972 | ; | LD HL,BUTTBL |
| | | | 973 | ; | LD A,(EXRANG) |
| | | | 974 | ; | CP 0 |
| | | | 975 | ; | JP Z,BUTT7A |
| | | | 976 | ; | LD HL,BUTTB1 |
| | | | 977 | ; | CP 1 |
| | | | 978 | ; | JP Z,BUTT7A |
| | | | 979 | ; | LD HL,BUTTB2 |
| | | | 980 | ; | |
| 0440 | 3A8768 | | 981 | | LD A,(EXRANG) |
| 0443 | 217104 | R | 982 | | LD HL,BUTTN |
| 0446 | CD6B04 | R | 983 | | CALL GETRNG |
| | | | 984 | BUTT7A: | |
| 0449 | F1 | | 985 | | POP AF |
| 044A | 09 | | 986 | | ADD HL,BC |
| 044B | 4E | | 987 | | LD C,(HL) |
| 044C | 23 | | 988 | | INC HL |
| 044D | 46 | | 989 | | LD B,(HL) |
| 044E | ED438268 | | 990 | | LD (BUTOFF),BC |
| | | | 991 | ; | |
| 0452 | CB27 | | 992 | | SLA A |
| 0454 | CB27 | | 993 | | SLA A |
| 0456 | 4F | | 994 | | LD C,A |
| 0457 | 0600 | | 995 | | LD B,0 |
| | | | 996 | ; | LD HL,BUTMSG |
| | | | 997 | ; | LD A,(EXRANG) |
| | | | 998 | ; | CP 0 |
| | | | 999 | ; | JP Z,BUTT7B |
| | | | 1000 | ; | LD HL,BMSG1 |
| | | | 1001 | ; | CP 1 |
| | | | 1002 | ; | JP Z,BUTT7B |
| | | | 1003 | ; | LD HL,BMSG2 |
| | | | 1004 | ; | |
| 0459 | 3A8768 | | 1005 | | LD A,(EXRANG) |
| 045C | 217D04 | R | 1006 | | LD HL,BMESSG |
| 045F | CD6B04 | R | 1007 | | CALL GETRNG |
| | | | 1008 | ; | |
| | | | 1009 | BUTT7B: | |
| 0462 | 09 | | 1010 | | ADD HL,BC |
| 0463 | E5 | | 1011 | | PUSH HL |
| 0464 | D1 | | 1012 | | POP DE |
| 0465 | CD0000 | X | 1013 | | CALL PUTASC |
| 0468 | C30000 | R | 1014 | | JP PRINT1 |
| | | | 1015 | ; | |

| | | | 1016 | ; | | |
|---|---|---|---|---|---|---|
| | | | 1017 | GETRNG: | | |
| 046B | F5 | | 1018 | | PUSH | AF |
| 046C | CD0000 | X | 1019 | | CALL | SELCT1 |
| 046F | F1 | | 1020 | | POP | AF |
| 0470 | C9 | | 1021 | | RET | |
| | | | 1022 | ; | | |
| | | | 1023 | ; | | |
| | | | 1024 | BUTTN: | | |
| 0471 | A704 | R | 1025 | | DEFW | BUTTBL |
| 0473 | B504 | R | 1026 | | DEFW | BUTTB1 |
| 0475 | C304 | R | 1027 | | DEFW | BUTTB2 |
| 0477 | D104 | R | 1028 | | DEFW | BUTTB5 |
| 0479 | 9904 | R | 1029 | | DEFW | BUTTB4 |
| 047B | 8904 | R | 1030 | | DEFW | BUTTB3 |
| | | | 1031 | ; | | |
| | | | 1032 | BMESSG: | | |
| 047D | 0000 | X | 1033 | | DEFW | BUTMSG |
| 047F | 0000 | X | 1034 | | DEFW | BMSG1 |
| 0481 | 0000 | X | 1035 | | DEFW | BMSG2 |
| 0483 | 0000 | X | 1036 | | DEFW | BMSG5 |
| 0485 | 0000 | X | 1037 | | DEFW | BMSG4 |
| 0487 | 0000 | X | 1038 | | DEFW | BMSG3 |
| | | | 1039 | ; | | |
| | | | 1040 | BUTTB3: | | |
| 0489 | 6A00 | | 1041 | | DEFW | 106 |
| 048B | 5900 | | 1042 | | DEFW | 89 |
| 048D | 4B00 | | 1043 | | DEFW | 75 |
| 048F | 3F00 | | 1044 | | DEFW | 63 |
| 0491 | 3500 | | 1045 | | DEFW | 53 |
| 0493 | 2D00 | | 1046 | | DEFW | 45 |
| 0495 | 2600 | | 1047 | | DEFW | 38 |
| 0497 | 2000 | | 1048 | | DEFW | 32 |
| | | | 1049 | BUTTB4: | | |
| 0499 | 6301 | | 1050 | | DEFW | 355 |
| 049B | 2B01 | | 1051 | | DEFW | 299 |
| 049D | FB00 | | 1052 | | DEFW | 251 |
| 049F | D300 | | 1053 | | DEFW | 211 |
| 04A1 | B200 | | 1054 | | DEFW | 178 |
| 04A3 | 9600 | | 1055 | | DEFW | 150 |
| 04A5 | 7E00 | | 1056 | | DEFW | 126 |
| | | | 1057 | BUTTBL: | | |
| 04A7 | 5402 | | 1058 | | DEFW | 596 |
| 04A9 | C402 | | 1059 | | DEFW | 708 |
| 04AB | 4903 | | 1060 | | DEFW | 841 |
| 04AD | E803 | | 1061 | | DEFW | 1000 |
| 04AF | A504 | | 1062 | | DEFW | 1189 |
| 04B1 | 8505 | | 1063 | | DEFW | 1413 |
| 04B3 | 8E06 | | 1064 | | DEFW | 1678 |
| | | | 1065 | BUTTB1: | | |
| 04B5 | A601 | | 1066 | | DEFW | 0422 |
| 04B7 | F501 | | 1067 | | DEFW | 0501 |
| 04B9 | CB07 | | 1068 | | DEFW | 1995 |
| 04BB | 4309 | | 1069 | | DEFW | 2371 |
| 04BD | 020B | | 1070 | | DEFW | 2818 |
| 04BF | 160D | | 1071 | | DEFW | 3350 |
| 04C1 | 8D0F | | 1072 | | DEFW | 3981 |
| | | | 1073 | BUTTB2: | | |
| 04C3 | 7C12 | | 1074 | | DEFW | 4732 |
| 04C5 | F715 | | 1075 | | DEFW | 5623 |
| 04C7 | 1B1A | | 1076 | | DEFW | 6683 |
| 04C9 | 071F | | 1077 | | DEFW | 7943 |
| 04CB | E024 | | 1078 | | DEFW | 9440 |
| 04CD | D42B | | 1079 | | DEFW | 11220 |
| 04CF | 1734 | | 1080 | | DEFW | 13335 |
| | | | 1081 | BUTTB5: | | |

```
04D1   E93D            1082         DEFW   15849
04D3   9549            1083         DEFW   18837
04D5   7357            1084         DEFW   22387
04D7   EF67            1085         DEFW   26607
04D9   877B            1086         DEFW   31623
04DB   877B            1087         DEFW   31623
04DD   877B            1088         DEFW   31623
                       1089  ;
                       1090  ;
                       1091  END
```

CROSS REFERENCE                                  PRINT
SYMBOL   VAL  M DEFN REFS

```
ADD      6906      323
ADHIGH   0008      125
ADLOW    0010      124
ADMODE   68FA      314  315
ADSEL    0010      123
ADVCNT   6900      319  320  663
ADVPUL   6A34      378  379  661
ADWAIT   6A36      379  380
AD_RUN   0020       88
ANS      6848      229  230
ANSLP    6861      234  235
ANSSAV   6857      233  234
BANK2    0010       81
BANK4    0000      101
BCH      6880      256  257
BCORR    6A24      371  372  647  941
BCOUNT   68F7      311  312
BDDEN    6A58      385  386
BDENVA   6A70      391  392
BDICHR   6A6A      388  389
BDISP    683C      223  224
BEEPER   0040       89
BEEP_1   001C  X   473  702
BEEP_2   00E0  X   470  577  739  921
BEPFLG   6884      259  260  552  560  688
BEXP     686B      241  242  519  569  799  829  836  855  877  879  906
                               908  942  944
BLINK    01E4  R   700  687  690  693  696
BLINK1   01FD  R   713  711
BLINK2   020D  R   720  718
BLKCNT   68EF      304  305  713  717
BLUCHL   0005       85
BLUDEN   68B4      276  277
BLUMAS   6A1E      368  369  904  918
BLUNEG   6A0C      359  360
BLUREF   6A06      356  357
BMESSG   047D  R  1032 1006
BMSG1    007C  X   472 1034
BMSG2    0073  X   472 1035
BMSG3    004C  X   473 1038
BMSG4    0043  X   473 1037
BMSG5    003A  X   473 1036
BNEG     682A      214  215
BO4PRN   6A12      362  363
BOFFS    6A2A      374  375
BOMBED   019E  G   671  468
BOMOUT   6903      321  322  656  669
BP       68E2      294  295
BP0      68C6      280  281
BPTIME   6836      220  221  570  682  828  832
BPU      68C4      279  280
BREF     6824      211  212
```

CROSS REFERENCE                    PRINT
SYMBOL   VAL  M DEFN REFS

BRTIME  6830      217  218  518  525
BU1PRN  6A18      365  366
BUTMSG  008F  X   472 1033
BUTOFF  6882      258  259  876  880  884  990
BUTT7   0435  G   966  468  746  957
BUTT7A  0449  R   984
BUTT7B  0462  R  1009
BUTT7N  041F  G   952  468
BUTTB1  04B5  R  1065 1026
BUTTB2  04C3  R  1073 1027
BUTTB3  0489  R  1040 1030
BUTTB4  0499  R  1049 1029
BUTTB5  04D1  R  1081 1028
BUTTBL  04A7  R  1057 1025
BUTTN   0471  R  1024  982
BYTE0   686D      242  243
BYTE1   68F4      308  309
CALSU   0000  X   474  479
CBHFLG  68E6      296  297  641  685
CHECK   03BA  R   911  893  899  905
CLR74   0008       73
CMXSET  0013      346  347
CNT     680D      198  199
COLCOR  6888      263  264
COLRSG  6889      264  265
COLRVA  688A      265  266
CONFLG  6885      260  261
CORCOL  03E7  R   931  538
COUNT   6881      257  258
CPADL   0001       70  846  865
CRATIO  68EC      302  303
CREG_1  0030      111
CREG_2  0031      112
CREG_3  0032      113  782  784  786  871
CREG_4  0033      114
CRFAIL  03DF  R   927  919
CTIME   6844      227  228
CUTMSG  0055  X   472  575
CUTPUL  6A32      377  378  582
DAVES   00AC  R   559  550
DBADGF  0025      172
DBBAVG  001E      165
DBBLUC  0022      169
DBBNBF  002B      178
DBBNFT  000C      147
DBBO4N  0031      184
DBBPBF  0028      175
DBBPFT  0009      144
DBBRAD  002E      181
DBBRFT  0006      141
DBBSFR  001B      162
DBBSO   0012      153
DBBSOO  000F      150
DBBSU   0015      156
DBBSUU  0018      159
DBBU1N  0035      187
DBFRAT  0023      170
DBFS    0001      136
DBFT    0002      137
DBGAVG  001D      164
DBGNBF  002A      177
DBGNFT  000B      146
DBGO4N  0030      183
DBGPBF  0027      174

```
DBGPPT  0008      143
DBGRAD  002D      180
DBGRPT  0005      140
DBGSFR  001A      161
DBGSO   0011      152
DBGSOO  000E      149
DBGSU   0014      155
DBGSUU  0017      158
DBGU1N  0034      186
DBMAGC  0024      171
DBPCNT  001F      166   633   638
DBPT    0003      138
DBPTR   68E0      293   294
DBRAVG  001C      163
DBRNBP  0029      176
DBRNPT  000A      145
DBRO4N  002F      182
DBRPBP  0026      173
DBRPPT  0007      142
DBRRAD  002C      179
DBRRPT  0004      139
DBRSFR  0019      160
DBRSO   0010      151
DBRSOO  000D      148
DBRSU   0013      154
DBRSUU  0016      157
DBRU1N  0032      185
DBTRAT  0020      167
DBTRBG  0021      168
DDIV    00D8  X   471   949
DEC     684C      231   232
DECDSP  684E      232   233
DEFLT1  00BF       79   593   867
DEFLT2  0060       90
DEFLT3  001F       99
DELTAT  68D8      289   290
DENBUT  68F9      313   314   745   966
DENMAX  001D      348
DIFF    6891      270   271
DIGPTR  6808      193   194
DISTIM  0105  X   470   679   681   683   796   798   800
DKSHUT  0010       74   599
DMPY    00EA  X   470   947
DOBLNK  68F8      312   313   701   705   758   767
DOCORR  0078  R   530   513
DO_SFS  00A3  X   471   536
DSP255  0099  X   471   738
ECONSV  6862      235   236
ED2B    0003      335   336
EMXSET  0031      347
END     04DF  R  1091
ENDEM   6820      208   209
ENDRAM  0C6C      396
ENDVAL  6A72      392
ERAM    5000      190
EXDONE  011F  R   611   608
EXEC    010F  X   470
EXECME  6816      207   208
EXP1    0283  R   787
EXP2    0292  R   793   866
EXP3    031F  R   848   844
EXP4    032F  R   855   851
EXP5    033F  R   863   858
EXP6    030F  R   841   803   806   817
EXP7    028F  R   792   790
EXPO    0111  R   603
```

```
EXPO1   016D R  648  643
EXPO2   018A R  661  654
EXPO3   02D1    818  810
EXPOSE  0277 R  781  603
EXRANG  6887    262  263  981 1005
FACTOR  6A30    376  377
FLGSFS  68E9    299  300  694
FLOCOR  0026 X  473  546
FLOFLG  68F6    310  311  544
FOOTSW  0000    103  749  753
FSFSF   68E8    298  299  757  766
FUNC    6870    245  246
FUNPTR  6878    251  252
GCH     687F    255  256
GCORR   6A22    370  371  646  936
GDDEN   6A4A    384  385
GDENVA  6A6E    390  391
GDICHR  6A68    387  388
GDISP   683A    222  223
GETRNG  046B R 1017  983 1007
GEXP    6869    240  241  517  567  797  824  835  848  881  883  900
                     902  937  939
GNEG    6828    213  214
GO4PRN  6A10    361  362
GOFFS   6A28    373  374
GPTIME  6834    219  220  568  680  823  827
GREF    6822    210  211
GRNCHL  0006     84
GRNDEN  68A6    275  276
GRNMAS  6A1C    367  368  898  917
GRNNEG  6A0A    358  359
GRNREF  6A04    355  356
GRTIME  682E    216  217  516  524
GU1PRN  6A16    364  365
HEX     684A    230  231
HEXSGN  688B    266  267
HHRCNT  68EE    303  304
HIREL   0003     40
HRCNT   6811    202  203
IN74A   0002    105
IN74B   0003    106
IOIMG1  6864    236  237  497  499  504  506  594  598  600  657  659
                     845  847  852  854  859  861  863  868
IOIMG2  6865    237  238
IOIMG3  6866    238  239
IOIMG4  6895    272  273  493  572  579  748
K801    0040     76  505
KBD     0028    121
KBDBUF  680A    195  196  588  804
KBDFLG  680B    196  197  585  609  761  801  814  838
KEY0    000C    423
KEY1    0000    404
KEY1M   0021    443
KEY1P   0025    447
KEY2    0001    406
KEY2M   0020    442
KEY2P   0026    448
KEY3    0002    408
KEY4    0003    410
KEY5    0004    412
KEY6    0005    414
KEY7    0008    416
KEY8    0009    418
KEY9    000A    420
KEYABS  0009    419
KEYADV  001B    434
```

| | | | | | | | | | |
|---|---|---|---|---|---|---|---|---|---|
| KEYB | 0012 | | 427 | | | | | | |
| KEYC | 0013 | | 428 | | | | | | |
| KEYCAN | 0019 | | 432 | 591 | 805 | | | | |
| KEYCBH | 0002 | | 409 | | | | | | |
| KEYENT | 0018 | | 431 | 589 | | | | | |
| KEYEXR | 000A | | 421 | | | | | | |
| KEYFCP | 0004 | | 413 | | | | | | |
| KEYG | 0011 | | 426 | | | | | | |
| KEYM | 0014 | | 429 | | | | | | |
| KEYMIN | 001E | | 440 | | | | | | |
| KEYN | 0023 | | 445 | 965 | | | | | |
| KEYNM | 0022 | | 444 | | | | | | |
| KEYNO | 001E | | 441 | | | | | | |
| KEYNP | 0024 | | 446 | | | | | | |
| KEYOFF | 001E | | 439 | | | | | | |
| KEYON | 001D | | 436 | | | | | | |
| KEYORD | 000D | | 424 | | | | | | |
| KEYPAP | 0003 | | 411 | | | | | | |
| KEYPLU | 001D | | 437 | | | | | | |
| KEYPRI | 0000 | | 405 | | | | | | |
| KEYR | 0010 | | 425 | | | | | | |
| KEYSFS | 0001 | | 407 | | | | | | |
| KEYSLP | 0008 | | 417 | | | | | | |
| KEYSPE | 000B | | 422 | | | | | | |
| KEYSTP | 001C | | 435 | | | | | | |
| KEYSU | 0005 | | 415 | | | | | | |
| KEYTIM | 001A | | 433 | | | | | | |
| KEYY | 0015 | | 430 | | | | | | |
| KEYYES | 001D | | 438 | | | | | | |
| L801 | 0080 | | 77 | | | | | | |
| L801N | 007F | | 78 | 498 | | | | | |
| LDCON | 00A7 | | 115 | 783 | | | | | |
| LINEAR | 00F2 | X | 470 | 532 | | | | | |
| LOGO | 68C3 | | 278 | 279 | | | | | |
| LOOP | 01EC | R | 704 | 699 | 763 | | | | |
| LOOP1 | 0214 | R | 724 | 707 | | | | | |
| LOOP2 | 0265 | R | 761 | 750 | 754 | | | | |
| LOOP3 | 0245 | R | 748 | 731 | | | | | |
| LOREL | 0089 | | 41 | | | | | | |
| MASCOR | 0383 | R | 892 | 534 | 925 | | | | |
| MAX | 68EA | | 300 | 301 | | | | | |
| MAX2B | 0034 | | 336 | 337 | 339 | | | | |
| MAXCLC | 0CFF | | 343 | 344 | | | | | |
| MAXFLD | 0034 | | 337 | | | | | | |
| MAXSET | 001E | | 345 | 347 | 396 | | | | |
| MIN | 68EB | | 301 | 302 | | | | | |
| MINCNT | 6810 | | 201 | 202 | | | | | |
| MINUS | 68FB | | 315 | 316 | | | | | |
| MODE | 6877 | | 250 | 251 | | | | | |
| MPADL | 0002 | | 71 | 853 | 865 | | | | |
| MSG11 | 00B6 | X | 471 | 671 | 787 | | | | |
| MSG12 | 00AD | X | 471 | 675 | 791 | | | | |
| MSG5 | 00BF | X | 471 | | | | | | |
| MSGCNT | 6896 | | 273 | 274 | | | | | |
| MSGNOR | 0085 | X | 472 | | | | | | |
| MSGSIZ | 0008 | | 334 | | | | | | |
| MULPRN | 6901 | | 320 | 321 | 605 | 728 | 736 | 742 | 744 | 807 | 816 |
| MXSETP | 001F | | 344 | 345 | | | | | | |
| N3 | 68C8 | | 281 | 282 | | | | | | |
| N3DEN | 68DA | | 290 | 291 | | | | | | |
| N3TIME | 68DE | | 292 | 293 | | | | | | |
| NEG | 6840 | | 225 | 226 | | | | | | |
| NEGSLP | 6872 | | 247 | 248 | | | | | | |
| NOCORR | 00B9 | R | 565 | 528 | 557 | 562 | | | | |
| NORMAL | 0415 | R | 947 | 878 | 882 | 886 | 895 | 901 | 907 | 933 | 938 | 943 |
| NT | 68CA | | 282 | 283 | | | | | | |

| | | | | | | | | | | | |
|---|---|---|---|---|---|---|---|---|---|---|---|
| NTDEN | 68DC | | 291 | 292 | | | | | | | |
| O4 | 68D4 | | 287 | 288 | | | | | | | |
| OLDKEY | 68FE | | 317 | 318 | | | | | | | |
| OPERAT | 0001 | | 104 | 494 | | | | | | | |
| ORDSRT | 68FC | | 316 | 317 | 628 | 630 | | | | | |
| PAPADV | 0020 | | 75 | 658 | | | | | | | |
| PAPCLR | 0107 | R | 598 | 574 | 584 | 590 | | | | | |
| PAPFLG | 6886 | | 261 | 262 | 652 | 697 | | | | | |
| POSSLP | 6871 | | 246 | 247 | | | | | | | |
| PRIM1 | 0013 | X | 473 | 734 | | | | | | | |
| PRINT | 0433 | G | 965 | 468 | 759 | | | | | | |
| PRINT1 | 0000 | R | 476 | 1014 | | | | | | | |
| PRINT2 | 0024 | R | 493 | 484 | | | | | | | |
| PRNCNT | 6A2C | | 375 | 376 | 611 | 614 | 615 | 618 | 619 | 622 | 623 | 626 |
| PRNSW | 68C2 | | 277 | 278 | 955 | 961 | | | | | |
| PUTASC | 0117 | X | 470 | 486 | 576 | 676 | 735 | 792 | 920 | 1013 | |
| RAM | 6800 | | 189 | 192 | 340 | 343 | | | | | |
| RAMSUM | 6904 | | 322 | 323 | | | | | | | |
| RCH | 687E | | 254 | 255 | | | | | | | |
| RCORR | 6A20 | | 369 | 370 | 645 | 931 | | | | | |
| RCSLOP | 68E4 | | 295 | 296 | | | | | | | |
| RDDEN | 6A3C | | 383 | 384 | | | | | | | |
| RDENVA | 6A6C | | 389 | 390 | | | | | | | |
| RDICHR | 6A66 | | 386 | 387 | | | | | | | |
| RDISP | 6838 | | 221 | 222 | | | | | | | |
| RDNEG | 00FC | X | 470 | 530 | | | | | | | |
| REDCHL | 0007 | | 83 | | | | | | | | |
| REDDEN | 6898 | | 274 | 275 | | | | | | | |
| REDMAS | 6A1A | | 366 | 367 | 892 | 916 | | | | | |
| REDNEG | 6A08 | | 357 | 358 | | | | | | | |
| REDREF | 6A02 | | 354 | 355 | | | | | | | |
| REF | 683E | | 224 | 225 | | | | | | | |
| REM | 6846 | | 228 | 229 | | | | | | | |
| REXP | 6867 | | 239 | 240 | 515 | 565 | 795 | 819 | 834 | 841 | 885 | 887 | 894 |
| | | | | | 896 | 932 | 934 | | | | |
| RNDIN | 0020 | | 122 | | | | | | | | |
| RNDOUT | 0008 | | 92 | | | | | | | | |
| RNEG | 6826 | | 212 | 213 | | | | | | | |
| RO4PRN | 6A0E | | 360 | 361 | | | | | | | |
| ROFFS | 6A26 | | 372 | 373 | | | | | | | |
| RPTIME | 6832 | | 218 | 219 | 566 | 678 | 818 | 822 | | | |
| RREF | 6820 | | 209 | 210 | | | | | | | |
| RRTIME | 682C | | 215 | 216 | 514 | 523 | | | | | |
| RSTCNT | 6A38 | | 380 | 381 | | | | | | | |
| RSTCTC | 0003 | | 116 | 781 | 870 | | | | | | |
| RTIME | 6842 | | 226 | 227 | | | | | | | |
| RU1PRN | 6A14 | | 363 | 364 | | | | | | | |
| SCNCNT | 680E | | 199 | 200 | | | | | | | |
| SCRTH1 | 68F0 | | 305 | 306 | | | | | | | |
| SECCNT | 680F | | 200 | 201 | | | | | | | |
| SEG | 0020 | | 119 | | | | | | | | |
| SEGIMG | 6800 | | 192 | 193 | 677 | 721 | 722 | 794 | | | |
| SEGOUT | 687A | | 253 | 254 | | | | | | | |
| SEL | 0018 | | 120 | | | | | | | | |
| SELCT1 | 0069 | X | 472 | 1019 | | | | | | | |
| SELPTR | 6809 | | 194 | 195 | | | | | | | |
| SET1 | 00D0 | X | 471 | 634 | 639 | | | | | | |
| SET12B | 0031 | | 333 | 336 | | | | | | | |
| SETNG | 001C | R | 491 | 485 | | | | | | | |
| SETNUM | 686E | | 243 | 244 | 476 | | | | | | |
| SETSAV | 686F | | 244 | 245 | | | | | | | |
| SETSIZ | 006A | | 339 | 344 | 346 | 396 | | | | | |
| SETUPO | 6A00 | | 341 | 342 | 354 | | | | | | |
| SETVAL | 6875 | | 249 | 250 | | | | | | | |
| SEVDEN | 0355 | R | 876 | 556 | 559 | | | | | | |
| SFS1 | 01AA | R | 676 | 674 | | | | | | | |

```
SFSFLG  68E7      297  298  672  709  756  765  788
SHO_SU  005F  X   472  651
SIGN    6815      206  207
SLOPE   00C7  X   471  555  563
SLPEX   00A6  R   556  554
SLPFLG  68F3      307  308  548  691
SLP01   68CC      283  284
SLP02   68CE      284  285
SLPU1   68D0      285  286
SLPU2   68D2      286  287
SPCHR   0021      126
SRTCNT  6A3A      381  383
SRTSSR  0010       98
SSR1    0000       68  500  507  595  601  660  864  869
SSR12   0001       94
SSR7    0004       96
SSR8    0008       97
SSRXX   0002       95
STACK   6A00      340  341
SUADDR  6B00      342  343
SUFLAG  6879      252  253
SUPTR   6873      248  249
TAPON   0010       87
TAPOUT  0008       86
TBLSAV  6893      271  272
TEMP    6812      203  204
TEMP1   6813      204  205
TEMPKE  680C      197  198
TEMPSU  68F2      306  307
TIMER   6814      205  206
TIME_1  0018      117
TIME_2  0000      118
TIMFLG  688C      267  268  511  521
TTIME   688D      268  269
TTIME1  688F      269  270
TUNCOR  0030  X   473  542
TUNFLG  68F5      309  310  540
U1      68D6      288  289
WAIT    0121  X   470  502  509  527  583  649  733  741  752  923  959
WAITKY  0009  X   473  488  667
WAITPC  00DC  R   578  587  592
WAITSW  0004      107  573  580
WTPC1   00EE  R   585  581
YPADL   0004       72  860  865
Y_NFLG  68FF      318  319  813  839
```

```
                              CONVER
LOC   OBJ CODE  M STMT SOURCE STATEMENT

450   *LIST ON
                    451   ;
                    452   ;
                    453   ;         101
                    454   ;
                    455   ;
                    456           EXTERNAL       DMP
                    457           GLOBAL         DEC
                    458   ;
0000  1027          459   HEXREP: DEFW   10000D
0002  E803          460   X1K     DEFW   1000D
0004  6400          461   X100    DEFW   100D
0006  0A00          462   X10     DEFW   10D
0008  0100          463   X1      DEFW   1D
                    464   ;===========================
                    465   ;
```

```
                466  ;
                467  ;===========================
                468  ;
                469  ;              BCD TO HEX C
                470  ;
                471  ;
                472  ;         INPUT:  8 CHARACTERS
                473  ;
                474  ;
                475  ;         OUTPUT: 6 HEX CHARAC
                476  ;                         A    =
                477  ;                         HL   =
                478  ;                 HEXSGN  =  O
                479  ;                         NE O
                480  ;===========================
                481  ;
                482  DECTHX:
000A  CD9200  R  483          CALL     CLRDD
000D  CD9F00  R  484          CALL     MAKDEC
0010  214668     485          LD       HL,REM
0013  3600       486          LD       (HL),0
0015  214E68     487          LD       HL,DECDSP
0018  7E         488          LD       A,(HL)
0019  23         489          INC      HL
001A  B6         490          OR       (HL)
001B  23         491          INC      HL
001C  B6         492          OR       (HL)
001D  C29000  R  493          JP       NZ,OVER
0020  210000  R  494          LD       HL,HEXREP
0023  224A68     495          LD       (HEX),HL
0026  215168     496          LD       HL,DECDSP+3
0029  224C68     497          LD       (DEC),HL
002C  215768     498          LD       HL,ANSSAV
002F  224868     499          LD       (ANS),HL
0032  3E05       500          LD       A,5
                501
                502  DTH1:
0034  F5         503          PUSH     AF
0035  2A4A68     504          LD       HL,(HEX)
0038  4E         505          LD       C,(HL)
0039  23         506          INC      HL
003A  46         507          LD       B,(HL)
003B  23         508          INC      HL
003C  224A68     509          LD       (HEX),HL
003F  2A4C68     510          LD       HL,(DEC)
0042  5E         511          LD       E,(HL)
0043  23         512          INC      HL
0044  1600       513          LD       D,0
0046  224C68     514          LD       (DEC),HL
0049  CD0000  X  515          CALL     DMPY
004C  7D         516          LD       A,L
004D  B7         517          OR       A
004E  CA5500  R  518          JP       Z,DTH1A
0051  214668     519          LD       HL,REM
0054  34         520          INC      (HL)
                521  DTH1A:
0055  2A4868     522          LD       HL,(ANS)
0058  73         523          LD       (HL),E
0059  23         524          INC      HL
005A  72         525          LD       (HL),D
005B  23         526          INC      HL
005C  224868     527          LD       (ANS),HL
005F  F1         528          POP      AF
0060  3D         529          DEC      A
0061  C23400  R  530          JP       NZ,DTH1
0064  3E05       531          LD       A,5
```

```
0066  215768        532        LD      HL,ANSSAV
0069  226168        533        LD      (ANSLP),HL
006C  210000        534        LD      HL,0
                    535  DTH2:
006F  F5            536        PUSH    AF
0070  EB            537        EX      DE,HL
0071  2A6168        538        LD      HL,(ANSLP)
0074  4E            539        LD      C,(HL)
0075  23            540        INC     HL
0076  46            541        LD      B,(HL)
0077  23            542        INC     HL
0078  226168        543        LD      (ANSLP),HL
007B  EB            544        EX      DE,HL
007C  09            545        ADD     HL,BC
007D  D28600     R  546        JP      NC,DTH3
0080  E5            547        PUSH    HL
0081  214668        548        LD      HL,REM
0084  34            549        INC     (HL)
0085  E1            550        POP     HL
                    551  DTH3:
0086  F1            552        POP     AF
0087  3D            553        DEC     A
0088  C26F00     R  554        JP      NZ,DTH2
008B  3A4668        555        LD      A,(REM)
008E  B7            556        OR      A
008F  C9            557        RET
                    558  OVER:
0090  37            559        SCF
0091  C9            560        RET
                    561  *EJECT
                    562  ;
                    563  ;
                    564  ;
                    565  ;================================
                    566  ;
                    567  ;              CLEAR RAM SAVE A
                    568  ;
                    569  ;
                    570  ;      INPUT:  CLRDD   - NONE
                    571  ;              CLR8B   - HL POI
                    572  ;              CLRTC   - HL POI
                    573  ;                        C = NU
                    574  ;
                    575  ;
                    576  ;      OUTPUT: CLRDD   - DECDSP
                    577  ;              CLRHXS  - HEXSAV
                    578  ;              CLR8B   - HL
                    579  ;              CLRTC   - HL
                    580  ;
                    581  ;================================
                    582
                    583  CLRDD:
0092  214E68        584        LD      HL,DECDSP
                    585  CLR8B:
0095  0E08          586        LD      C,8
                    587  CLRTC:
0097  3600          588        LD      (HL),0
0099  23            589        INC     HL
009A  0D            590        DEC     C
009B  C29700     R  591        JP      NZ,CLRTC
009E  C9            592        RET
                    593  *EJECT
                    594  ;
                    595  ;================================
                    596  ;
                    597  ;
```

```
                              598  ;               DECIMAL TO HEX C
                              599  ;
                              600  ;
                              601  ;      INPUT:   DATA STORED IN D
                              602  ;
                              603  ;
                              604  ;      OUTPUT:  DATA STORED IN S
                              605  ;               SIGN STORED IN H
                              606  ;
                              607  ;=============================
                              608  ;
                              609  ;
                              610  MAKDEC:
009F   3E00                   611         LD      A,0
00A1   328B68                 612         LD      (HEXSGN),A
00A4   115568                 613         LD      DE,DECDSP+7
00A7   0E08                   614         LD      C,8
00A9   210768                 615         LD      HL,SEGIMG+7
                              616
                              617  MAKD01:
00AC   7E                     618         LD      A,(HL)
00AD   E67F                   619         AND     07FH
00AF   FE21                   620         CP      SPCHR
00B1   C8                     621         RET     Z
00B2   FE14                   622         CP      'K'-'7'
00B4   CAC400   R             623         JP      Z,MAKD02
00B7   FE13                   624         CP      'K'-'8'
00B9   CAC700   R             625         JP      Z,MAKD03
00BC   12                     626         LD      (DE),A
00BD   2B                     627         DEC     HL
00BE   1B                     628         DEC     DE
00BF   0D                     629         DEC     C
00C0   C2AC00   R             630         JP      NZ,MAKD01
00C3   C9                     631         RET
                              632  ;
                              633  MAKD02:
00C4   328B68                 634         LD      (HEXSGN),A
                              635  MAKD03:
00C7   3621                   636         LD      (HL),SPCHR
00C9   C9                     637         RET
                              638  ;
                              639  *END
```

CROSS REFERENCE                    CONVER
SYMBOL   VAL  M DEFN REFS

| SYMBOL | VAL | M | DEFN | REFS | | | |
|---|---|---|---|---|---|---|---|
| ADD | 6906 | | 323 | | | | |
| ADHIGH | 0008 | | 125 | | | | |
| ADLOW | 0010 | | 124 | | | | |
| ADMODE | 68FA | | 314 | 315 | | | |
| ADSEL | 0010 | | 123 | | | | |
| ADVCNT | 6900 | | 319 | 320 | | | |
| ADVPUL | 6A34 | | 378 | 379 | | | |
| ADWAIT | 6A36 | | 379 | 380 | | | |
| AD_RUN | 0020 | | 88 | | | | |
| ANS | 6848 | | 229 | 230 | 499 | 522 | 527 |
| ANSLP | 6861 | | 234 | 235 | 533 | 538 | 543 |
| ANSSAV | 6857 | | 233 | 234 | 498 | 532 | |
| BANK2 | 0010 | | 81 | | | | |
| BANK4 | 0000 | | 101 | | | | |
| BCH | 6880 | | 256 | 257 | | | |
| BCORR | 6A24 | | 371 | 372 | | | |
| BCOUNT | 68F7 | | 311 | 312 | | | |
| BDDEN | 6A58 | | 385 | 386 | | | |
| BDENVA | 6A70 | | 391 | 392 | | | |
| BDICHR | 6A6A | | 388 | 389 | | | |

| | | | | |
|---|---|---|---|---|
| BDISP | 683C | | 223 | 224 |
| BEEPER | 0040 | | 89 | |
| BEPFLG | 6884 | | 259 | 260 |
| BEXP | 686B | | 241 | 242 |
| BLKCNT | 68EF | | 304 | 305 |
| BLUCHL | 0005 | | 85 | |
| BLUDEN | 68B4 | | 276 | 277 |
| BLUMAS | 6A1E | | 368 | 369 |
| BLUNEG | 6A0C | | 359 | 360 |
| BLUREF | 6A06 | | 356 | 357 |
| BNEG | 682A | | 214 | 215 |
| BO4PRN | 6A12 | | 362 | 363 |
| BOFFS | 6A2A | | 374 | 375 |
| BOMOUT | 6903 | | 321 | 322 |
| BP | 68E2 | | 294 | 295 |
| BPO | 68C6 | | 280 | 281 |
| BPTIME | 6836 | | 220 | 221 |
| BPU | 68C4 | | 279 | 280 |
| BREF | 6824 | | 211 | 212 |
| BRTIME | 6830 | | 217 | 218 |
| BU1PRN | 6A18 | | 365 | 366 |
| BUTOFF | 6882 | | 258 | 259 |
| BYTE0 | 686D | | 242 | 243 |
| BYTE1 | 68F4 | | 308 | 309 |
| CBHFLG | 68E6 | | 296 | 297 |
| CLR74 | 0008 | | 73 | |
| CLR8B | 0095 | R | 585 | |
| CLRDD | 0092 | G | 583 | 457 483 |
| CLRTC | 0097 | R | 587 | 591 |
| CMXSET | 0013 | | 346 | 347 |
| CNT | 680D | | 198 | 199 |
| COLCOR | 6888 | | 263 | 264 |
| COLRSG | 6889 | | 264 | 265 |
| COLRVA | 688A | | 265 | 266 |
| CONFLG | 6885 | | 260 | 261 |
| COUNT | 6881 | | 257 | 258 |
| CPADL | 0001 | | 70 | |
| CRATIO | 68EC | | 302 | 303 |
| CREG_1 | 0030 | | 111 | |
| CREG_2 | 0031 | | 112 | |
| CREG_3 | 0032 | | 113 | |
| CREG_4 | 0033 | | 114 | |
| CTIME | 6844 | | 227 | 228 |
| CUTPUL | 6A32 | | 377 | 378 |
| DBADGF | 0025 | | 172 | |
| DBBAVG | 001E | | 165 | |
| DBBLUC | 0022 | | 169 | |
| DBBNBP | 002B | | 178 | |
| DBBNPT | 000C | | 147 | |
| DBBO4N | 0031 | | 184 | |
| DBBPBP | 0028 | | 175 | |
| DBBPPT | 0009 | | 144 | |
| DBBRAD | 002E | | 181 | |
| DBBRPT | 0006 | | 141 | |
| DBBSFR | 001B | | 162 | |
| DBBSO | 0012 | | 153 | |
| DBBSOO | 000F | | 150 | |
| DBBSU | 0015 | | 156 | |
| DBBSUU | 0018 | | 159 | |
| DBBU1N | 0035 | | 187 | |
| DBFRAT | 0023 | | 170 | |
| DBFS | 0001 | | 136 | |
| DBFT | 0002 | | 137 | |
| DBGAVG | 001D | | 164 | |
| DBGNBP | 002A | | 177 | |
| DBGNPT | 000B | | 146 | |

| | | | | | | | |
|---|---|---|---|---|---|---|---|
| DBG04N | 0030 | | 183 | | | | |
| DBGFBP | 0027 | | 174 | | | | |
| DBGFPT | 0008 | | 143 | | | | |
| DBGRAD | 002D | | 180 | | | | |
| DBGRPT | 0005 | | 140 | | | | |
| DBGSFR | 001A | | 161 | | | | |
| DBGSO | 0011 | | 152 | | | | |
| DBGSOO | 000E | | 149 | | | | |
| DBGSU | 0014 | | 155 | | | | |
| DBGSUU | 0017 | | 158 | | | | |
| DBGU1N | 0034 | | 186 | | | | |
| DBMAGC | 0024 | | 171 | | | | |
| DBPCNT | 001F | | 166 | | | | |
| DBPT | 0003 | | 138 | | | | |
| DBPTR | 68E0 | | 293 | 294 | | | |
| DBRAVG | 001C | | 163 | | | | |
| DBRNBP | 0029 | | 176 | | | | |
| DBRNPT | 000A | | 145 | | | | |
| DBRO4N | 002F | | 182 | | | | |
| DBRFBP | 0026 | | 173 | | | | |
| DBRFPT | 0007 | | 142 | | | | |
| DBRRAD | 002C | | 179 | | | | |
| DBRRPT | 0004 | | 139 | | | | |
| DBRSFR | 0019 | | 160 | | | | |
| DBRSO | 0010 | | 151 | | | | |
| DBRSOO | 000D | | 148 | | | | |
| DBRSU | 0013 | | 154 | | | | |
| DBRSUU | 0016 | | 157 | | | | |
| DBRU1N | 0032 | | 185 | | | | |
| DBTRAT | 0020 | | 167 | | | | |
| DBTRBG | 0021 | | 168 | | | | |
| DEC | 684C | | 231 | 232 | 497 | 510 | 514 |
| DECDSP | 684E | | 232 | 233 | 487 | 496 | 584 | 613 |
| DECTHX | 000A | G | 482 | 457 | | | |
| DEFLT1 | 00BF | | 79 | | | | |
| DEFLT2 | 0060 | | 90 | | | | |
| DEFLT3 | 001F | | 99 | | | | |
| DELTAT | 68D8 | | 289 | 290 | | | |
| DENBUT | 68F9 | | 313 | 314 | | | |
| DENMAX | 001D | | 348 | | | | |
| DIFF | 6891 | | 270 | 271 | | | |
| DIGPTR | 6808 | | 193 | 194 | | | |
| DKSHUT | 0010 | | 74 | | | | |
| DMPY | 0031 | X | 456 | 515 | | | |
| DOBLNK | 68F8 | | 312 | 313 | | | |
| DTH1 | 0034 | R | 502 | 530 | | | |
| DTH1A | 0055 | R | 521 | 518 | | | |
| DTH2 | 006F | R | 535 | 554 | | | |
| DTH3 | 0086 | R | 551 | 546 | | | |
| ECONSV | 6862 | | 235 | 236 | | | |
| ED2B | 0003 | | 335 | 336 | | | |
| EMXSET | 0031 | | 347 | | | | |
| ENDEM | 6820 | | 208 | 209 | | | |
| ENDRAM | 0C6C | | 396 | | | | |
| ENDVAL | 6A72 | | 392 | | | | |
| ERAM | 5000 | | 190 | | | | |
| EXECME | 6816 | | 207 | 208 | | | |
| EXRANG | 6887 | | 262 | 263 | | | |
| FACTOR | 6A30 | | 376 | 377 | | | |
| FLGSFS | 68E9 | | 299 | 300 | | | |
| FLOFLG | 68F6 | | 310 | 311 | | | |
| FOOTSW | 0000 | | 103 | | | | |
| FSFSF | 68E8 | | 298 | 299 | | | |
| FUNC | 6870 | | 245 | 246 | | | |
| FUNPTR | 6878 | | 251 | 252 | | | |
| GCH | 687F | | 255 | 256 | | | |

| | | | | | | |
|---|---|---|---|---|---|---|
| GCORR | 6A22 | 370 | 371 | | | |
| GDDEN | 6A4A | 384 | 385 | | | |
| GDENVA | 6A6E | 390 | 391 | | | |
| GDICHR | 6A68 | 387 | 388 | | | |
| GDISP | 683A | 222 | 223 | | | |
| GETKEY | 001D X | 456 | | | | |
| GEXP | 6869 | 240 | 241 | | | |
| GNEG | 6828 | 213 | 214 | | | |
| GO4PRN | 6A10 | 361 | 362 | | | |
| GOFFS | 6A28 | 373 | 374 | | | |
| GPTIME | 6834 | 219 | 220 | | | |
| GREF | 6822 | 210 | 211 | | | |
| GRNCHL | 0006 | 84 | | | | |
| GRNDEN | 68A6 | 275 | 276 | | | |
| GRNMAS | 6A1C | 367 | 368 | | | |
| GRNNEG | 6A0A | 358 | 359 | | | |
| GRNREF | 6A04 | 355 | 356 | | | |
| GRTIME | 682E | 216 | 217 | | | |
| GU1PRN | 6A16 | 364 | 365 | | | |
| HEX | 684A | 230 | 231 | 495 | 504 | 509 |
| HEXREP | 0000 R | 459 | 494 | | | |
| HEXSGN | 688B | 266 | 267 | 612 | 634 | |
| HHRCNT | 68EE | 303 | 304 | | | |
| HIREL | 0003 | 40 | | | | |
| HRCNT | 6811 | 202 | 203 | | | |
| IN74A | 0002 | 105 | | | | |
| IN74B | 0003 | 106 | | | | |
| IOIMG1 | 6864 | 236 | 237 | | | |
| IOIMG2 | 6865 | 237 | 238 | | | |
| IOIMG3 | 6866 | 238 | 239 | | | |
| IOIMG4 | 6895 | 272 | 273 | | | |
| K801 | 0040 | 76 | | | | |
| KBD | 0028 | 121 | | | | |
| KBDBUF | 680A | 195 | 196 | | | |
| KBDFLG | 680B | 196 | 197 | | | |
| KEY0 | 000C | 423 | | | | |
| KEY1 | 0000 | 404 | | | | |
| KEY1M | 0021 | 443 | | | | |
| KEY1P | 0025 | 447 | | | | |
| KEY2 | 0001 | 406 | | | | |
| KEY2M | 0020 | 442 | | | | |
| KEY2P | 0026 | 448 | | | | |
| KEY3 | 0002 | 408 | | | | |
| KEY4 | 0003 | 410 | | | | |
| KEY5 | 0004 | 412 | | | | |
| KEY6 | 0005 | 414 | | | | |
| KEY7 | 0008 | 416 | | | | |
| KEY8 | 0009 | 418 | | | | |
| KEY9 | 000A | 420 | | | | |
| KEYABS | 0009 | 419 | | | | |
| KEYADV | 001B | 434 | | | | |
| KEYB | 0012 | 427 | | | | |
| KEYC | 0013 | 428 | | | | |
| KEYCAN | 0019 | 432 | | | | |
| KEYCBH | 0002 | 409 | | | | |
| KEYENT | 0018 | 431 | | | | |
| KEYEXR | 000A | 421 | | | | |
| KEYFCP | 0004 | 413 | | | | |
| KEYG | 0011 | 426 | | | | |
| KEYM | 0014 | 429 | | | | |
| KEYMIN | 001E | 440 | | | | |
| KEYN | 0023 | 445 | | | | |
| KEYNM | 0022 | 444 | | | | |
| KEYNO | 001E | 441 | | | | |
| KEYNP | 0024 | 446 | | | | |
| KEYOFF | 001E | 439 | | | | |
| KEYON | 001D | 436 | | | | |

```
KEYORD  000D      424
KEYPAP  0003      411
KEYPLU  001D      437
KEYPRI  0000      405
KEYR    0010      425
KEYSFS  0001      407
KEYSLP  0008      417
KEYSPE  000B      422
KEYSTP  001C      435
KEYSU   0005      415
KEYTIM  001A      433
KEYY    0015      430
KEYYES  001D      438
L801    0080       77
L801N   007F       78
LDCON   00A7      115
LOGO    68C3      278  279
LOREL   0089       41
MAKD01  00AC  R   617  630
MAKD02  00C4  R   633  623
MAKD03  00C7  R   635  625
MAKDEC  009F  G   610  457  484
MAX     68EA      300  301
MAX2B   0034      336  337  339
MAXCLC  0CFF      343  344
MAXFLD  0034      337
MAXSET  001E      345  347  396
MIN     68EB      301  302
MINCNT  6810      201  202
MINUS   68FB      315  316
MODE    6877      250  251
MPADL   0002       71
MSGCNT  6896      273  274
MSGSIZ  0008      334
MULPRN  6901      320  321
MXSETP  001F      344  345
N3      68C8      281  282
N3DEN   68DA      290  291
N3TIME  68DE      292  293
NEG     6840      225  226
NEGSLP  6872      247  248
NT      68CA      282  283
NTDEN   68DC      291  292
O4      68D4      287  288
OLDKEY  68FE      317  318
OPERAT  0001      104
ORDSRT  68FC      316  317
OVER    0090  R   558  493
PAPADV  0020       75
PAPFLG  6886      261  262
POSSLP  6871      246  247
PRNCNT  6A2C      375  376
PRNSW   68C2      277  278
PUTASC  0027  X   456
RAM     6800      189  192  340  343
RAMSUM  6904      322  323
RCH     687E      254  255
RCORR   6A20      369  370
RCSLOP  68E4      295  296
RDDEN   6A3C      383  384
RDENVA  6A6C      389  390
RDICHR  6A66      386  387
RDISP   6838      221  222
REDCHL  0007       83
REDDEN  6898      274  275
REDMAS  6A1A      366  367
```

| | | | | | | | |
|---|---|---|---|---|---|---|---|
| REDNEG | 6A08 | 357 | 358 | | | | |
| REDREF | 6A02 | 354 | 355 | | | | |
| REF | 683E | 224 | 225 | | | | |
| REM | 6846 | 228 | 229 | 485 | 519 | 548 | 555 |
| REXP | 6867 | 239 | 240 | | | | |
| RNDIN | 0020 | 122 | | | | | |
| RNDOUT | 0008 | 92 | | | | | |
| RNEG | 6826 | 212 | 213 | | | | |
| RO4PRN | 6A0E | 360 | 361 | | | | |
| ROFFS | 6A26 | 372 | 373 | | | | |
| RPTIME | 6832 | 218 | 219 | | | | |
| RREF | 6820 | 209 | 210 | | | | |
| RRTIME | 682C | 215 | 216 | | | | |
| RSTCNT | 6A38 | 380 | 381 | | | | |
| RSTCTC | 0003 | 116 | | | | | |
| RTIME | 6842 | 226 | 227 | | | | |
| RU1PRN | 6A14 | 363 | 364 | | | | |
| SCNCNT | 680E | 199 | 200 | | | | |
| SCRTH1 | 68F0 | 305 | 306 | | | | |
| SECCNT | 680F | 200 | 201 | | | | |
| SEG | 0020 | 119 | | | | | |
| SEGIMG | 6800 | 192 | 193 | 615 | | | |
| SEGOUT | 687A | 253 | 254 | | | | |
| SEL | 0018 | 120 | | | | | |
| SELPTR | 6809 | 194 | 195 | | | | |
| SET12B | 0031 | 333 | 336 | | | | |
| SETNUM | 686E | 243 | 244 | | | | |
| SETSAV | 686F | 244 | 245 | | | | |
| SETSIZ | 006A | 339 | 344 | 346 | 396 | | |
| SETUP0 | 6A00 | 341 | 342 | 354 | | | |
| SETVAL | 6875 | 249 | 250 | | | | |
| SFSFLG | 68E7 | 297 | 298 | | | | |
| SIGN | 6815 | 206 | 207 | | | | |
| SLPFLG | 68F3 | 307 | 308 | | | | |
| SLPO1 | 68CC | 283 | 284 | | | | |
| SLPO2 | 68CE | 284 | 285 | | | | |
| SLPU1 | 68D0 | 285 | 286 | | | | |
| SLPU2 | 68D2 | 286 | 287 | | | | |
| SPCHR | 0021 | 126 | 620 | 636 | | | |
| SRTCNT | 6A3A | 381 | 383 | | | | |
| SRTSSR | 0010 | 98 | | | | | |
| SSR1 | 0000 | 68 | | | | | |
| SSR12 | 0001 | 94 | | | | | |
| SSR7 | 0004 | 96 | | | | | |
| SSR8 | 0008 | 97 | | | | | |
| SSRXX | 0002 | 95 | | | | | |
| STACK | 6A00 | 340 | 341 | | | | |
| SUADDR | 6B00 | 342 | 343 | | | | |
| SUFLAG | 6879 | 252 | 253 | | | | |
| SUPTR | 6873 | 248 | 249 | | | | |
| TAPON | 0010 | 87 | | | | | |
| TAPOUT | 0008 | 86 | | | | | |
| TBLSAV | 6893 | 271 | 272 | | | | |
| TEMP | 6812 | 203 | 204 | | | | |
| TEMP1 | 6813 | 204 | 205 | | | | |
| TEMPKE | 680C | 197 | 198 | | | | |
| TEMPSU | 68F2 | 306 | 307 | | | | |
| TIMER | 6814 | 205 | 206 | | | | |
| TIME_1 | 0018 | 117 | | | | | |
| TIME_2 | 0000 | 118 | | | | | |
| TTMFLG | 688C | 267 | 268 | | | | |
| TTIME | 688D | 268 | 269 | | | | |
| TTIME1 | 688F | 269 | 270 | | | | |
| TUNFLG | 68F5 | 309 | 310 | | | | |
| U1 | 68D6 | 288 | 289 | | | | |
| WAITSW | 0004 | 107 | | | | | |

```
        X1      0008 R  463
        X10     0006 R  462
        X100    0004 R  461
        X1K     0002 R  460
        YPADL   0004    72
        Y_NFLG  68FF    318  319
NO FILES DELETED
Assembling  I/O test Module -> IOTEST.S
ASM 4.1
PASS 1 COMPLETE
0 ASSEMBLY ERRORS
PASS 2 COMPLETE
ASSEMBLY COMPLETE Assembling Print time calculation Module -> SLOPE.S
ASM 4.1
I/O ERROR D3 ON UNIT 06

Assembling Densitometer Module -> DENSEO.S
ASM 4.1
PASS 1 COMPLETE
I/O ERROR D3 ON UNIT 05

Assembling Densitometer Module -> DENSE.S
ASM 4.1
I/O ERROR D3 ON UNIT 06
                        450     *LIST ON
                        451     ;
                        452     ; I/O test module -> enter from
                        453     ;
                        454     ;::::::::::::::::::::::::::::::
                        455     ;
                        456     ;                       E D I T
                        457     ;
                        458     ;       04-26-82        BB
                        459     ;
                        460     ;::::::::::::::::::::::::::::::
                        461     ;
                        462             GLOBAL          IOTEST
                        463
                        464             EXTERNAL        GETDIG,E
                        465     ;
0000    110000    X     466     IOTEST  LD      DE,MSG9
0003    CD0000    X     467             CALL    PUTASC
0006    CD0000    X     468             CALL    GETDIG
0009    FE01            469             CP      1
000B    2008            470             JR      NZ,I01
000D    0E00            471             LD      C,SSR1
000F    DD216468        472             LD      IX,IOIMG1
0013    1822            473             JR      I07
0015    FE02            474     I01     CP      2
0017    2008            475             JR      NZ,I02
0019    0E10            476             LD      C,BANK2
001B    DD216568        477             LD      IX,IOIMG2
001F    1816            478             JR      I07
0021    FE03            479     I02     CP      3
0023    2008            480             JR      NZ,I03
0025    0E08            481             LD      C,RNDOUT
0027    DD216668        482             LD      IX,IOIMG3
002B    180A            483             JR      I07
002D    FE00            484     I03     CP      0
002F    CA6A00    R     485             JP      Z,EXIT
0032    CD0000    X     486             CALL    ERROR
0035    18C9            487             JR      IOTEST
0037    CD5500    R     488     I07     CALL    UPDATE
```

```
003A  CD0000   X  489  I08     CALL    GETDIG
003D  30FB        490          JR      NC,I08
003F  FE00        491          CP      0
0041  CA6A00   R  492          JP      Z,EXIT
0044  47          493          LD      B,A
0045  3E00        494          LD      A,0
0047  37          495          SCF
0048  1F          496  I09     RRA
0049  10FD        497          DJNZ    I09
004B  DDAE00      498          XOR     (IX)
004E  DD7700      499          LD      (IX),A
0051  ED79        500          OUT     (C),A
0053  18E2        501          JR      I07
                  502  ;
0055  210068      503  UPDATE  LD      HL,SEGIMG
0058  DD7E00      504          LD      A,(IX)
005B  0608        505          LD      B,8
005D  CB07        506  UP1     RLC     A
005F  3804        507          JR      C,UP2
0061  3600        508          LD      (HL),0
0063  1802        509          JR      UP3
0065  3601        510  UP2     LD      (HL),1
0067  23          511  UP3     INC     HL
0068  10F3        512          DJNZ    UP1
                  513  ;
006A  97          514  EXIT    SUB     A
006B  C9          515          RET
                  516  ;
                  517          END
```

```
ADD      6906    323
ADHIGH   0008    125
ADLOW    0010    124
ADMODE   68FA    314    315
ADSEL    0010    123
ADVCNT   6900    319    320
ADVPUL   6A34    378    379
ADWAIT   6A36    379    380
AD_RUN   0020     88
ANS      6848    229    230
ANSLP    6861    234    235
ANSSAV   6857    233    234
BANK2    0010     81    476
BANK4    0000    101
BCH      6880    256    257
BCORR    6A24    371    372
BCOUNT   68F7    311    312
BDDEN    6A58    385    386
BDENVA   6A70    391    392
BDICHR   6A6A    388    389
BDISP    683C    223    224
BEEPER   0040     89
BEPFLG   6884    259    260
BEXP     686B    241    242
BLKCNT   68EF    304    305
BLUCHL   0005     85
BLUDEN   68B4    276    277
BLUMAS   6A1E    368    369
BLUNEG   6A0C    359    360
BLUREF   6A06    356    357
BNEG     682A    214    215
BO4PRN   6A12    362    363
BOFFS    6A2A    374    375
BOMOUT   6903    321    322
BP       68E2    294    295
BP0      68C6    280    281
BPTIME   6836    220    221
BPU      68C4    279    280
```

| | | | |
|---|---|---|---|
| BREF | 6824 | 211 | 212 |
| BRTIME | 6830 | 217 | 218 |
| BU1PRN | 6A18 | 365 | 366 |
| BUTOFF | 6882 | 258 | 259 |
| BYTE0 | 686D | 242 | 243 |
| BYTE1 | 68F4 | 308 | 309 |
| CBHFLG | 68E6 | 296 | 297 |
| CLR74 | 0008 | 73 | |
| CMXSET | 0013 | 346 | 347 |
| CNT | 680D | 198 | 199 |
| COLCOR | 6888 | 263 | 264 |
| COLRSG | 6889 | 264 | 265 |
| COLRVA | 688A | 265 | 266 |
| CONFLG | 6885 | 260 | 261 |
| COUNT | 6881 | 257 | 258 |
| CPADL | 0001 | 70 | |
| CRATIO | 68EC | 302 | 303 |
| CREG_1 | 0030 | 111 | |
| CREG_2 | 0031 | 112 | |
| CREG_3 | 0032 | 113 | |
| CREG_4 | 0033 | 114 | |
| CTIME | 6844 | 227 | 228 |
| CUTPUL | 6A32 | 377 | 378 |
| DBADGF | 0025 | 172 | |
| DBBAVG | 001E | 165 | |
| DBBLUC | 0022 | 169 | |
| DBBNBP | 002B | 178 | |
| DBBNPT | 000C | 147 | |
| DBBO4N | 0031 | 184 | |
| DBBPBP | 0028 | 175 | |
| DBBPPT | 0009 | 144 | |
| DBBRAD | 002E | 181 | |
| DBBRPT | 0006 | 141 | |
| DBBSFR | 001B | 162 | |
| DBBSO | 0012 | 153 | |
| DBBSOO | 000F | 150 | |
| DBBSU | 0015 | 156 | |
| DBBSUU | 0018 | 159 | |
| DBBU1N | 0035 | 187 | |
| DBFRAT | 0023 | 170 | |
| DBFS | 0001 | 136 | |
| DBFT | 0002 | 137 | |
| DBGAVG | 001D | 164 | |
| DBGNBP | 002A | 177 | |
| DBGNPT | 000B | 146 | |
| DBGO4N | 0030 | 183 | |
| DBGPBP | 0027 | 174 | |
| DBGPPT | 0008 | 143 | |
| DBGRAD | 002D | 180 | |
| DBGRPT | 0005 | 140 | |
| DBGSFR | 001A | 161 | |
| DBGSO | 0011 | 152 | |
| DBGSOO | 000E | 149 | |
| DBGSU | 0014 | 155 | |
| DBGSUU | 0017 | 158 | |
| DBGU1N | 0034 | 186 | |
| DBMAGC | 0024 | 171 | |
| DBPCNT | 001F | 166 | |
| DBPT | 0003 | 138 | |
| DBPTR | 68E0 | 293 | 294 |
| DBRAVG | 001C | 163 | |
| DBRNBP | 0029 | 176 | |
| DBRNPT | 000A | 145 | |
| DBRO4N | 002F | 182 | |
| DBRPBP | 0026 | 173 | |
| DBRPPT | 0007 | 142 | |
| DBRRAD | 002C | 179 | |

| | | | | |
|---|---|---|---|---|
| DBRRPT | 0004 | | 139 | |
| DBRSFR | 0019 | | 160 | |
| DBRSO | 0010 | | 151 | |
| DBRSOO | 000D | | 148 | |
| DBRSU | 0013 | | 154 | |
| DBRSUU | 0016 | | 157 | |
| DBRU1N | 0032 | | 185 | |
| DBTRAT | 0020 | | 167 | |
| DBTRBG | 0021 | | 168 | |
| DEC | 684C | | 231 | 232 |
| DECDSP | 684F | | 232 | 233 |
| DEFLT1 | 00BF | | 79 | |
| DEFLT2 | 0060 | | 90 | |
| DEFLT3 | 001F | | 99 | |
| DELTAT | 68D8 | | 289 | 290 |
| DENBUT | 68F9 | | 313 | 314 |
| DENMAX | 001D | | 348 | |
| DIFF | 6891 | | 270 | 271 |
| DIGPTR | 6808 | | 193 | 194 |
| DKSHUT | 0010 | | 74 | |
| DOBLNK | 68F8 | | 312 | 313 |
| ECONSV | 6862 | | 235 | 236 |
| ED2B | 0003 | | 335 | 336 |
| EMXSET | 0031 | | 347 | |
| END | 006C | R | 517 | |
| ENDEM | 6820 | | 208 | 209 |
| ENDRAM | 0C6C | | 396 | |
| ENDVAL | 6A72 | | 392 | |
| ERAM | 5000 | | 190 | |
| ERROR | 0024 | X | 464 | 486 |
| EXEC | 001C | X | 464 | |
| EXECME | 6816 | | 207 | 208 |
| EXIT | 006A | R | 514 | 485 492 |
| EXRANG | 6887 | | 262 | 263 |
| FACTOR | 6A30 | | 376 | 377 |
| FLGSFS | 68E9 | | 299 | 300 |
| FLOFLG | 68F6 | | 310 | 311 |
| FOOTSW | 0000 | | 103 | |
| FSFSF | 68E8 | | 298 | 299 |
| FUNC | 6870 | | 245 | 246 |
| FUNPTR | 6878 | | 251 | 252 |
| GCH | 687F | | 255 | 256 |
| GCORR | 6A22 | | 370 | 371 |
| GDDEN | 6A4A | | 384 | 385 |
| GDENVA | 6A6E | | 390 | 391 |
| GDICHR | 6A68 | | 387 | 388 |
| GDISP | 683A | | 222 | 223 |
| GETDIG | 002D | X | 464 | 468 489 |
| GETKEY | 0008 | X | 464 | |
| GEXP | 6869 | | 240 | 241 |
| GNEG | 6828 | | 213 | 214 |
| GO4PRN | 6A10 | | 361 | 362 |
| GOFFS | 6A28 | | 373 | 374 |
| GPTIME | 6834 | | 219 | 220 |
| GREF | 6822 | | 210 | 211 |
| GRNCHL | 0006 | | 84 | |
| GRNDEN | 68A6 | | 275 | 276 |
| GRNMAS | 6A1C | | 367 | 368 |
| GRNNEG | 6A0A | | 358 | 359 |
| GRNREF | 6A04 | | 355 | 356 |
| GRTIME | 682E | | 216 | 217 |
| GU1PRN | 6A16 | | 364 | 365 |
| HEX | 684A | | 230 | 231 |
| HEXSGN | 688B | | 266 | 267 |
| HHPCNT | 68EE | | 303 | 304 |
| HIREL | 0003 | | 40 | |

| | | | | | | |
|---|---|---|---|---|---|---|
| HRCNT | 6811 | | 202 | 203 | | |
| IN74A | 0002 | | 105 | | | |
| IN74B | 0003 | | 106 | | | |
| IO1 | 0015 | R | 474 | 470 | | |
| IO2 | 0021 | R | 479 | 475 | | |
| IO3 | 002D | R | 484 | 480 | | |
| IO7 | 0037 | R | 488 | 473 | 478 | 483 | 501 |
| IO8 | 003A | R | 489 | 490 | | |
| IO9 | 0048 | R | 496 | 497 | | |
| IOIMG1 | 6864 | | 236 | 237 | 472 | |
| IOIMG2 | 6865 | | 237 | 238 | 477 | |
| IOIMG3 | 6866 | | 238 | 239 | 482 | |
| IOIMG4 | 6895 | | 272 | 273 | | |
| IOTEST | 0000 | G | 466 | 462 | 487 | |
| K801 | 0040 | | 76 | | | |
| KBD | 0028 | | 121 | | | |
| KBDBUF | 680A | | 195 | 196 | | |
| KBDFLG | 680B | | 196 | 197 | | |
| KEY0 | 000C | | 423 | | | |
| KEY1 | 0000 | | 404 | | | |
| KEY1M | 0021 | | 443 | | | |
| KEY1P | 0025 | | 447 | | | |
| KEY2 | 0001 | | 406 | | | |
| KEY2M | 0020 | | 442 | | | |
| KEY2P | 0026 | | 448 | | | |
| KEY3 | 0002 | | 408 | | | |
| KEY4 | 0003 | | 410 | | | |
| KEY5 | 0004 | | 412 | | | |
| KEY6 | 0005 | | 414 | | | |
| KEY7 | 0008 | | 416 | | | |
| KEY8 | 0009 | | 418 | | | |
| KEY9 | 000A | | 420 | | | |
| KEYABS | 0009 | | 419 | | | |
| KEYADV | 001B | | 434 | | | |
| KEYB | 0012 | | 427 | | | |
| KEYC | 0013 | | 428 | | | |
| KEYCAN | 0019 | | 432 | | | |
| KEYCBH | 0002 | | 409 | | | |
| KEYENT | 0018 | | 431 | | | |
| KEYEXR | 000A | | 421 | | | |
| KEYFCP | 0004 | | 413 | | | |
| KEYG | 0011 | | 426 | | | |
| KEYM | 0014 | | 429 | | | |
| KEYMIN | 001E | | 440 | | | |
| KEYN | 0023 | | 445 | | | |
| KEYNM | 0022 | | 444 | | | |
| KEYNO | 001E | | 441 | | | |
| KEYNP | 0024 | | 446 | | | |
| KEYOFF | 001E | | 439 | | | |
| KEYON | 001D | | 436 | | | |
| KEYORD | 000D | | 424 | | | |
| KEYPAP | 0003 | | 411 | | | |
| KEYPLU | 001D | | 437 | | | |
| KEYPRT | 0000 | | 405 | | | |
| KEYR | 0010 | | 425 | | | |
| KEYSFS | 0001 | | 407 | | | |
| KEYSLP | 0008 | | 417 | | | |
| KEYSPE | 000B | | 422 | | | |
| KEYSTP | 001C | | 435 | | | |
| KEYSU | 0005 | | 415 | | | |
| KEYTIM | 001A | | 433 | | | |
| KEYY | 0015 | | 430 | | | |
| KEYYES | 001D | | 438 | | | |
| L801 | 0080 | | 77 | | | |
| L801N | 007F | | 78 | | | |
| LDCON | 00A7 | | 115 | | | |
| LOGO | 68C3 | | 278 | 279 | | |

| | | | | | |
|---|---|---|---|---|---|
| LOREL | 0089 | 41 | | | |
| MAX | 68EA | 300 | 301 | | |
| MAX2B | 0034 | 336 | 337 | 339 | |
| MAXCLC | 0CFF | 343 | 344 | | |
| MAXFLD | 0034 | 337 | | | |
| MAXSET | 001E | 345 | 347 | 396 | |
| MIN | 68EB | 301 | 302 | | |
| MINCNT | 6810 | 201 | 202 | | |
| MINUS | 68FB | 315 | 316 | | |
| MODE | 6877 | 250 | 251 | | |
| MPADL | 0002 | 71 | | | |
| MSG9 | 0000 X | 464 | 466 | | |
| MSGCNT | 6896 | 273 | 274 | | |
| MSGSIZ | 0008 | 334 | | | |
| MULPRN | 6901 | 320 | 321 | | |
| MXSETP | 001F | 344 | 345 | | |
| N3 | 68C8 | 281 | 282 | | |
| N3DEN | 68DA | 290 | 291 | | |
| N3TIME | 68DE | 292 | 293 | | |
| NEG | 6840 | 225 | 226 | | |
| NEGSLP | 6872 | 247 | 248 | | |
| NT | 68CA | 282 | 283 | | |
| NTDEN | 68DC | 291 | 292 | | |
| O4 | 68D4 | 287 | 288 | | |
| OLDKEY | 68FE | 317 | 318 | | |
| OPERAT | 0001 | 104 | | | |
| ORDSRT | 68FC | 316 | 317 | | |
| PAPADV | 0020 | 75 | | | |
| PAPFLG | 6886 | 261 | 262 | | |
| POSSLP | 6871 | 246 | 247 | | |
| PRNCNT | 6A2C | 375 | 376 | | |
| PRNSW | 68C2 | 277 | 278 | | |
| PUTASC | 0012 X | 464 | 467 | | |
| RAM | 6800 | 189 | 192 | 340 | 343 |
| RAMSUM | 6904 | 322 | 323 | | |
| RCH | 687E | 254 | 255 | | |
| RCORR | 6A20 | 369 | 370 | | |
| RCSLOP | 68E4 | 295 | 296 | | |
| RDDEN | 6A3C | 383 | 384 | | |
| RDENVA | 6A6C | 389 | 390 | | |
| RDICHR | 6A66 | 386 | 387 | | |
| RDISP | 6838 | 221 | 222 | | |
| REDCHL | 0007 | 83 | | | |
| REDDEN | 6898 | 274 | 275 | | |
| REDMAS | 6A1A | 366 | 367 | | |
| REDNEG | 6A08 | 357 | 358 | | |
| REDREF | 6A02 | 354 | 355 | | |
| REF | 683E | 224 | 225 | | |
| REM | 6846 | 228 | 229 | | |
| REXP | 6867 | 239 | 240 | | |
| RNDIN | 0020 | 122 | | | |
| RNDOUT | 0008 | 92 | 481 | | |
| RNEG | 6826 | 212 | 213 | | |
| RO4PRN | 6A0E | 360 | 361 | | |
| ROFFS | 6A26 | 372 | 373 | | |
| RPTIME | 6832 | 218 | 219 | | |
| RREF | 6820 | 209 | 210 | | |
| RRTIME | 682C | 215 | 216 | | |
| RSTCNT | 6A38 | 380 | 381 | | |
| RSTCTC | 0003 | 116 | | | |
| RTIME | 6842 | 226 | 227 | | |
| RU1PRN | 6A14 | 363 | 364 | | |
| SCNCNT | 680E | 199 | 200 | | |
| SCRTH1 | 68F0 | 305 | 306 | | |
| SECCNT | 680F | 200 | 201 | | |
| SEG | 0020 | 119 | | | |

```
SEGIMG  6800      192  193   503
SEGOUT  687A      253  254
SEL     0018      120
SELPTR  6809      194  195
SET12B  0031      333  336
SETNUM  686E      243  244
SETSAV  686F      244  245
SETSIZ  006A      339  344   346  396
SETUPO  6A00      341  342   354
SETVAL  6875      249  250
SFSFLG  68E7      297  298
SIGN    6815      206  207
SLPFLG  68F3      307  308
SLP01   68CC      283  284
SLP02   68CE      284  285
SLPU1   68D0      285  286
SLPU2   68D2      286  287
SPCHR   0021      126
SRTCNT  6A3A      381  383
SRTSSR  0010       98
SSR1    0000       68  471
SSR12   0001       94
SSR7    0004       96
SSR8    0008       97
SSRXX   0002       95
STACK   6A00      340  341
SUADDR  6B00      342  343
SUFLAG  6879      252  253
SUPTR   6873      248  249
TAPON   0010       87
TAPOUT  0008       86
TBLSAV  6893      271  272
TEMP    6812      203  204
TEMP1   6813      204  205
TEMPKE  680C      197  198
TEMPSU  68F2      306  307
TIMER   6814      205  206
TIME_1  0018      117
TIME_2  0000      118
TIMFLG  688C      267  268
TTIME   688D      268  269
TTIME1  688F      269  270
TUNFLG  68F5      309  310
U1      68D6      288  289
UP1     005D  R   506  512
UP2     0065  R   510  507
UP3     0067  R   511  509
UPDATE  0055  R   503  488
WAITSW  0004      107
YPADL   0004       72
Y_NFLG  68FF      318  319
                  450   *LIST ON
                  451   ;
                  452   ;   Slope calculation routines
                  453   ;
                  454   ;         131
                  455   ;
                  456   ;;;;;;;;;;;;;;;;;;;;;;;;;;;;;;;;
                  457   ;
                  458   ;                         E D I
                  459   ;
                  460   ;      05-12-82          BB
                  461   ;      05-14-82          AMF
                  462   ;      09-03-82          BB
                  463   ;      09-17-82          AMF
                  464   ;      10-14-82          BB
                  465   ;
```

```
                        467  ;
                        468          GLOBAL      LINEAR
                        469          GLOBAL      RECSLF
                        470  ;
                        471          EXTERNAL    PUTASC
                        472          EXTERNAL    MSG11,
                        473  ;
                        474  LINEAR
0000  110000    X       475          LD          DE,MSG11
0003  CD0000    X       476          CALL        PUTASC
0006  FD210068          477          LD          IY,SEGIMG
                        478  ; RED
000A  CD5300    R       479          CALL        RTMOFF
000D  DAA500    R       480          JP          C,OFFERR
0010  012C00            481          LD          BC,DBRRAD
0013  CD8000    R       482          CALL        CALNEG
0016  226768            483          LD          (REXP),HL
                        484  ; GREEN
0019  CD6400    R       485          CALL        GTMOFF
001C  DAA500    R       486          JP          C,OFFERR
001F  012D00            487          LD          BC,DBGRAD
0022  CD8000    R       488          CALL        CALNEG
0025  226968            489          LD          (GEXP),HL
                        490  ; BLUE
0028  CD7500    R       491          CALL        BTMOFF
002B  DAA500    R       492          JP          C,OFFERR
002E  012E00            493          LD          BC,DBBRAD
0031  CD8000    R       494          CALL        CALNEG
0034  226B68            495          LD          (BEXP),HL
                        496  ;
                        497  ;
                        498  SHOW:
0037  ED4B6768          499          LD          BC,(REXP)
003B  CD0000    X       500          CALL        DISTIM
003E  ED4B6968          501          LD          BC,(GEXP)
0042  CD0000    X       502          CALL        DISTIM
0045  ED4B6B68          503          LD          BC,(BEXP)
0049  CD0000    X       504          CALL        DISTIM
004C  C9                505          RET
                        506  ;
                        507  RREFMO:
004D  2A2068            508          LD          HL,(RREF)
0050  C35600    R       509          JP          RTM
                        510  RTMOFF:
0053  2A2668            511          LD          HL,(RNEG)
                        512  RTM:
0056  ED5B266A          513          LD          DE,(ROFFS)
005A  B7                514          OR          A
005B  ED52              515          SBC         HL,DE
005D  C9                516          RET
                        517  ;
                        518  GREFMO:
005E  2A2268            519          LD          HL,(GREF)
0061  C36700    R       520          JP          GTM
                        521  GTMOFF:
0064  2A2868            522          LD          HL,(GNEG)
                        523  GTM:
0067  ED5B286A          524          LD          DE,(GOFFS)
006B  B7                525          OR          A
006C  ED52              526          SBC         HL,DE
006E  C9                527          RET
                        528  ;
                        529  BREFMO:
006F  2A2468            530          LD          HL,(BREF)
0072  C37800    R       531          JP          BTM
                        532  BTMOFF:
0075  2A2A68            533          LD          HL,(BNEG)
```

|      |          |   |     |        |       |                |
|------|----------|---|-----|--------|-------|----------------|
|      |          |   | 534 | BTM:   |       |                |
| 0078 | ED5B2A6A |   | 535 |        | LD    | DE,(BOFFS)     |
| 007C | B7       |   | 536 |        | OR    | A              |
| 007D | ED52     |   | 537 |        | SBC   | HL,DE          |
| 007F | C9       |   | 538 |        | RET   |                |
|      |          |   | 539 | ;      |       |                |
|      |          |   | 540 | CALNEG:|       |                |
| 0080 | 112800   |   | 541 |        | LD    | DE,DBRRAD-DBRRPT |
|      |          |   | 542 | CALTIM:|       |                |
| 0083 | D5       |   | 543 |        | PUSH  | DE             |
| 0084 | C5       |   | 544 |        | PUSH  | BC             |
| 0085 | 224068   |   | 545 |        | LD    | (NEG),HL       |
| 0088 | 0652     |   | 546 |        | LD    | B,'R'          |
| 008A | CD0000   | X | 547 |        | CALL  | SET1           |
| 008D | ED533E68 |   | 548 |        | LD    | (REF),DE       |
| 0091 | 0652     |   | 549 |        | LD    | B,'R'          |
| 0093 | E1       |   | 550 |        | POP   | HL             |
| 0094 | D1       |   | 551 |        | POP   | DE             |
| 0095 | B7       |   | 552 |        | OR    | A              |
| 0096 | ED52     |   | 553 |        | SBC   | HL,DE          |
| 0098 | 4D       |   | 554 |        | LD    | C,L            |
| 0099 | 0652     |   | 555 |        | LD    | B,'R'          |
| 009B | CD0000   | X | 556 |        | CALL  | SET1           |
| 009E | ED534268 |   | 557 |        | LD    | (RTIME),DE     |
| 00A2 | C3CA00   | R | 558 |        | JP    | CALC           |
|      |          |   | 559 |        |       |                |
|      |          |   | 560 | ;      |       |                |
|      |          |   | 561 | ;      |       |                |
| 00A5 | 11C200   | R | 562 | OFFERR | LD    | DE,ERRMSG      |
| 00A8 | CD0000   | X | 563 |        | CALL  | PUTASC         |
| 00AB | 210000   |   | 564 |        | LD    | HL,0           |
| 00AE | 22266A   |   | 565 |        | LD    | (ROFFS),HL     |
| 00B1 | 22286A   |   | 566 |        | LD    | (GOFFS),HL     |
| 00B4 | 222A6A   |   | 567 |        | LD    | (BOFFS),HL     |
| 00B7 | CD0000   | X | 568 |        | CALL  | BEEP_2         |
| 00BA | 0E20     |   | 569 |        | LD    | C,32           |
| 00BC | CD0000   | X | 570 |        | CALL  | WAIT           |
| 00BF | C30000   | R | 571 |        | JP    | LINEAR         |
|      |          |   | 572 | ;      |       |                |
| 00C2 | 4F465358 |   | 573 | ERRMSG | DEFM  | 'OFSXERRX'     |
|      |          |   | 574 | ;      |       |                |
|      |          |   | 575 | CALC   |       |                |
| 00CA | ED4B3E68 |   | 576 | CALC1  | LD    | BC,(REF)       |
| 00CE | ED5B4268 |   | 577 |        | LD    | DE,(RTIME)     |
| 00D2 | CD0000   | X | 578 |        | CALL  | DMPY           |
| 00D5 | ED4B4068 |   | 579 |        | LD    | BC,(NEG)       |
| 00D9 | CD0000   | X | 580 |        | CALL  | DDIV           |
| 00DC | EB       |   | 581 |        | EX    | DE,HL          |
| 00DD | 224468   |   | 582 |        | LD    | (CTIME),HL     |
| 00E0 | E5       |   | 583 |        | PUSH  | HL             |
| 00E1 | C1       |   | 584 |        | POP   | BC             |
|      |          |   | 585 | ;      | CALL  | DISTIM         |
| 00E2 | 2A4468   |   | 586 |        | LD    | HL,(CTIME)     |
| 00E5 | 3E00     |   | 587 |        | LD    | A,0            |
| 00E7 | C9       |   | 588 |        | RET   |                |
|      |          |   | 589 | ;      |       |                |
|      |          |   | 590 | ;      |       |                |
|      |          |   | 591 | RECSLP:|       |                |
| 00E8 | 110000   | X | 592 |        | LD    | DE,MSG15       |
| 00EB | CD0000   | X | 593 |        | CALL  | PUTASC         |
| 00EE | 0E20     |   | 594 |        | LD    | C,32           |
| 00F0 | CD0000   | X | 595 |        | CALL  | WAIT           |
| 00F3 | 3EFF     |   | 596 |        | LD    | A,0FFH         |
| 00F5 | B7       |   | 597 |        | OR    | A              |
| 00F6 | 32E468   |   | 598 |        | LD    | (RCSLOP),A     |
| 00F9 | CD1501   | R | 599 |        | CALL  | CALO4T         |
| 00FC | CDD401   | R | 600 |        | CALL  | CALU1T         |

```
00FF   AF            601         XOR    A
0100   32E468        602         LD     (RCSLOP),A
0103   C9            603         RET
                     604  ;
                     605  ;
                     606  TSTREC:
0104   3AE468        607         LD     A,(RCSLOP)
0107   B7            608         OR     A
0108   C9            609         RET
                     610  ;
                     611  ;
                     612  WSET1:
0109   0657          613         LD     B,'W'
010B   C30000    X   614         JP     SET1
                     615  ;
                     616  RSET1:
010E   0652          617         LD     B,'R'
0110   CD0000    X   618         CALL   SET1
0113   EB            619         EX     DE,HL
0114   C9            620         RET
                     621  ;
                     622  CAL04T:
0115   CD0401    R   623         CALL   TSTREC
0118   C22301    R   624         JP     NZ,CO4RS
011B   CD4D00    R   625         CALL   RREFMO
011E   0E2F          626         LD     C,DBRO4N
0120   CD0901    R   627         CALL   WSET1
                     628  CO4RS:
0123   0E2F          629         LD     C,DBRO4N
0125   CD0E01    R   630         CALL   RSET1
0128   012C00        631         LD     BC,DBRRAD
012B   CD8000    R   632         CALL   CALNEG
012E   22CA68        633         LD     (NT),HL
0131   0657          634         LD     B,'W'
0133   0E26          635         LD     C,DBRPBP
0135   CD0000    X   636         CALL   SET1
0138   0E04          637         LD     C,DBRRPT
013A   CDCA01    R   638         CALL   GETN3
013D   0E10          639         LD     C,DBRSO
013F   CDB201    R   640         CALL   SO4CAL
0142   0657          641         LD     B,'W'
0144   0E07          642         LD     C,DBRPPT
0146   CD0000    X   643         CALL   SET1
                     644  ;GREEN
0149   CD0401    R   645         CALL   TSTREC
014C   C25701    R   646         JP     NZ,CO4GS
014F   CD5E00    R   647         CALL   GREFMO
0152   0E30          648         LD     C,DBGO4N
0154   CD0901    R   649         CALL   WSET1
                     650  CO4GS:
0157   0E30          651         LD     C,DBGO4N
0159   CD0E01    R   652         CALL   RSET1
015C   012D00        653         LD     BC,DBGRAD
015F   CD8000    R   654         CALL   CALNEG
0162   22CA68        655         LD     (NT),HL
0165   0657          656         LD     B,'W'
0167   0E27          657         LD     C,DBGPBP
0169   CD0000    X   658         CALL   SET1
016C   0E05          659         LD     C,DBGRPT
016E   CDCA01    R   660         CALL   GETN3
0171   0E11          661         LD     C,DBGSO
0173   CDB201    R   662         CALL   SO4CAL
0176   0657          663         LD     B,'W'
0178   0E08          664         LD     C,DBGPPT
017A   CD0000    X   665         CALL   SET1
                     666  ;BLUE
017D   CD0401    R   667         CALL   TSTREC
```

| | | | | | | |
|---|---|---|---|---|---|---|
| 0180 | C28B01 | R | 668 | | JP | NZ,CB04S |
| 0183 | CD6F00 | R | 669 | | CALL | BREFMO |
| 0186 | 0E31 | | 670 | | LD | C,DBB04N |
| 0188 | CD0901 | R | 671 | | CALL | WSET1 |
| | | | 672 | CB04S: | | |
| 018B | 0E31 | | 673 | | LD | C,DBB04N |
| 018D | CD0E01 | R | 674 | | CALL | RSET1 |
| 0190 | 012E00 | | 675 | | LD | BC,DBBRAD |
| 0193 | CD8000 | R | 676 | | CALL | CALNEG |
| 0196 | 22CA68 | | 677 | | LD | (NT),HL |
| 0199 | 0657 | | 678 | | LD | B,'W' |
| 019B | 0E28 | | 679 | | LD | C,DBBPBP |
| 019D | CD0000 | X | 680 | | CALL | SET1 |
| 01A0 | 0E06 | | 681 | | LD | C,DBBRPT |
| 01A2 | CDCA01 | R | 682 | | CALL | GETN3 |
| 01A5 | 0E12 | | 683 | | LD | C,DBBSO |
| 01A7 | CDB201 | R | 684 | | CALL | SO4CAL |
| 01AA | 0657 | | 685 | | LD | B,'W' |
| 01AC | 0E09 | | 686 | | LD | C,DBBPPT |
| 01AE | CD0000 | X | 687 | | CALL | SET1 |
| 01B1 | C9 | | 688 | | RET | |
| | | | 689 | ; | | |
| | | | 690 | ; | | |
| | | | 691 | SO4CAL: | | |
| 01B2 | 0652 | | 692 | | LD | B,'R' |
| 01B4 | CD0000 | X | 693 | | CALL | SET1 |
| 01B7 | ED53CC68 | | 694 | | LD | (SLPO1),DE |
| 01BB | C30704 | R | 695 | | JP | S4C |
| | | | 696 | SU1CAL: | | |
| 01BE | 0652 | | 697 | | LD | B,'R' |
| 01C0 | CD0000 | X | 698 | | CALL | SET1 |
| 01C3 | ED53D068 | | 699 | | LD | (SLPU1),DE |
| 01C7 | C32204 | R | 700 | | JP | S4B |
| | | | 701 | ; | | |
| | | | 702 | ; | | |
| | | | 703 | GETN3: | | |
| 01CA | 0652 | | 704 | | LD | B,'R' |
| 01CC | CD0000 | X | 705 | | CALL | SET1 |
| 01CF | ED53C868 | | 706 | | LD | (N3),DE |
| 01D3 | C9 | | 707 | | RET | |
| | | | 708 | ; | | |
| | | | 709 | CALU1T: | | |
| 01D4 | CD0401 | R | 710 | | CALL | TSTREC |
| 01D7 | C2E201 | R | 711 | | JP | NZ,CU1RS |
| 01DA | CD4D00 | R | 712 | | CALL | RREFMO |
| 01DD | 0E32 | | 713 | | LD | C,DBRU1N |
| 01DF | CD0901 | R | 714 | | CALL | WSET1 |
| | | | 715 | CU1RS: | | |
| 01E2 | 0E32 | | 716 | | LD | C,DBRU1N |
| 01E4 | CD0E01 | R | 717 | | CALL | RSET1 |
| 01E7 | 012C00 | | 718 | | LD | BC,DBRRAD |
| 01EA | CD8000 | R | 719 | | CALL | CALNEG |
| 01ED | 22CA68 | | 720 | | LD | (NT),HL |
| 01F0 | 0657 | | 721 | | LD | B,'W' |
| 01F2 | 0E29 | | 722 | | LD | C,DBRNBP |
| 01F4 | CD0000 | X | 723 | | CALL | SET1 |
| 01F7 | 0E04 | | 724 | | LD | C,DBRRPT |
| 01F9 | CDCA01 | R | 725 | | CALL | GETN3 |
| 01FC | 0E13 | | 726 | | LD | C,DBRSU |
| 01FE | CDBE01 | R | 727 | | CALL | SU1CAL |
| 0201 | 0657 | | 728 | | LD | B,'W' |
| 0203 | 0E0A | | 729 | | LD | C,DBRNPT |
| 0205 | CD0000 | X | 730 | | CALL | SET1 |
| | | | 731 | ;GREEN | | |
| 0208 | CD0401 | R | 732 | | CALL | TSTREC |
| 020B | C21602 | R | 733 | | JP | NZ,CU1GS |
| 020E | CD5E00 | R | 734 | | CALL | GREFMO |

```
0211  0E34              735           LD    C,DBGU1N
0213  CD0901    R       736           CALL  WSET1
                        737  CU1GS:
0216  0E34              738           LD    C,DBGU1N
0218  CD0E01    R       739           CALL  RSET1
021B  012D00            740           LD    BC,DBGRAD
021E  CD8000    R       741           CALL  CALNEG
0221  22CA68            742           LD    (NT),HL
0224  0657              743           LD    B,'W'
0226  0E2A              744           LD    C,DBGNBP
0228  CD0000    X       745           CALL  SET1
022B  0E05              746           LD    C,DBGRPT
022D  CDCA01    R       747           CALL  GETN3
0230  0E14              748           LD    C,DBGSU
0232  CDBE01    R       749           CALL  SU1CAL
0235  0657              750           LD    B,'W'
0237  0E0B              751           LD    C,DBGNPT
0239  CD0000    X       752           CALL  SET1
                        753  ;BLUE
023C  CD0401    R       754           CALL  TSTREC
023F  C24A02    R       755           JP    NZ,CU1BS
0242  CD6F00    R       756           CALL  BREFMO
0245  0E35              757           LD    C,DBBU1N
0247  CD0901    R       758           CALL  WSET1
                        759  CU1BS:
024A  0E35              760           LD    C,DBBU1N
024C  CD0E01    R       761           CALL  RSET1
024F  012E00            762           LD    BC,DBBRAD
0252  CD8000    R       763           CALL  CALNEG
0255  22CA68            764           LD    (NT),HL
0258  0657              765           LD    B,'W'
025A  0E2B              766           LD    C,DBBNBP
025C  CD0000    X       767           CALL  SET1
025F  0E06              768           LD    C,DBBRPT
0261  CDCA01    R       769           CALL  GETN3
0264  0E15              770           LD    C,DBBSU
0266  CDBE01    R       771           CALL  SU1CAL
0269  0657              772           LD    B,'W'
026B  0E0C              773           LD    C,DBBNPT
026D  CD0000    X       774           CALL  SET1
0270  C9                775           RET
                        776  *EJECT
                        777  ;
                        778  ;
                        779  ;********************** SLC
                        780  ;
                        781  ;
                        782  ;       INPUTS
                        783  ;       ------
                        784  ;       NT
                        785  ;       REF
                        786  ;       BPO
                        787  ;       BPU
                        788  ;       SLPO1
                        789  ;       SLPO2
                        790  ;       SLPU1
                        791  ;       SLPU2
                        792  ;
                        793  SLOPE:
                        794  ;RED
0271  2A6768            795           LD    HL,(REXP)
0274  22CA68            796           LD    (NT),HL
0277  0652              797           LD    B,'R'
0279  0E04              798           LD    C,DBRRPT
027B  CD0000    X       799           CALL  SET1
027E  ED53C868          800           LD    (N3),DE
0282  0652              801           LD    B,'R'
```

| | | | | | |
|---|---|---|---|---|---|
| 0284 | 0E07 | | 802 | LD | C,DBRPPT |
| 0286 | CD0000 | X | 803 | CALL | SET1 |
| 0289 | ED53C668 | | 804 | LD | (BPO),DE |
| 028D | 0652 | | 805 | LD | B,'R' |
| 028F | 0E0A | | 806 | LD | C,DBRNPT |
| 0291 | CD0000 | X | 807 | CALL | SET1 |
| 0294 | ED53C468 | | 808 | LD | (BPU),DE |
| 0298 | 0652 | | 809 | LD | B,'R' |
| 029A | 0E10 | | 810 | LD | C,DBRSO |
| 029C | CD0000 | X | 811 | CALL | SET1 |
| 029F | ED53CC68 | | 812 | LD | (SLPO1),DE |
| 02A3 | 0652 | | 813 | LD | B,'R' |
| 02A5 | 0E0D | | 814 | LD | C,DBRSOO |
| 02A7 | CD0000 | X | 815 | CALL | SET1 |
| 02AA | ED53CE68 | | 816 | LD | (SLPO2),DE |
| 02AE | 0652 | | 817 | LD | B,'R' |
| 02B0 | 0E13 | | 818 | LD | C,DBRSU |
| 02B2 | CD0000 | X | 819 | CALL | SET1 |
| 02B5 | ED53D068 | | 820 | LD | (SLPU1),DE |
| 02B9 | 0652 | | 821 | LD | B,'R' |
| 02BB | 0E16 | | 822 | LD | C,DBRSUU |
| 02BD | CD0000 | X | 823 | CALL | SET1 |
| 02C0 | ED53D268 | | 824 | LD | (SLPU2),DE |
| 02C4 | 0652 | | 825 | LD | B,'R' |
| 02C6 | 0E26 | | 826 | LD | C,DBRPBP |
| 02C8 | CD0000 | X | 827 | CALL | SET1 |
| 02CB | ED53D468 | | 828 | LD | (O4),DE |
| 02CF | 0652 | | 829 | LD | B,'R' |
| 02D1 | 0E29 | | 830 | LD | C,DBRNBP |
| 02D3 | CD0000 | X | 831 | CALL | SET1 |
| 02D6 | ED53D668 | | 832 | LD | (U1),DE |
| 02DA | CDBF03 | R | 833 | CALL | DOSLP |
| 02DD | 226768 | | 834 | LD | (REXP),HL |
| | | | 835 | ;GREEN | |
| 02E0 | 2A6968 | | 836 | LD | HL,(GEXP) |
| 02E3 | 22CA68 | | 837 | LD | (NT),HL |
| 02E6 | 0652 | | 838 | LD | B,'R' |
| 02E8 | 0E05 | | 839 | LD | C,DBGRPT |
| 02EA | CD0000 | X | 840 | CALL | SET1 |
| 02ED | ED53C868 | | 841 | LD | (N3),DE |
| 02F1 | 0652 | | 842 | LD | B,'R' |
| 02F3 | 0E08 | | 843 | LD | C,DBGPPT |
| 02F5 | CD0000 | X | 844 | CALL | SET1 |
| 02F8 | ED53C668 | | 845 | LD | (BPO),DE |
| 02FC | 0652 | | 846 | LD | B,'R' |
| 02FE | 0E0B | | 847 | LD | C,DBGNPT |
| 0300 | CD0000 | X | 848 | CALL | SET1 |
| 0303 | ED53C468 | | 849 | LD | (BPU),DE |
| 0307 | 0652 | | 850 | LD | B,'R' |
| 0309 | 0E11 | | 851 | LD | C,DBGSO |
| 030B | CD0000 | X | 852 | CALL | SET1 |
| 030E | ED53CC68 | | 853 | LD | (SLPO1),DE |
| 0312 | 0652 | | 854 | LD | B,'R' |
| 0314 | 0E0E | | 855 | LD | C,DBGSOO |
| 0316 | CD0000 | X | 856 | CALL | SET1 |
| 0319 | ED53CE68 | | 857 | LD | (SLPO2),DE |
| 031D | 0652 | | 858 | LD | B,'R' |
| 031F | 0E14 | | 859 | LD | C,DBGSU |
| 0321 | CD0000 | X | 860 | CALL | SET1 |
| 0324 | ED53D068 | | 861 | LD | (SLPU1),DE |
| 0328 | 0652 | | 862 | LD | B,'R' |
| 032A | 0E17 | | 863 | LD | C,DBGSUU |
| 032C | CD0000 | X | 864 | CALL | SET1 |
| 032F | ED53D268 | | 865 | LD | (SLPU2),DE |
| 0333 | 0652 | | 866 | LD | B,'R' |
| 0335 | 0E27 | | 867 | LD | C,DBGPBP |

```
0337  CD0000    X   868         CALL    SET1
033A  ED53D468      869         LD      (O4),DE
033E  0652          870         LD      B,'R'
0340  0E2A          871         LD      C,DBGNBP
0342  CD0000    X   872         CALL    SET1
0345  ED53D668      873         LD      (U1),DE
0349  CDBF03    R   874         CALL    DOSLP
034C  226968        875         LD      (GEXP),HL
                    876  ;BLUE
034F  2A6B68        877         LD      HL,(BEXP)
0352  22CA68        878         LD      (NT),HL
0355  0652          879         LD      B,'R'
0357  0E06          880         LD      C,DBBRPT
0359  CD0000    X   881         CALL    SET1
035C  ED53C868      882         LD      (N3),DE
0360  0652          883         LD      B,'R'
0362  0E09          884         LD      C,DBBPPT
0364  CD0000    X   885         CALL    SET1
0367  ED53C668      886         LD      (BPO),DE
036B  0652          887         LD      B,'R'
036D  0E0C          888         LD      C,DBBNPT
036F  CD0000    X   889         CALL    SET1
0372  ED53C468      890         LD      (BPU),DE
0376  0652          891         LD      B,'R'
0378  0E12          892         LD      C,DBBSO
037A  CD0000    X   893         CALL    SET1
037D  ED53CC68      894         LD      (SLPO1),DE
0381  0652          895         LD      B,'R'
0383  0E0F          896         LD      C,DBBSOO
0385  CD0000    X   897         CALL    SET1
0388  ED53CE68      898         LD      (SLPO2),DE
038C  0652          899         LD      B,'R'
038E  0E15          900         LD      C,DBBSU
0390  CD0000    X   901         CALL    SET1
0393  ED53D068      902         LD      (SLPU1),DE
0397  0652          903         LD      B,'R'
0399  0E18          904         LD      C,DBBSUU
039B  CD0000    X   905         CALL    SET1
039E  ED53D268      906         LD      (SLPU2),DE
03A2  0652          907         LD      B,'R'
03A4  0E28          908         LD      C,DBBPBP
03A6  CD0000    X   909         CALL    SET1
03A9  ED53D468      910         LD      (O4),DE
03AD  0652          911         LD      B,'R'
03AF  0E2B          912         LD      C,DBBNBP
03B1  CD0000    X   913         CALL    SET1
03B4  ED53D668      914         LD      (U1),DE
03B8  CDBF03    R   915         CALL    DOSLP
03BB  226B68        916         LD      (BEXP),HL
03BE  C9            917         RET
                    918  ;
                    919  ;
                    920  *EJECT
                    921  ;
                    922  ;
                    923  DOSLP:
                    924  ;                              TEST NT <
                    925  ;
03BF  2ACA68        926         LD      HL,(NT)
03C2  ED5BD668      927         LD      DE,(U1)
03C6  B7            928         OR      A
03C7  ED52          929         SBC     HL,DE
03C9  CA2204    R   930         JP      Z,S4B
03CC  FA5304    R   931         JP      M,S4A
                    932  ;
```

```
                        933  ;                   U1 < NT
                        934  ;
                        935  ;                       TEST  NT
                        936  ;
                        937  ;          LD      HL,(U1)
03CF   ED5BCA68         938             LD      DE,(NT)
                        939  ;          OR      A
                        940  ;          SBC     HL,DE
                        941  ;          JP      P,S2
03D3   2ACB68           942             LD      HL,(N3)
03D6   B7               943             OR      A
03D7   ED52             944             SBC     HL,DE
03D9   F22204    R      945             JP      P,S4B
                        946  ;
                        947  ;          NT > N3
                        948  ;                       TEST NT <
                        949  ;
                        950  ;S2:
                        951  ;          LD      HL,(N3)
                        952  ;          LD      DE,(NT)
                        953  ;          OR      A
                        954  ;          SBC     HL,DE
                        955  ;          JP      P,S3
03DC   2ACA68           956             LD      HL,(NT)
03DF   ED5BD468         957             LD      DE,(O4)
03E3   B7               958             OR      A
03E4   ED52             959             SBC     HL,DE
03E6   CA0704    R      960             JP      Z,S4C
03E9   FA0704    R      961             JP      M,S4C
                        962  ;
                        963  ;                              ; O4 < NT
                        964  ;S3:
                        965  S4D:
                        966  ;          PT = (NT - O4) * SLPO2 + I
03EC   2ACA68           967             LD      HL,(NT)
03EF   ED5BD468         968             LD      DE,(O4)
03F3   B7               969             OR      A
03F4   ED52             970             SBC     HL,DE
03F6   EB               971             EX      DE,HL
03F7   ED4BCE68         972             LD      BC,(SLPO2)
03FB   CD0000    X      973             CALL    DMPY
03FE   CD3F04    R      974             CALL    NORMAL
0401   ED5BC668         975             LD      DE,(BPO)
0405   19               976             ADD     HL,DE
0406   C9               977             RET
                        978  ;
                        979  ;
                        980  *EJECT
                        981  ;
                        982  S4C:
                        983  ;          PT = (NT - N3) * SLPO1 + I
                        984  ;
0407   2ACA68           985             LD      HL,(NT)
040A   ED5BC868         986             LD      DE,(N3)
040E   B7               987             OR      A
040F   ED52             988             SBC     HL,DE
0411   EB               989             EX      DE,HL
0412   ED4BCC68         990             LD      BC,(SLPO1)
0416   CD0000    X      991             CALL    DMPY
0419   CD3F04    R      992             CALL    NORMAL
041C   ED5BC868         993             LD      DE,(N3)
0420   19               994             ADD     HL,DE
0421   C9               995             RET
                        996  ;
                        997  S4B:
                        998  ;          PT = N3 - (N3 - NT) * SLP!
                        999  ;
```

```
0422  2AC868      1000        LD      HL,(N3)
0425  ED5BCA68    1001        LD      DE,(NT)
0429  B7          1002        OR      A
042A  ED52        1003        SBC     HL,DE
042C  EB          1004        EX      DE,HL
042D  ED4BD068    1005        LD      BC,(SLPU1)
0431  CD0000    X 1006        CALL    DMPY
0434  CD3F04    R 1007        CALL    NORMAL
0437  EB          1008        EX      DE,HL
0438  2AC868      1009        LD      HL,(N3)
043B  B7          1010        OR      A
043C  ED52        1011        SBC     HL,DE
043E  C9          1012        RET
                  1013   ;
                  1014   ;
                  1015   NORMAL:
043F  E5          1016        PUSH    HL
0440  21F401      1017        LD      HL,500
0443  19          1018        ADD     HL,DE
0444  EB          1019        EX      DE,HL
0445  E1          1020        POP     HL
0446  010000      1021        LD      BC,0
0449  ED4A        1022        ADC     HL,BC
                  1023   ;
044B  01E803      1024        LD      BC,1000
044E  CD0000    X 1025        CALL    DDIV
0451  EB          1026        EX      DE,HL
0452  C9          1027        RET
                  1028   ;
                  1029   S4A:
                  1030   ;    PT = BPU - (U1 - NT) * SLP
                  1031   ;    Note:
                  1032   ;            If PT < 005 , ther
0453  2AD668      1033        LD      HL,(U1)
0456  ED5BCA68    1034        LD      DE,(NT)
045A  B7          1035        OR      A
045B  ED52        1036        SBC     HL,DE
045D  EB          1037        EX      DE,HL
045E  ED4BD268    1038        LD      BC,(SLPU2)
0462  CD0000    X 1039        CALL    DMPY
0465  CD3F04    R 1040        CALL    NORMAL
0468  EB          1041        EX      DE,HL
0469  2AC468      1042        LD      HL,(BPU)
046C  B7          1043        OR      A
046D  ED52        1044        SBC     HL,DE
046F  7D          1045        LD      A,L
0470  84          1046        ADD     A,H
0471  FE05        1047        CP      5
0473  D0          1048        RET     NC
0474  2600        1049        LD      H,0
0476  2E05        1050        LD      L,5
0478  C9          1051        RET
                  1052   ;
                  1053   ;
                  1054   ;
                  1055   END
```

DENSEO
LOC   OBJ CODE M STMT  SOURCE STATEMENT

```
                  450    *LIST ON
                  451    ;
                  452    ;       201
                  453    ;
                  454           EXTERNAL    DMPY,RRI
                  455           EXTERNAL    DECTHX,I
```

|      |         |   |     |         |          |              |
|------|---------|---|-----|---------|----------|--------------|
|      |         |   | 456 |         | EXTERNAL | SET1,CAl     |
|      |         |   | 457 |         | EXTERNAL | SRTDEN,l     |
|      |         |   | 458 | ;       |          |              |
|      |         |   | 459 |         | GLOBAL   | STRDEN,(     |
|      |         |   | 460 | ;       |          |              |
|      |         |   | 461 | SERLEN  | EQU      | 14           |
|      |         |   | 462 | ;       |          |              |
| 0000 | 5402    |   | 463 | SERMUL  | DEFW     | 596   ; .5956( |
| 0002 | 8A02    |   | 464 |         | DEFW     | 650   ; .6501 |
| 0004 | C402    |   | 465 |         | DEFW     | 708   ; .70795 |
| 0006 | 0403    |   | 466 |         | DEFW     | 772   ; .77179 |
| 0008 | 4903    |   | 467 |         | DEFW     | 841   ; .8414( |
| 000A | 9603    |   | 468 |         | DEFW     | 918   ; .91833 |
| 000C | E803    |   | 469 |         | DEFW     | 1000  ; 1.000( |
| 000E | 4104    |   | 470 |         | DEFW     | 1089  ; 1.0889 |
| 0010 | A504    |   | 471 |         | DEFW     | 1189  ; 1.1885 |
| 0012 | 1005    |   | 472 |         | DEFW     | 1296  ; 1.2957 |
| 0014 | 8505    |   | 473 |         | DEFW     | 1413  ; 1.4125 |
| 0016 | 0206    |   | 474 |         | DEFW     | 1538  ; 1.5382 |
| 0018 | 8E06    |   | 475 |         | DEFW     | 1678  ; 1.6789 |
|      |         |   | 476 |         |          |              |
|      |         |   | 477 | ;       |          |              |
|      |         |   | 478 | ;       |          |              |
|      |         |   | 479 | MANDEN: |          |              |
| 001A | 110000  | X | 480 |         | LD       | DE,CALDENM   |
| 001D | CD0000  | X | 481 |         | CALL     | SNDWAT       |
| 0020 | CD9000  | R | 482 |         | CALL     | GTDENV       |
| 0023 | CD0000  | X | 483 |         | CALL     | SRTDEN       |
| 0026 | 3A6E68  |   | 484 |         | LD       | A,(SETNUM)   |
| 0029 | 110000  |   | 485 |         | LD       | DE,0         |
| 002C | 5F      |   | 486 |         | LD       | E,A          |
| 002D | CD0000  | X | 487 |         | CALL     | CALSU        |
| 0030 | 364F    |   | 488 |         | LD       | (HL),'O'     |
| 0032 | 23      |   | 489 |         | INC      | HL           |
| 0033 | 364B    |   | 490 |         | LD       | (HL),'K'     |
| 0035 | 010000  |   | 491 |         | LD       | BC,0         |
| 0038 | 21026A  |   | 492 |         | LD       | HL,REDREF    |
| 003B | CD0000  | X | 493 |         | CALL     | LDNGET       |
| 003E | 216C6A  |   | 494 |         | LD       | HL,RDENVAL   |
| 0041 | CD0000  | X | 495 |         | CALL     | LMEMFB       |
| 0044 | 1677    |   | 496 |         | LD       | D,'W'        |
| 0046 | 1E04    |   | 497 |         | LD       | E,DBRRPT     |
| 0048 | CD7800  | R | 498 |         | CALL     | STINDB       |
| 004B | 010100  |   | 499 |         | LD       | BC,01        |
| 004E | 21046A  |   | 500 |         | LD       | HL,GRNREF    |
| 0051 | CD0000  | X | 501 |         | CALL     | LDNGET       |
| 0054 | 216E6A  |   | 502 |         | LD       | HL,GDENVAL   |
| 0057 | CD0000  | X | 503 |         | CALL     | LMEMFB       |
| 005A | 1677    |   | 504 |         | LD       | D,'W'        |
| 005C | 1E05    |   | 505 |         | LD       | E,DBGRPT     |
| 005E | CD7800  | R | 506 |         | CALL     | STINDB       |
| 0061 | 010200  |   | 507 |         | LD       | BC,02        |
| 0064 | 21066A  |   | 508 |         | LD       | HL,BLUREF    |
| 0067 | CD0000  | X | 509 |         | CALL     | LDNGET       |
| 006A | 21706A  |   | 510 |         | LD       | HL,BDENVAL   |
| 006D | CD0000  | X | 511 |         | CALL     | LMEMFB       |
| 0070 | 1657    |   | 512 |         | LD       | D,'W'        |
| 0072 | 1E06    |   | 513 |         | LD       | E,DBBRPT     |
| 0074 | CD7800  | R | 514 |         | CALL     | STINDB       |
| 0077 | C9      |   | 515 |         | RET      |              |
|      |         |   | 516 | STINDB: |          |              |
| 0078 | D5      |   | 517 |         | PUSH     | DE           |
| 0079 | C5      |   | 518 |         | PUSH     | BC           |
| 007A | 0652    |   | 519 |         | LD       | B,'R'        |
| 007C | 4B      |   | 520 |         | LD       | C,E          |
| 007D | CD0000  | X | 521 |         | CALL     | SET1         |

```
LOC     OBJ CODE  M  STMT  SOURCE  STATEMENT
                                DENSEO
0080    C1           522          POP     BC
0081    CD0000    X  523          CALL    DMPY
0084    01E803       524          LD      BC,1000
0087    CD0000    X  525          CALL    DDIV
008A    EB           526          EX      DE,HL
008B    C1           527          POP     BC
008C    CD0000    X  528          CALL    SET1
008F    C9           529          RET
                     530  ;
                     531  ;
                     532  GTDENV:
0090    213C6A       533          LD      HL,RDDEN
0093    119868       534          LD      DE,REDDEN
0096    0E08         535          LD      C,8
0098    CDAE00    R  536          CALL    REORD
009B    213E6A       537          LD      HL,RDDEN+2
009E    11A668       538          LD      DE,GRNDEN
00A1    0E08         539          LD      C,8
00A3    CDAE00    R  540          CALL    REORD
00A6    21406A       541          LD      HL,RDDEN+4
00A9    11B468       542          LD      DE,BLUDEN
00AC    0E08         543          LD      C,8
                     544  REORD:
00AE    7E           545          LD      A,(HL)
00AF    12           546          LD      (DE),A
00B0    23           547          INC     HL
00B1    13           548          INC     DE
00B2    7E           549          LD      A,(HL)
00B3    12           550          LD      (DE),A
00B4    23           551          INC     HL
00B5    13           552          INC     DE
00B6    23           553          INC     HL
00B7    23           554          INC     HL
00B8    23           555          INC     HL
00B9    23           556          INC     HL
00BA    0D           557          DEC     C
00BB    C2AE00    R  558          JP      NZ,REORD
00BE    C9           559          RET
                     560  ;
                     561  ;
                     562  SEVENB:
                     563  ;       LD      DE,SBUTSM
                     564  ;       CALL    SNDNWAT
                     565  ;       CALL    STRDEN
                     566  CRE8RF:
                     567  ;       LD      BC,0
                     568  ;       LD      HL,REDDEN
                     569  LP7BUTT:
                     570  ;       LD      E,(HL)
                     571  ;       INC     HL
                     572  ;       LD      D,(HL)
                     573  ;       PUSH    BC
                     574  ;       PUSH    HL
                     575  ;       CALL    GETDEN
                     576  ;       POP     HL
                     577  ;       LD      D,(HL)
                     578  ;       DEC     HL
                     579  ;       LD      E,(HL)
                     580  ;       PUSH    HL
                     581  ;       CALL    DMPY
                     582  ;       EX      DE,HL
                     583  ;       POP     HL
                     584  ;       POP     BC
                     585  ;       PUSH    HL
```

```
                    586  ;        LD      HL,RRTIME
                    587  ;        ADD     HL,BC
                    588  ;        LD      (HL),E
                    589  ;        INC     HL
                    590  ;        LD      (HL),D
                    591  ;        INC     BC
                    592  ;        INC     BC
                    593  ;        POP     HL
                    594  ;        ADD     HL,BC
                    595  ;        LD      A,C
                    596  ;        CP      2*3
                    597  ;        JP      NZ,LP7BUTT
00BF  C9            598           RET
                    599  ;
                    600  ;
                    601  ;
                    602  ;        STORE DENSITIES R,G,B
                    603  ;
                    604  ;
                    605  STRDEN:
00C0  3E00          606           LD      A,0
00C2  327E68        607           LD      (RCH),A
00C5  327F68        608           LD      (GCH),A
00C8  328068        609           LD      (BCH),A
00CB  210000        610           LD      HL,0
00CE  229668        611           LD      (MSGCNT),HL
                    612  STRDNO:
00D1  3A7E68        613           LD      A,(RCH)
00D4  47            614           LD      B,A
00D5  3A7F68        615           LD      A,(GCH)
00D8  4F            616           LD      C,A
00D9  3A8068        617           LD      A,(BCH)
00DC  80            618           ADD     A,B
00DD  81            619           ADD     A,C
00DE  FE2A          620           CP      SERLEN*3
00E0  CA3301    R   621           JP      Z,STRFIN
00E3  3A0B68        622           LD      A,(KBDFLG)
00E6  B7            623           OR      A
00E7  CA2601    R   624           JP      Z,DENART
                    625  STRDOO:
00EA  2A9668        626           LD      HL,(MSGCNT)
00ED  EB            627           EX      DE,HL
00EE  210000    X   628           LD      HL,RDENM
00F1  19            629           ADD     HL,DE
00F2  EB            630           EX      DE,HL
00F3  CD0000    X   631           CALL    SNDWAT
00F6  CD0000    X   632           CALL    GETCHN
00F9  FAEA00    R   633           JP      M,STRDOO
00FC  FE03          634           CP      3
00FE  CA0000    X   635           JP      Z,DENERR
0101  119868        636           LD      DE,REDDEN
0104  217E68        637           LD      HL,RCH
0107  FE00          638           CP      0
0109  CA1D01    R   639           JP      Z,STRDN1
010C  11A668        640           LD      DE,GRNDEN
010F  217F68        641           LD      HL,GCH
0112  FE01          642           CP      1
0114  CA1D01    R   643           JP      Z,STRDN1
0117  11B468        644           LD      DE,BLUDEN
011A  218068        645           LD      HL,BCH
                    646  STRDN1:
011D  CD0000    X   647           CALL    DENSTR
0120  CD0000    X   648           CALL    INMSGC
0123  C3D100    R   649           JP      STRDNO
                    650  ;
                    651  ;
```

```
                        652  DENART:
0126  AF                653        XOR    A
0127  320B68            654        LD     (KBDFLG),A
012A  3A0A68            655        LD     A,(KBDBUF)
012D  FE19              656        CP     KEYCAN
012F  C8                657        RET    Z
0130  C3EA00    R       658        JP     STRDO0
                        659  ;
                        660  ;
                        661  STRFIN:
0133  CD0000    X       662        CALL   SRTDEN
0136  113C6A            663        LD     DE,RDDEN
0139  219868            664        LD     HL,REDDEN
013C  0E08              665        LD     C,8
013E  CD5401    R       666        CALL   REORD01
0141  113E6A            667        LD     DE,RDDEN+2
0144  21A668            668        LD     HL,GRNDEN
0147  0E08              669        LD     C,8
0149  CD5401    R       670        CALL   REORD01
014C  11406A            671        LD     DE,RDDEN+4
014F  21B468            672        LD     HL,BLUDEN
0152  0E08              673        LD     C,8
                        674  REORD01:
0154  7E                675        LD     A,(HL)
0155  12                676        LD     (DE),A
0156  23                677        INC    HL
0157  13                678        INC    DE
0158  7E                679        LD     A,(HL)
0159  12                680        LD     (DE),A
015A  23                681        INC    HL
015B  13                682        INC    DE
015C  13                683        INC    DE
015D  13                684        INC    DE
015E  13                685        INC    DE
015F  13                686        INC    DE
0160  0D                687        DEC    C
0161  C25401    R       688        JP     NZ,REORD01
0164  C9                689        RET
                             DENSE
LOC   OBJ CODE  M STMT  SOURCE STATEMENT

450  *LIST ON
                        451  ;
                        452  ;
                        453  ;      232
                        454  ;
                        455  ;*LIST OFF
                        456  ;
                        457        EXTERNAL    DMPY,RRI
                        458        EXTERNAL    DECTHX,I
                        459        EXTERNAL    SET1,CAL
                        460        EXTERNAL    RECSLP,(
                        461  ;
                        462        GLOBAL      STRREF,I
                        463        GLOBAL      GETDEN,C
                        464        GLOBAL      LMEMFB,C
                        465  ;
                        466  ;
                        467  ;
                        468  SERLEN EQU         14
                        469  ;
                        470  ;
                        471  ;
                        472  ;
                        473  INMSGC:
0000  E5                474        PUSH        HL
```

```
0001    2A9668         475         LD      HL,(MSGCNT)
0004    110800         476         LD      DE,8
0007    19             477         ADD     HL,DE
0008    229668         478         LD      (MSGCNT),HL
000B    E1             479         POP     HL
000C    C9             480         RET
                       481     ;
                       482     ;
                       483     DENSTR:
000D    7E             484         LD      A,(HL)
000E    C602           485         ADD     A,2
0010    77             486         LD      (HL),A
0011    D602           487         SUB     2
0013    210000         488         LD      HL,0
0016    6F             489         LD      L,A
0017    19             490         ADD     HL,DE
0018    E5             491         PUSH    HL
0019    CDA801    R    492         CALL    GETDAT
001C    E1             493         POP     HL
001D    73             494         LD      (HL),E
001E    23             495         INC     HL
001F    72             496         LD      (HL),D
0020    C9             497         RET
                       498     ;
                       499     ;
                       500     DENERR:
0021    110000    X    501         LD      DE,SEEDEN
0024    CD8200    R    502         CALL    SNDWAT
0027    3E01           503         LD      A,1
0029    B7             504         OR      A
002A    C9             505         RET
                       506     ;
                       507     ;           --      STORE REFERENCES
                       508     ;
                       509     ;
                       510     STRREF:
002B    21006A         511         LD      HL,SETUP0
002E    364F           512         LD      (HL),'O'
0030    23             513         INC     HL
0031    364B           514         LD      (HL),'K'
0033    210000         515         LD      HL,0
0036    11026A         516         LD      DE,REDREF
                       517     STRRF0:
0039    229668         518         LD      (MSGCNT),HL
003C    EB             519         EX      DE,HL
003D    3E00           520         LD      A,0
003F    328168         521         LD      (COUNT),A
                       522     STRRF1:
0042    E5             523         PUSH    HL
0043    2A9668         524         LD      HL,(MSGCNT)
0046    EB             525         EX      DE,HL
0047    210000    X    526         LD      HL,RREFM
004A    19             527         ADD     HL,DE
004B    EB             528         EX      DE,HL
004C    CD8200    R    529         CALL    SNDWAT
004F    E1             530         POP     HL
0050    CD9F01    R    531         CALL    GETCHN
0053    FA4200    R    532         JP      M,STRRF1
0056    FE03           533         CP      03
0058    CA2100    R    534         JP      Z,DENERR
005B    87             535         ADD     A,A
005C    010000         536         LD      BC,0
005F    4F             537         LD      C,A
0060    E5             538         PUSH    HL
0061    09             539         ADD     HL,BC
0062    CDA801    R    540         CALL    GETDAT
```

```
0065  73              541          LD      (HL),E
0066  23              542          INC     HL
0067  72              543          LD      (HL),D
0068  E1              544          POP     HL
0069  3A8168          545          LD      A,(COUNT)
006C  3C              546          INC     A
006D  FE03            547          CP      3
006F  C8              548          RET     Z
0070  328168          549          LD      (COUNT),A
0073  CD0000   R      550          CALL    INMSGC
0076  C34200   R      551          JP      STRRF1
                      552  ;
                      553  STRNEG:
0079  211800          554          LD      HL,3*MSGSIZ
007C  11086A          555          LD      DE,REDNEG
007F  C33900   R      556          JP      STRRF0
                      557  SNDNWAT:
0082  CD0000   X      558          CALL    PUTASC
                      559  WAIT1:
0085  0E20            560          LD      C,32
0087  CD0000   X      561          CALL    WAIT
008A  CD0000   X      562          CALL    BEEP_2
008D  C9              563          RET
                      564  ;
                      565  ;
                      566  STRO4:
008E  213000          567          LD      HL,6*MSGSIZ
0091  110E6A          568          LD      DE,RO4PRN
0094  C33900   R      569          JP      STRRF0
                      570  ;
                      571  ;
                      572  STRU1:
0097  214800          573          LD      HL,9*MSGSIZ
009A  11146A          574          LD      DE,RU1PRN
009D  C33900   R      575          JP      STRRF0
                      576  ;
                      577  ;
                      578  ;                      SORT ALL DENSITI
                      579  ;                              LOW TO H
                      580  ;
                      581  ;
                      582  SRTDEN:
00A0  219868          583          LD      HL,REDDEN
00A3  CDAF00   R      584          CALL    TSTORD
00A6  21A668          585          LD      HL,GRNDEN
00A9  CDAF00   R      586          CALL    TSTORD
00AC  21B468          587          LD      HL,BLUDEN
                      588  TSTORD:
00AF  110B00          589          LD      DE,11
00B2  4E              590          LD      C,(HL)
00B3  23              591          INC     HL
00B4  46              592          LD      B,(HL)
00B5  19              593          ADD     HL,DE
00B6  5E              594          LD      E,(HL)
00B7  23              595          INC     HL
00B8  56              596          LD      D,(HL)
00B9  CDB801   R      597          CALL    CPBCDE
00BC  4D              598          LD      C,L
00BD  44              599          LD      B,H
00BE  D8              600          RET     C
00BF  3E07            601          LD      A,SERLEN/2
                      602  REORD1:
00C1  5E              603          LD      E,(HL)
00C2  2B              604          DEC     HL
00C3  56              605          LD      D,(HL)
00C4  2B              606          DEC     HL
```

```
00C5   D5              607           PUSH    DE
00C6   3D              608           DEC     A
00C7   C2C100    R     609           JP      NZ,REORD1
00CA   3E07            610           LD      A,SERLEN/2
00CC   60              611           LD      H,B
00CD   69              612           LD      L,C
                       613   REORD2:
00CE   D1              614           POP     DE
00CF   73              615           LD      (HL),E
00D0   2B              616           DEC     HL
00D1   72              617           LD      (HL),D
00D2   2B              618           DEC     HL
00D3   3D              619           DEC     A
00D4   C2CE00    R     620           JP      NZ,REORD2
00D7   C9              621           RET
                       622   ;
                       623   ;
                       624   LMEMFB:
00D8   71              625           LD      (HL),C
00D9   23              626           INC     HL
00DA   70              627           LD      (HL),B
00DB   C9              628           RET
                       629   ;
                       630   ;
                       631   ;===================================
                       632   ;
                       633   ;             GETDEN   ROUTINE
                       634   ;
                       635   ;
                       636   ;
                       637   ;      IN
                       638   ;      ==
                       639   ;      BC = R,G,B (0-2)
                       640   ;      DE = INPUT VALUE
                       641   ;
                       642   ;===================================
                       643   ;
                       644   LDNGET:
00DC   CD0000    X     645           CALL    LDEFHL
                       646   GETDEN:
00DF   D5              647           PUSH    DE
00E0   110E00          648           LD      DE,SERLEN
00E3   CD0000    X     649           CALL    DMPY
00E6   219868          650           LD      HL,REDDEN
00E9   19              651           ADD     HL,DE
00EA   C1              652           POP     BC
00EB   3E00            653           LD      A,0
00ED   328168          654           LD      (COUNT),A
                       655   GETDN1:
00F0   5E              656           LD      E,(HL)
00F1   23              657           INC     HL
00F2   56              658           LD      D,(HL)
00F3   23              659           INC     HL
00F4   3A8168          660           LD      A,(COUNT)
00F7   3C              661           INC     A
00F8   FE07            662           CP      SERLEN/2
00FA   CA0C01    R     663           JP      Z,TSTLST
00FD   328168          664           LD      (COUNT),A
0100   CDB801    R     665           CALL    CPBCDE
0103   D2F000    R     666           JP      NC,GETDN1
0106   CA7301    R     667           JP      Z,XACTV
0109   C31C01    R     668           JP      GETDON
                       669   ;
                       670   ;
                       671   TSTLST:
010C   3A8168          672           LD      A,(COUNT)
```

```
010F    3C                  673             INC     A
0110    328168              674             LD      (COUNT),A
0113    CDB801      R       675             CALL    CPBCDE
0116    DA1C01      R       676             JP      C,GETDON
0119    C37301      R       677             JP      XACTV
                            678     ;
                            679     ;
                            680     GETDON:
011C    3A8168              681             LD      A,(COUNT)
011F    FE01                682             CP      1
0121    CA7301      R       683             JP      Z,XACTV
0124    C5                  684             PUSH    BC
0125    2B                  685             DEC     HL
0126    2B                  686             DEC     HL
0127    2B                  687             DEC     HL
0128    46                  688             LD      B,(HL)
0129    2B                  689             DEC     HL
012A    4E                  690             LD      C,(HL)
012B    E1                  691             POP     HL
012C    C5                  692             PUSH    BC
012D    CDC701      R       693             CALL    DEMNBC
0130    79                  694             LD      A,C
0131    37                  695             SCF
0132    3F                  696             CCF
0133    1F                  697             RRA
0134    4F                  698             LD      C,A
                            699
0135    CDC701      R       700             CALL    DEMNBC
0138    C5                  701             PUSH    BC
0139    4D                  702             LD      C,L
013A    44                  703             LD      B,H
                            704
013B    CDC701      R       705             CALL    DEMNBC
013E    F1                  706             POP     AF
013F    D1                  707             POP     DE
0140    C5                  708             PUSH    BC
0141    F5                  709             PUSH    AF
0142    4D                  710             LD      C,L
0143    44                  711             LD      B,H
0144    CDBE01      R       712             CALL    BCMNDE
0147    D1                  713             POP     DE
0148    C5                  714             PUSH    BC
0149    4D                  715             LD      C,L
014A    44                  716             LD      B,H
014B    CDB801      R       717             CALL    CPBCDE
014E    D25701      R       718             JP      NC,GETD1
0151    CDC701      R       719             CALL    DEMNBC
0154    C35A01      R       720             JP      GETD2
                            721     GETD1:
0157    CDBE01      R       722             CALL    BCMNDE
                            723     GETD2:
015A    E1                  724             POP     HL
015B    D1                  725             POP     DE
                            726
015C    79                  727             LD      A,C
015D    BB                  728             CP      E
015E    D26E01      R       729             JP      NC,HICLOS
0161    BD                  730             CP      L
0162    D27E01      R       731             JP      NC,LOCLOS
                            732     GETD3:
0165    3A8168              733             LD      A,(COUNT)
0168    3D                  734             DEC     A
0169    F680                735             OR      080H
016B    C38201      R       736             JP      GETSL
                            737     HICLOS:
016E    7D                  738             LD      A,L
016F    BB                  739             CP      E
```

```
0170   DA7901   R   740          JP      C,HIOUT
                    741  XACTV:
0173   3A8168       742          LD      A,(COUNT)
                    743          DEC     A
0176   C38201   R   744          JP      GETSL
                    745  ;
                    746  ;
                    747  HIOUT:
0179   79           748          LD      A,C
017A   BD           749          CP      L
017B   DA6501   R   750          JP      C,GETD3
                    751  LOCLOS:
017E   3A8168       752          LD      A,(COUNT)
0181   3D           753          DEC     A
                    754  GETSL:
0182   110000       755          LD      DE,0
0185   5F           756          LD      E,A
0186   B7           757          OR      A
0187   17           758          RLA
0188   F5           759          PUSH    AF
0189   7B           760          LD      A,E
018A   E67F         761          AND     07FH
018C   3D           762          DEC     A
018D   B7           763          OR      A
018E   17           764          RLA
018F   17           765          RLA
0190   5F           766          LD      E,A
0191   F1           767          POP     AF
0192   D29701   R   768          JP      NC,GTSL1
0195   13           769          INC     DE
0196   13           770          INC     DE
                    771  GTSL1:
0197   210000   X   772          LD      HL,SERMUL
019A   19           773          ADD     HL,DE
019B   4E           774          LD      C,(HL)
019C   23           775          INC     HL
019D   46           776          LD      B,(HL)
019E   C9           777          RET
                    778  ;
                    779  ;
                    780  ;
                    781  GETCHN:
019F   E5           782          PUSH    HL
01A0   CDAF01   R   783          CALL    READEN
01A3   E1           784          POP     HL
01A4   79           785          LD      A,C
01A5   D401         786          SUB     1
01A7   C9           787          RET
                    788  ;
                    789  ;
                    790  GETDAT:
01A8   E5           791          PUSH    HL
01A9   CD0000   X   792          CALL    GETCHN
01AC   EB           793          EX      DE,HL
01AD   E1           794          POP     HL
01AE   C9           795          RET
                    796  ;
                    797  ;
                    798  READEN:
01AF   CD0000   X   799          CALL    DLUART
01B2   C5           800          PUSH    BC
01B3   CD8500   R   801          CALL    WAIT1
01B6   C1           802          POP     BC
01B7   C9           803          RET
                    804  ;
                    805  ;
```

```
                806   CFBCDE:
01B8  78        807         LD      A,B
01B9  BA        808         CP      D
01BA  C0        809         RET     NZ
01BB  79        810         LD      A,C
01BC  BB        811         CP      E
01BD  C9        812         RET
                813   ;
                814   ;
                815   BCMNDE:
01BE  79        816         LD      A,C
01BF  93        817         SUB     E
01C0  4F        818         LD      C,A
01C1  78        819         LD      A,B
01C2  DE00      820         SBC     A,0
01C4  92        821         SUB     D
01C5  47        822         LD      B,A
01C6  C9        823         RET
                824   ;
                825   ;
                826   DEMNBC:
01C7  7B        827         LD      A,E
01C8  91        828         SUB     C
01C9  4F        829         LD      C,A
01CA  7A        830         LD      A,D
01CB  DE00      831         SBC     A,0
01CD  90        832         SUB     B
01CE  47        833         LD      B,A
01CF  C9        834         RET
                835   ;
                836   ;
                837   CMCORR:
01D0  CD2B00  R 838         CALL    STRREF
01D3  C0        839         RET     NZ
01D4  CD7900  R 840         CALL    STRNEG
01D7  C0        841         RET     NZ
                842   ;
01D8  2A026A    843         LD      HL,(REDREF)
01DB  ED5B086A  844         LD      DE,(REDNEG)
01DF  CD0002  R 845         CALL    CLDELTA
01E2  221A6A    846         LD      (REDMAS),HL
01E5  2A046A    847         LD      HL,(GRNREF)
01E8  ED5B0A6A  848         LD      DE,(GRNNEG)
01EC  CD0002  R 849         CALL    CLDELTA
01EF  221C6A    850         LD      (GRNMAS),HL
01F2  2A066A    851         LD      HL,(BLUREF)
01F5  ED5B0C6A  852         LD      DE,(BLUNEG)
01F9  CD0002  R 853         CALL    CLDELTA
01FC  221E6A    854         LD      (BLUMAS),HL
01FF  C9        855         RET
                856   ;
                857   ;
                858   CLDELTA:
0200  22DA68    859         LD      (N3DEN),HL
0203  ED53DC68  860         LD      (NTDEN),DE
0207  B7        861         OR      A
0208  ED52      862         SBC     HL,DE
020A  FA1202  R 863         JP      M,CLDT1
020D  11E803    864         LD      DE,1000
0210  19        865         ADD     HL,DE
0211  C9        866         RET
                867   ;
                868   CLDT1:
0212  2ADC68    869         LD      HL,(NTDEN)
0215  ED5BDA68  870         LD      DE,(N3DEN)
0219  B7        871         OR      A
```

```
021A   ED52              872            SBC     HL,DE
021C   EB                873            EX      DE,HL
021D   21E803            874            LD      HL,1000
0220   B7                875            OR      A
0221   ED52              876            SBC     HL,DE
0223   C9                877            RET
                         878     ;
                         879     ;
                         880     CALDTM:
0224   CD0000    X       881            CALL    GET_SU
0227   CD2B00    R       882            CALL    STRREF
022A   C20000    X       883            JP      NZ,RES_SU
022D   CD7900    R       884            CALL    STRNEG
0230   C20000    X       885            JP      NZ,RES_SU
                         886     RECLTM:
0233   0E04              887            LD      C,DBRRPT
0235   2A026A            888            LD      HL,(REDREF)
0238   ED5B086A          889            LD      DE,(REDNEG)
023C   CD5402    R       890            CALL    CALDIF
023F   0E05              891            LD      C,DBGRPT
0241   2A046A            892            LD      HL,(GRNREF)
0244   ED5B0A6A          893            LD      DE,(GRNNEG)
0248   CD5402    R       894            CALL    CALDIF
024B   0E06              895            LD      C,DBBRPT
024D   2A066A            896            LD      HL,(BLUREF)
0250   ED5B0C6A          897            LD      DE,(BLUNEG)
                         898     ;
                         899     CALDIF:
0254   22DA68            900            LD      (N3DEN),HL
0257   ED53DC68          901            LD      (NTDEN),DE
025B   ED43E068          902            LD      (DBPTR),BC
025F   0652              903            LD      B,'R'
0261   CD0000    X       904            CALL    SET1
0264   ED53DE68          905            LD      (N3TIME),DE
0268   ED4BDC68          906            LD      BC,(NTDEN)
026C   2ADA68            907            LD      HL,(N3DEN)
026F   B7                908            OR      A
0270   ED42              909            SBC     HL,BC
0272   FA8202    R       910            JP      M,CALD1
0275   22D868            911            LD      (DELTAT),HL
0278   CDFA02    R       912            CALL    CALCDT
027B   2ADE68            913            LD      HL,(N3TIME)
027E   19                914            ADD     HL,DE
027F   C39C02    R       915            JP      CALD2
                         916     ;
                         917     CALD1:
0282   2ADC68            918            LD      HL,(NTDEN)
0285   ED5BDA68          919            LD      DE,(N3DEN)
0289   B7                920            OR      A
028A   ED52              921            SBC     HL,DE
028C   7C                922            LD      A,H
028D   F680              923            OR      080H
028F   67                924            LD      H,A
0290   22D868            925            LD      (DELTAT),HL
0293   CDFA02    R       926            CALL    CALCDT
0296   2ADE68            927            LD      HL,(N3TIME)
0299   B7                928            OR      A
029A   ED52              929            SBC     HL,DE
                         930     CALD2:
029C   ED4BE068          931            LD      BC,(DBPTR)
02A0   0677              932            LD      B,'w'
02A2   CD0000    X       933            CALL    SET1
02A5   2AE068            934            LD      HL,(DBPTR)
02A8   110300            935            LD      DE,DBRPFT-DBRRFT
02AB   CDC302    R       936            CALL    CALBF
02AE   110300            937            LD      DE,DBRNFT-DBRPFT
02B1   CDC302    R       938            CALL    CALBF
```

```
02B4  111C00       939        LD      DE,DBRPBP-DBRNPT
02B7  CDC302   R   940        CALL    CALBP
02BA  110300       941        LD      DE,DBRNBP-DBRPBP
02BD  CDC302   R   942        CALL    CALBP
                   943   ;            LD      HL,1000
                   944   ;            LD      (REDMAS),HL
                   945   ;            LD      (GRNMAS),HL
                   946   ;            LD      (BLUMAS),HL
02C0  C30000   X   947        JP      RES_SU
                   948   ;
                   949   ;
                   950   CALBP:
02C3  19           951        ADD     HL,DE
02C4  22E068       952        LD      (DBPTR),HL
02C7  4D           953        LD      C,L
02C8  0652         954        LD      B,'R'
02CA  CD0000   X   955        CALL    SET1
02CD  ED53E268     956        LD      (BP),DE
02D1  2AD868       957        LD      HL,(DELTAT)
02D4  7C           958        LD      A,H
02D5  E680         959        AND     080H
02D7  F2E602   R   960        JP      P,CALD3
02DA  CDFE02   R   961        CALL    CALCT
02DD  2AE268       962        LD      HL,(BP)
02E0  B7           963        OR      A
02E1  ED52         964        SBC     HL,DE
02E3  C3ED02   R   965        JP      CALD4
                   966   ;
                   967   CALD3:
02E6  CDFE02   R   968        CALL    CALCT
02E9  2AE268       969        LD      HL,(BP)
02EC  19           970        ADD     HL,DE
                   971   CALD4:
02ED  ED4BE068     972        LD      BC,(DBPTR)
02F1  0657         973        LD      B,'W'
02F3  CD0000   X   974        CALL    SET1
02F6  2AE068       975        LD      HL,(DBPTR)
02F9  C9           976        RET
                   977   ;
                   978   ;
                   979   CALCDT:
02FA  ED5BDE68     980        LD      DE,(N3TIME)
                   981   CALCT:
02FE  ED4BD868     982        LD      BC,(DELTAT)
0302  78           983        LD      A,B
0303  E67F         984        AND     07FH
0305  47           985        LD      B,A
0306  CD0000   X   986        CALL    DMPY
0309  01E803       987        LD      BC,1000
030C  C30000   X   988        JP      DDIV
                   989   *LIST ON
                   990   CO4U1S:
030F  CD0000   X   991        CALL    GET_SU
0312  CD7900   R   992        CALL    STRNEG
0315  C20000   X   993        JP      NZ,RES_SU
0318  CD8E00   R   994        CALL    STRO4
031B  C20000   X   995        JP      NZ,RES_SU
031E  CD9700   R   996        CALL    STRU1
0321  C20000   X   997        JP      NZ,RES_SU
                   998   CALSLP:
                   999   RCO4U1:
0324  010700       1000       LD      BC,DBRPPT
0327  ED43E068     1001       LD      (DBPTR),BC
032B  2A086A       1002       LD      HL,(REDNEG)
032E  22DA68       1003       LD      (N3DEN),HL
0331  ED5B0E6A     1004       LD      DE,(RO4PRN)
```

```
0335   ED53DC68        1005            LD      (NTDEN),DE
0339   CD5004     R    1006            CALL    CO4BP
033C   010800          1007            LD      BC,DBGPPT
033F   ED43E068        1008            LD      (DBPTR),BC
0343   2A0A6A          1009            LD      HL,(GRNNEG)
0346   22DA68          1010            LD      (N3DEN),HL
0349   ED5B106A        1011            LD      DE,(GO4PRN)
034D   ED53DC68        1012            LD      (NTDEN),DE
0351   CD5004     R    1013            CALL    CO4BP
0354   010900          1014            LD      BC,DBBPPT
0357   ED43E068        1015            LD      (DBPTR),BC
035B   2A0C6A          1016            LD      HL,(BLUNEG)
035E   22DA68          1017            LD      (N3DEN),HL
0361   ED5B126A        1018            LD      DE,(BO4PRN)
0365   ED53DC68        1019            LD      (NTDEN),DE
0369   CD5004     R    1020            CALL    CO4BP
                       1021    ;
036C   010A00          1022            LD      BC,DBRNPT
036F   ED43E068        1023            LD      (DBPTR),BC
0373   2A086A          1024            LD      HL,(REDNEG)
0376   22DA68          1025            LD      (N3DEN),HL
0379   ED5B146A        1026            LD      DE,(RU1PRN)
037D   ED53DC68        1027            LD      (NTDEN),DE
0381   CDB703     R    1028            CALL    CU1BP
0384   010B00          1029            LD      BC,DBGNPT
0387   ED43E068        1030            LD      (DBPTR),BC
038B   2A0A6A          1031            LD      HL,(GRNNEG)
038E   22DA68          1032            LD      (N3DEN),HL
0391   ED5B166A        1033            LD      DE,(GU1PRN)
0395   ED53DC68        1034            LD      (NTDEN),DE
0399   CDB703     R    1035            CALL    CU1BP
039C   010C00          1036            LD      BC,DBBNPT
039F   ED43E068        1037            LD      (DBPTR),BC
03A3   2A0C6A          1038            LD      HL,(BLUNEG)
03A6   22DA68          1039            LD      (N3DEN),HL
03A9   ED5B186A        1040            LD      DE,(BU1PRN)
03AD   ED53DC68        1041            LD      (NTDEN),DE
03B1   CDB703     R    1042            CALL    CU1BP
03B4   C30000     X    1043            JP      RES_SU
                       1044    ;
                       1045    ;
                       1046    CU1BP:
                       1047            ; CALC DELTA D = D1' - I
                       1048            ;
03B7   2ADA68          1049            LD      HL,(N3DEN)
03BA   ED5BDC68        1050            LD      DE,(NTDEN)
03BE   B7              1051            OR      A
03BF   ED52            1052            SBC     HL,DE
03C1   F2D603     R    1053            JP      P,CNTU1
03C4   EB              1054            EX      DE,HL
03C5   ED5BDA68        1055            LD      DE,(N3DEN)
03C9   B7              1056            OR      A
03CA   ED52            1057            SBC     HL,DE
03CC   EB              1058            EX      DE,HL
03CD   21E803          1059            LD      HL,1000
03D0   B7              1060            OR      A
03D1   ED52            1061            SBC     HL,DE
03D3   C3DA03     R    1062            JP      DIU1CA
                       1063    CNTU1:
03D6   11E803          1064            LD      DE,1000
03D9   19              1065            ADD     HL,DE
                       1066    DIU1CA:
03DA   22D868          1067            LD      (DELTAT),HL
03DD   ED4BE068        1068            LD      BC,(DBPTR)
03E1   0652            1069            LD      B,'R'
03E3   CD0000     X    1070            CALL    SET1
```

| | | | | | |
|---|---|---|---|---|---|
| 03E6 | ED4BD868 | | 1071 | LD | BC,(DELTAT) |
| 03EA | CD0000 | X | 1072 | CALL | DMPY |
| 03ED | CD0000 | X | 1073 | CALL | NORMAL |
| 03F0 | 22E268 | | 1074 | LD | (BP),HL |
| 03F3 | ED4BE068 | | 1075 | LD | BC,(DBPTR) |
| 03F7 | 0677 | | 1076 | LD | B,'W' |
| 03F9 | CD0000 | X | 1077 | CALL | SET1 |
| 03FC | 2AE068 | | 1078 | LD | HL,(DBPTR) |
| 03FF | 010600 | | 1079 | LD | BC,DBRNPT-DBRRPT |
| 0402 | B7 | | 1080 | OR | A |
| 0403 | ED42 | | 1081 | SBC | HL,BC |
| 0405 | 4D | | 1082 | LD | C,L |
| 0406 | 0652 | | 1083 | LD | B,'R' |
| 0408 | CD0000 | X | 1084 | CALL | SET1 |
| 040B | EB | | 1085 | EX | DE,HL |
| 040C | 22DA68 | | 1086 | LD | (N3DEN),HL |
| 040F | ED5BE268 | | 1087 | LD | DE,(BP) |
| 0413 | B7 | | 1088 | OR | A |
| 0414 | ED52 | | 1089 | SBC | HL,DE |
| 0416 | 22DC68 | | 1090 | LD | (NTDEN),HL |
| 0419 | ED4BE068 | | 1091 | LD | BC,(DBPTR) |
| 041D | 211F00 | | 1092 | LD | HL,DBRNBP-DBRNP |
| 0420 | 09 | | 1093 | ADD | HL,BC |
| 0421 | 4D | | 1094 | LD | C,L |
| 0422 | 0652 | | 1095 | LD | B,'R' |
| 0424 | CD0000 | X | 1096 | CALL | SET1 |
| 0427 | 2ADA68 | | 1097 | LD | HL,(N3DEN) |
| 042A | B7 | | 1098 | OR | A |
| 042B | ED52 | | 1099 | SBC | HL,DE |
| 042D | 22DA68 | | 1100 | LD | (N3DEN),HL |
| 0430 | ED5BDC68 | | 1101 | LD | DE,(NTDEN) |
| 0434 | 01E803 | | 1102 | LD | BC,1000 |
| 0437 | CD0000 | X | 1103 | CALL | DMPY |
| 043A | ED4BDA68 | | 1104 | LD | BC,(N3DEN) |
| 043E | CD0000 | X | 1105 | CALL | DDIV |
| 0441 | ED4BE068 | | 1106 | LD | BC,(DBPTR) |
| 0445 | 210900 | | 1107 | LD | HL,DBRSU-DBRNPT |
| 0448 | 09 | | 1108 | ADD | HL,BC |
| 0449 | 4D | | 1109 | LD | C,L |
| 044A | EB | | 1110 | EX | DE,HL |
| 044B | 0657 | | 1111 | LD | B,'W' |
| 044D | C30000 | X | 1112 | JP | SET1 |
| | | | 1113 | ; | |
| | | | 1114 | ; | |
| | | | 1115 | CO4BP: | |
| | | | 1116 | | ; CALC DELTA D = D1' - I |
| 0450 | 2ADA68 | | 1117 | LD | HL,(N3DEN) |
| 0453 | ED5BDC68 | | 1118 | LD | DE,(NTDEN) |
| 0457 | B7 | | 1119 | OR | A |
| 0458 | ED52 | | 1120 | SBC | HL,DE |
| 045A | F26F04 | R | 1121 | JP | P,CNTCAL |
| 045D | EB | | 1122 | EX | DE,HL |
| 045E | ED5BDA68 | | 1123 | LD | DE,(N3DEN) |
| 0462 | B7 | | 1124 | OR | A |
| 0463 | ED52 | | 1125 | SBC | HL,DE |
| 0465 | EB | | 1126 | EX | DE,HL |
| 0466 | 21E803 | | 1127 | LD | HL,1000 |
| 0469 | B7 | | 1128 | OR | A |
| 046A | ED52 | | 1129 | SBC | HL,DE |
| 046C | C37304 | R | 1130 | JP | DIFCAL |
| | | | 1131 | CNTCAL: | |
| 046F | 11E803 | | 1132 | LD | DE,1000 |
| 0472 | 19 | | 1133 | ADD | HL,DE |
| | | | 1134 | DIFCAL: | |
| 0473 | EB | | 1135 | EX | DE,HL |
| 0474 | ED53D868 | | 1136 | LD | (DELTAT),DE |

```
0478  ED4BE068    1137         LD     BC,(DBPTR)
047C  0652        1138         LD     B,'R'
047E  CD0000    X 1139         CALL   SET1
0481  ED4BD868    1140         LD     BC,(DELTAT)
                  1141    ;
                  1142    ;    CALC BPO' = BPO [ 1 + (
                  1143    ;
0485  CD0000    X 1144         CALL   DMPY
0488  CD0000    X 1145         CALL   NORMAL
048B  ED4BE068    1146         LD     BC,(DBPTR)
048F  22E268      1147         LD     (BP),HL
                  1148    ;
                  1149    ;    STORE NEW BPO
                  1150    ;
0492  0677        1151         LD     B,'W'
0494  CD0000    X 1152         CALL   SET1
0497  2AE068      1153         LD     HL,(DBPTR)
049A  110300      1154         LD     DE,DBRFPT-DBRRPT
049D  B7          1155         OR     A
049E  ED52        1156         SBC    HL,DE
04A0  4D          1157         LD     C,L
04A1  0652        1158         LD     B,'R'
04A3  CD0000    X 1159         CALL   SET1
04A6  2AE268      1160         LD     HL,(BP)
04A9  B7          1161         OR     A
04AA  ED52        1162         SBC    HL,DE
04AC  22DA68      1163         LD     (N3DEN),HL
04AF  011F00      1164         LD     BC,DBRFBF-DBRFPT
04B2  2AE068      1165         LD     HL,(DBPTR)
04B5  09          1166         ADD    HL,BC
04B6  ED53DE68    1167         LD     (N3TIME),DE
04BA  4D          1168         LD     C,L
04BB  0652        1169         LD     B,'R'
04BD  CD0000    X 1170         CALL   SET1
04C0  EB          1171         EX     DE,HL
04C1  ED5BDE68    1172         LD     DE,(N3TIME)
04C5  B7          1173         OR     A
04C6  ED52        1174         SBC    HL,DE
04C8  22DE68      1175         LD     (N3TIME),HL
04CB  ED5BDA68    1176         LD     DE,(N3DEN)
04CF  01E803      1177         LD     BC,1000
04D2  CD0000    X 1178         CALL   DMPY
04D5  ED4BDE68    1179         LD     BC,(N3TIME)
04D9  CD0000    X 1180         CALL   DDIV
04DC  210900      1181         LD     HL,DBRSO-DBRFPT
04DF  ED4BE068    1182         LD     BC,(DBPTR)
04E3  09          1183         ADD    HL,BC
04E4  E5          1184         PUSH   HL
04E5  C1          1185         POP    BC
04E6  0657        1186         LD     B,'W'
04E8  EB          1187         EX     DE,HL
04E9  C30000    X 1188         JP     SET1
                  1189    END
                                 SFS
LOC    OBJ CODE M STMT SOURCE STATEMENT

450     *LIST ON
                  451     ;
                  452     ;    Subject Failure Suppression c
                  453     ;
                  454     ;         10
                  455     ;
                  456     ;;;;;;;;;;;;;;;;;;;;;;;;;;;;;;;;;;
                  457     ;
                  458     ;                        E D I T
                  459     ;
```

```
                460  ;          10-15-82          BB
                461  ;
                462  ;:::::::::::::::::::::::::::::::
                463  ;
                464           GLOBAL       DO_SFS,T
                465  ;
                466           EXTERNAL     DDIV,DMF
                467  ;
                468  ;
                469  ; Calculate ratios of Linear tim
                470  ;
0000  0652      471  DO_SFS   LD      B,'R'
0002  0E04      472           LD      C,DBRRPT
0004  CD0000  X 473           CALL    SET1
0007  ED533E68  474           LD      (REF),DE
000B  2A6768    475           LD      HL,(REXP)
000E  224068    476           LD      (NEG),HL
0011  CD0604  R 477           CALL    CALSFS
0014  ED533268  478           LD      (RPTIME),DE
                479  ;
0018  0652      480           LD      B,'R'
001A  0E05      481           LD      C,DBGRPT
001C  CD0000  X 482           CALL    SET1
001F  ED533E68  483           LD      (REF),DE
0023  2A6968    484           LD      HL,(GEXP)
0026  224068    485           LD      (NEG),HL
0029  CD0604  R 486           CALL    CALSFS
002C  ED533468  487           LD      (GPTIME),DE
                488  ;
0030  0652      489           LD      B,'R'
0032  0E06      490           LD      C,DBBRPT
0034  CD0000  X 491           CALL    SET1
0037  ED533E68  492           LD      (REF),DE
003B  2A6B68    493           LD      HL,(BEXP)
003E  224068    494           LD      (NEG),HL
0041  CD0604  R 495           CALL    CALSFS
0044  ED533668  496           LD      (BPTIME),DE
                497  ;
                498  ; Put ratios into Data Base for
                499  ;
0048  2A3268    500           LD      HL,(RPTIME)
004B  224068    501           LD      (NEG),HL
004E  0652      502           LD      B,'R'
0050  0E1C      503           LD      C,DBRAVG
0052  CD0000  X 504           CALL    SET1
0055  ED533E68  505           LD      (REF),DE
0059  CDD003  R 506           CALL    CALAVG
005C  0677      507           LD      B,'W'
005E  0E1C      508           LD      C,DBRAVG
0060  CD0000  X 509           CALL    SET1
                510
0063  2A3468    511           LD      HL,(GPTIME)
0066  224068    512           LD      (NEG),HL
0069  0652      513           LD      B,'R'
006B  0E1D      514           LD      C,DBGAVG
006D  CD0000  X 515           CALL    SET1
0070  ED533E68  516           LD      (REF),DE
0074  CDD003  R 517           CALL    CALAVG
0077  0677      518           LD      B,'W'
0079  0E1D      519           LD      C,DBGAVG
007B  CD0000  X 520           CALL    SET1
                521
007E  2A3668    522           LD      HL,(BPTIME)
0081  224068    523           LD      (NEG),HL
0084  0652      524           LD      B,'R'
0086  0E1E      525           LD      C,DBBAVG
```

```
0088  CD0000    X  526           CALL   SET1
008B  ED533E68     527           LD     (REF),DE
008F  CDD003    R  528           CALL   CALAVG
0092  0677         529           LD     B,'W'
0094  0E1E         530           LD     C,DBBAVG
0096  CD0000    X  531           CALL   SET1
                   532   ;
                   533   ; see if SFS is enabled
                   534   ;
0099  3AE868       535           LD     A,(FSFSF)
009C  B7           536           OR     A
009D  C2A700    R  537           JP     NZ,SFS
                   538
00A0  3AE968       539           LD     A,(FLGSFS)
00A3  B7           540           OR     A
00A4  2001         541           JR     NZ,SFS
00A6  C9           542           RET
                   543   ;
                   544   ; determine Max & Min ratios
                   545   ;
00A7  3E42         546   SFS     LD     A,'B'
00A9  32EB68       547           LD     (MIN),A
00AC  32EA68       548           LD     (MAX),A
00AF  DD2A3668     549           LD     IX,(BPTIME)
00B3  FD2A3668     550           LD     IY,(BPTIME)
00B7  2A3268       551           LD     HL,(RPTIME)
00BA  ED5B3468     552           LD     DE,(GPTIME)
00BE  B7           553           OR     A
00BF  ED52         554           SBC    HL,DE
00C1  3809         555           JR     C,MMAX1
00C3  3E52         556           LD     A,'R'
00C5  32EA68       557           LD     (MAX),A
00C8  DD2A3268     558           LD     IX,(RPTIME)
00CC  2A3668       559   MMAX1   LD     HL,(BPTIME)
00CF  B7           560           OR     A
00D0  ED52         561           SBC    HL,DE
00D2  3026         562           JR     NC,MMAX3
00D4  3AEA68       563           LD     A,(MAX)
00D7  FE52         564           CP     'R'
00D9  2867         565           JR     Z,RMAX
                   566   ;
00DB  3E47         567           LD     A,'G'
00DD  32EA68       568           LD     (MAX),A
00E0  DD2A3468     569           LD     IX,(GPTIME)
00E4  2A3268       570           LD     HL,(RPTIME)
00E7  ED5B3668     571           LD     DE,(BPTIME)
00EB  ED52         572           SBC    HL,DE
00ED  3069         573           JR     NC,GMAX
00EF  3E52         574           LD     A,'R'
00F1  32EB68       575           LD     (MIN),A
00F4  FD2A3268     576           LD     IY,(RPTIME)
00F8  185E         577           JR     GMAX
00FA  3AEA68       578   MMAX3   LD     A,(MAX)
00FD  FE52         579           CP     'R'
00FF  280B         580           JR     Z,MMAX2
0101  3E52         581           LD     A,'R'
0103  32EB68       582           LD     (MIN),A
0106  FD2A3268     583           LD     IY,(RPTIME)
010A  1820         584           JR     BMAX
010C  3E47         585   MMAX2   LD     A,'G'
010E  32EB68       586           LD     (MIN),A
0111  FD2A3468     587           LD     IY,(GPTIME)
0115  2A3268       588           LD     HL,(RPTIME)
0118  ED5B3668     589           LD     DE,(BPTIME)
011C  B7           590           OR     A
011D  ED52         591           SBC    HL,DE
```

```
011F  3037          592           JR    NC,GMAX
0121  3E42          593           LD    A,'B'
0123  32EA68        594           LD    (MAX),A
0126  DD2A3668      595           LD    IX,(BPTIME)
012A  1800          596           JR    BMAX
                    597  ;
                    598  ; determine if color predominanc
                    599  ;
012C  CD1804   R    600  BMAX     CALL  RATIO
012F  0652          601           LD    B,'R'
0131  0E1B          602           LD    C,DBBSFR
0133  CD0000   X    603           CALL  SET1
0136  2AEC68        604           LD    HL,(CRATIO)
0139  B7            605           OR    A
013A  ED52          606           SBC   HL,DE
013C  3034          607           JR    NC,TUNGST
013E  DD2A3268      608           LD    IX,(RPTIME)
                    609
0142  CD1804   R    610  RMAX     CALL  RATIO
0145  0652          611           LD    B,'R'
0147  0E19          612           LD    C,DBRSFR
0149  CD0000   X    613           CALL  SET1
014C  2AEC68        614           LD    HL,(CRATIO)
014F  B7            615           OR    A
0150  ED52          616           SBC   HL,DE
0152  301E          617           JR    NC,TUNGST
0154  DD2A3468      618           LD    IX,(GPTIME)
                    619
0158  CD1804   R    620  GMAX     CALL  RATIO
015B  0652          621           LD    B,'R'
015D  0E1A          622           LD    C,DBGSFR
015F  CD0000   X    623           CALL  SET1
0162  2AEC68        624           LD    HL,(CRATIO)
0165  B7            625           OR    A
0166  ED52          626           SBC   HL,DE
0168  3008          627           JR    NC,TUNGST
                    628
016A  3AE868        629           LD    A,(FSFSF)
016D  B7            630           OR    A
016E  C27201   R    631           JP    NZ,TUNGST
0171  C9            632           RET
                    633  ;
                    634  ; check for tungsten or fluores
                    635  ;
0172  3AEB68        636  TUNGST   LD    A,(MIN)
0175  FE42          637           CP    'B'
0177  C22A03   R    638           JP    NZ,USESFS
                    639  ;
017A  ED5B3268      640           LD    DE,(RPTIME)
017E  01E803        641           LD    BC,1000
0181  CD0000   X    642           CALL  DMPY
0184  ED4B3468      643           LD    BC,(GPTIME)
0188  CD0000   X    644           CALL  DDIV
018B  D5            645           PUSH  DE
018C  0652          646           LD    B,'R'
018E  0E20          647           LD    C,DBTRAT
0190  CD0000   X    648           CALL  SET1
0193  E1            649           POP   HL
0194  22F068        650           LD    (SCRTH1),HL
0197  B7            651           OR    A
0198  ED52          652           SBC   HL,DE
019A  DA6502   R    653           JP    C,FLTEST
                    654  ;
019D  ED5B3468      655           LD    DE,(GPTIME)
01A1  01E803        656           LD    BC,1000
01A4  CD0000   X    657           CALL  DMPY
```

```
01A7   ED4B3668        658          LD      BC,(BPTIME)
01AB   CD0000    X     659          CALL    DDIV
01AE   D5              660          PUSH    DE
01AF   0652            661          LD      B,'R'
01B1   0E21            662          LD      C,DBTREG
01B3   CD0000    X     663          CALL    SET1
01B6   E1              664          POP     HL
01B7   B7              665          OR      A
01B8   ED52            666          SBC     HL,DE
01BA   D26502    R     667          JP      NC,FLTEST
                       668      ;
01BD   ED4B0169        669          LD      BC,(MULPRN)
01C1   79              670          LD      A,C
01C2   B0              671          OR      B
01C3   2806            672          JR      Z,ASKTUN
01C5   3AFF68          673          LD      A,(Y_NFLG)
01C8   B7              674          OR      A
01C9   202D            675          JR      NZ,TUNANS
01CB   112C04    R     676  ASKTUN  LD      DE,MSG01
01CE   CD0000    X     677          CALL    PUTASC
01D1   CD0000    X     678          CALL    BEEP_2
01D4   3A6468          679          LD      A,(IOIMG1)
01D7   F680            680          OR      L801
01D9   326468          681          LD      (IOIMG1),A
01DC   D300            682          OUT     (SSR1),A
01DE   CD0000    X     683          CALL    GETKEY
01E1   57              684          LD      D,A
01E2   3A6468          685          LD      A,(IOIMG1)
01E5   E67F            686          AND     L801N
01E7   326468          687          LD      (IOIMG1),A
01EA   D300            688          OUT     (SSR1),A
01EC   ED4B0169        689          LD      BC,(MULPRN)
01F0   79              690          LD      A,C
01F1   B0              691          OR      B
01F2   7A              692          LD      A,D
01F3   2803            693          JR      Z,TUNANS
01F5   32FF68          694          LD      (Y_NFLG),A
01F8   FE1D            695  TUNANS  CP      KEYPLU
                       696      ;   JP      NZ,USESFS
01FA   C0              697          RET     NZ
01FB   3E01            698          LD      A,1
01FD   32F568          699          LD      (TUNFLG),A
0200   C9              700          RET
                       701      ;
0201   0652            702  TUNCOR  LD      B,'R'
0203   0E22            703          LD      C,DBBLUC
0205   CD0000    X     704          CALL    SET1
0208   ED53F068        705          LD      (SCRTH1),DE
020C   ED4B6B68        706          LD      BC,(BEXP)
0210   CD0000    X     707          CALL    DMPY
0213   01E803          708          LD      BC,1000
0216   CD0000    X     709          CALL    DDIV
0219   ED536B68        710          LD      (BEXP),DE
021D   21E803          711          LD      HL,1000
0220   ED5BF068        712          LD      DE,(SCRTH1)
0224   B7              713          OR      A
0225   ED52            714          SBC     HL,DE
0227   C8              715          RET     Z
0228   EB              716          EX      DE,HL
0229   010200          717          LD      BC,2
022C   210000          718          LD      HL,0
022F   CD0000    X     719          CALL    DDIV
0232   21E803          720          LD      HL,1000
0235   19              721          ADD     HL,DE
0236   22F068          722          LD      (SCRTH1),HL
0239   EB              723          EX      DE,HL
```

```
023A  ED4B6768      724  ;
              725            LD    BC,(REXP)
023E  CD0000    X   726            CALL  DMPY
0241  01E803        727            LD    BC,1000
0244  CD0000    X   728            CALL  DDIV
0247  ED536768      729            LD    (REXP),DE
              730  ;
024B  ED4B6968      731            LD    BC,(GEXP)
024F  ED5BF068      732            LD    DE,(SCRTH1)
0253  CD0000    X   733            CALL  DMPY
0256  01E803        734            LD    BC,1000
0259  CD0000    X   735            CALL  DDIV
025C  ED536968      736            LD    (GEXP),DE
0260  97            737            SUB   A
0261  32F568        738            LD    (TUNFLG),A
0264  C9            739            RET
              740  ;
              741  FLTEST:
0265  ED4BF068      742            LD    BC,(SCRTH1)
0269  21E803        743            LD    HL,1000
026C  B7            744            OR    A
026D  ED42          745            SBC   HL,BC
026F  DA2A03    R   746            JP    C,USESFS
0272  C5            747            PUSH  BC
0273  0652          748            LD    B,'R'
0275  0E23          749            LD    C,DBFRAT
0277  CD0000    X   750            CALL  SET1
027A  E1            751            POP   HL
027B  B7            752            OR    A
027C  ED52          753            SBC   HL,DE
027E  DA2A03    R   754            JP    C,USESFS
              755  ;
0281  ED4B0169      756            LD    BC,(MULPRN)
0285  79            757            LD    A,C
0286  B0            758            OR    B
0287  2806          759            JR    Z,ASKFLO
0289  3AFF68        760            LD    A,(Y_NFLG)
028C  B7            761            OR    A
028D  202D          762            JR    NZ,FLOANS
028F  113404    R   763  ASKFLO   LD    DE,MSG02
0292  CD0000    X   764            CALL  PUTASC
0295  CD0000    X   765            CALL  BEEP_2
0298  3A6468        766            LD    A,(IOIMG1)
029B  F680          767            OR    L.801
029D  326468        768            LD    (IOIMG1),A
02A0  D300          769            OUT   (SSR1),A
02A2  CD0000    X   770            CALL  GETKEY
02A5  57            771            LD    D,A
02A6  3A6468        772            LD    A,(IOIMG1)
02A9  E67F          773            AND   L.801N
02AB  326468        774            LD    (IOIMG1),A
02AE  D300          775            OUT   (SSR1),A
02B0  ED4B0169      776            LD    BC,(MULPRN)
02B4  79            777            LD    A,C
02B5  B0            778            OR    B
02B6  7A            779            LD    A,D
02B7  2803          780            JR    Z,FLOANS
02B9  32FF68        781            LD    (Y_NFLG),A
02BC  FE1D          782  FLOANS   CP    KEYPLU
              783  ;        JP    NZ,USESFS
02BE  C0            784            RET   NZ
02BF  3E01          785            LD    A,1
02C1  32F668        786            LD    (FLOFLG),A
02C4  C9            787            RET
              788  ;
02C5  0652          789  FLOCOR   LD    B,'R'
```

```
02C7  0E24          790         LD    C,DBMAGC
02C9  CD0000    X   791         CALL  SET1
02CC  ED53F068      792         LD    (SCRTH1),DE
02D0  ED4B6968      793         LD    BC,(GEXP)
02D4  CD0000    X   794         CALL  DMPY
02D7  01E803        795         LD    BC,1000
02DA  CD0000    X   796         CALL  DDIV
02DD  ED536968      797         LD    (GEXP),DE
02E1  11E803        798         LD    DE,1000
02E4  2AF068        799         LD    HL,(SCRTH1)
02E7  B7            800         OR    A
02E8  ED52          801         SBC   HL,DE
02EA  C8            802         RET   Z
02EB  EB            803         EX    DE,HL
02EC  010200        804         LD    BC,2
02EF  210000        805         LD    HL,0
02F2  CD0000    X   806         CALL  DDIV
02F5  21E803        807         LD    HL,1000
02F8  B7            808         OR    A
02F9  ED52          809         SBC   HL,DE
02FB  22F068        810         LD    (SCRTH1),HL
02FE  EB            811         EX    DE,HL
                    812     ;
02FF  ED4B6768      813         LD    BC,(REXP)
0303  CD0000    X   814         CALL  DMPY
0306  01E803        815         LD    BC,1000
0309  CD0000    X   816         CALL  DDIV
030C  ED536768      817         LD    (REXP),DE
                    818     ;
0310  ED4B6B68      819         LD    BC,(BEXP)
0314  ED5BF068      820         LD    DE,(SCRTH1)
0318  CD0000    X   821         CALL  DMPY
031B  01E803        822         LD    BC,1000
031E  CD0000    X   823         CALL  DDIV
0321  ED536B68      824         LD    (BEXP),DE
0325  97            825         SUB   A
0326  32F668        826         LD    (FLOFLG),A
0329  C9            827         RET
                    828     ;
                    829     ; calculate average of R,G,B rat
                    830     ;
032A  2A3268        831  USESFS LD    HL,(RPTIME)
032D  44            832         LD    B,H
032E  4D            833         LD    C,L
032F  2A3468        834         LD    HL,(GPTIME)
0332  EB            835         EX    DE,HL
0333  2A3668        836         LD    HL,(BPTIME)
0336  19            837         ADD   HL,DE
0337  09            838         ADD   HL,BC
0338  EB            839         EX    DE,HL
0339  210000        840         LD    HL,00
033C  010300        841         LD    BC,03
033F  CD0000    X   842         CALL  DDIV
0342  010800        843         LD    BC,8
0345  CD0000    X   844         CALL  DMPY
0348  ED534068      845         LD    (NEG),DE
                    846     ;
                    847     ; multiply average ratio by each
                    848     ;
034C  0652          849         LD    B,'R'
034E  0E04          850         LD    C,DBRRPT
0350  CD0000    X   851         CALL  SET1
0353  ED4B4068      852         LD    BC,(NEG)
0357  CD0000    X   853         CALL  DMPY
035A  01E803        854         LD    BC,1000
035D  CD0000    X   855         CALL  DDIV
```

| | | | | | |
|---|---|---|---|---|---|
| 0360 | D5 | | 856 | PUSH | DE |
| 0361 | ED5B6768 | | 857 | LD | DE,(REXP) |
| 0365 | 01C800 | | 858 | LD | BC,200 |
| 0368 | CD0000 | X | 859 | CALL | DMPY |
| 036B | 01E803 | | 860 | LD | BC,1000 |
| 036E | CD0000 | X | 861 | CALL | DDIV |
| 0371 | E1 | | 862 | POP | HL |
| 0372 | 19 | | 863 | ADD | HL,DE |
| 0373 | 226768 | | 864 | LD | (REXP),HL |
| | | | 865 | ; | |
| 0376 | 0652 | | 866 | LD | B,'R' |
| 0378 | 0E05 | | 867 | LD | C,DBGRPT |
| 037A | CD0000 | X | 868 | CALL | SET1 |
| 037D | ED4B4068 | | 869 | LD | BC,(NEG) |
| 0381 | CD0000 | X | 870 | CALL | DMPY |
| 0384 | 01E803 | | 871 | LD | BC,1000 |
| 0387 | CD0000 | X | 872 | CALL | DDIV |
| 038A | D5 | | 873 | PUSH | DE |
| 038B | ED5B6968 | | 874 | LD | DE,(GEXP) |
| 038F | 01C800 | | 875 | LD | BC,200 |
| 0392 | CD0000 | X | 876 | CALL | DMPY |
| 0395 | 01E803 | | 877 | LD | BC,1000 |
| 0398 | CD0000 | X | 878 | CALL | DDIV |
| 039B | E1 | | 879 | POP | HL |
| 039C | 19 | | 880 | ADD | HL,DE |
| 039D | 226968 | | 881 | LD | (GEXP),HL |
| | | | 882 | ; | |
| 03A0 | 0652 | | 883 | LD | B,'R' |
| 03A2 | 0E06 | | 884 | LD | C,DBBRPT |
| 03A4 | CD0000 | X | 885 | CALL | SET1 |
| 03A7 | ED4B4068 | | 886 | LD | BC,(NEG) |
| 03AB | CD0000 | X | 887 | CALL | DMPY |
| 03AE | 01E803 | | 888 | LD | BC,1000 |
| 03B1 | CD0000 | X | 889 | CALL | DDIV |
| 03B4 | D5 | | 890 | PUSH | DE |
| 03B5 | ED5B6B68 | | 891 | LD | DE,(BEXP) |
| 03B9 | 01C800 | | 892 | LD | BC,200 |
| 03BC | CD0000 | X | 893 | CALL | DMPY |
| 03BF | 01E803 | | 894 | LD | BC,1000 |
| 03C2 | CD0000 | X | 895 | CALL | DDIV |
| 03C5 | E1 | | 896 | POP | HL |
| 03C6 | 19 | | 897 | ADD | HL,DE |
| 03C7 | 226B68 | | 898 | LD | (BEXP),HL |
| | | | 899 | ; | |
| | | | 900 | ; | |
| 03CA | 3E01 | | 901 | LD | A,1 |
| 03CC | 32E768 | | 902 | LD | (SFSFLG),A |
| 03CF | C9 | | 903 | RET | |
| | | | 904 | ; | |
| | | | 905 | ; subroutines | |
| | | | 906 | ; | |
| 03D0 | ED5B4068 | | 907 | CALAVG LD | DE,(NEG) |
| 03D4 | 010A00 | | 908 | LD | BC,10 |
| 03D7 | CD0000 | X | 909 | CALL | DMPY |
| 03DA | ED534068 | | 910 | LD | (NEG),DE |
| 03DE | 0652 | | 911 | LD | B,'R' |
| 03E0 | 0E1F | | 912 | LD | C,DBPCNT |
| 03E2 | CD0000 | X | 913 | CALL | SET1 |
| 03E5 | ED4B3E68 | | 914 | LD | BC,(REF) |
| 03E9 | ED533E68 | | 915 | LD | (REF),DE |
| 03ED | CD0000 | X | 916 | CALL | DMPY |
| 03F0 | E5 | | 917 | PUSH | HL |
| 03F1 | 2A4068 | | 918 | LD | HL,(NEG) |
| 03F4 | 19 | | 919 | ADD | HL,DE |
| 03F5 | EB | | 920 | EX | DE,HL |
| 03F6 | E1 | | 921 | POP | HL |
| 03F7 | 010000 | | 922 | LD | BC,0 |

```
03FA   ED4A            923          ADC    HL,BC
03FC   ED4B3E68        924          LD     BC,(REF)
0400   03              925          INC    BC
0401   CD0000    X     926          CALL   DDIV
0404   EB              927          EX     DE,HL
0405   C9              928          RET
                       929   ;
0406   016400          930   CALSFS LD     BC,100
0409   ED5B4068        931          LD     DE,(NEG)
040D   CD0000    X     932          CALL   DMPY
0410   ED4B3E68        933          LD     BC,(REF)
0414   CD0000    X     934          CALL   DDIV
0417   C9              935          RET
                       936   ;
0418   DDE5            937   RATIO  PUSH   IX
041A   D1              938          POP    DE
041B   01E803          939          LD     BC,1000
041E   CD0000    X     940          CALL   DMPY
0421   FDE5            941          PUSH   IY
0423   C1              942          POP    BC
0424   CD0000    X     943          CALL   DDIV
0427   ED53EC68        944          LD     (CRATIO),DE
042B   C9              945          RET
                       946   ;
042C   585B554E        947   MSG01  DEFM   'XEUNGXTX'
0434   464C564F        948   MSG02  DEFM   'FLVORXTX'
                       949   ;
                       950          END
```

```
                                      COLOR
LOC    OBJ CODE  M STMT SOURCE STATEMENT

450   *LIST ON
                      451   ;
                      452   ;
                      453   ;
                      454   ;       129
                      455   ;
                      456   ;                COLOR CORRECTION
                      457   ;
                      458   ;
                      459   ;;;;;;;;;;;;;;;;;;;;;;;;;;;;;;;;;;
                      460   ;
                      461   ;                            E D I T
                      462   ;
                      463   ;       08-20-82            AMF
                      464   ;
                      465   ;;;;;;;;;;;;;;;;;;;;;;;;;;;;;;;;;;
                      466   ;
                      467   ;
                      468          EXTERNAL     SENDING,E
                      469          EXTERNAL     GETNUM,F
                      470          EXTERNAL     LEFT,SEL
                      471   ;
                      472          GLOBAL       COLOR,LE
                      473   ;
                      474   ;
                      475   PPCOL:
0000   0F04           476          DEFW    1039
0002   3804           477          DEFW    1080
0004   6204           478          DEFW    1122
0006   8E04           479          DEFW    1166
0008   BC04           480          DEFW    1212
000A   EB04           481          DEFW    1259
000C   1C05           482          DEFW    1308
000E   4F05           483          DEFW    1359
0010   8505           484          DEFW    1413
```

|  |  |  |  |  |  |
|---|---|---|---|---|---|
|  |  | 485 | ; | DEFW | 1468 |
|  |  | 486 | ; | DEFW | 1525 |
|  |  | 487 | ; | DEFW | 1585 |
|  |  | 488 | ; | DEFW | 1647 |
|  |  | 489 | ; | DEFW | 1711 |
|  |  | 490 | ; | DEFW | 1778 |
|  |  | 491 | ; | DEFW | 1848 |
|  |  | 492 | ; | DEFW | 1920 |
|  |  | 493 | ; | DEFW | 1995 |
|  |  | 494 | ; | DEFW | 2073 |
|  |  | 495 | ; |  |  |
|  |  | 496 | ; |  |  |
|  |  | 497 | NPCOL: |  |  |
| 0012 | C203 | 498 |  | DEFW | 962 |
| 0014 | 9E03 | 499 |  | DEFW | 926 |
| 0016 | 7B03 | 500 |  | DEFW | 891 |
| 0018 | 5A03 | 501 |  | DEFW | 858 |
| 001A | 3903 | 502 |  | DEFW | 825 |
| 001C | 1A03 | 503 |  | DEFW | 794 |
| 001E | FC02 | 504 |  | DEFW | 764 |
| 0020 | E002 | 505 |  | DEFW | 736 |
| 0022 | C402 | 506 |  | DEFW | 708 |
|  |  | 507 | ; | DEFW | 681 |
|  |  | 508 | ; | DEFW | 656 |
|  |  | 509 | ; | DEFW | 631 |
|  |  | 510 | ; | DEFW | 607 |
|  |  | 511 | ; | DEFW | 584 |
|  |  | 512 | ; | DEFW | 562 |
|  |  | 513 | ; | DEFW | 541 |
|  |  | 514 | ; | DEFW | 521 |
|  |  | 515 | ; | DEFW | 501 |
|  |  | 516 | ; | DEFW | 482 |
|  |  | 517 | ; |  |  |
|  |  | 518 | ; |  |  |
|  |  | 519 | PRCOL: |  |  |
| 0024 | D503 | 520 |  | DEFW | 981 |
| 0026 | C203 | 521 |  | DEFW | 962 |
| 0028 | B003 | 522 |  | DEFW | 944 |
| 002A | 9E03 | 523 |  | DEFW | 926 |
| 002C | 8D03 | 524 |  | DEFW | 909 |
| 002E | 7B03 | 525 |  | DEFW | 891 |
| 0030 | 6A03 | 526 |  | DEFW | 874 |
| 0032 | 5A03 | 527 |  | DEFW | 858 |
| 0034 | 4903 | 528 |  | DEFW | 841 |
|  |  | 529 | ; | DEFW | 825 |
|  |  | 530 | ; | DEFW | 810 |
|  |  | 531 | ; | DEFW | 794 |
|  |  | 532 | ; | DEFW | 779 |
|  |  | 533 | ; | DEFW | 764 |
|  |  | 534 | ; | DEFW | 750 |
|  |  | 535 | ; | DEFW | 736 |
|  |  | 536 | ; | DEFW | 722 |
|  |  | 537 | ; | DEFW | 708 |
|  |  | 538 | ; | DEFW | 695 |
|  |  | 539 | ; |  |  |
|  |  | 540 | ; |  |  |
|  |  | 541 | NRCOL: |  |  |
| 0036 | FB03 | 542 |  | DEFW | 1019 |
| 0038 | 0F04 | 543 |  | DEFW | 1039 |
| 003A | 2304 | 544 |  | DEFW | 1059 |
| 003C | 3804 | 545 |  | DEFW | 1080 |
| 003E | 4C04 | 546 |  | DEFW | 1100 |
| 0040 | 6204 | 547 |  | DEFW | 1122 |
| 0042 | 7804 | 548 |  | DEFW | 1144 |
| 0044 | 8E04 | 549 |  | DEFW | 1166 |
| 0046 | A504 | 550 |  | DEFW | 1189 |

```
                          551  ;         DEFW    1212
                          552  ;         DEFW    1235
                          553  ;         DEFW    1259
                          554  ;         DEFW    1283
                          555  ;         DEFW    1308
                          556  ;         DEFW    1334
                          557  ;         DEFW    1359
                          558  ;         DEFW    1386
                          559  ;         DEFW    1413
                          560  ;         DEFW    1440
                          561  ;
                          562  COLOR:
0048   328868             563          LD      (COLCOR),A
004B   3E00               564          LD      A,0
004D   328968             565          LD      (COLRSGN),A
0050   3A8868             566          LD      A,(COLCOR)
0053   210000     X       567          LD      HL,CORMSG
0056   110800             568          LD      DE,8
0059   FE10               569          CP      KEYR
005B   2815               570          JR      Z,COLOR2
005D   19                 571          ADD     HL,DE
005E   FE11               572          CP      KEYG
0060   2810               573          JR      Z,COLOR2
0062   19                 574          ADD     HL,DE
0063   FE12               575          CP      KEYB
0065   280B               576          JR      Z,COLOR2
0067   19                 577          ADD     HL,DE
0068   FE13               578          CP      KEYC
006A   2806               579          JR      Z,COLOR2
006C   19                 580          ADD     HL,DE
006D   FE14               581          CP      KEYM
006F   2801               582          JR      Z,COLOR2
0071   19                 583          ADD     HL,DE
                          584  ;
                          585  ;         LD      DE,COLORM
                          586  ;         CALL    CLRNWAT
                          587  ;
                          588  ;         CALL    GETKEY
                          589  ;         LD      (HEXSGN),A
                          590  ;         CP      KEYMIN
                          591  ;         JP      NZ,COLOR2
                          592  ;         LD      A,'K'-'7'
                          593  ;         LD      (SEGIMG+6),A
                          594  COLOR2:
                          595  ;         CALL    GETDIG
0072   EB                 596          EX      DE,HL
0073   CD0000     X       597          CALL    PUTASC
0076   CD0000     X       598          CALL    GETKEY
0079   FE19               599          CP      KEYCAN
007B   CA1B01     R       600          JP      Z,CLRCC
007E   CD0000     X       601          CALL    CONVKEY
0081   FE00               602          CP      0
0083   CA4501     R       603          JP      Z,COLERR
0086   FE0A               604          CP      10
0088   D24501     R       605          JP      NC,COLERR
008B   320768             606          LD      (SEGIMG+7),A
008E   328A68             607          LD      (COLRVAL),A
0091   0E20               608          LD      C,32
0093   CD0000     X       609          CALL    WAITKY
                          610  ;
                          611  ;         LD      A,(HEXSGN)
                          612  ;         LD      (COLRSGN),A
                          613  ;
0096   3A8868             614          LD      A,(COLCOR)
0099   FE13               615          CP      KEYC
009B   DAA700     R       616          JP      C,PRICOL
```

```
009E  210000   R  617            LD    HL,PPCOL
00A1  112400   R  618            LD    DE,PRCOL
               619  ;
               620  ;            LD    A,(COLRSGN)
               621  ;            CP    KEYMIN
               622  ;            JP    NZ,COLROUT
               623  ;            LD    HL,PPCOL
               624  ;            LD    DE,PRCOL
               625  ;
00A4  C3AD00   R  626            JP    COLROUT
               627  PRICOL:
00A7  211200   R  628            LD    HL,NPCOL
00AA  113600   R  629            LD    DE,NRCOL
               630  ;
               631  ;            LD    A,(COLRSGN)
               632  ;            CP    'K'-'7'
               633  ;            CP    KEYMIN
               634  ;            JP    NZ,COLROUT
               635  ;            LD    HL,NPCOL
               636  ;            LD    DE,NRCOL
               637  ;
               638  COLROUT:
00AD  3A8868      639            LD    A,(COLCOR)
00B0  FE10        640            CP    KEYR
00B2  CAD000   R  641            JP    Z,REDPRE
00B5  FE13        642            CP    KEYC
00B7  CAD000   R  643            JP    Z,REDPRE
00BA  FE11        644            CP    KEYG
00BC  CADC00   R  645            JP    Z,GRNPRE
00BF  FE14        646            CP    KEYM
00C1  CADC00   R  647            JP    Z,GRNPRE
               648  BLUPRE:
00C4  CD2801   R  649            CALL  GETCTB
00C7  CDF700   R  650            CALL  STRBLU
00CA  CDE900   R  651            CALL  STRRED
00CD  C30501   R  652            JP    STRGRN
               653  ;
               654  ;            CALL  GETCTB
               655  ;            LD    (BCORR),HL
               656  ;            EX    DE,HL
               657  ;            LD    (RCORR),HL
               658  ;            LD    (GCORR),HL
               659  ;            JP    COROUT
               660  ;
               661  REDPRE:
00D0  CD2801   R  662            CALL  GETCTB
00D3  CDE900   R  663            CALL  STRRED
00D6  CDF700   R  664            CALL  STRBLU
00D9  C30501   R  665            JP    STRGRN
               666  ;
               667  ;            CALL  GETCTB
               668  ;            LD    (RCORR),HL
               669  ;            EX    DE,HL
               670  ;            LD    (GCORR),HL
               671  ;            LD    (BCORR),HL
               672  ;            JP    COROUT
               673  ;
               674  GRNPRE:
00DC  CD2801   R  675            CALL  GETCTB
00DF  CD0501   R  676            CALL  STRGRN
00E2  CDE900   R  677            CALL  STRRED
00E5  C3F700   R  678            JP    STRBLU
               679  ;            CALL  GEUCTB
               680  ;            LD    (GCORR),HL
               681  ;            EX    DE,HL
               682  ;            LD    (RCORR),HL
               683  ;            LD    (BCORR),HL
```

```
                    684  COROUT:
     00E8  C9       685       RET
                    686  ;
                    687  ;
                    688  STRRED:
     00E9  ED4B206A 689       LD    BC,(RCORR)
     00ED  CD1301 R 690       CALL  ADDCLR
     00F0  22206A   691       LD    (RCORR),HL
     00F3  2AF068   692       LD    HL,(SCRTH1)
     00F6  C9       693       RET
                    694  ;
                    695  STRBLU:
     00F7  ED4B246A 696       LD    BC,(BCORR)
     00FB  CD1301 R 697       CALL  ADDCLR
     00FE  22246A   698       LD    (BCORR),HL
     0101  2AF068   699       LD    HL,(SCRTH1)
     0104  C9       700       RET
                    701  ;
                    702  STRGRN:
     0105  ED4B226A 703       LD    BC,(GCORR)
     0109  CD1301 R 704       CALL  ADDCLR
     010C  22226A   705       LD    (GCORR),HL
     010F  2AF068   706       LD    HL,(SCRTH1)
     0112  C9       707       RET
                    708  ;
                    709  ;
                    710  ADDCLR:
     0113  EB       711       EX    DE,HL
     0114  CD0000 X 712       CALL  DMPY
     0117  CD0000 X 713       CALL  NORMAL
     011A  C9       714       RET
                    715  ;
                    716  ;
                    717  CLRCC:
     011B  21E803   718       LD    HL,1000
     011E  22206A   719       LD    (RCORR),HL
     0121  22226A   720       LD    (GCORR),HL
     0124  22246A   721       LD    (BCORR),HL
     0127  C9       722       RET
                    723  ;
                    724  ;
                    725  GETCTB:
     0128  3A8A68   726       LD    A,(COLRVAL)
     012B  3D       727       DEC   A
     012C  87       728       ADD   A,A
     012D  010000   729       LD    BC,0
     0130  4F       730       LD    C,A
     0131  09       731       ADD   HL,BC
     0132  CD4901 R 732       CALL  LBCFHL
     0135  C5       733       PUSH  BC
     0136  010000   734       LD    BC,0
     0139  4F       735       LD    C,A
     013A  EB       736       EX    DE,HL
     013B  09       737       ADD   HL,BC
     013C  CD4D01 R 738       CALL  LDEFHL
     013F  E1       739       POP   HL
     0140  ED53F068 740       LD    (SCRTH1),DE
     0144  C9       741       RET
                    742  ;
                    743  ;
                    744  COLERR:
     0145  CD0000 X 745       CALL  ERROR
     0148  C9       746       RET
                    747  ;
                    748  ;
                    749  LBCFHL:
```

```
0149    4E              750             LD      C,(HL)
014A    23              751             INC     HL
014B    46              752             LD      B,(HL)
014C    C9              753             RET
                        754     ;
                        755     ;
                        756     LDEFHL:
014D    5E              757             LD      E,(HL)
014E    23              758             INC     HL
014F    56              759             LD      D,(HL)
0150    C9              760             RET
                        761     ;
                        762     *LIST ON
                        763     ;
                        764     EXPRN:
0151    F5              765             PUSH    AF
0152    110000     X    766             LD      DE,SELPRM
0155    CD0000     X    767             CALL    PUTASC
                        768     ;       CALL    CLRNWAT
0158    CD0000     X    769             CALL    GETDIG
015B    320768          770             LD      (SEGIMG+7),A
015E    47              771             LD      B,A
015F    FE00            772             CP      0
0161    CA0102     R    773             JP      Z,BADNUM
0164    FE0A            774             CP      10
0166    D20102     R    775             JP      NC,BADNUM
0169    FE01            776             CP      1
016B    C28501     R    777             JP      NZ,EXPR1
016E    F5              778             PUSH    AF
016F    CDFB01     R    779             CALL    CLRIT
0172    F1              780             POP     AF
0173    320668          781             LD      (SEGIMG+6),A
0176    CD0000     X    782             CALL    GETDIG
0179    320768          783             LD      (SEGIMG+7),A
017C    FE0A            784             CP      10
017E    D20102     R    785             JP      NC,BADNUM
0181    0E0A            786             LD      C,10
0183    81              787             ADD     A,C
0184    47              788             LD      B,A
                        789     EXPR1:
0185    F1              790             POP     AF
0186    FE1E            791             CP      KEYMIN
0188    78              792             LD      A,B
0189    CA9E01     R    793             JP      Z,NEGVAL
018C    FE03            794             CP      3
018E    DAC101     R    795             JP      C,RANGE0
0191    FE08            796             CP      8
0193    DAD501     R    797             JP      C,RANGE1
0196    FE0F            798             CP      15
0198    DADB01     R    799             JP      C,RANGE2
019B    C3E001     R    800             JP      RANGE3
                        801     ;
                        802     NEGVAL:
019E    FE03            803             CP      3
01A0    DAB601     R    804             JP      C,RANG0
01A3    FE05            805             CP      5
01A5    DACA01     R    806             JP      C,RANG1
01A8    FE0C            807             CP      12
01AA    DAE601     R    808             JP      C,RANGE4
01AD    78              809             LD      A,B
01AE    D60C            810             SUB     12
01B0    47              811             LD      B,A
01B1    3E05            812             LD      A,5
01B3    C3EC01     R    813             JP      RANOUT
                        814     ;
                        815     RANG0:
```

```
01B6   D602              816         SUB     2
01B8   CABD01   R        817         JP      Z,R0
01BB   C602              818         ADD     A,2
                         819  R0:
01BD   47                820         LD      B,A
01BE   C3C501   R        821         JP      RAN0
                         822  RANGE0:
01C1   78                823         LD      A,B
01C2   C604              824         ADD     A,4
01C4   47                825         LD      B,A
                         826  RAN0:
01C5   3E00              827         LD      A,0
01C7   C3EC01   R        828         JP      RANOUT
                         829  ;
                         830  RANG1:
01CA   D604              831         SUB     4
01CC   CAD101   R        832         JP      Z,R1
01CF   C602              833         ADD     A,2
                         834  R1:
01D1   47                835         LD      B,A
01D2   C3D601   R        836         JP      RAN1
                         837  RANGE1:
01D5   05                838         DEC     B
                         839  RAN1:
01D6   3E01              840         LD      A,1
01D8   C3EC01   R        841         JP      RANOUT
                         842  ;
                         843  RANGE2:
01DB   3E02              844         LD      A,2
01DD   C3EC01   R        845         JP      RANOUT
                         846  ;
                         847  RANGE3:
01E0   04                848         INC     B
01E1   3E03              849         LD      A,3
01E3   C3EC01   R        850         JP      RANOUT
                         851  ;
                         852  RANGE4:
01E6   78                853         LD      A,B
01E7   D605              854         SUB     5
01E9   47                855         LD      B,A
01EA   3E04              856         LD      A,4
                         857  RANOUT:
01EC   328768            858         LD      (EXRANG),A
01EF   78                859         LD      A,B
01F0   CD0000   X        860         CALL    BUTT7
01F3   3E00              861         LD      A,0
01F5   328768            862         LD      (EXRANG),A
01F8   3E19              863         LD      A,KEYCAN
01FA   C9                864         RET
                         865  ;
                         866  ;
                         867  ;CLRNWAT:
                         868  ;       CALL    PUTASC
                         869  ;       LD      C,12
                         870  ;       CALL    WAIT
                         871  CLRIT:
01FB   110000   X        872         LD      DE,MSG6
01FE   C30000   X        873         JP      PUTASC
                         874  ;
                         875  ;
                         876  BADNUM:
0201   F1                877         POP     AF
0202   C30000   X        878         JP      ERROR
                         879  ;
                         880  END
```

What is claimed is:

1. A color printing control system having signal processing means for automatically performing setups of internal values for automatically self-correcting the control of color balance and color density in making color prints from color negatives comprising:

light transmitting means for transmitting light through each reference negative;

means for reading the light transmitted by each reference color negative and providing color print times in accordance with print time signals;

light source and light sensing means directly coupled to said signal processing means (1) for online reading of a normal reference print and producing a first set of signals related to the color densities of the reference print and (2) for online reading of prints made from normal, underexposed and overexposed reference negatives using initial internal values and producing a second set of signals each related to the respective color densities;

means for storing the first set of signals; and said signal processing means including means for online comparing immediately upon the production of the second set of signals without human intervention the first set of signals with said second set of signals to determine adjusted internal values including adjusted print time signals to automatically correct and to adapt the internal values without human intervention if the first set of signals is not substantially equal to the second set of signals whereby the normal and underexposed and overexposed reference negatives produce prints with the same densities as the reference print and the adjusted internal values are maintained over a plurality of color prints.

2. A method for automatically performing setups of internal values and for automatically self-correcting the control of color balance and color density in making color prints from color negatives which comprises the steps of:

(a) transmitting light through each reference color negative;

(b) reaching the light transmitted by each reference color negative and providing color print times in accordance with print time signals;

(c) online reading by light sensing means of a reference print and producing a first set of signals related to the density of the reference print and online reading of prints made from normal, underexposed and overexposed reference negatives and producing a second set of signals each related to the respective color densities;

(d) storing the first set of signals; and (e) immediately upon production of the second set directly receiving the second set from the online reading and comparing the first set with the second set of signals to determine adjusted internal values including adjusted print time signals to automatically correct and to adapt the internal values without human intervention if the first set of signals is not substantially equal to the second set of signals whereby the normal and underexposed and overexposed reference negatives produce prints with the same densities as the reference print and the adjusted internal values are maintained over a production run of color prints until self-correction is again required.

3. A color printing control system for automatically performing setups in which print time and print time versus density slopes are adjusted and for controlling the color balance and the color density in making color prints from color negatives comprising:

means for reading the light transmitted by a reference color negative;

means for transmitting light through the color negative and providing color print times in accordance with print time signals;

signal processing means, light source and light sensing means for online reading of a color print and producing a color density signal related to the color densities;

means coupling said light sensing means to said processing means for comparing without human intervention the reading of the signal from a reference print with that of a print made from a normal reference negative without human intervention immediately upon the production of the print made from the normal reference negative for automatically adjusting the print time and print time versus density slopes and maintaining the adjusted print time and print time versus density slopes over a plurality of color prints.

4. The system of claim 3 in which said processing means includes means for comparing another color print made from the normal reference negative using the adjusted print time versus density slopes and automatically readjusting the density slopes.

5. The system of claim 4 in which said signal processing means includes means for determining a correction factor based upon the difference in said signals and multiplying the correction factor by the reference point print time which determines the slope to obtain a new value of reference print time and slope.

6. A method for automatically performing setups in which print time versus density slopes are adjusted and for controlling the color balance and the color density in making color prints from color negatives which comprises the steps of:

(a) reading the light transmitted by a color negative;

(b) transmitting light through each color negative and providing color print times in accordance with print time signals;

(c) making a color print in accordance with the color negative light reading and with the current value of density slopes;

(d) reading a color print and producing a signal related to the density of each of the primary colors; and (e) comparing the reading of the signal from a reference print with that of a print made from a normal reference negative for automatically adjusting the print time versus density slopes without human intervention immediately upon production of the signal related to the density of the print made from the normal reference negative and maintaining the adjusted print time versus density slope over a plurality of color prints.

7. The method of claim 6 in which there is provided a further step of making another color print from the normal reference negative with the adjusted slopes and iterating steps a–e.

8. The method of claim 6 in which step (e) includes (f) developing a correction factor using the density difference between the signals and multiplying the correction factor by the reference point print times to obtain a new value of reference point print times.

9. The method of claim 8 in which steps a-f are repeated until the density difference approaches zero.

10. The method of claim 9 in which steps a-e are repeated using instead of a normal reference negative an underexposed and then an overexposed reference negative to obtain underexposed and overexposed reference point print times which determine the respective slopes to obtain new values of reference point print times.

11. The method of claim 10 in which steps a-e with underexposed and overexposed negatives are iterated until the density differences approach zero.

12. A method for performing an overall master correction of print time signals when making color prints from color negatives which comprises the steps of:
   (a) making a print from a normal reference negative;
   (b) online reading of the print of a normal reference negative and a normal reference print and producing signals related to the density of each of the prints and storing the signals related to the density of the normal reference print;
   (c) immediately upon the production of the signals related to the density of the print made from the normal reference negative without human intervention comparing the signals and developing and storing a correction factor related to the density difference between them; and
   (d) multiplying the print time signals by this correction factor when printing color negatives.

* * * * *